United States Patent [19]

Winkelman

[11] 4,435,752
[45] Mar. 6, 1984

[54] ALLOCATION OF ROTATING MEMORY DEVICE STORAGE LOCATIONS

[75] Inventor: Wayne Winkelman, Leander, Tex.

[73] Assignee: Texas Instruments Incorporated, Dallas, Tex.

[21] Appl. No.: 138,783

[22] Filed: Apr. 9, 1980

Related U.S. Application Data

[63] Continuation of Ser. No. 413,461, Nov. 7, 1973, abandoned, which is a continuation of Ser. No. 252,708, May 12, 1972, abandoned.

[51] Int. Cl.³ .................... G06F 3/06; G06F 13/04; G06F 13/08
[52] U.S. Cl. .................................................. 364/200
[58] Field of Search ... 364/200 MS File, 900 MS File

[56] References Cited

U.S. PATENT DOCUMENTS 3,596,257 7/1971 Patel .................................... 364/200
3,623,006 11/1971 Balakian ............................. 364/200
3,840,864 10/1974 Chang ................................. 364/200

Primary Examiner—Harvey E. Springborn
Attorney, Agent, or Firm—Melvin Sharp; N. Rhys Merrett; Thomas G. Devine

[57] ABSTRACT

A method of allocating memory space on a cyclic memory system is described. The memory system is partitioned into a plurality of memory regions with each of the regions containing contiguous memory elements. Each of the memory regions is then partitioned into a plurality of memory subregions wherein all subregions within a region are of equal memory capacity but where subregions of different regions have different memory capacities. A file of data is then assigned to occupy one available subregion of the memory which is the smallest available subregion which has sufficient memory capacity to contain the file of data.

8 Claims, 106 Drawing Figures

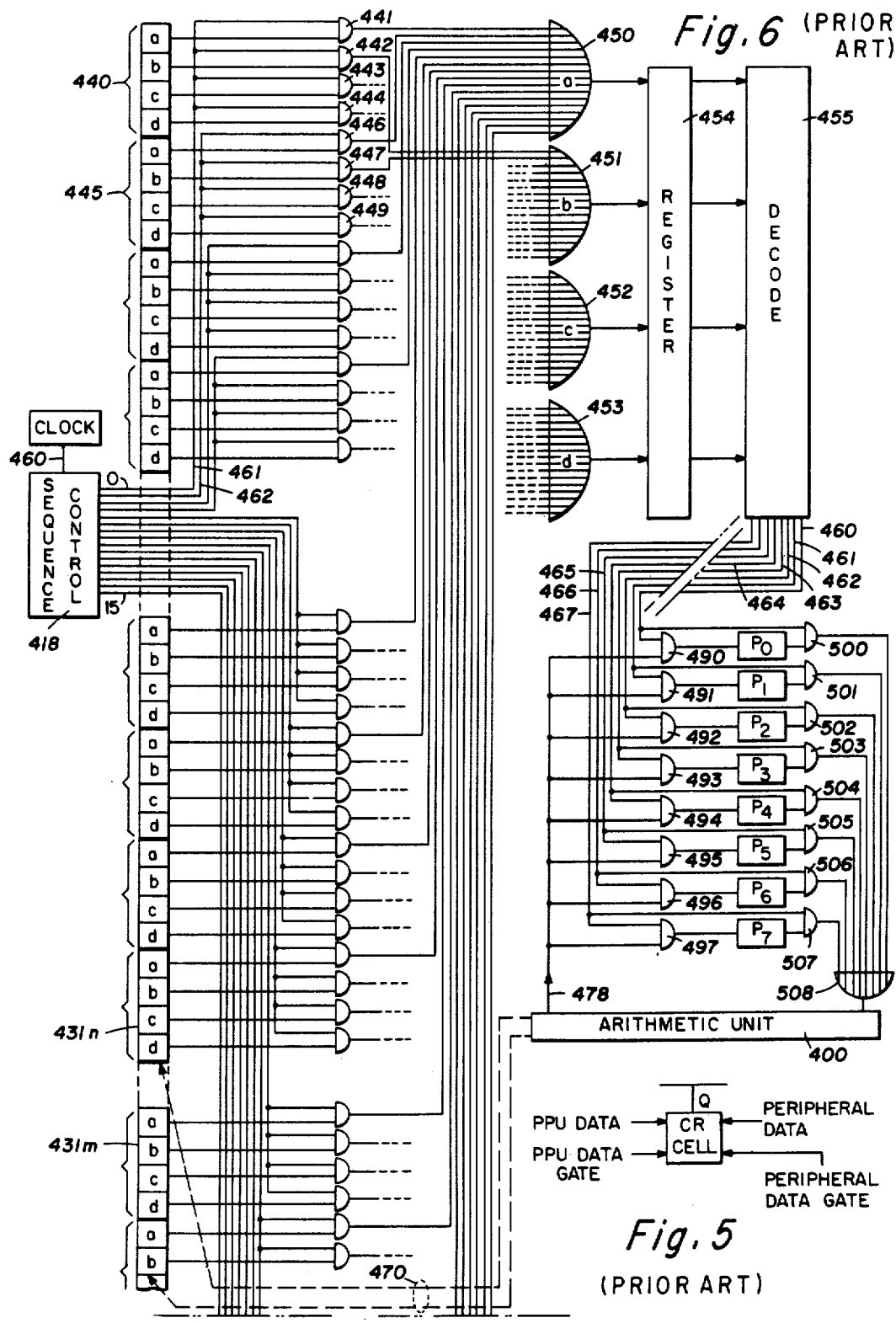

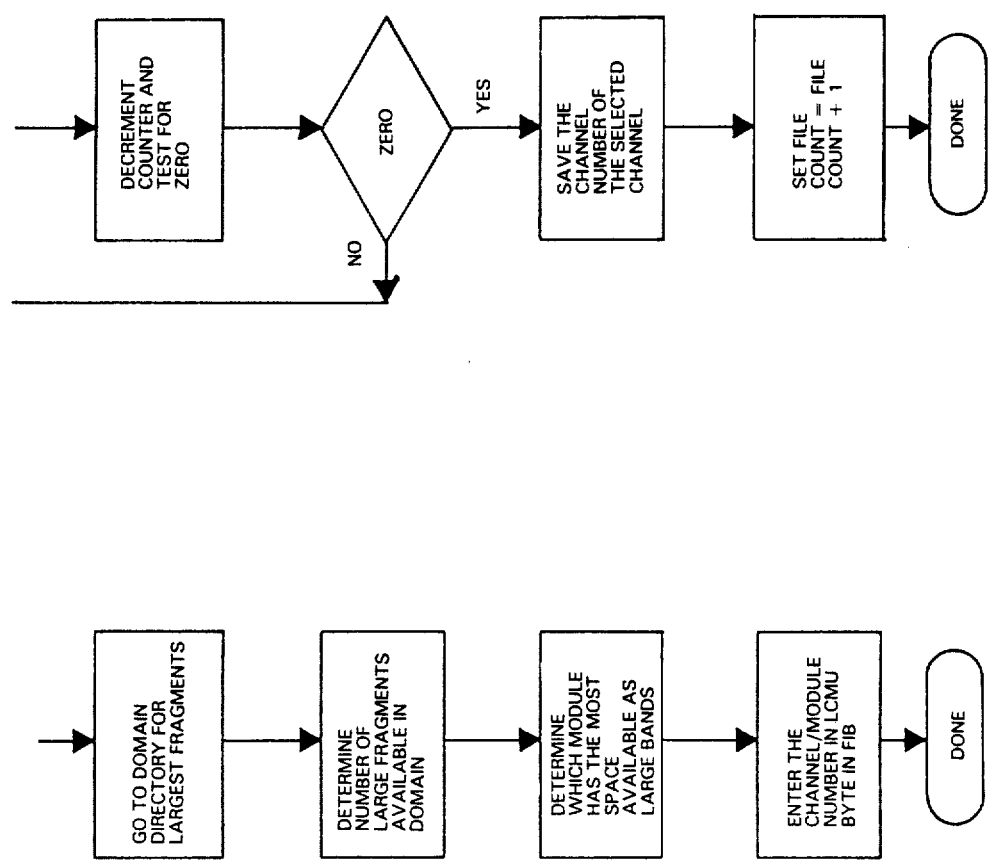
Fig. DA6-2

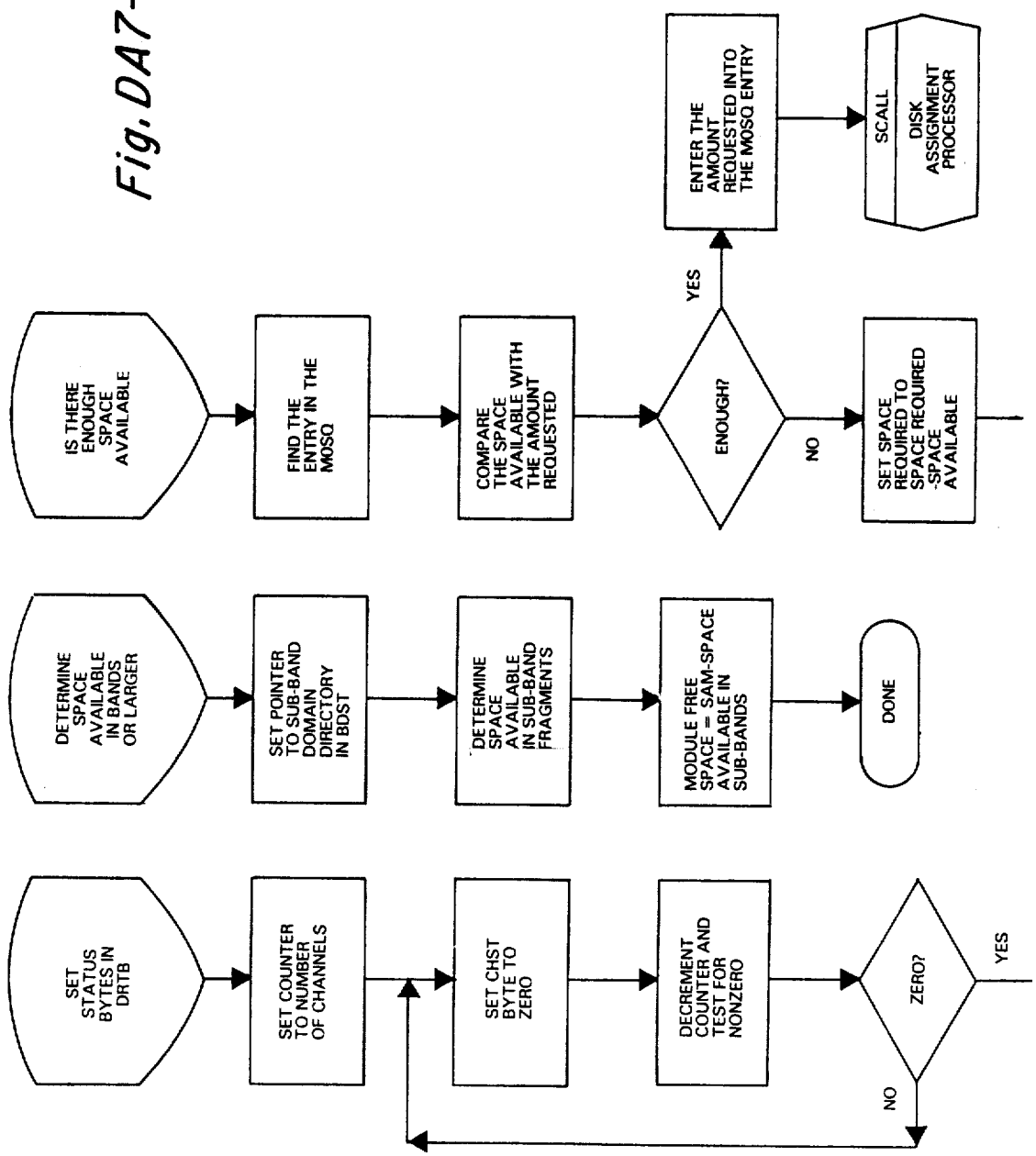
Fig. DA7-1

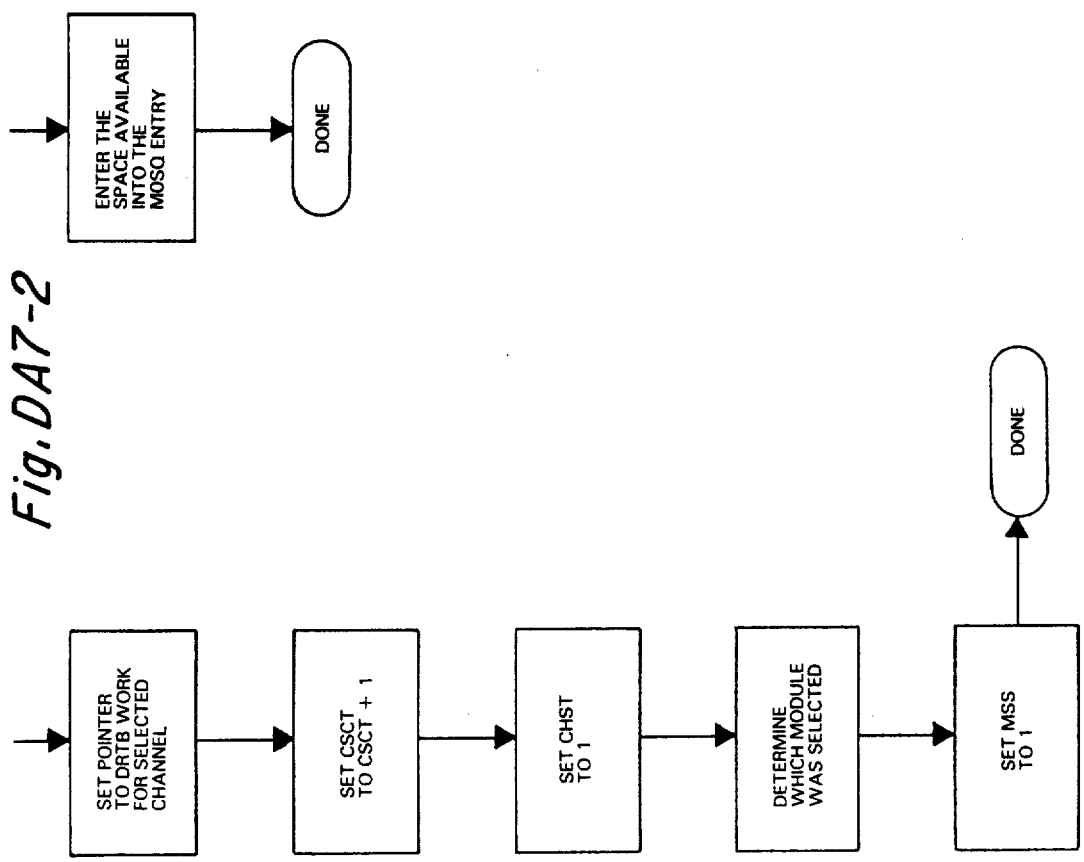
Fig. DA7-2

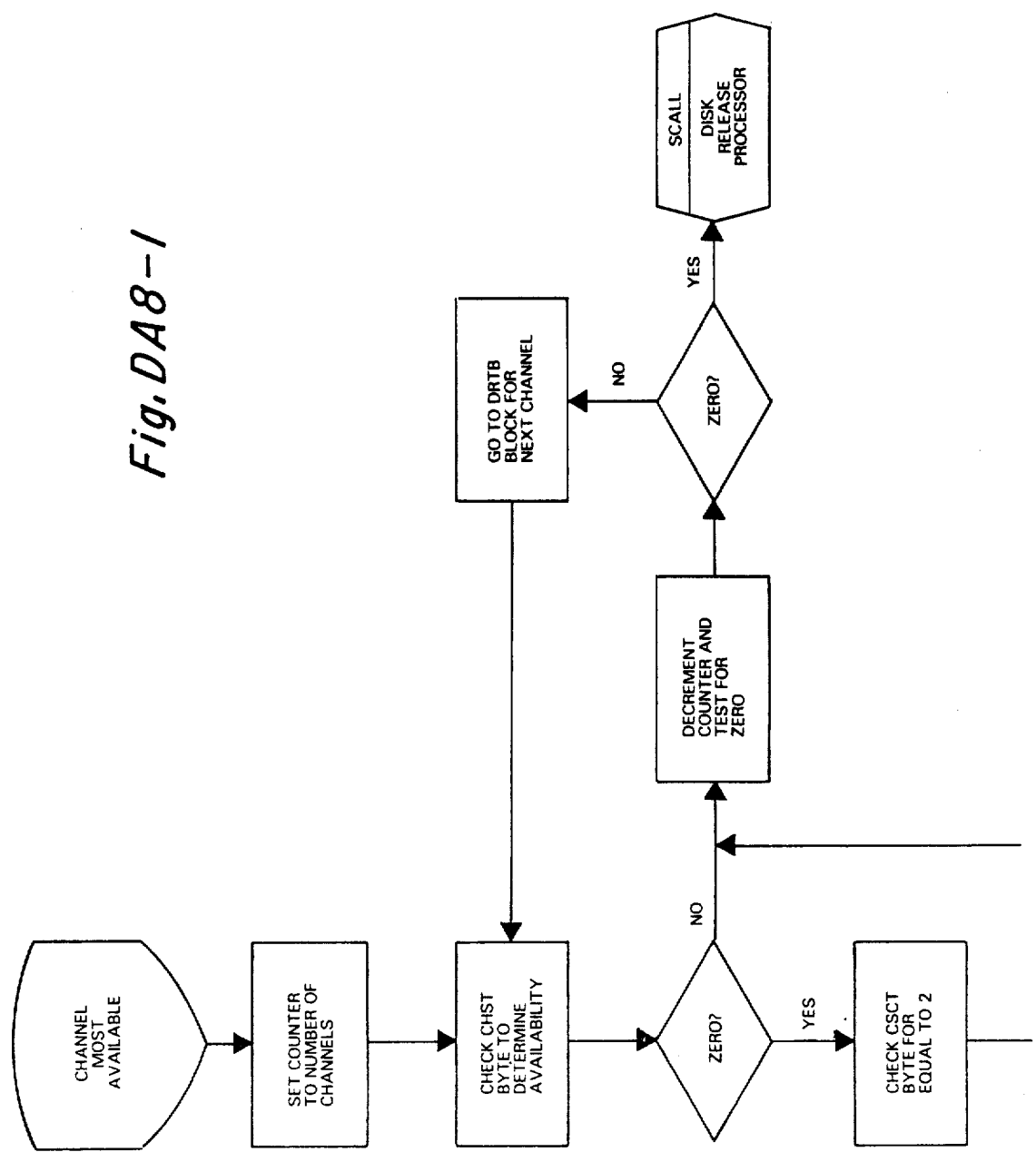
Fig. DA8-1

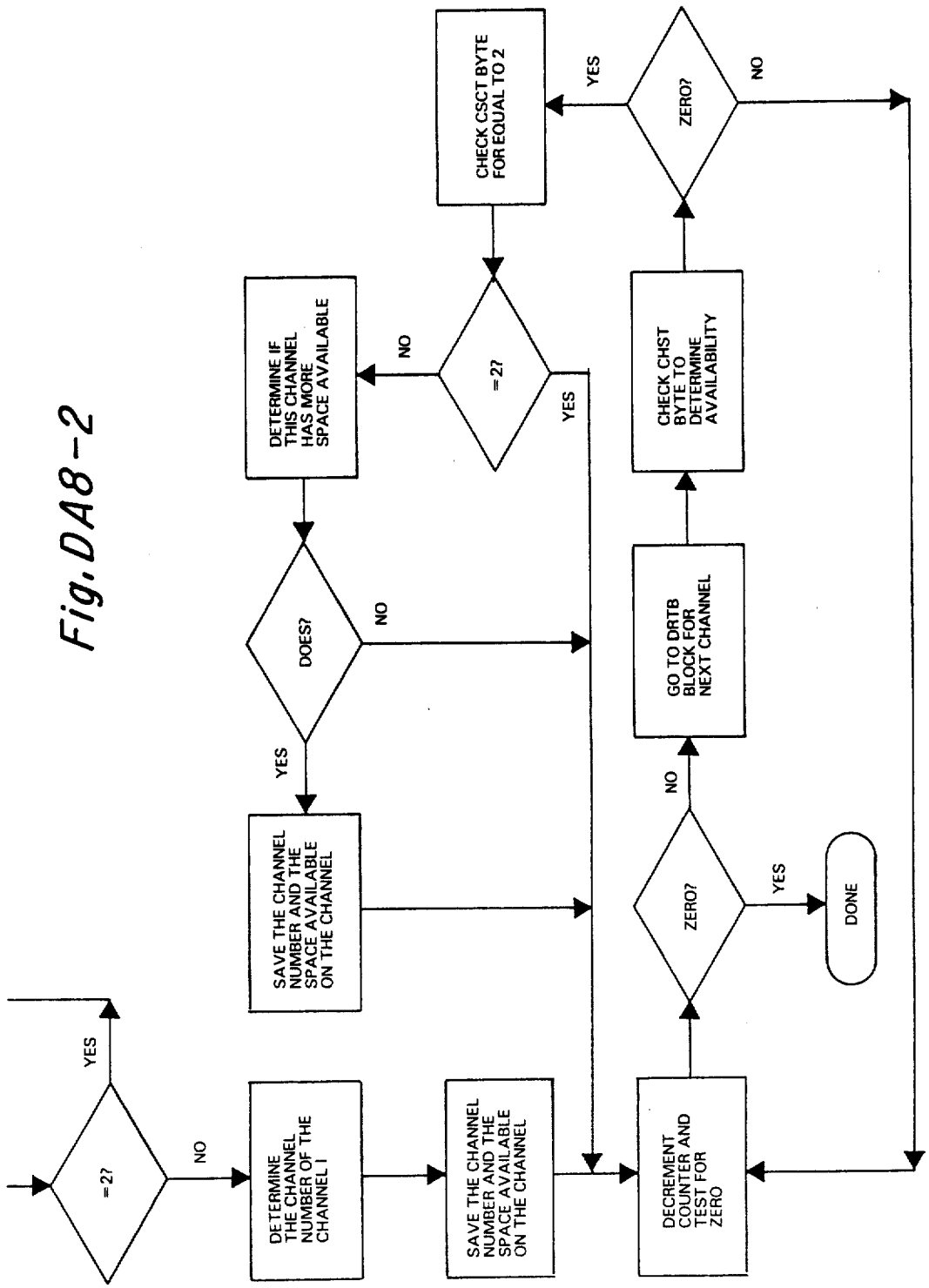
Fig. DA8-2

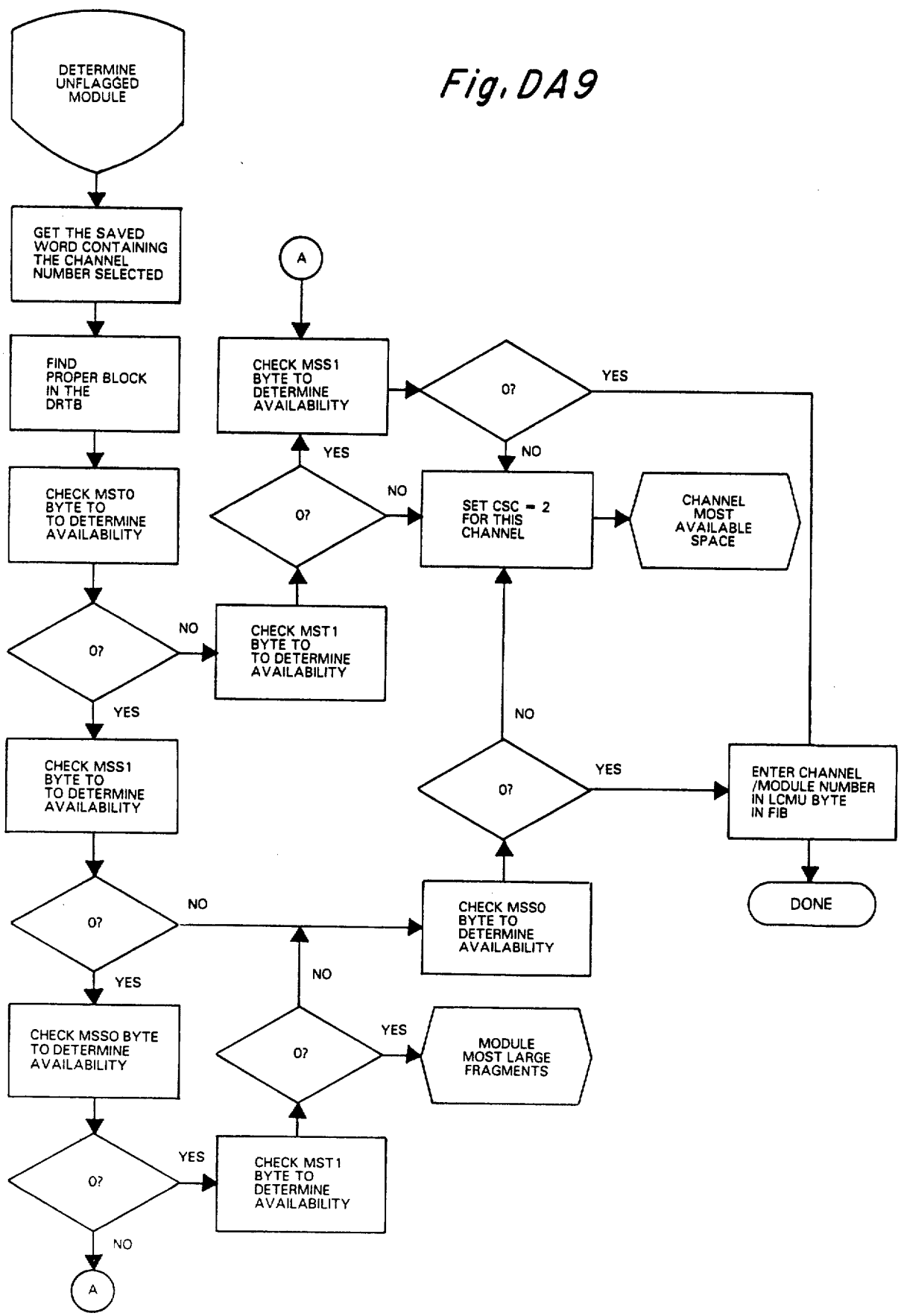
Fig. DA9

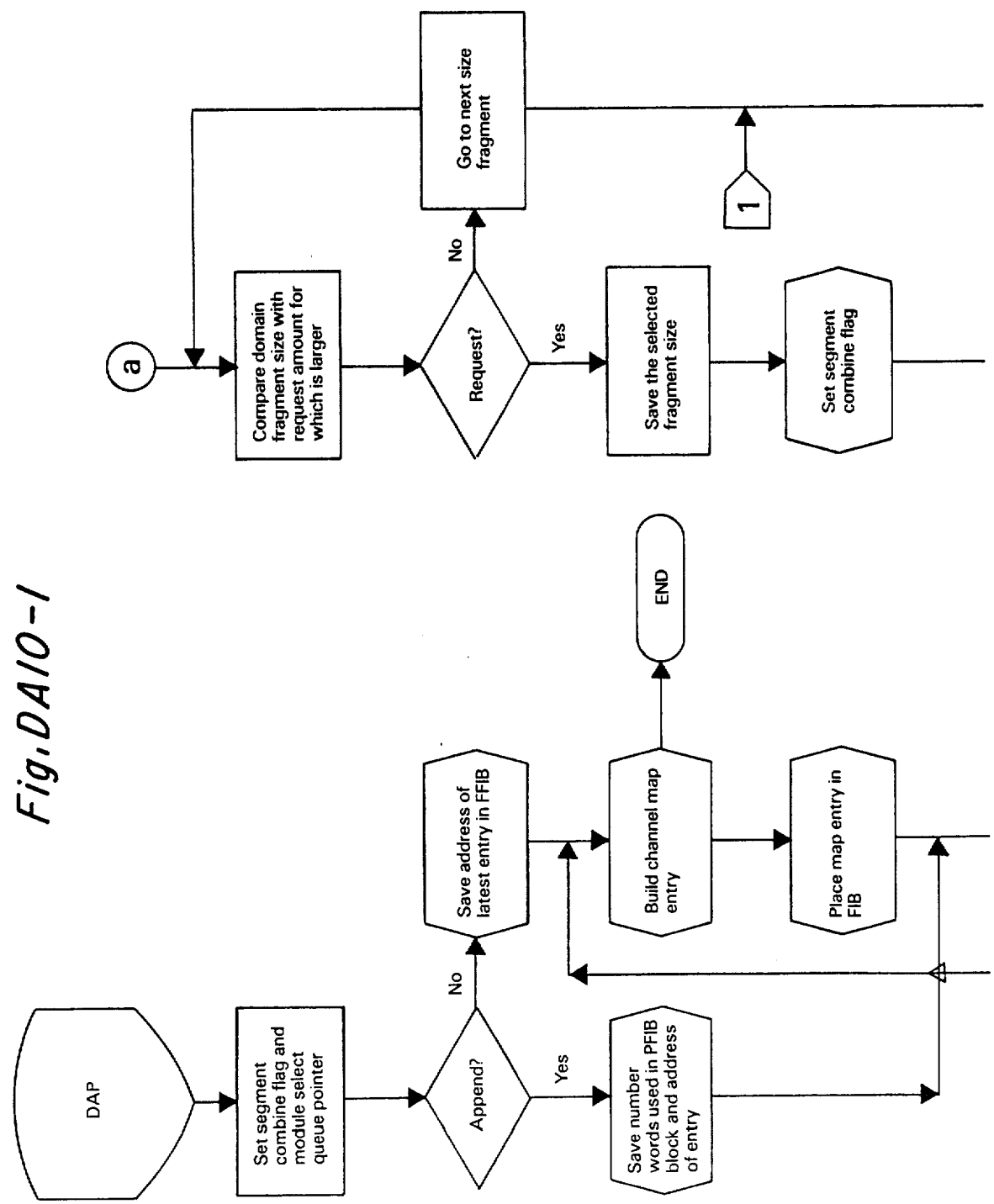
Fig. DA10-1

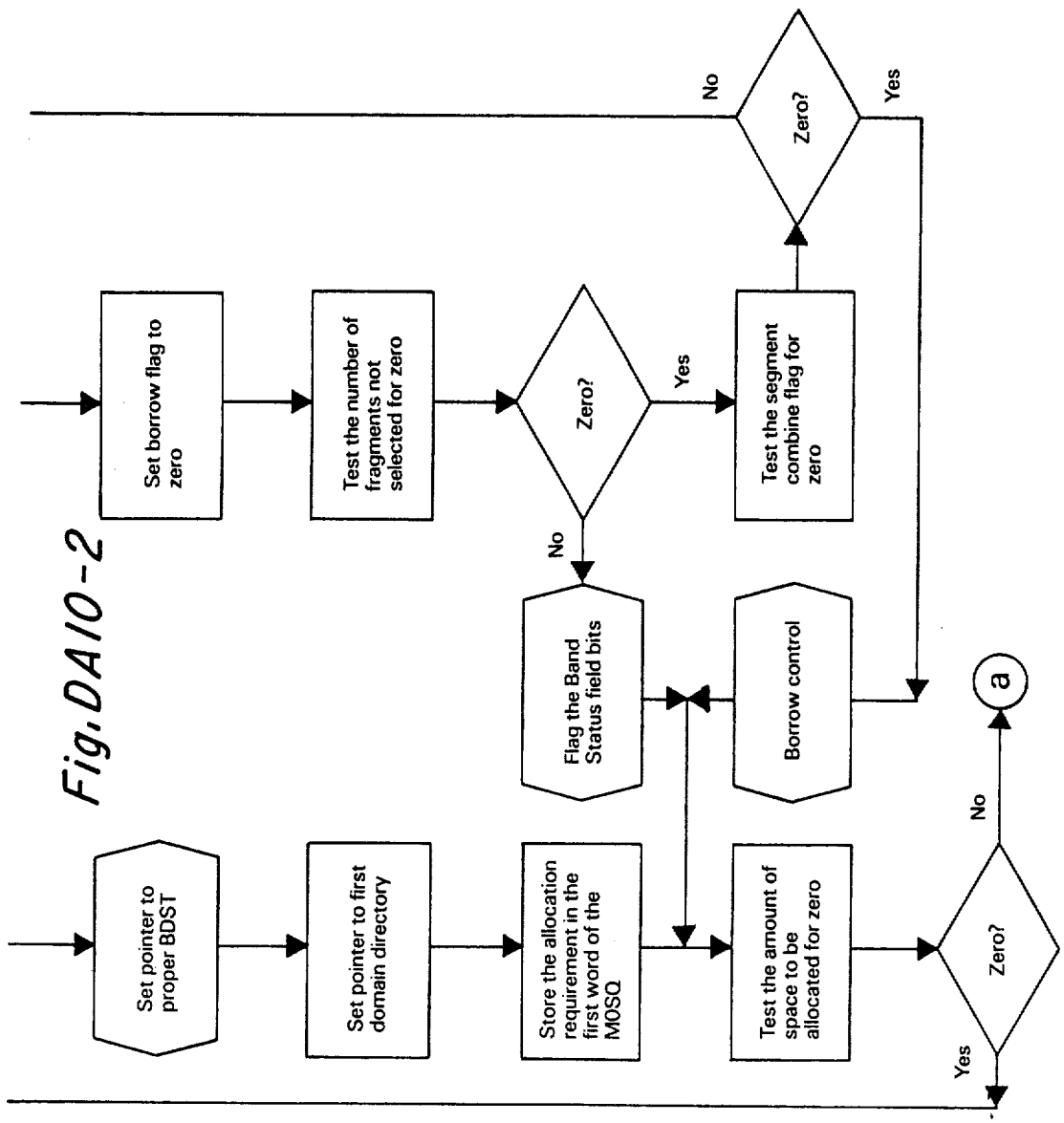
Fig. DA10-2

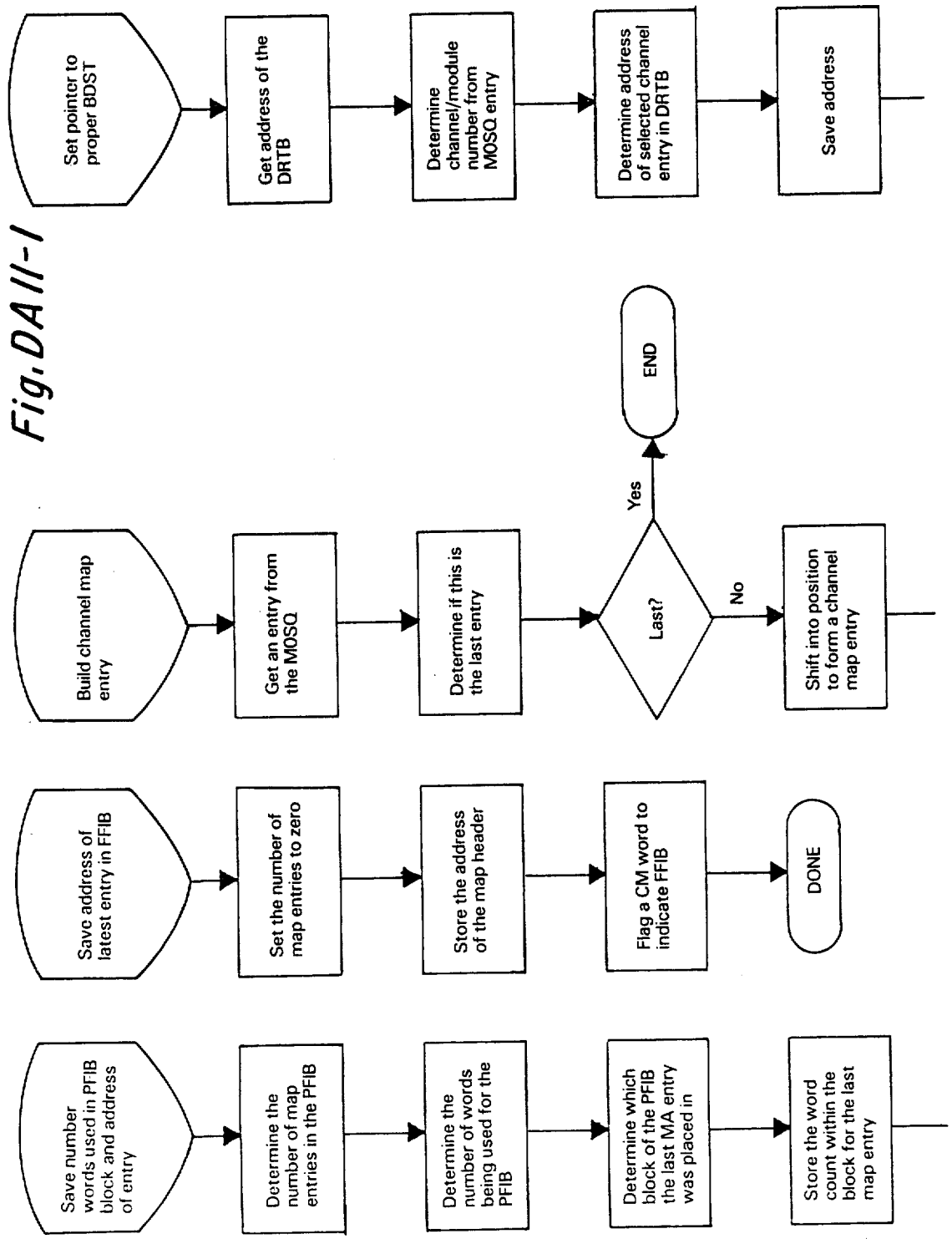

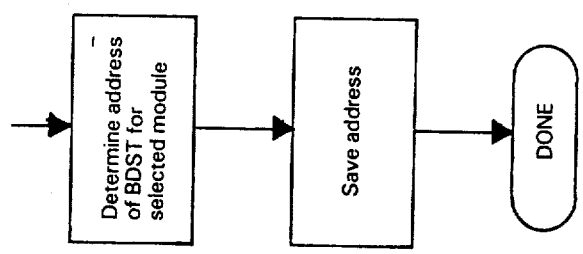
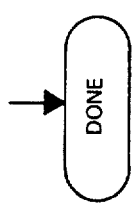
Fig. DA11-2
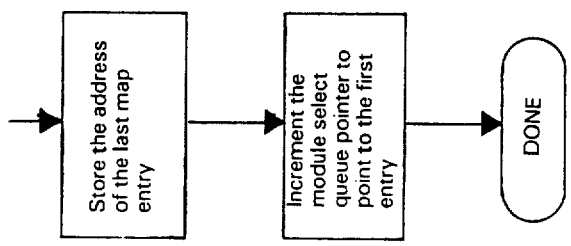

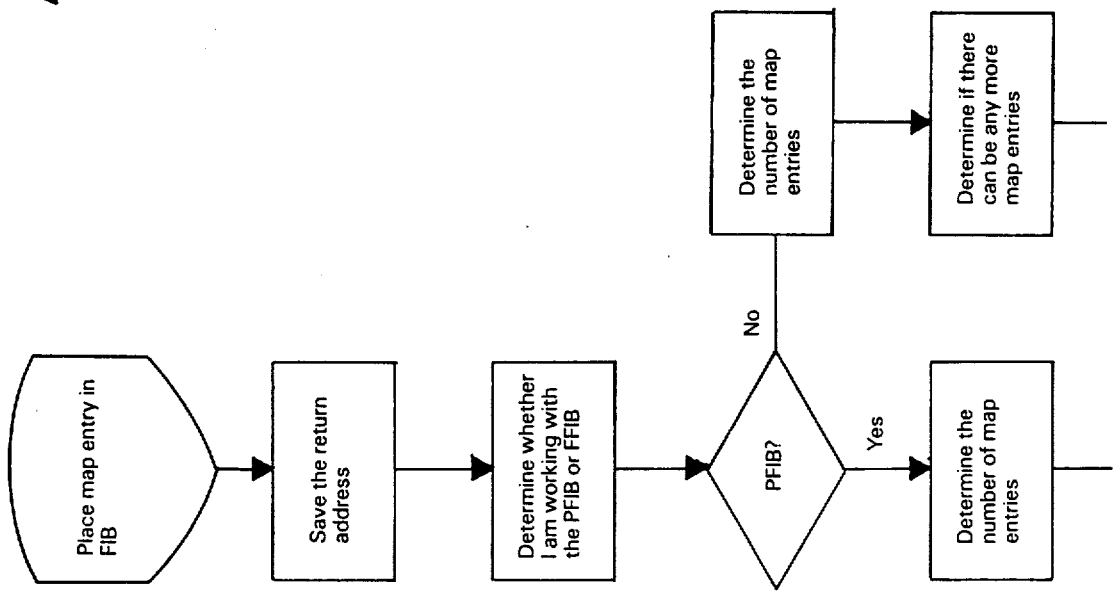
Fig. DA12-1

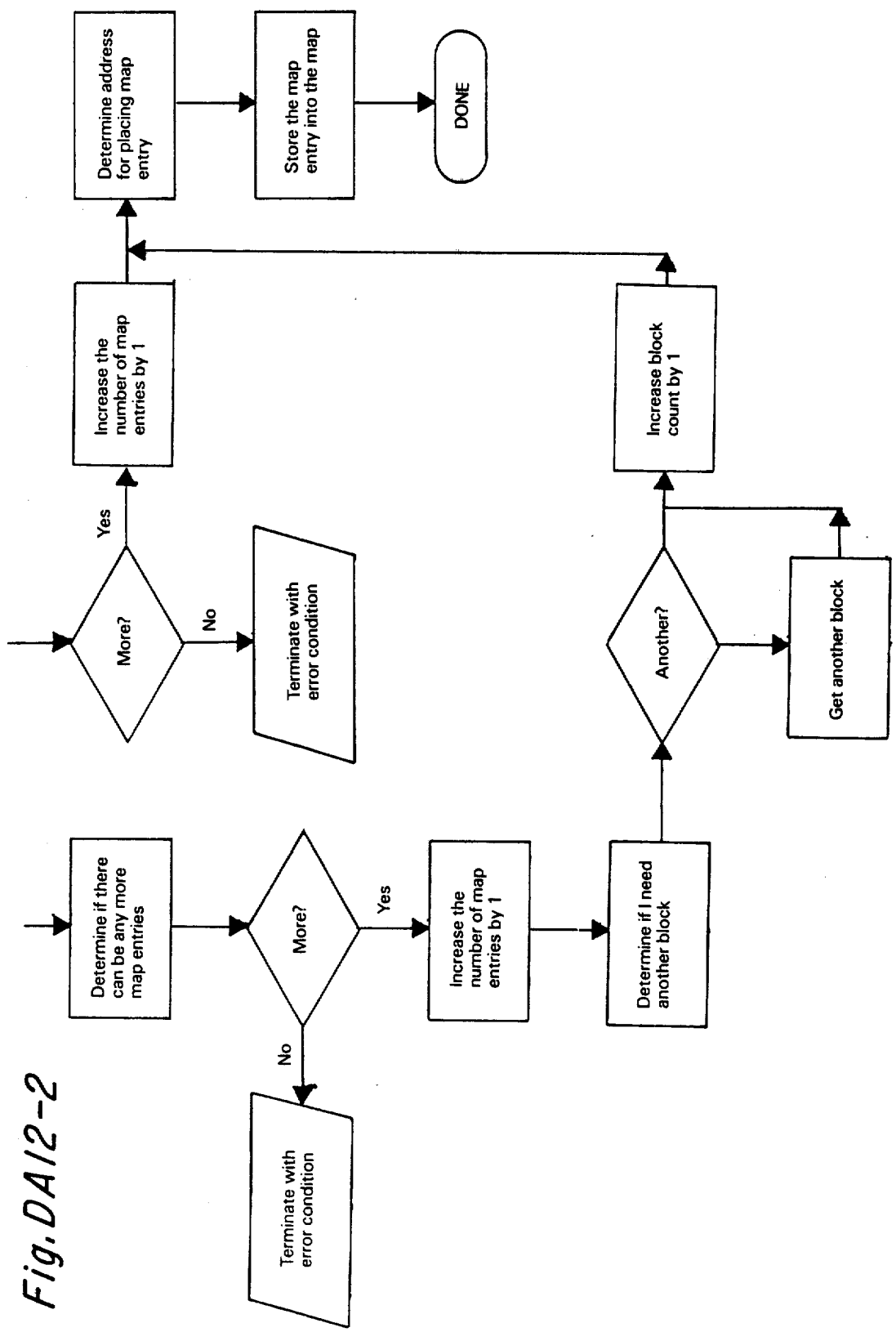
Fig.DA12-2

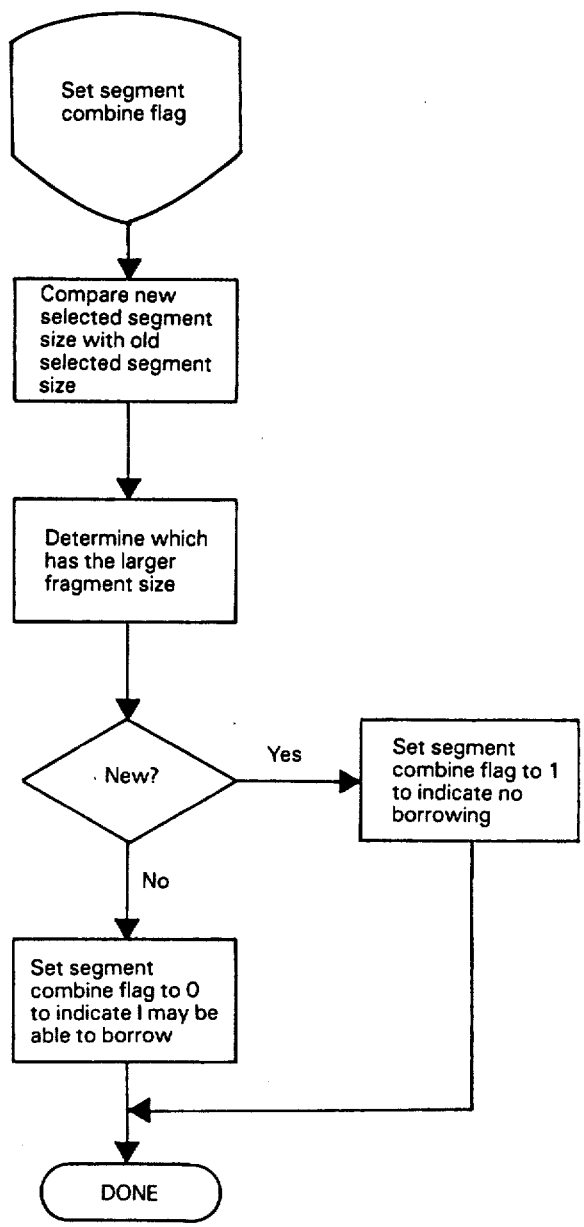
Fig. DA13

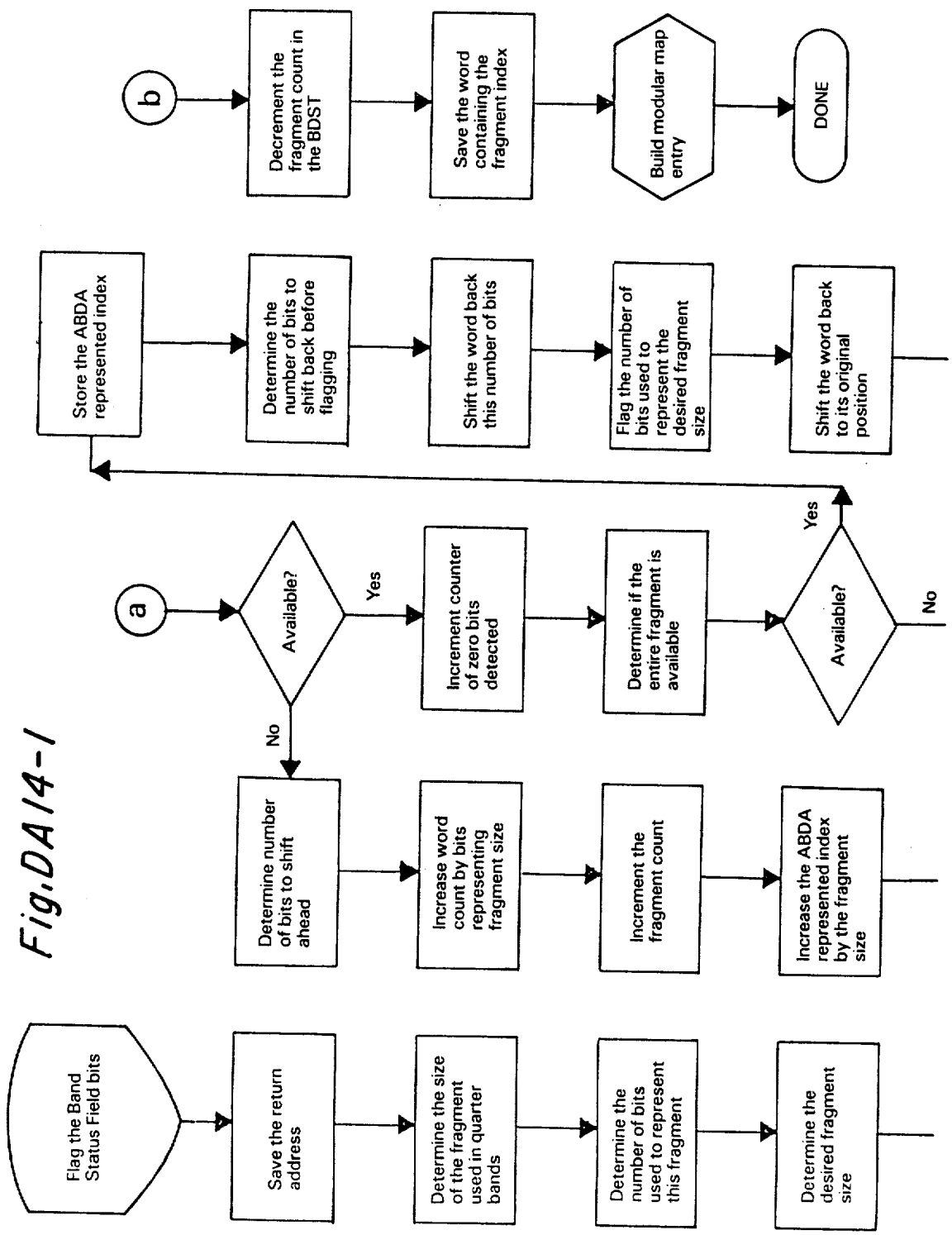

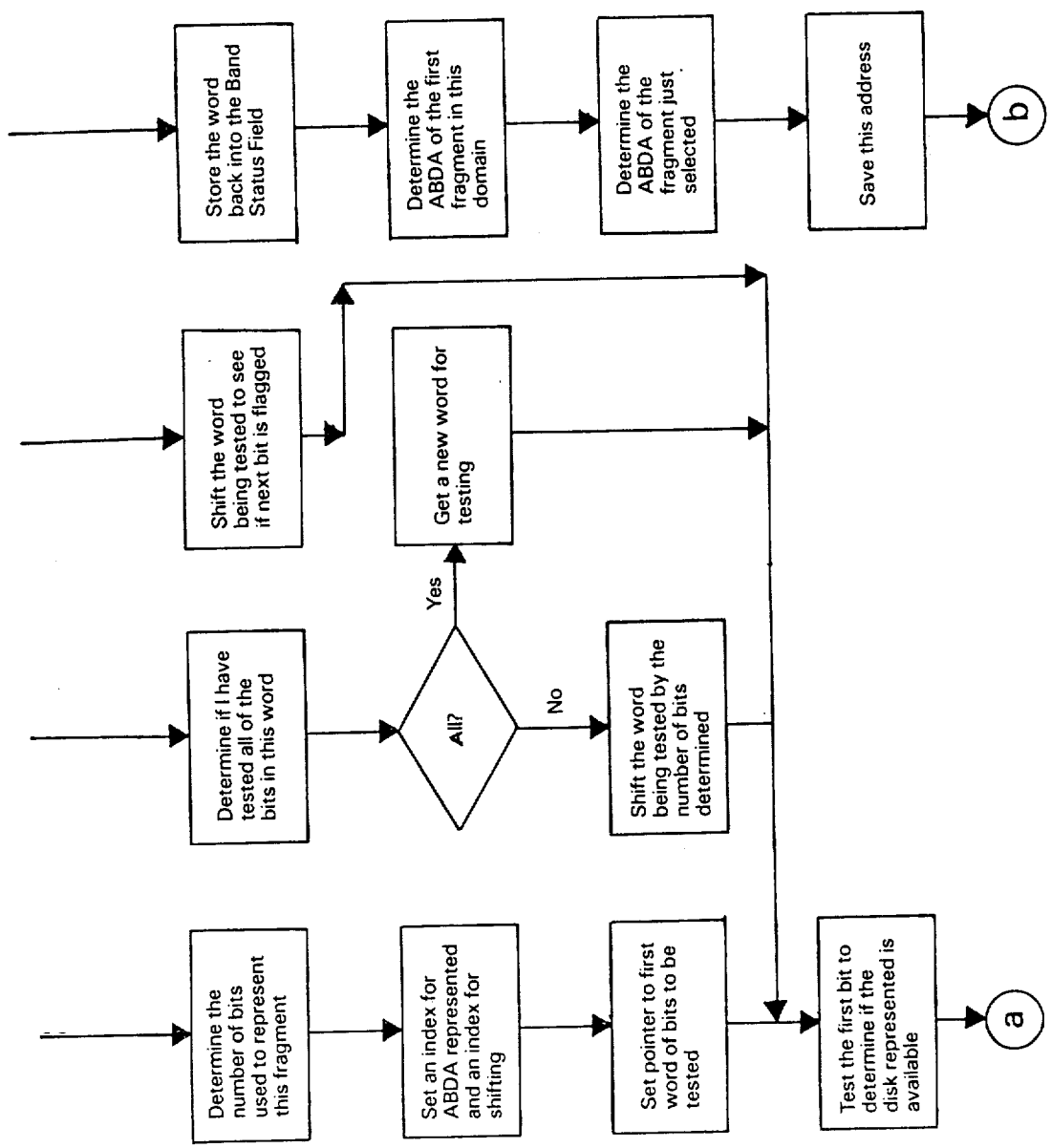
Fig. DA14-2

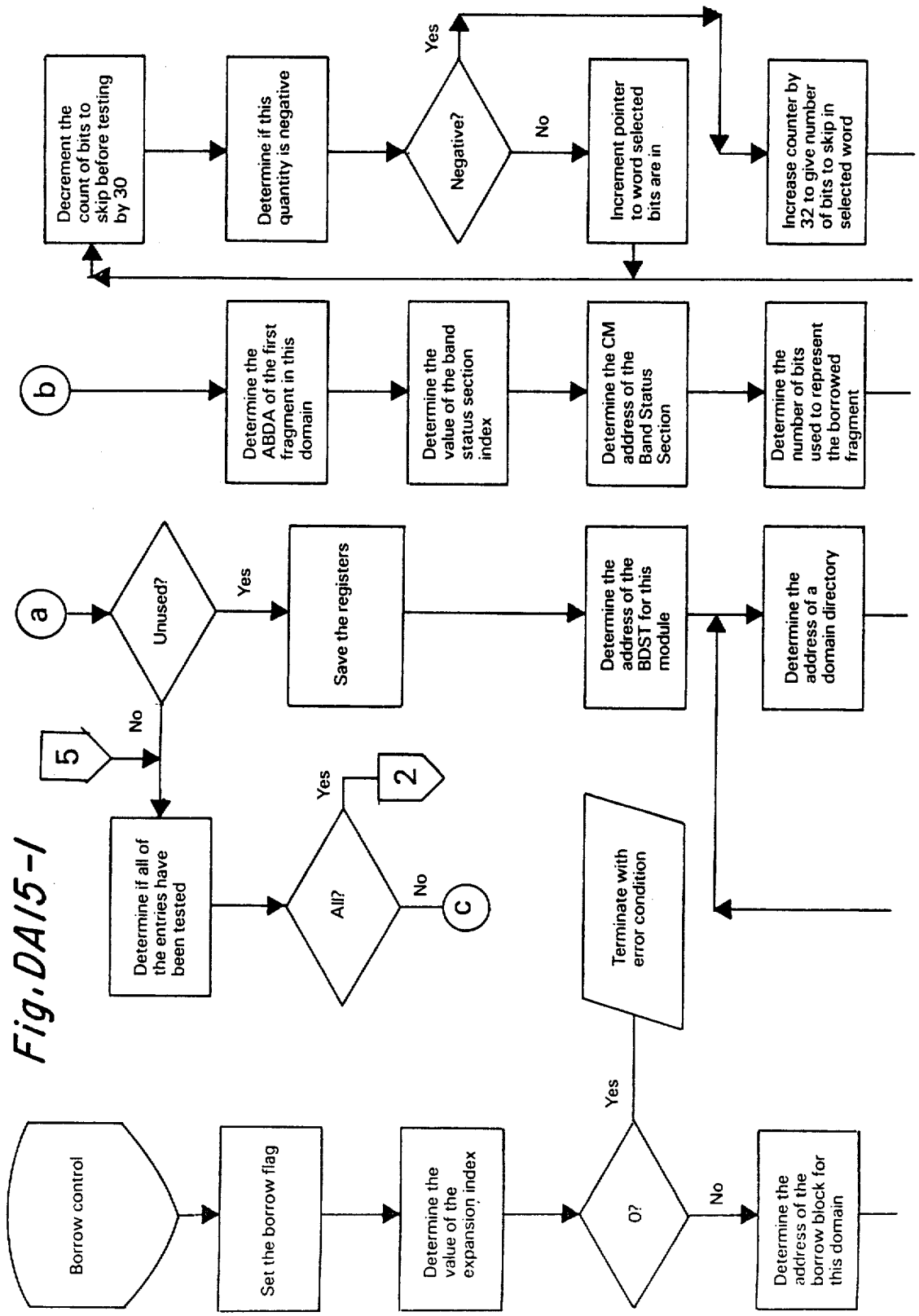

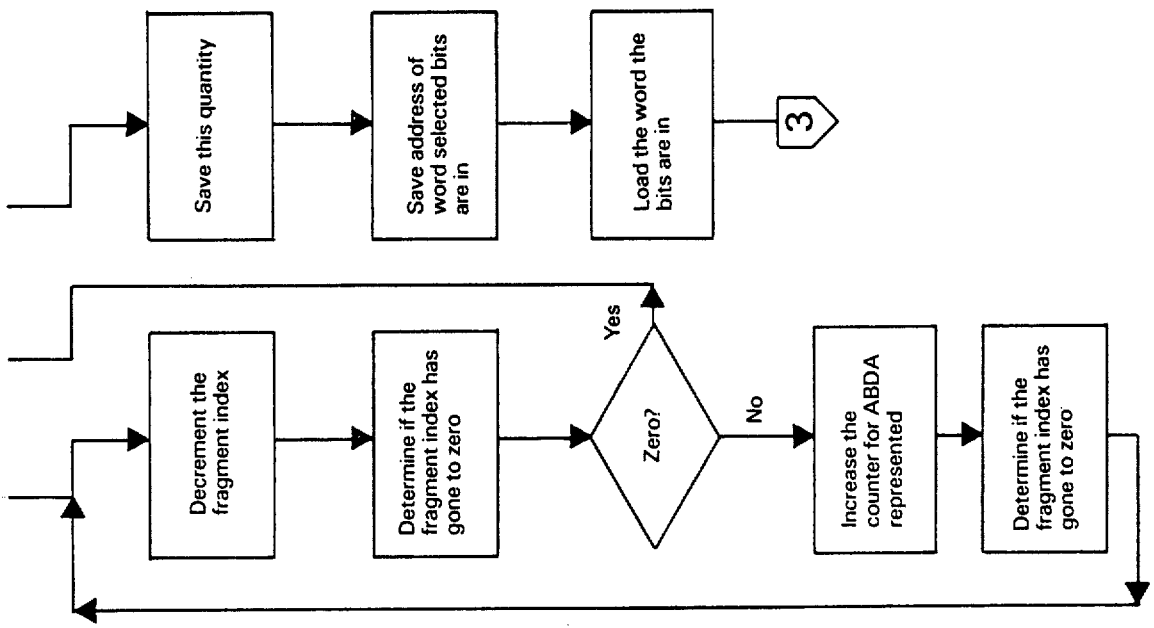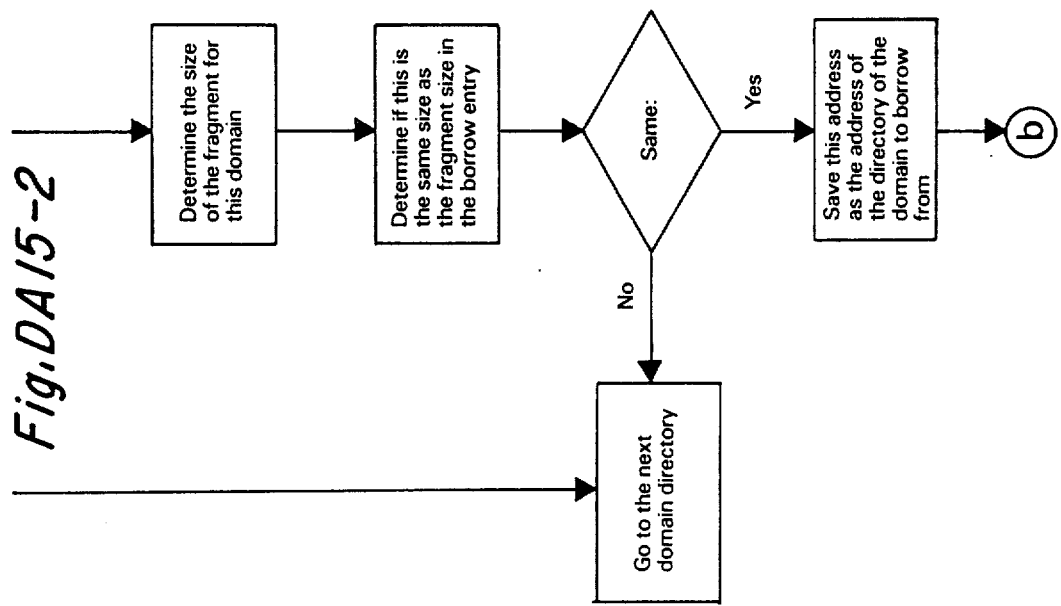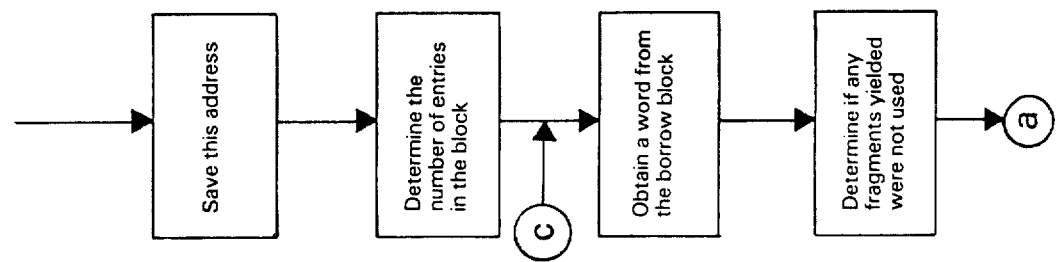
Fig.DA15-2

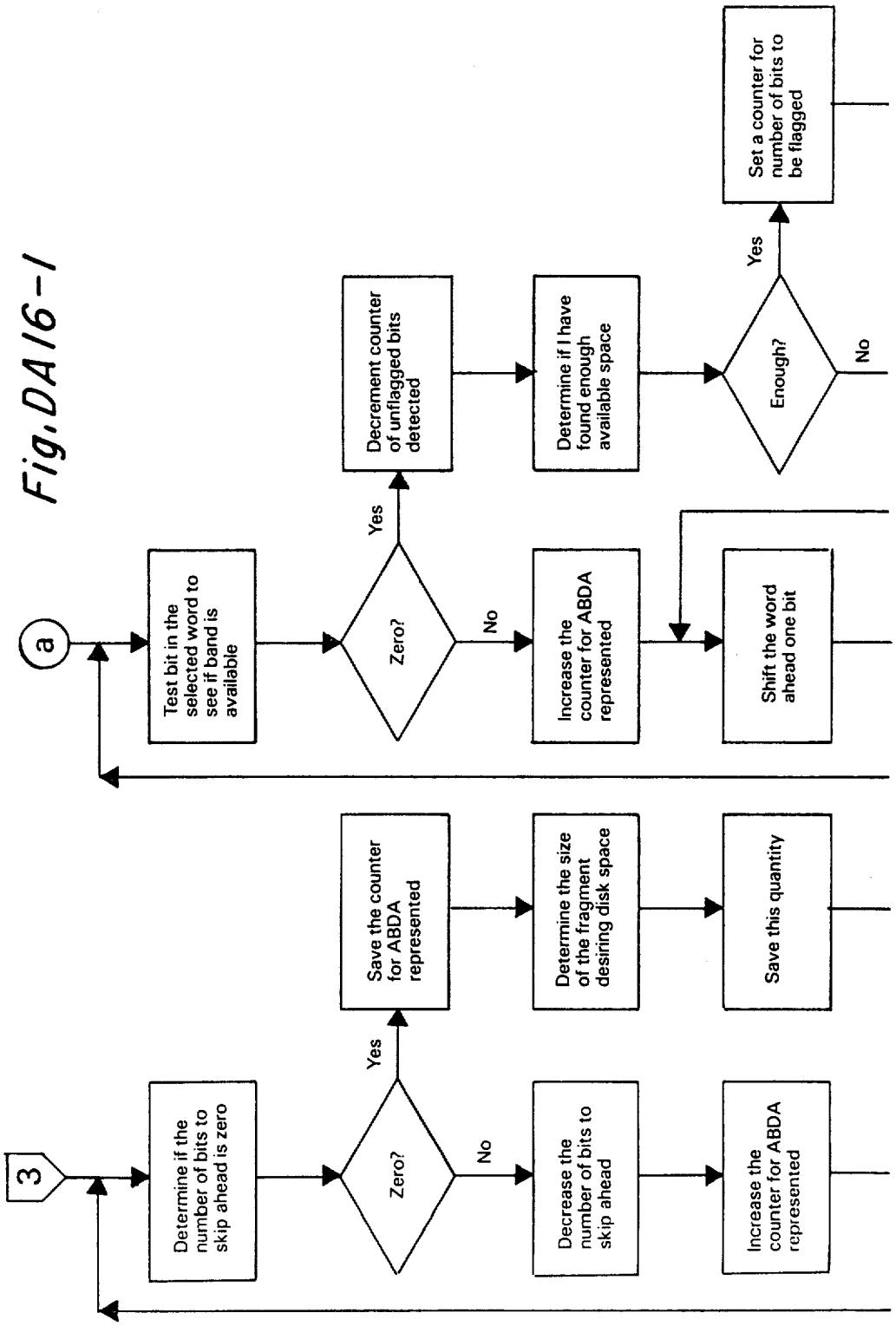
Fig.DA16-1

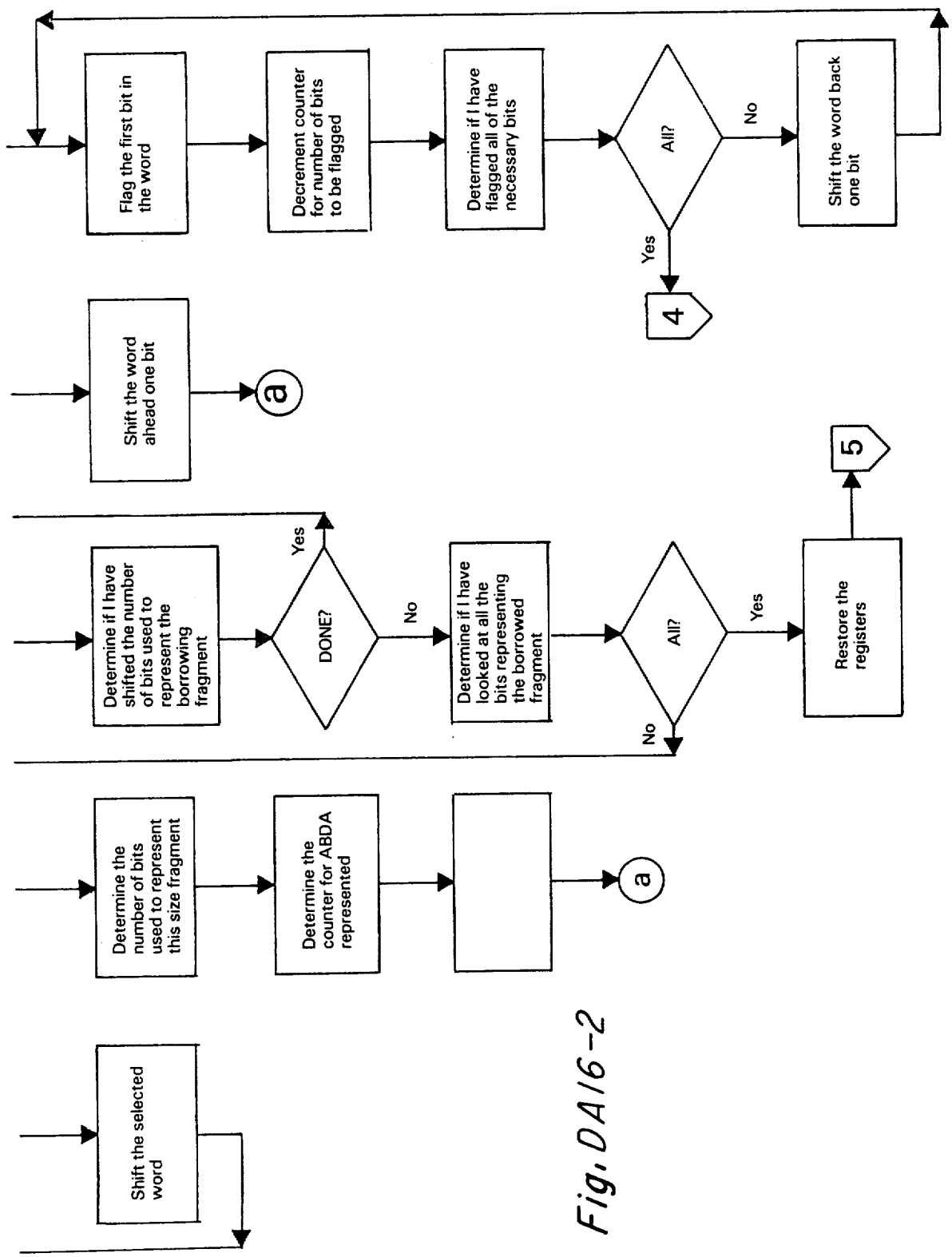
Fig. DA16-2

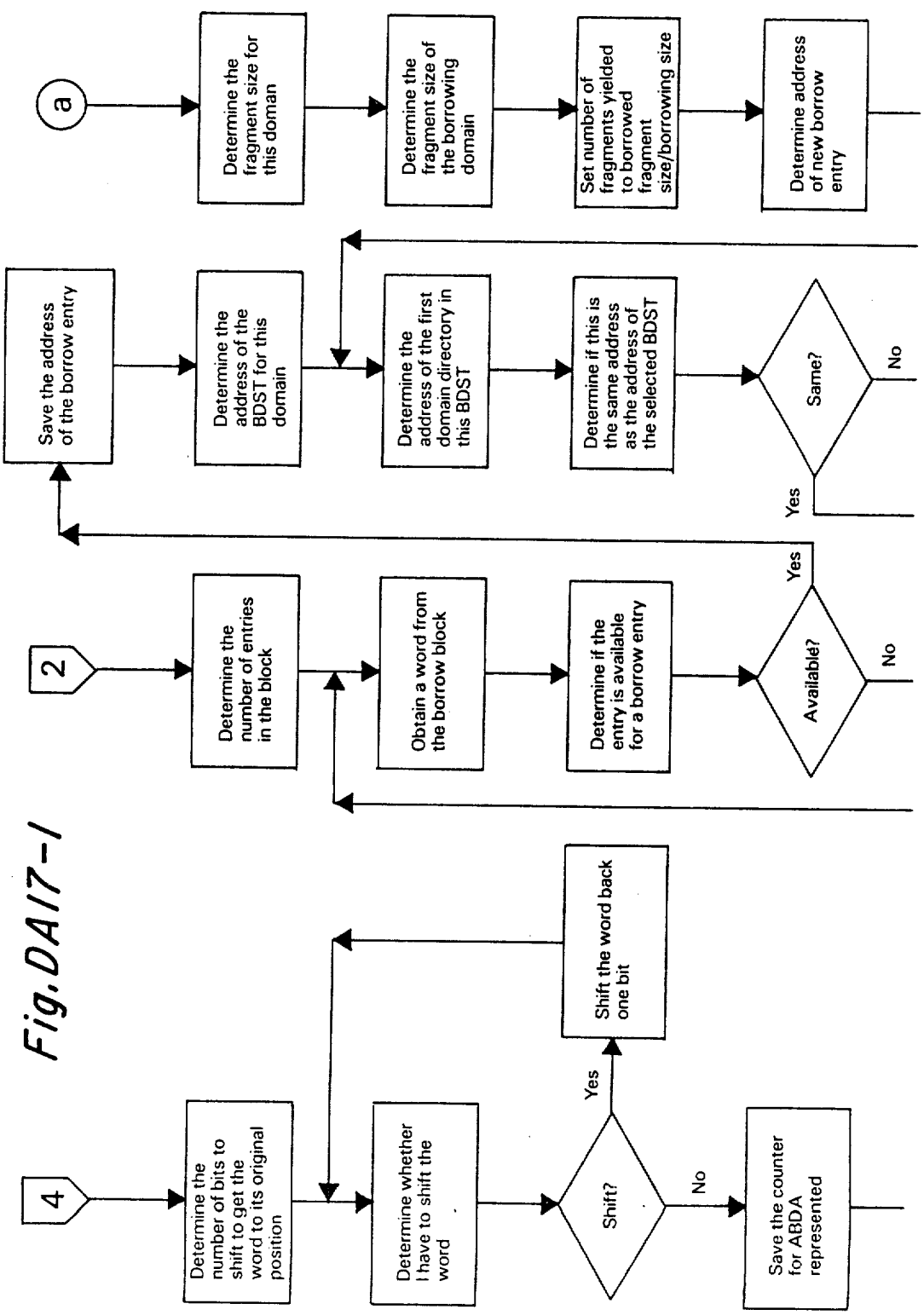
Fig.DA17-1

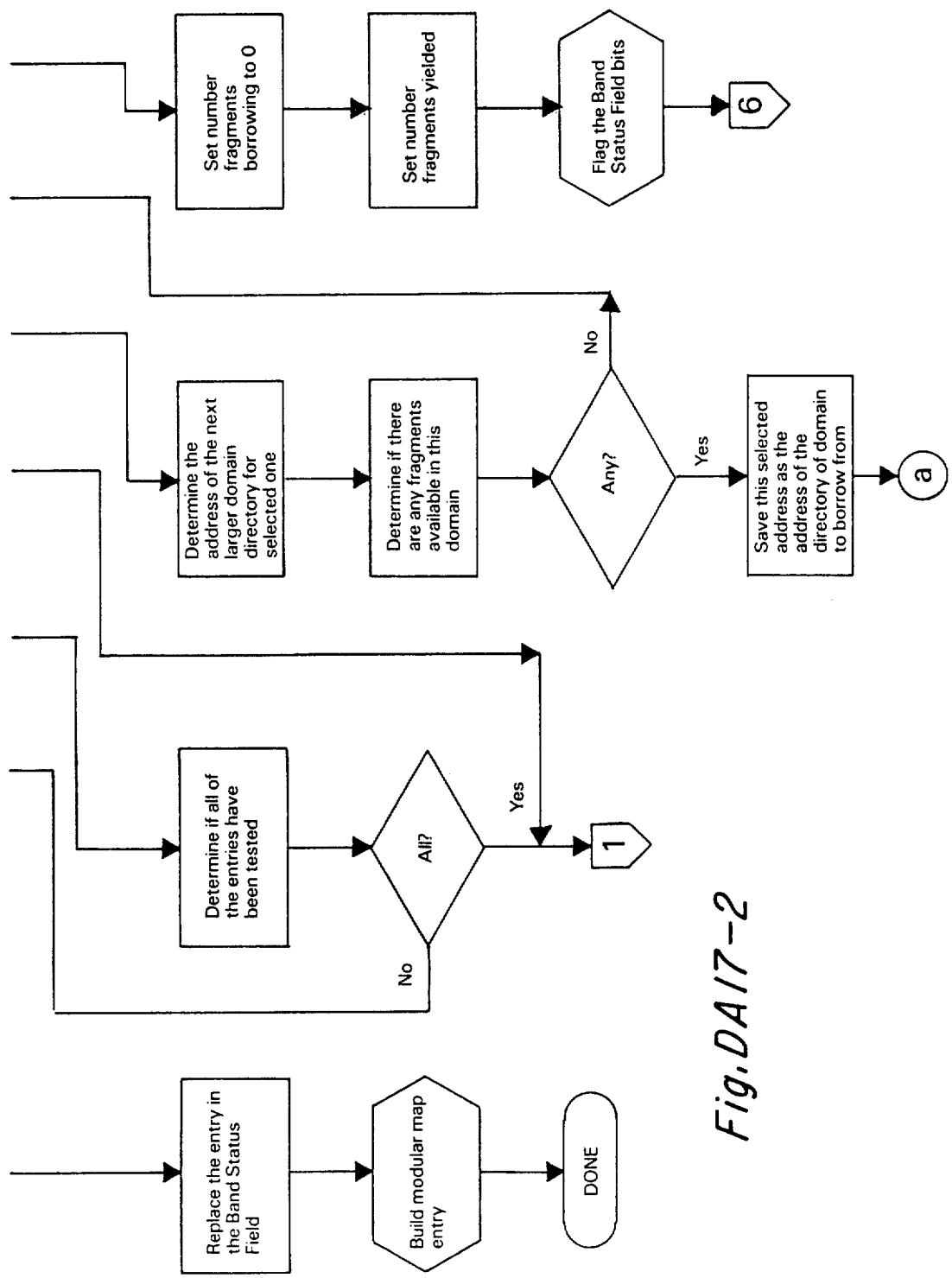
Fig.DA17-2

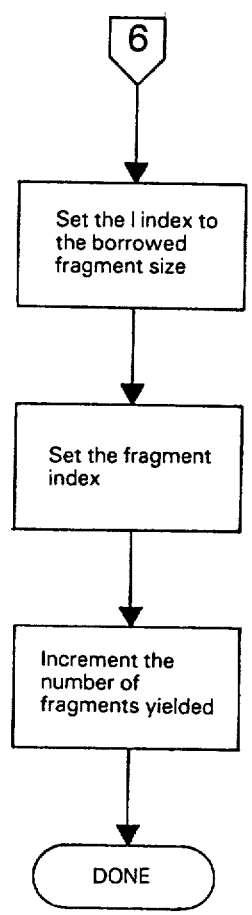
Fig. DA18

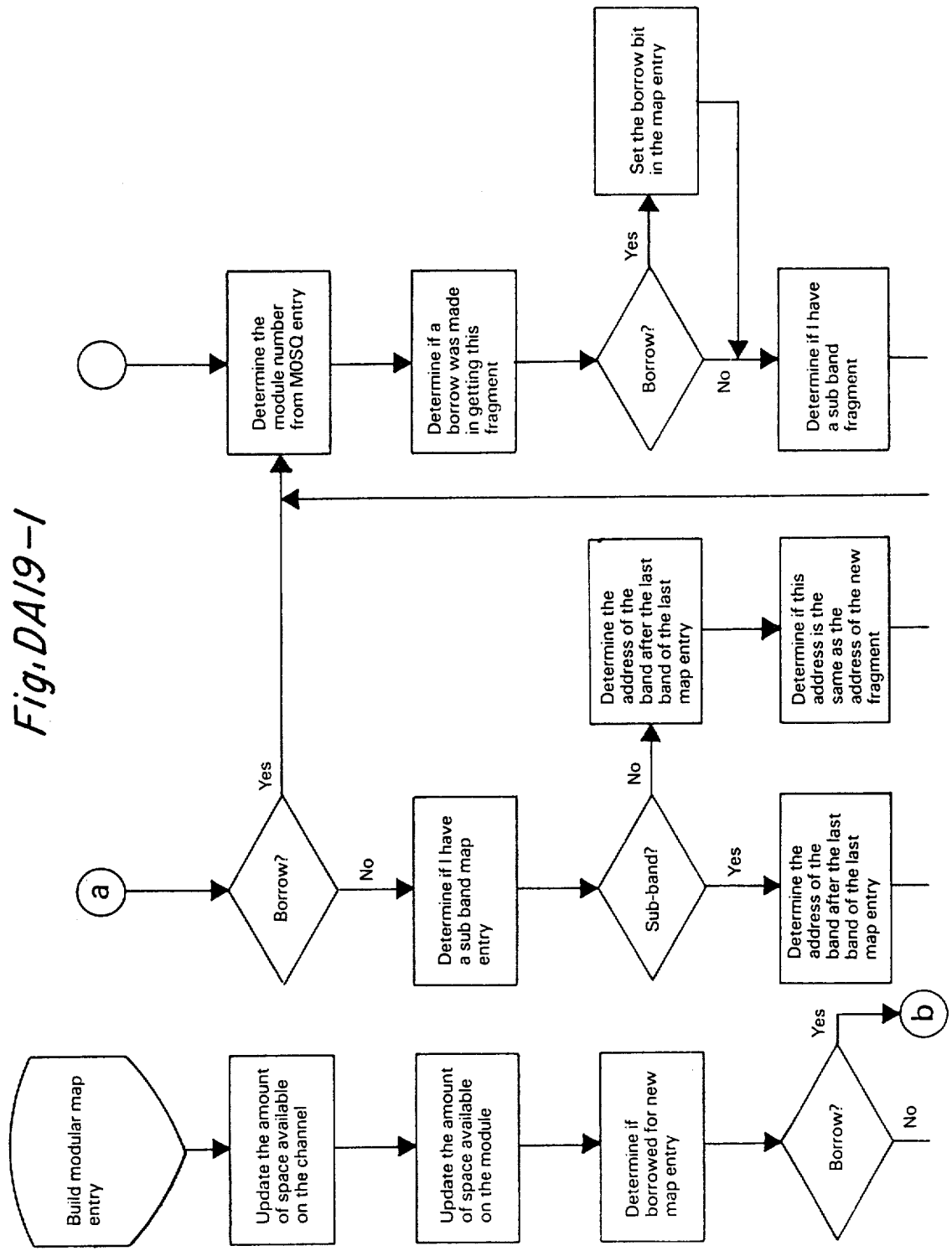

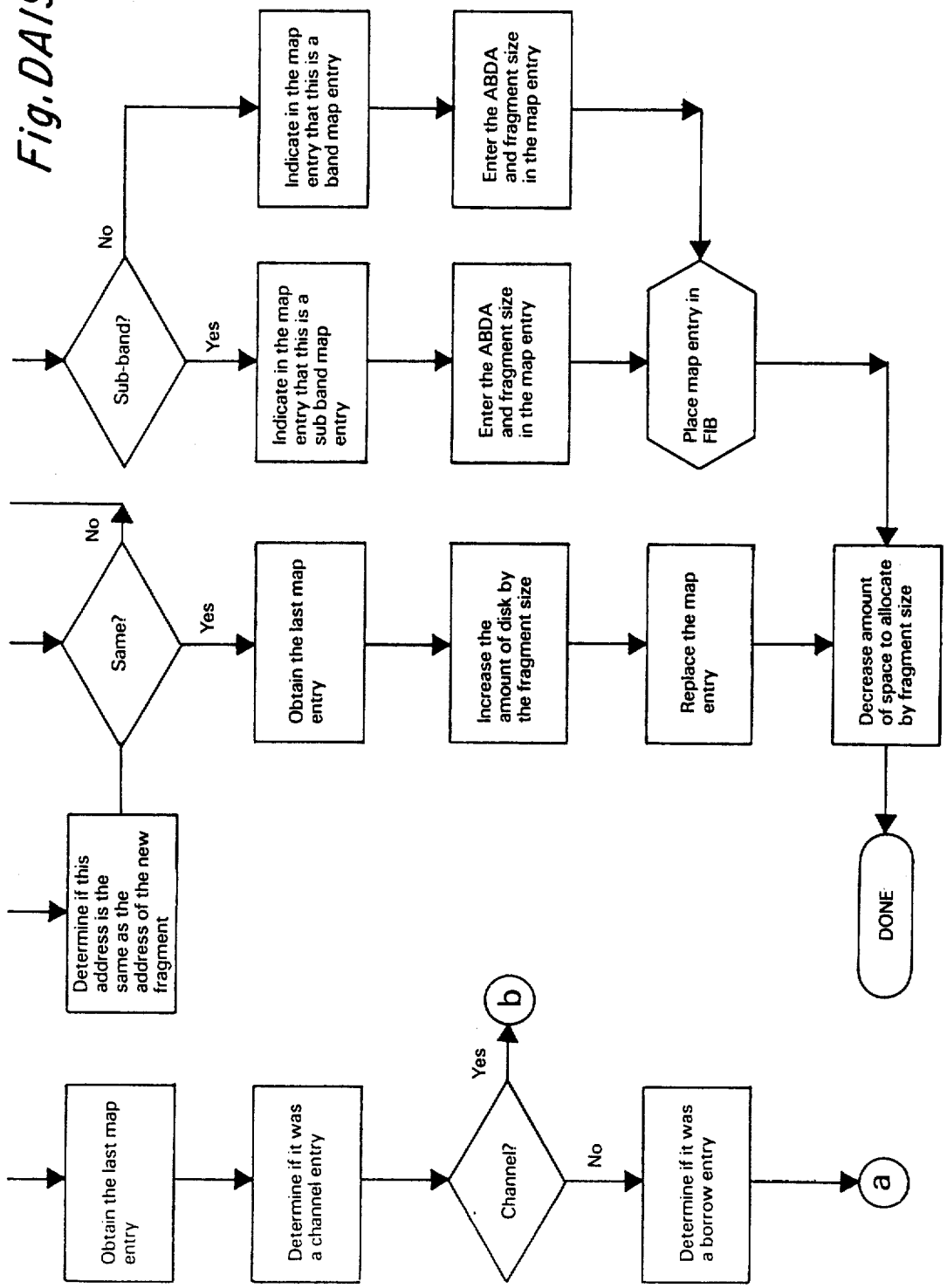

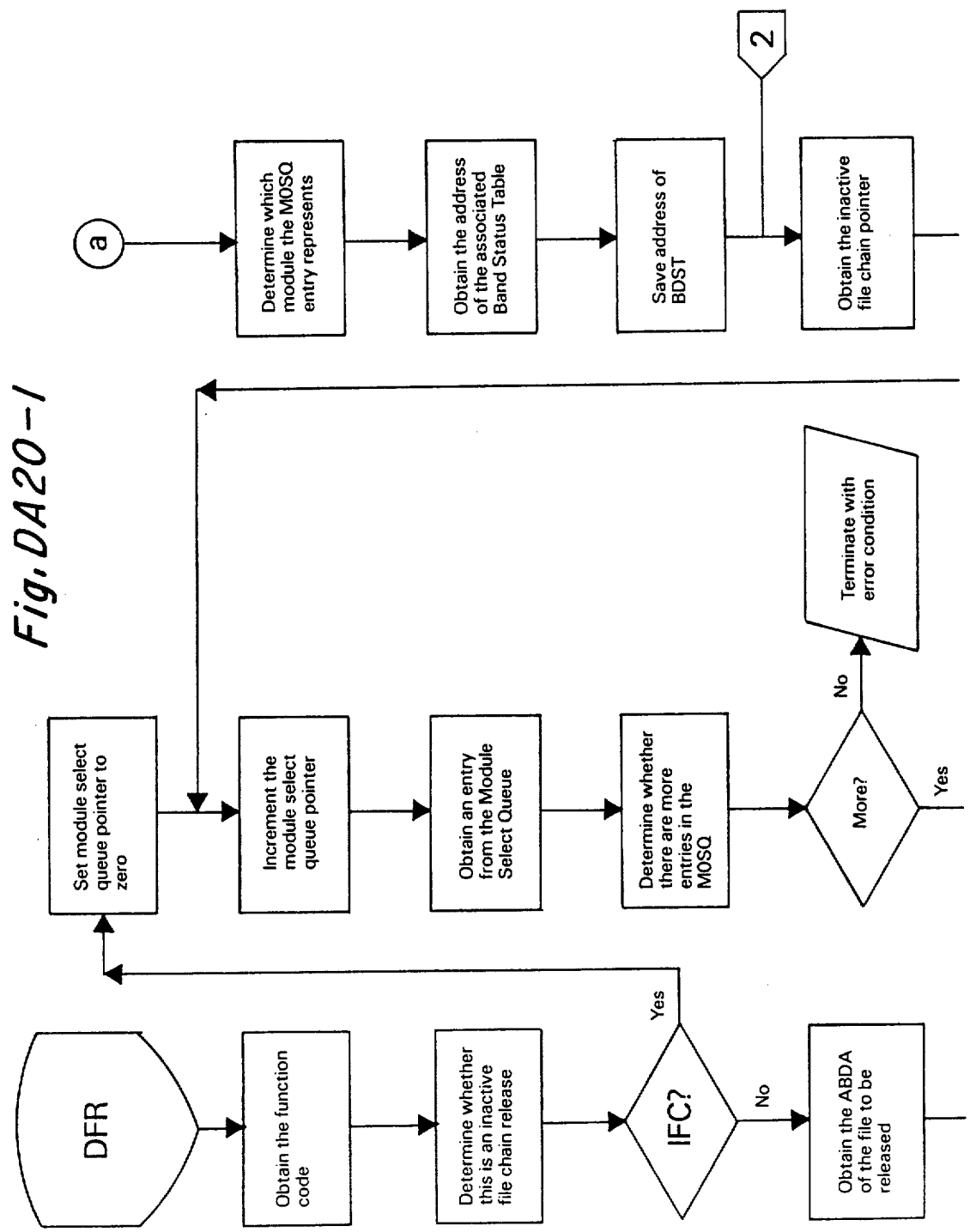
Fig. DA20-1

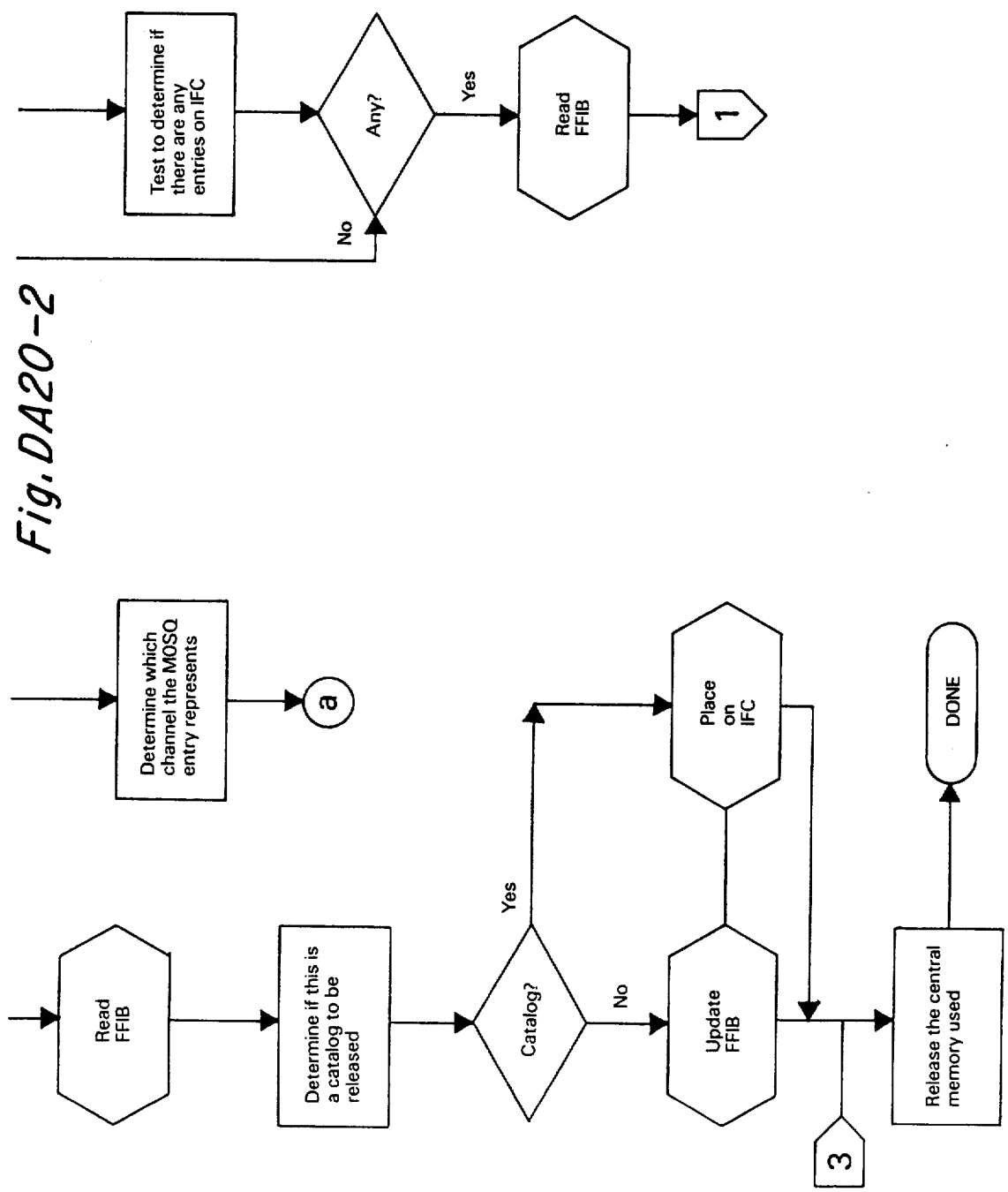

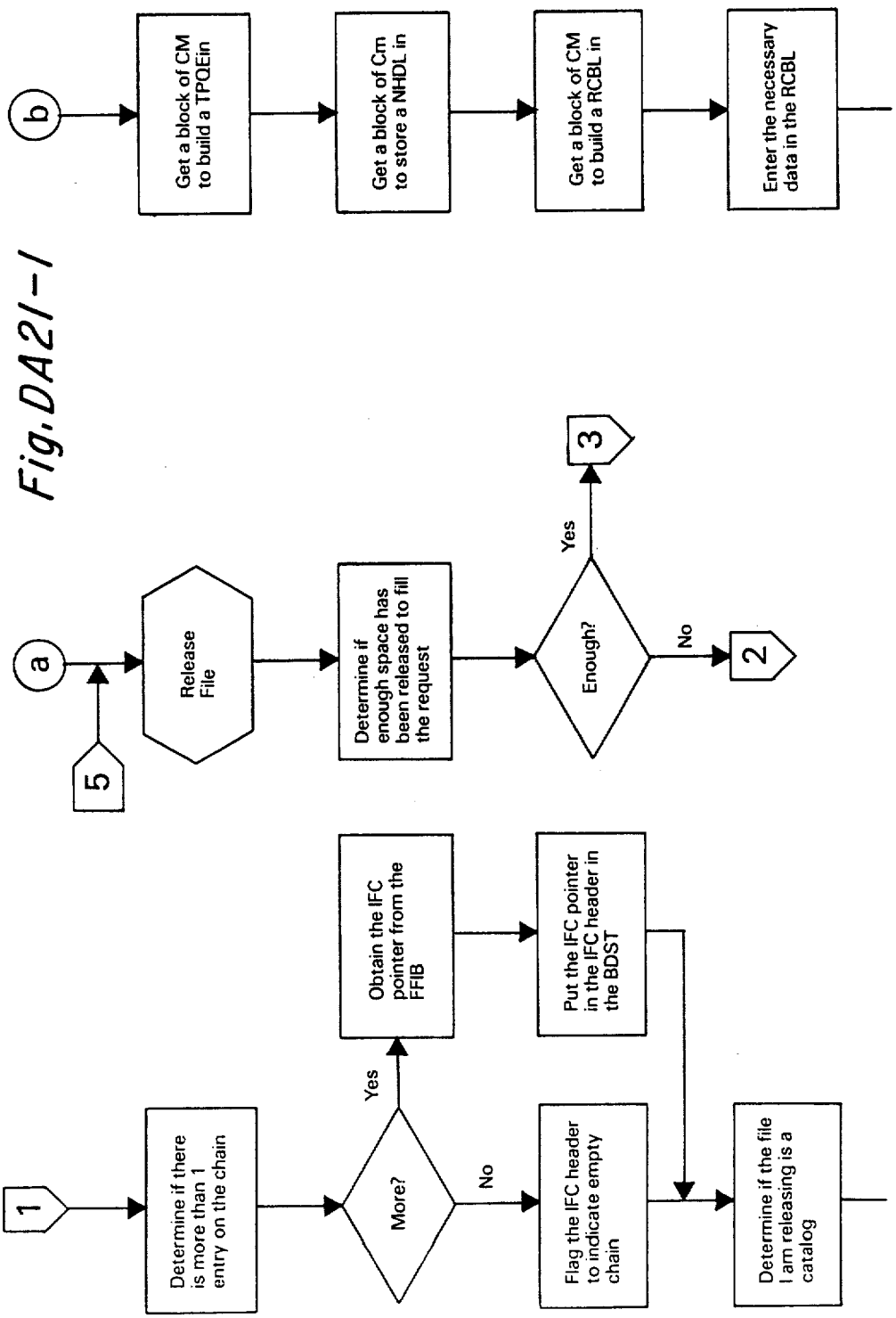
Fig. DA21-1

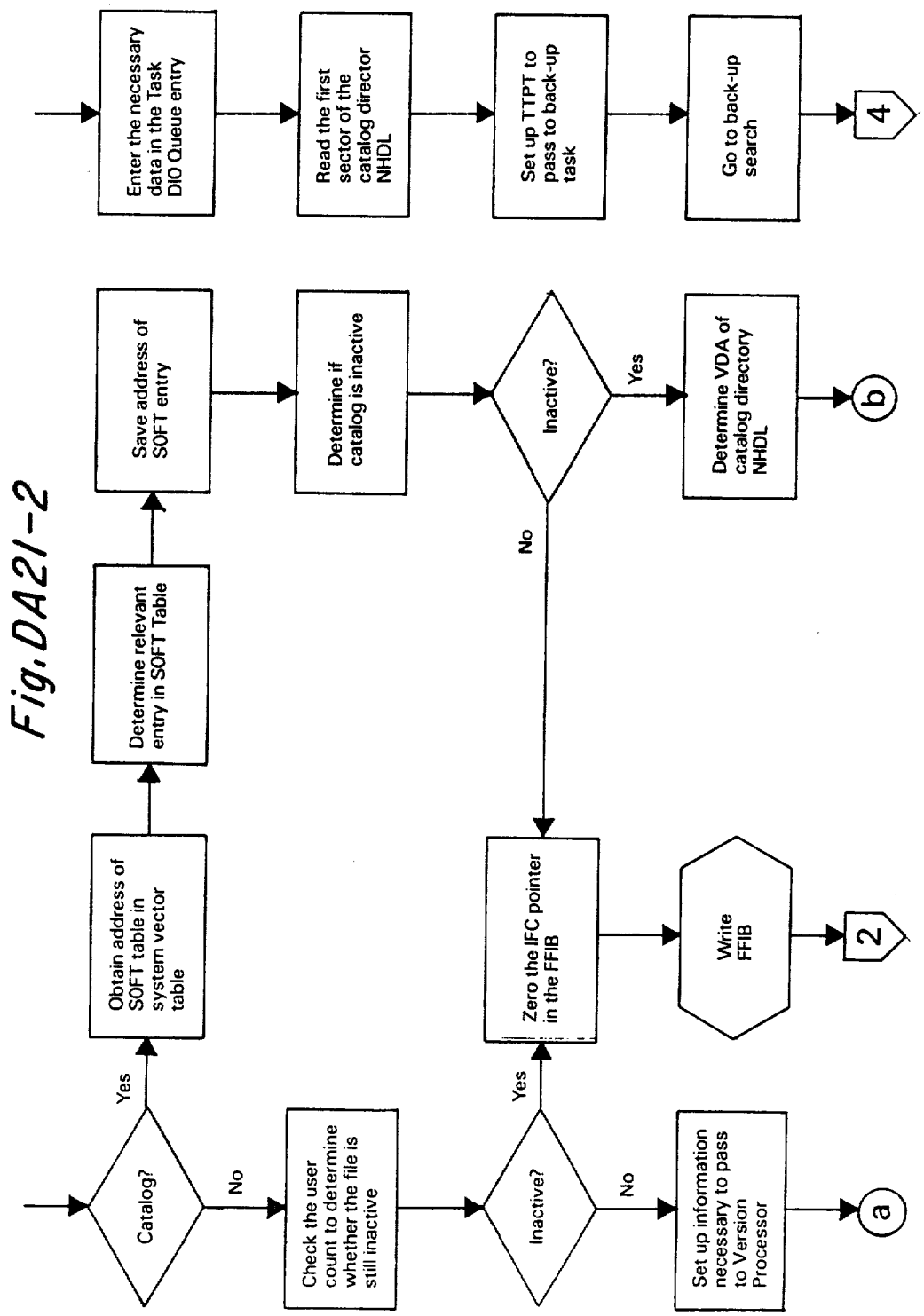
Fig.DA21-2

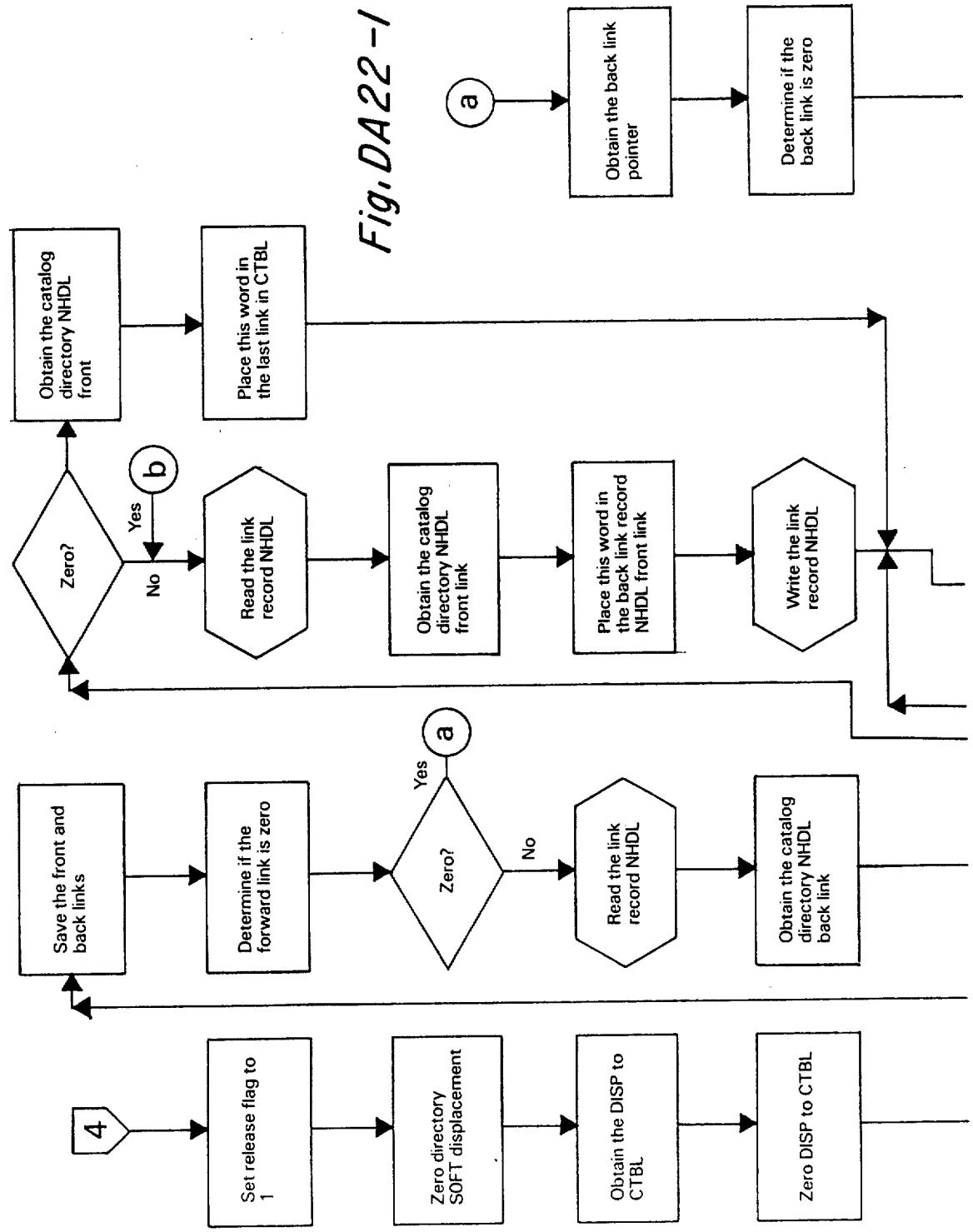
Fig. DA22-1

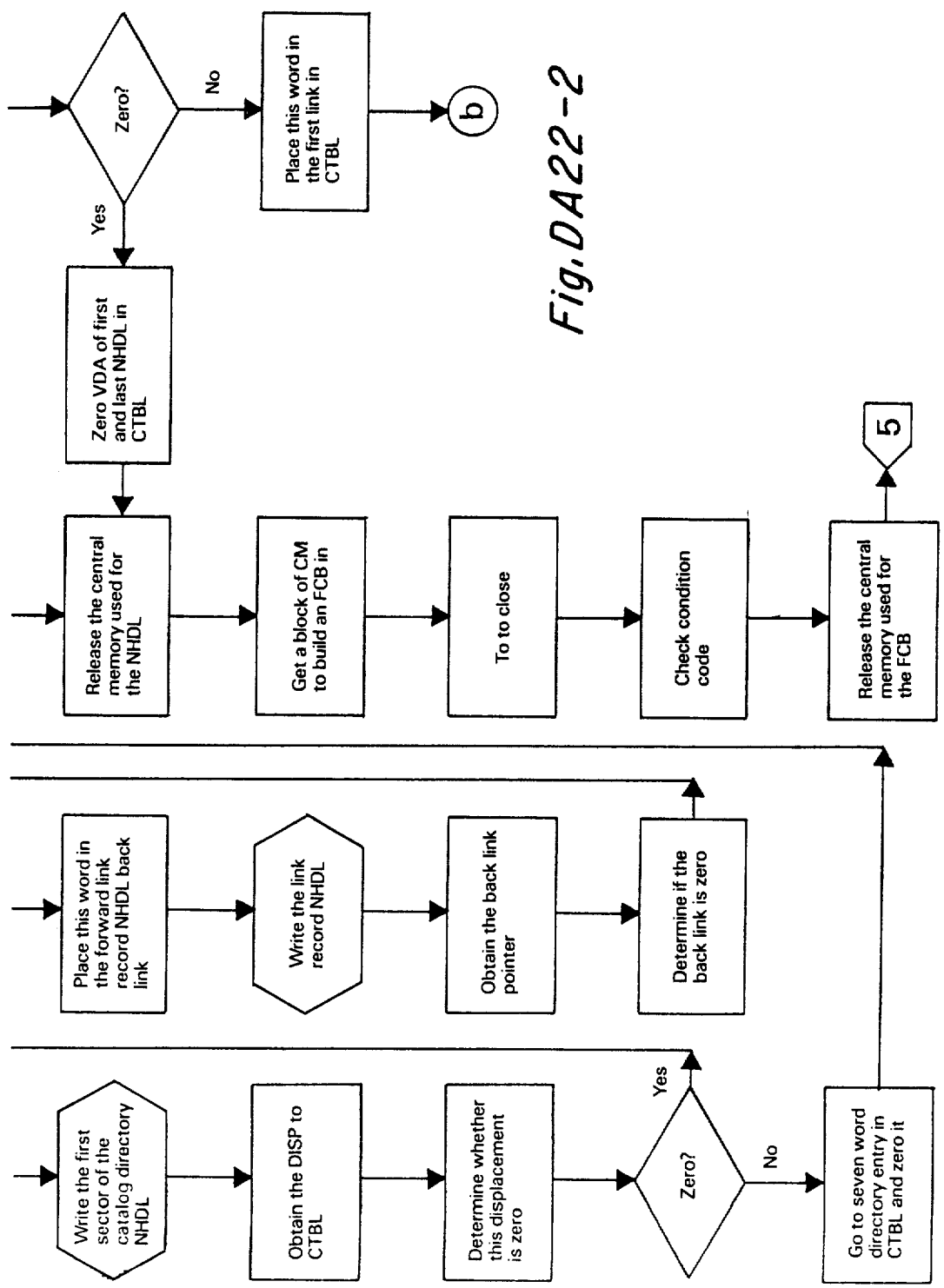
Fig. DA22-2

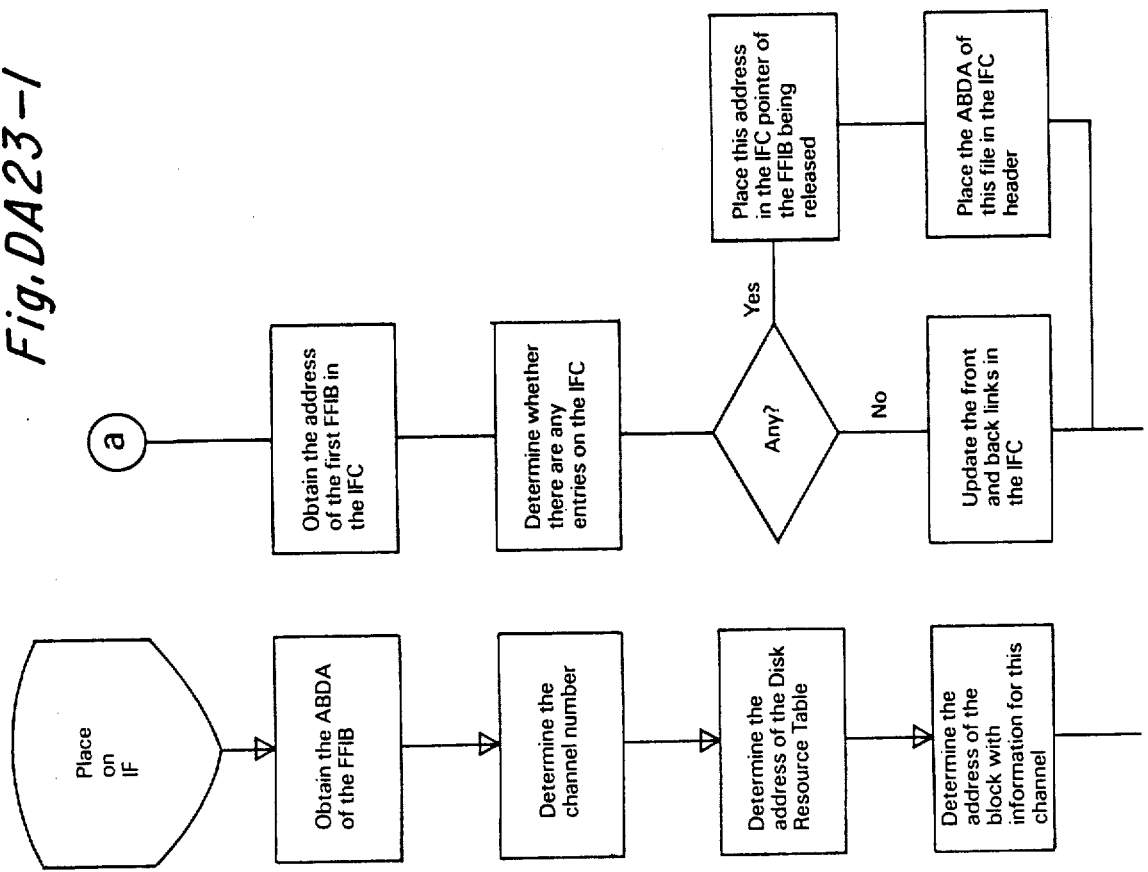
Fig.DA23-1

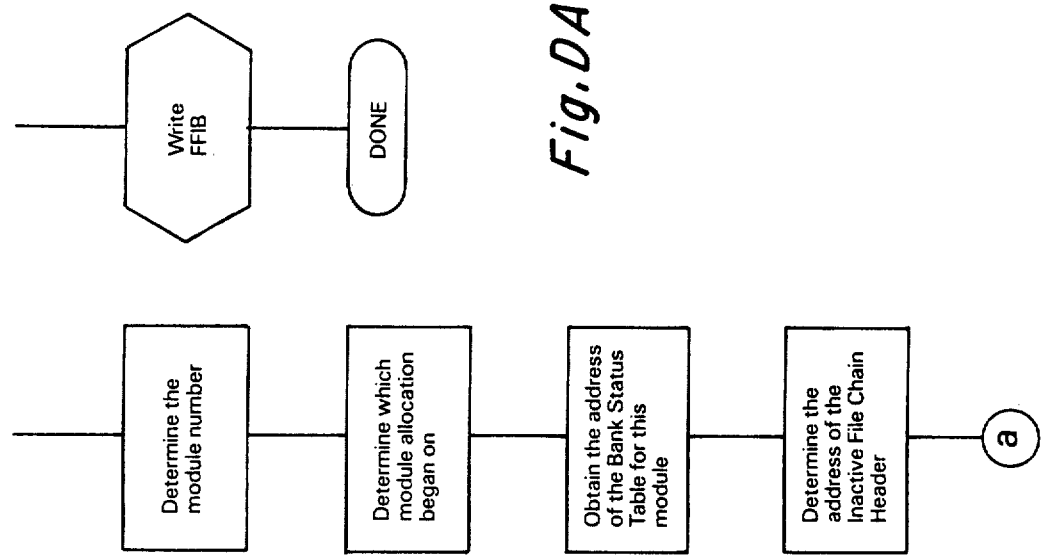
Fig.DA23-2

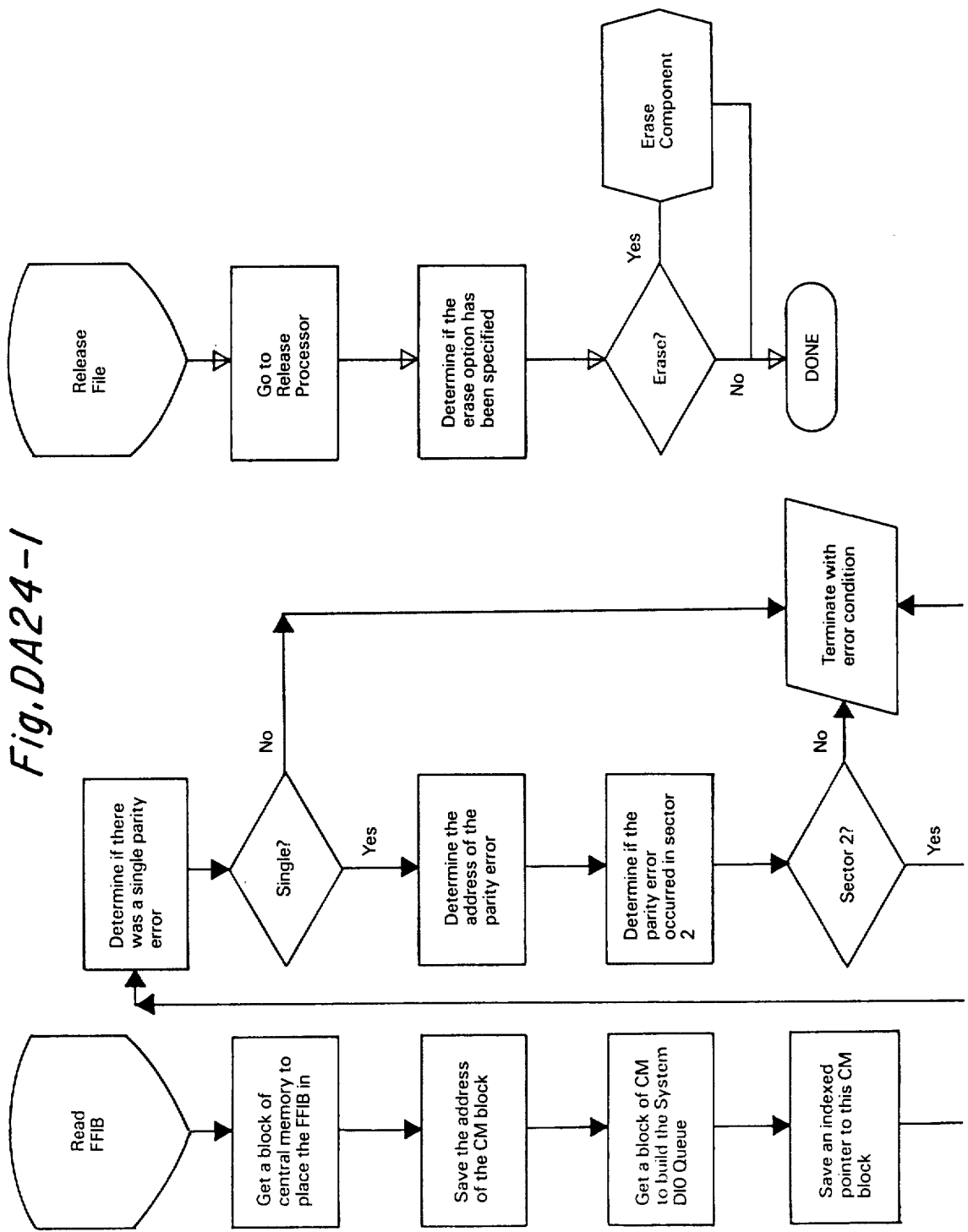
Fig.DA24-1

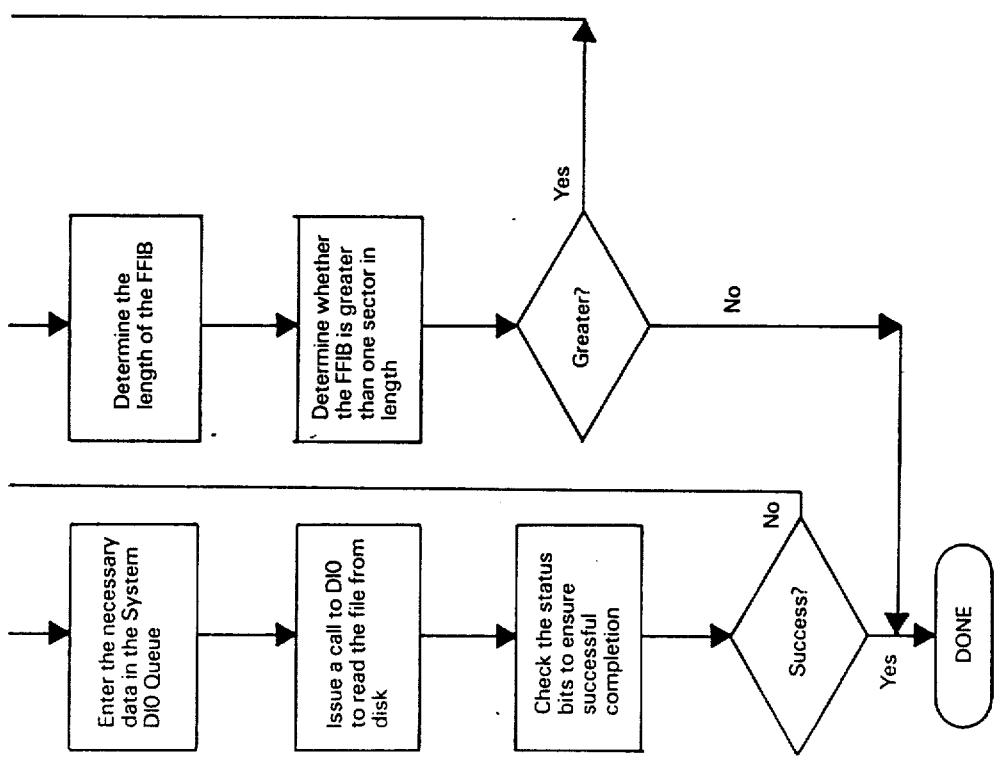
Fig.DA24-2

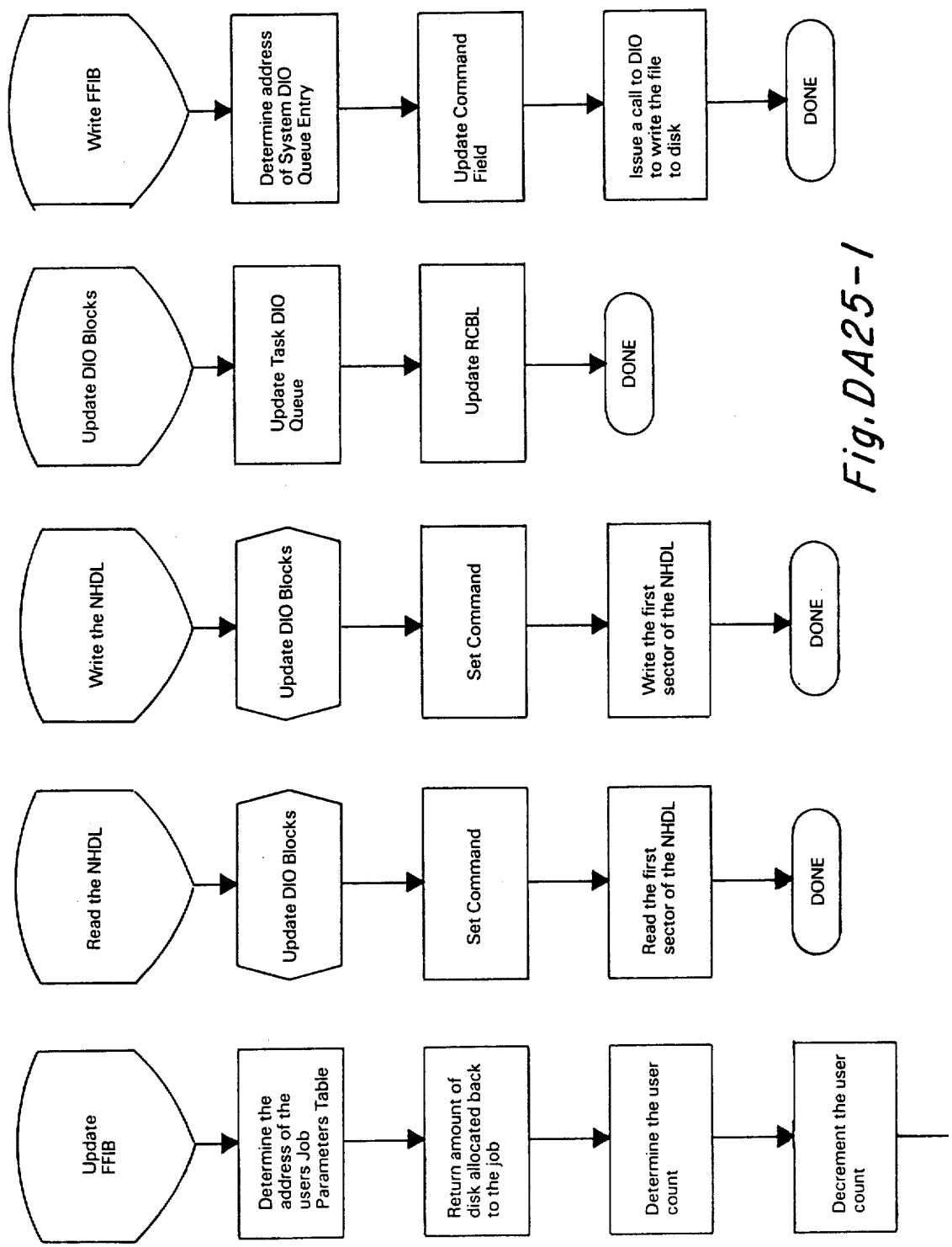
Fig.DA25-1

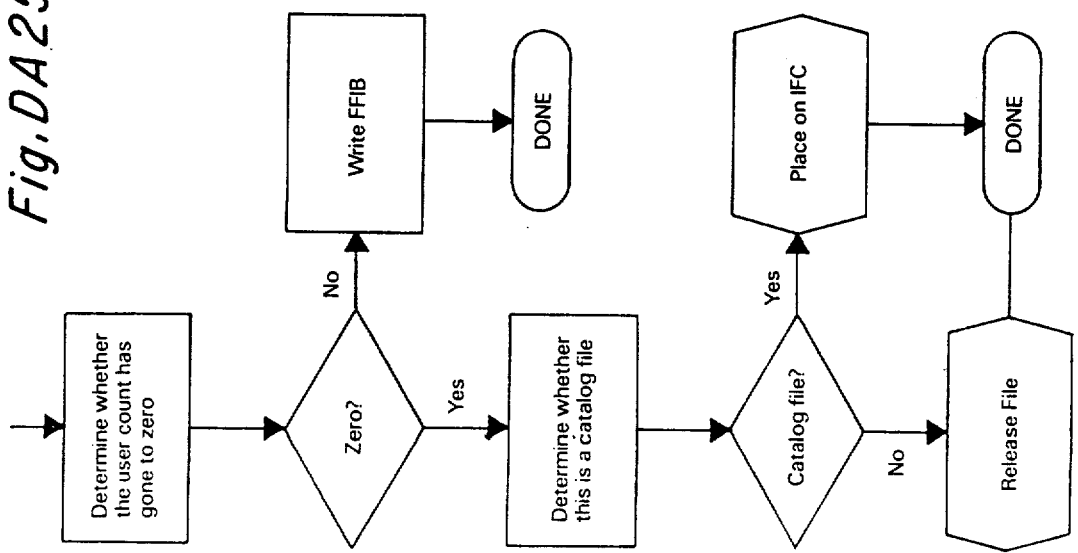
Fig. DA25-2

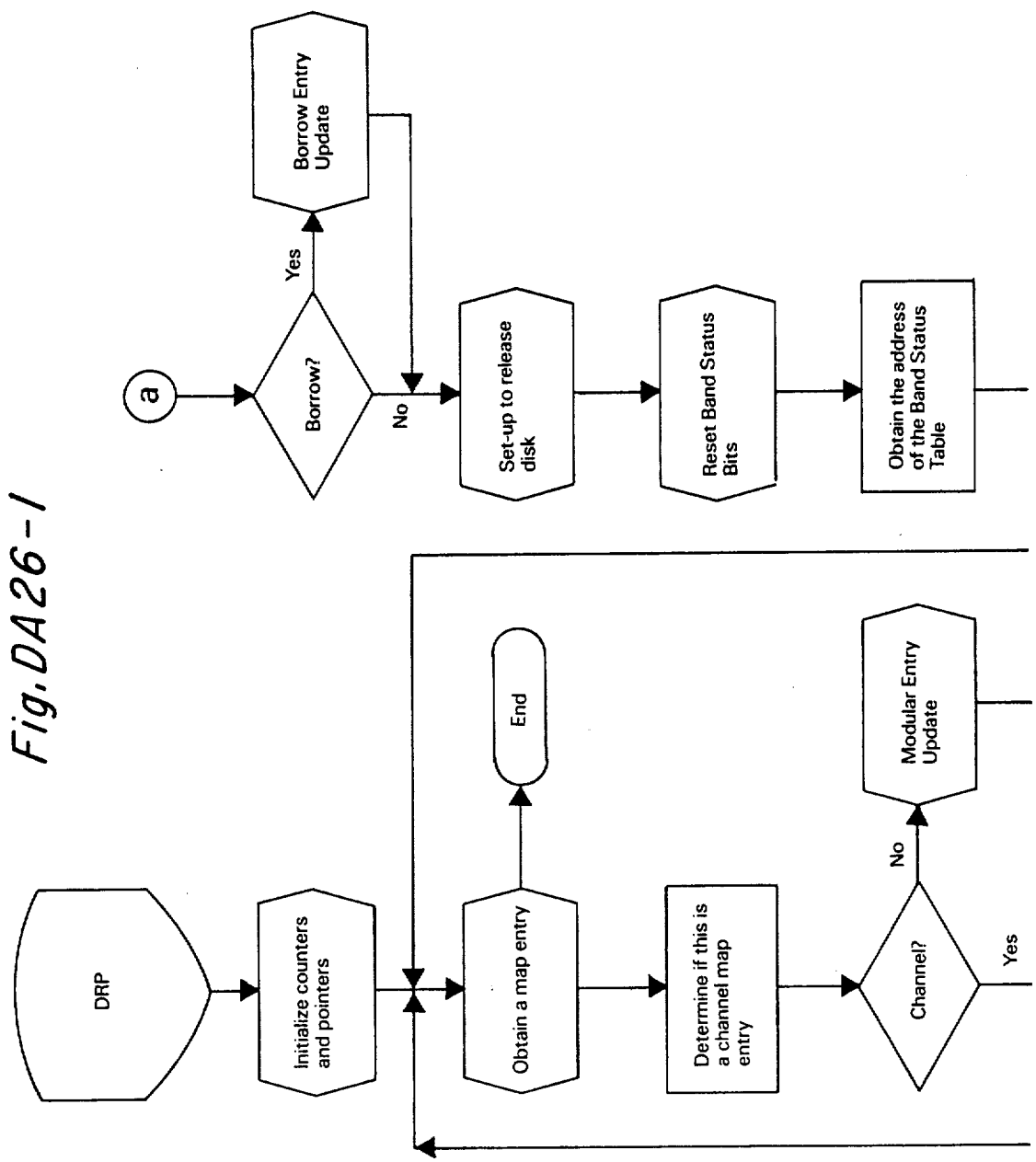

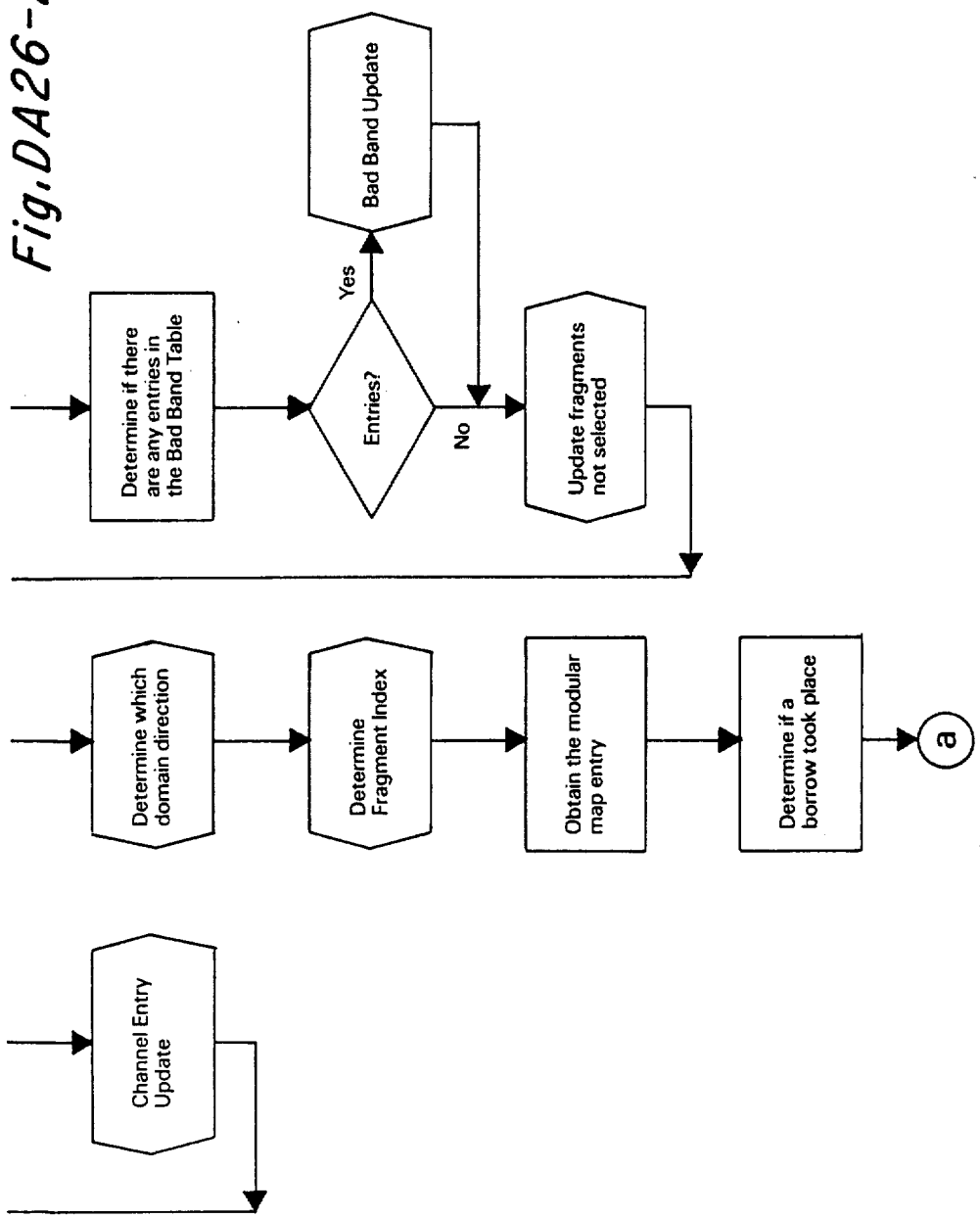
Fig.DA26-2

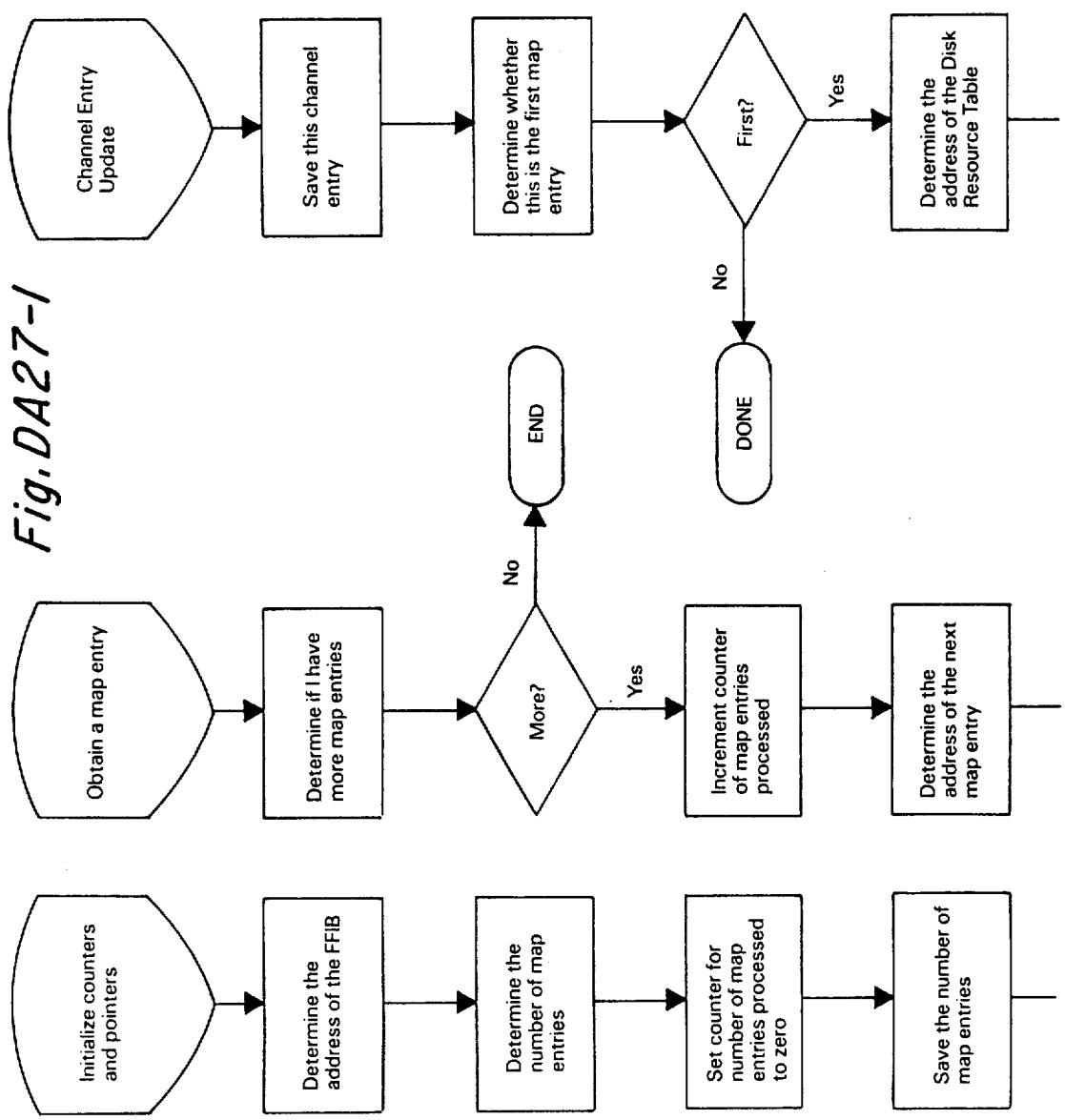
Fig. DA27-1

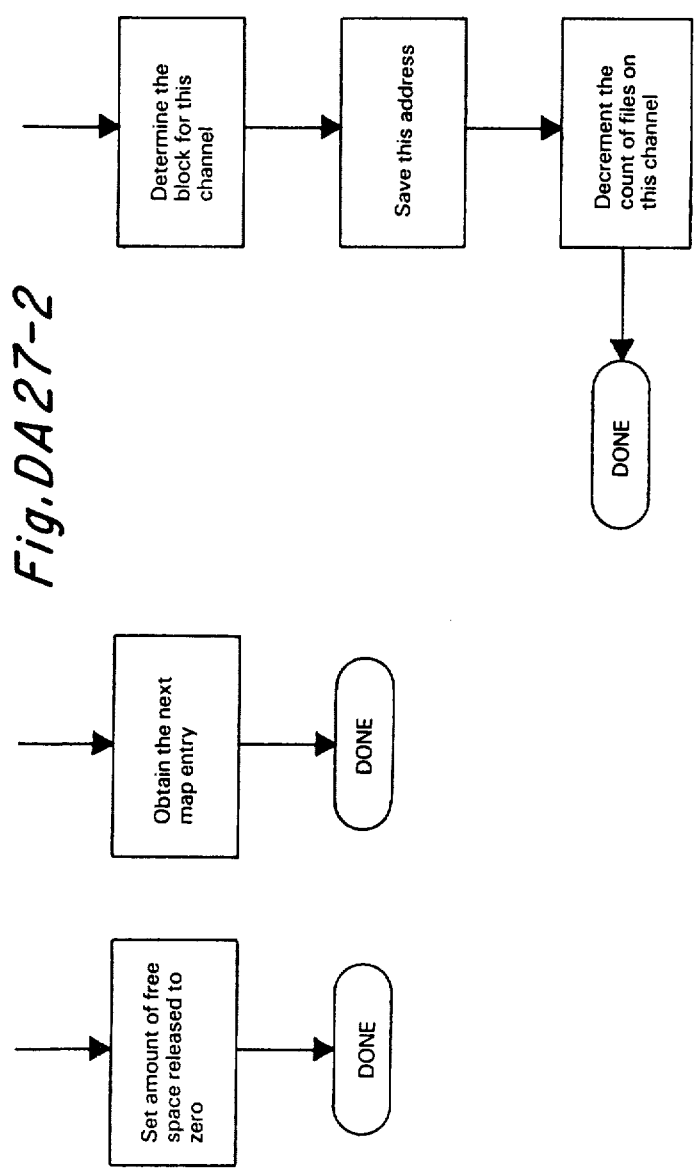
Fig.DA27-2

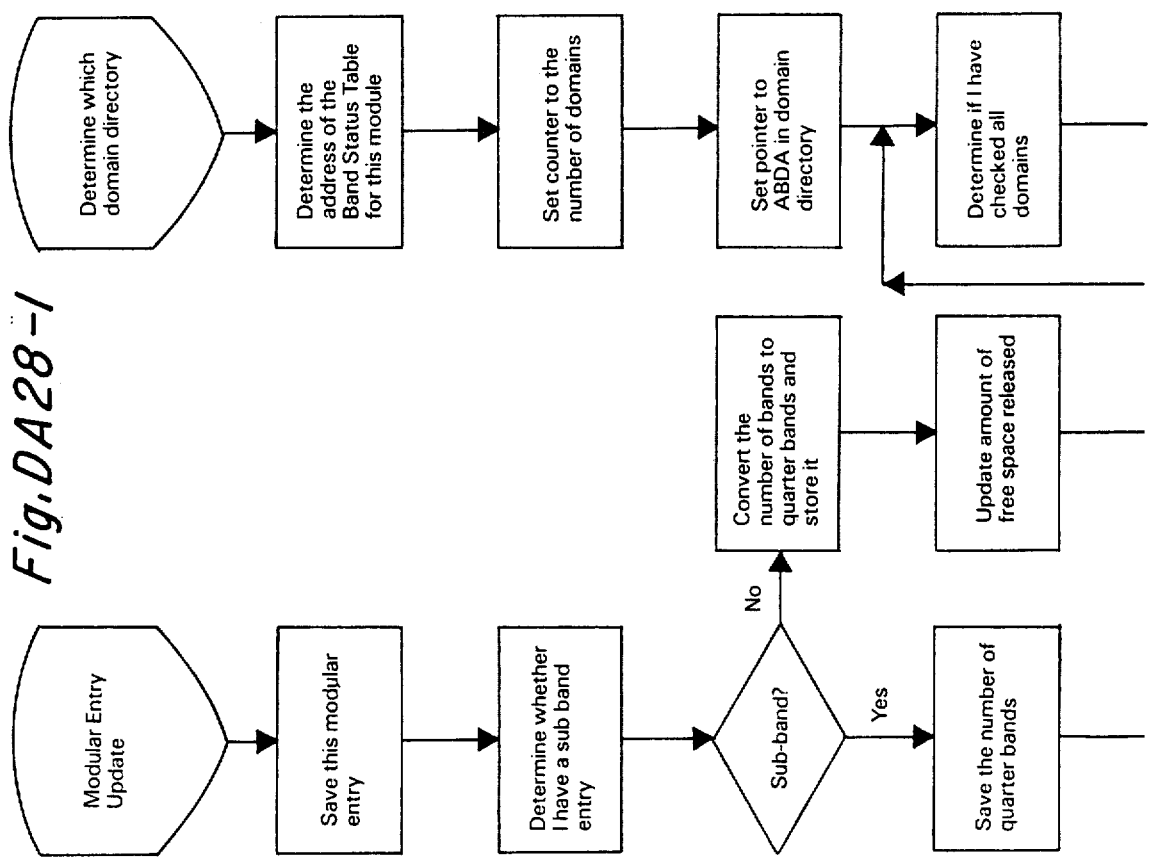
Fig. DA28-1

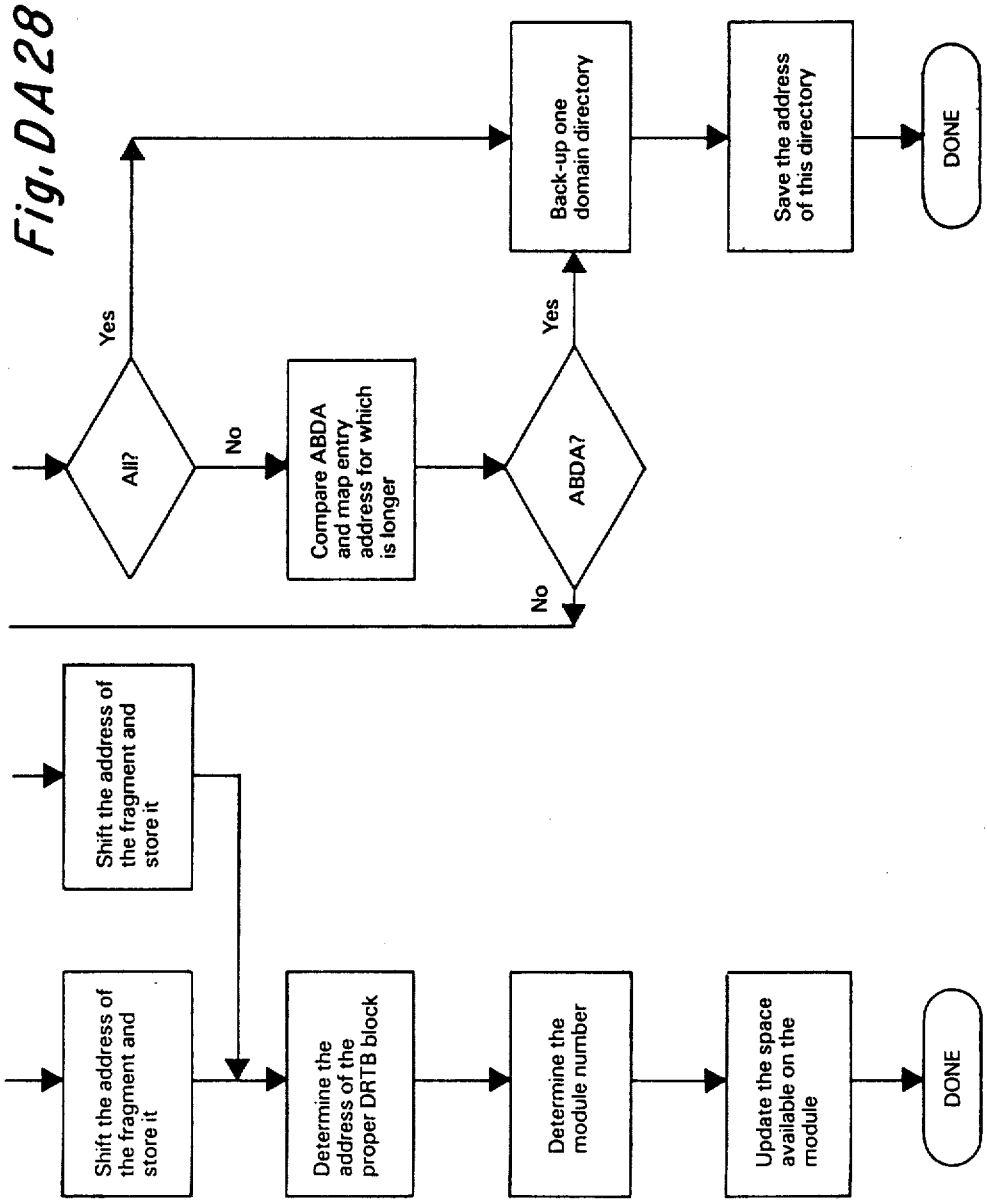

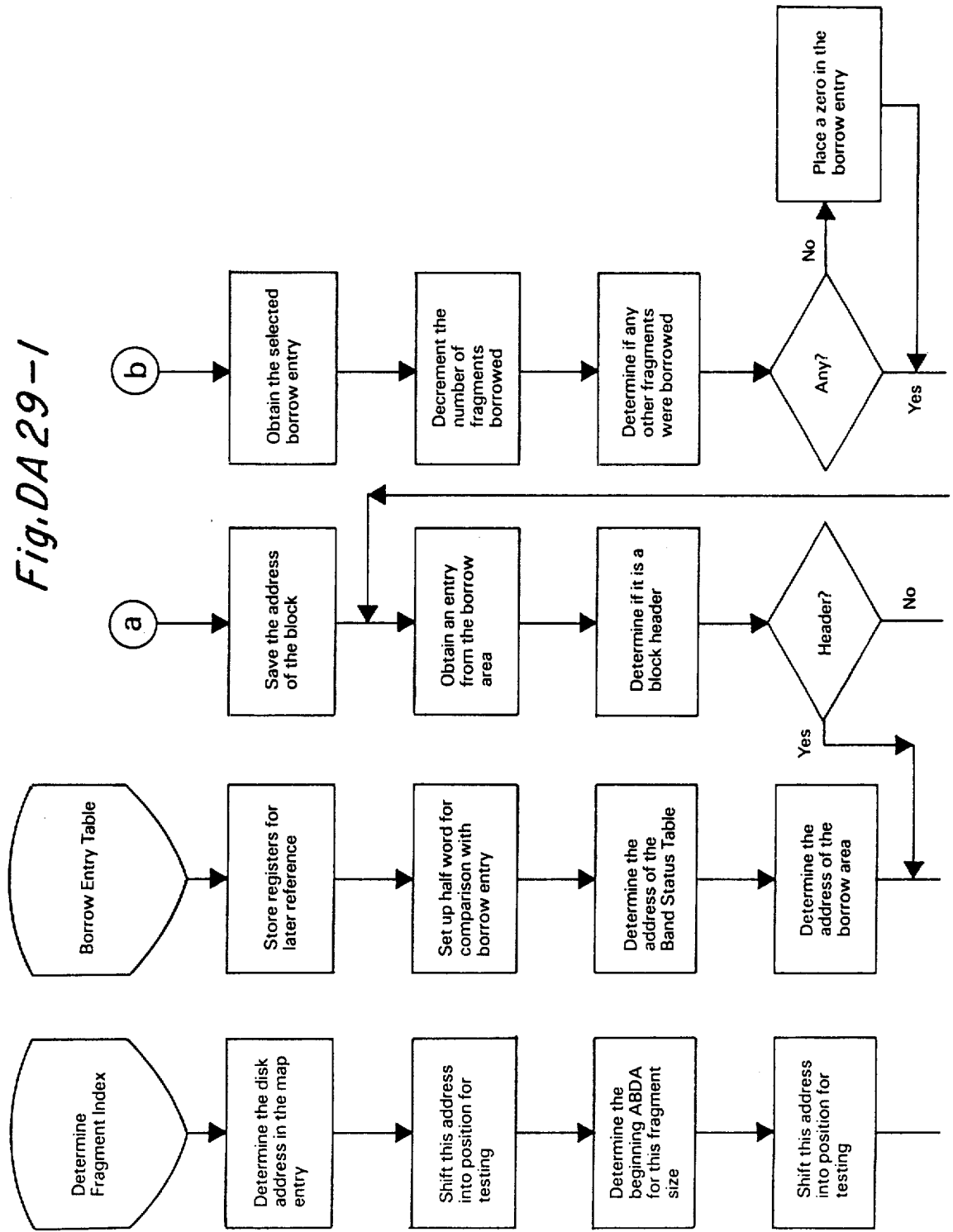

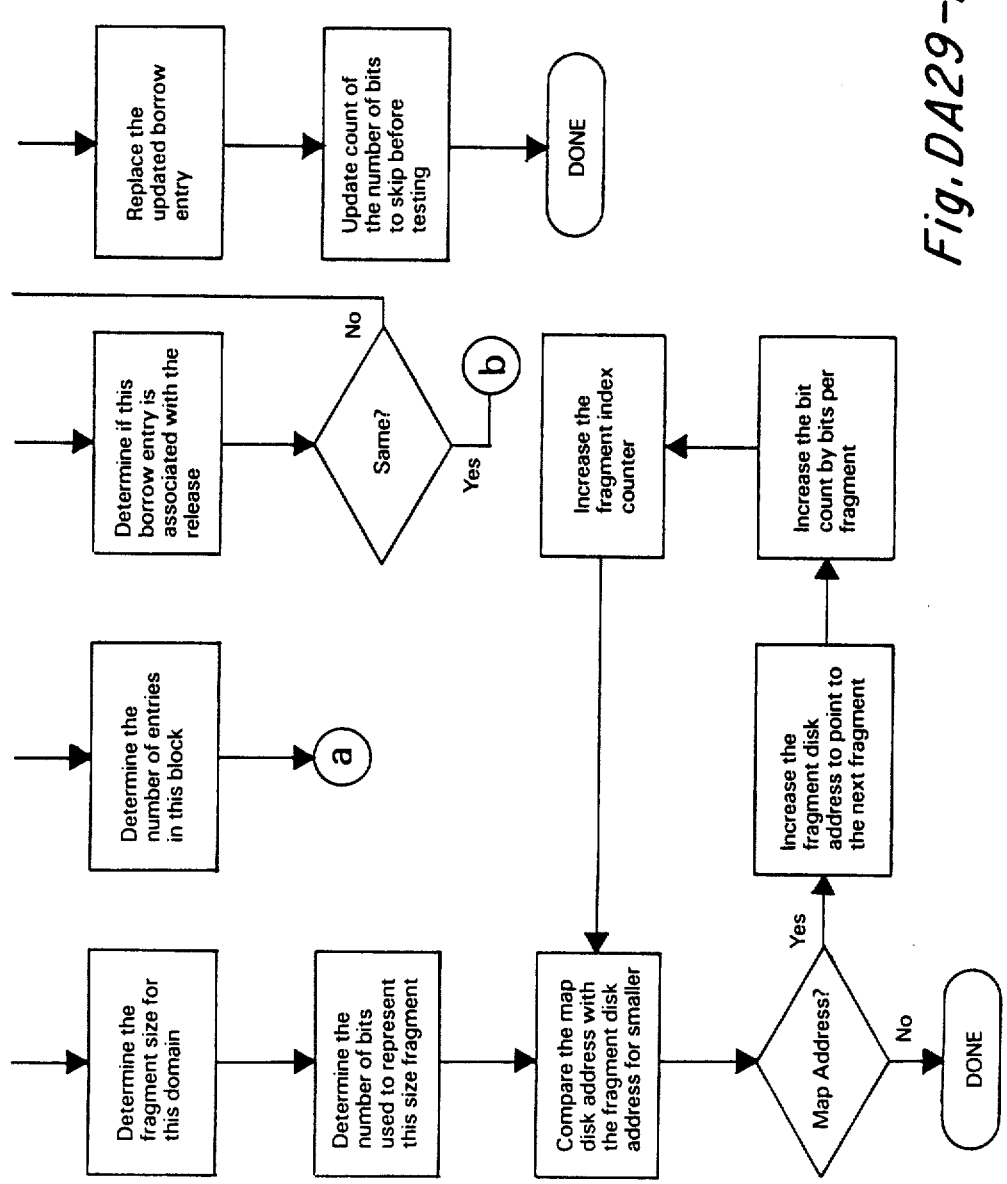
Fig.DA29-2

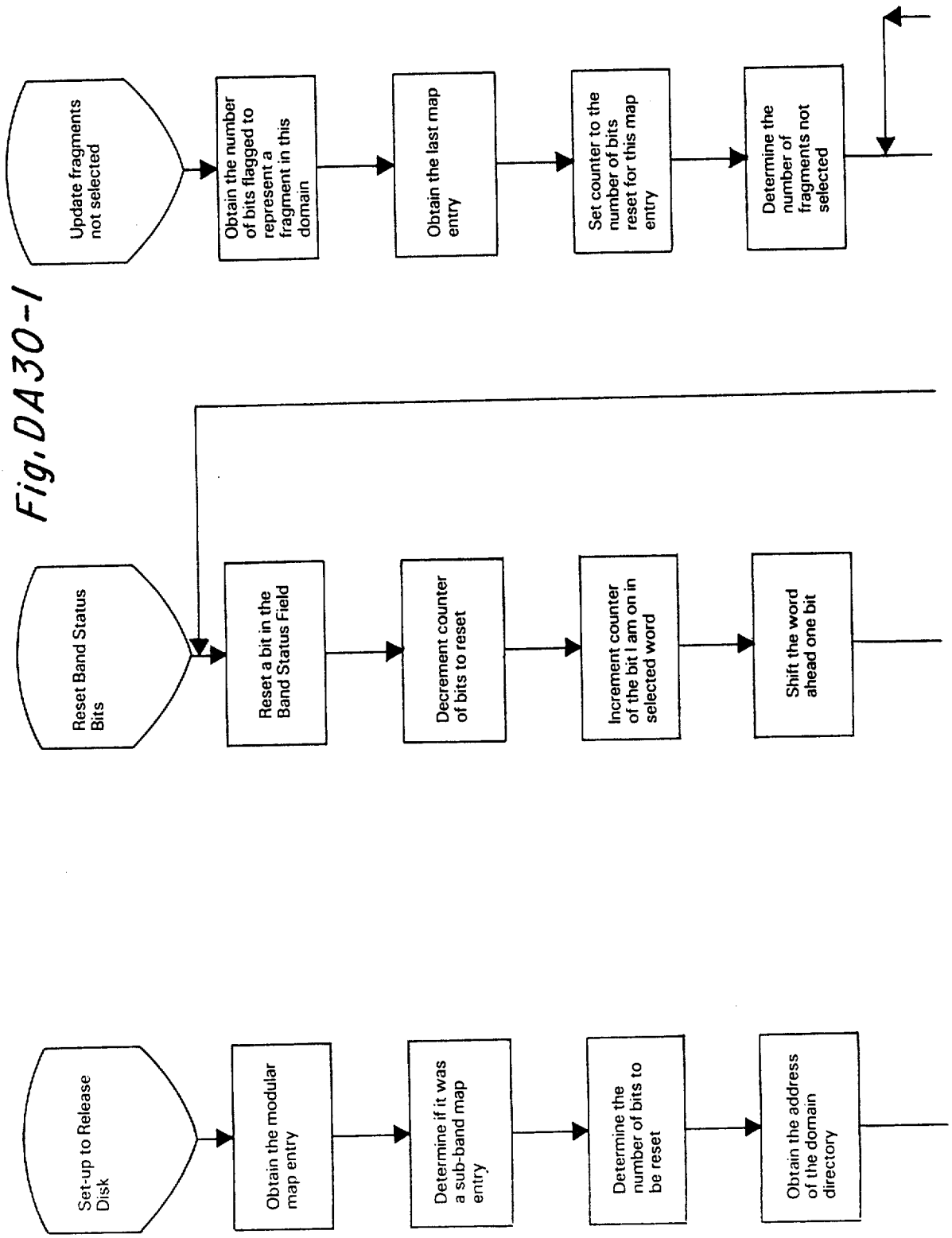

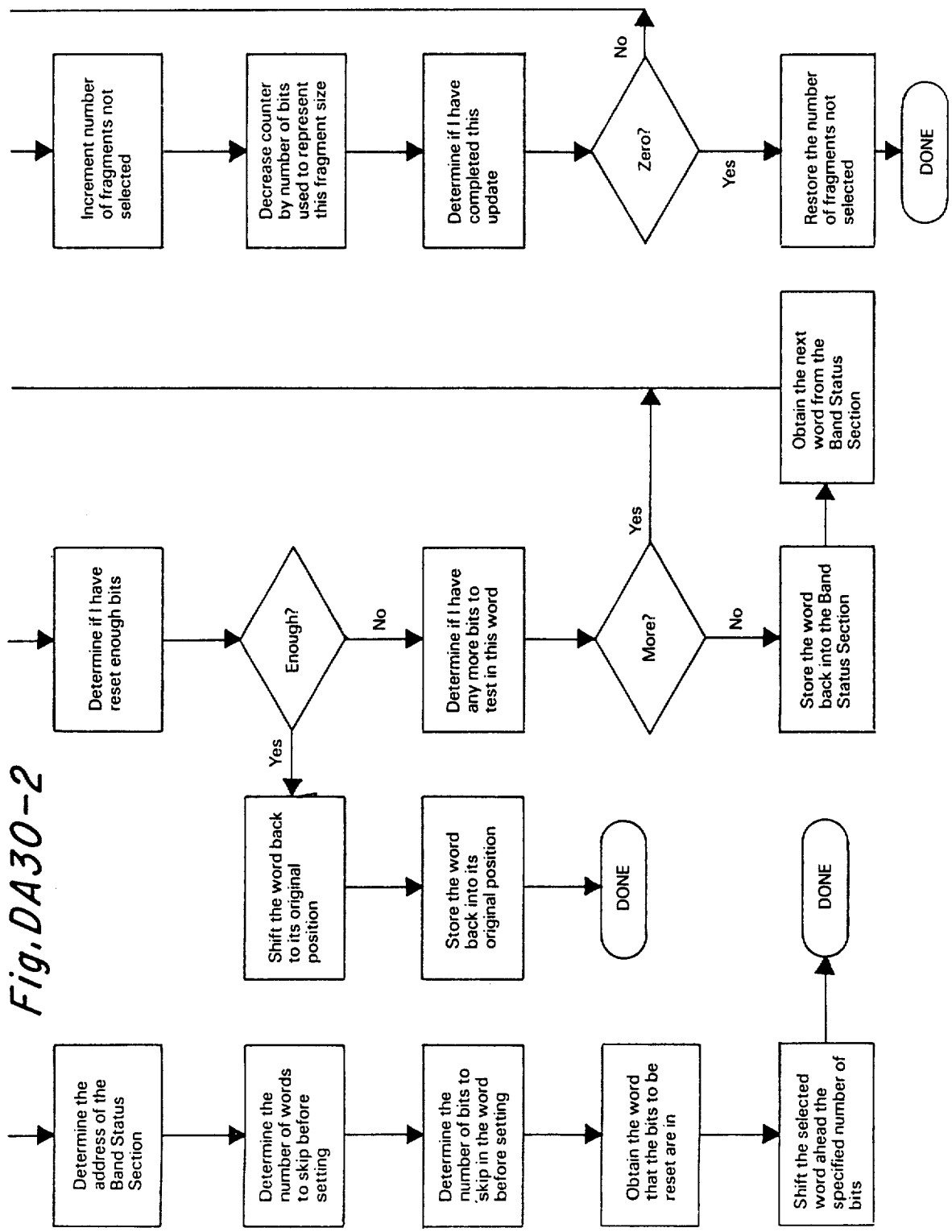
Fig. DA30-2

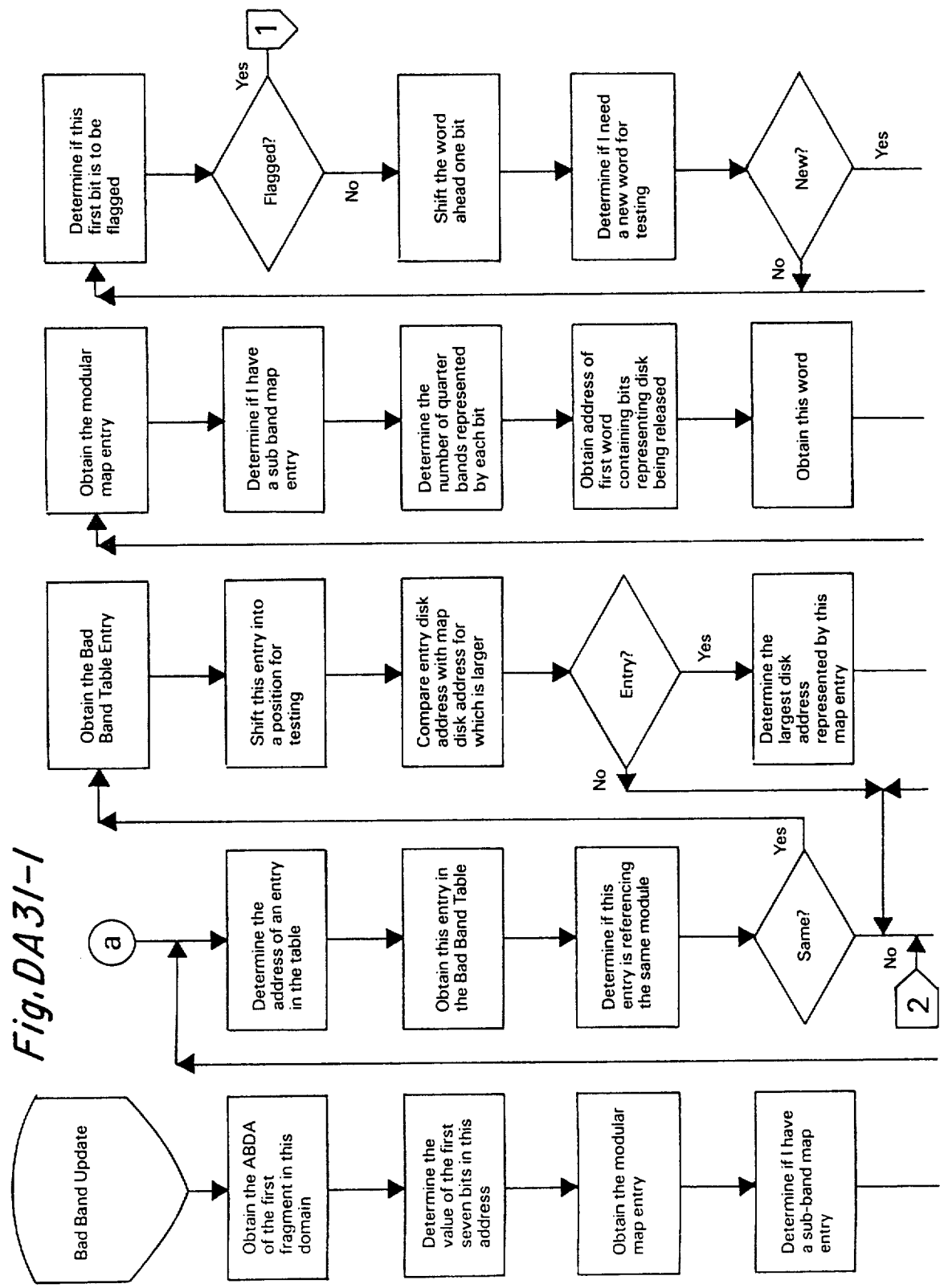
Fig.DA31-1

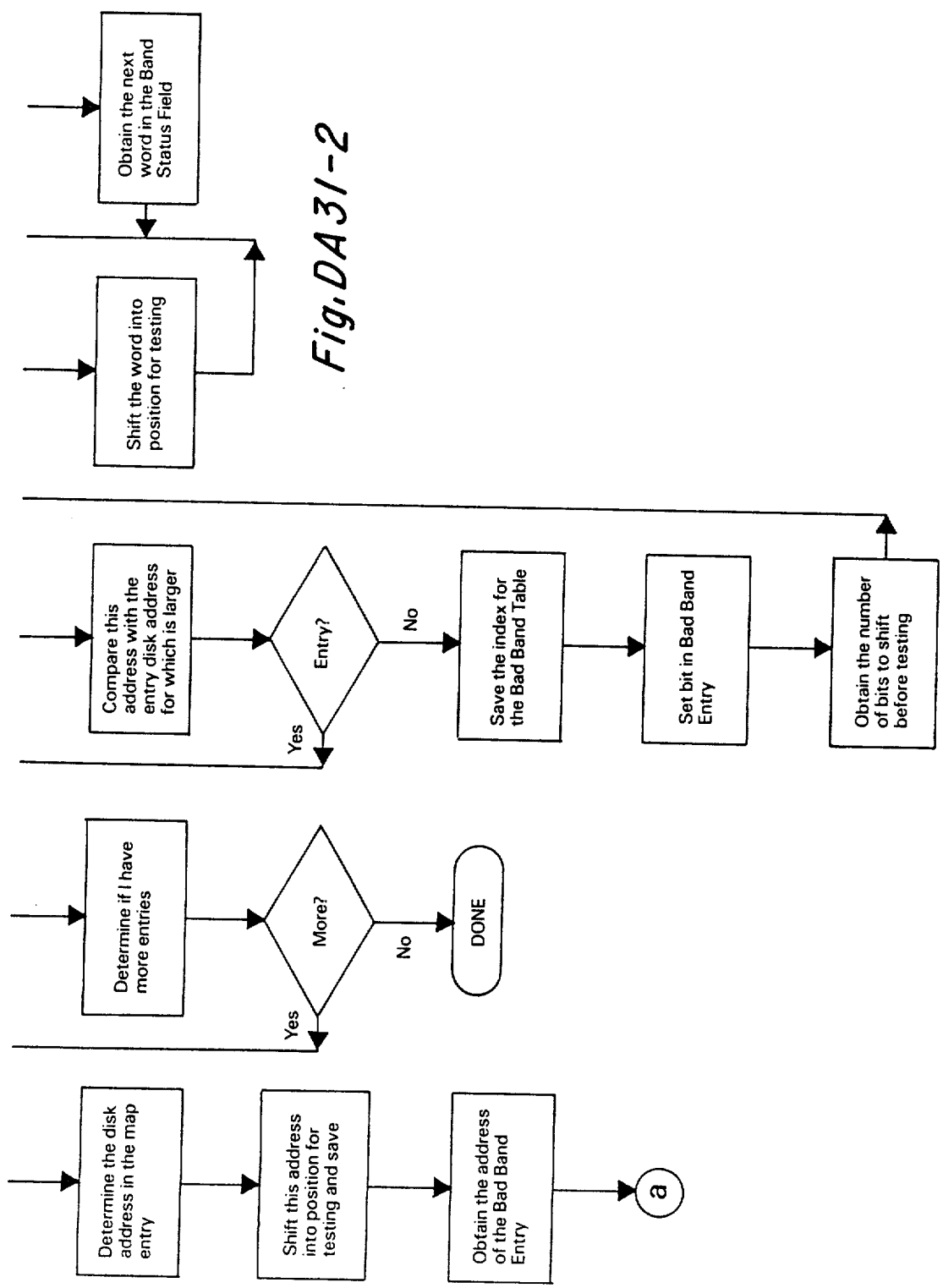
Fig. DA31-2

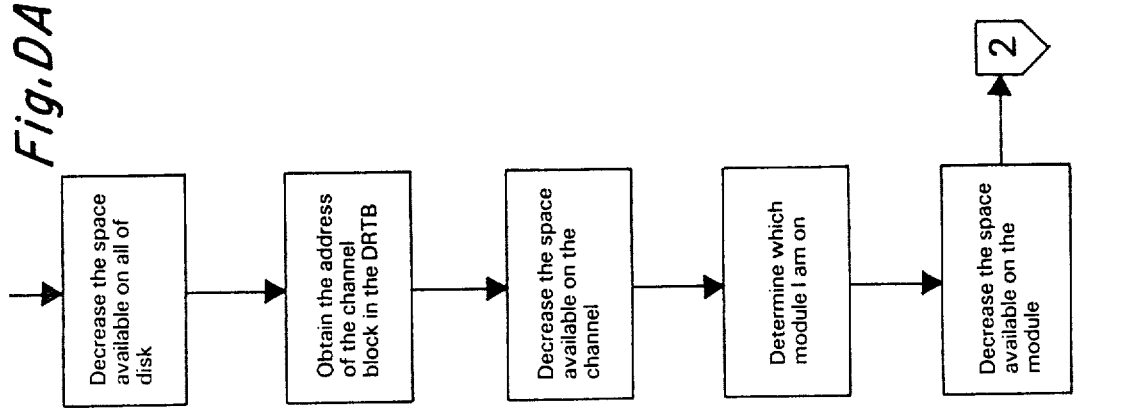
Fig.DA32-2
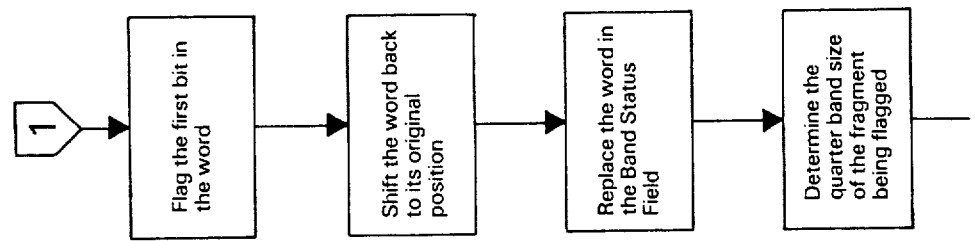
Fig.DA32-1

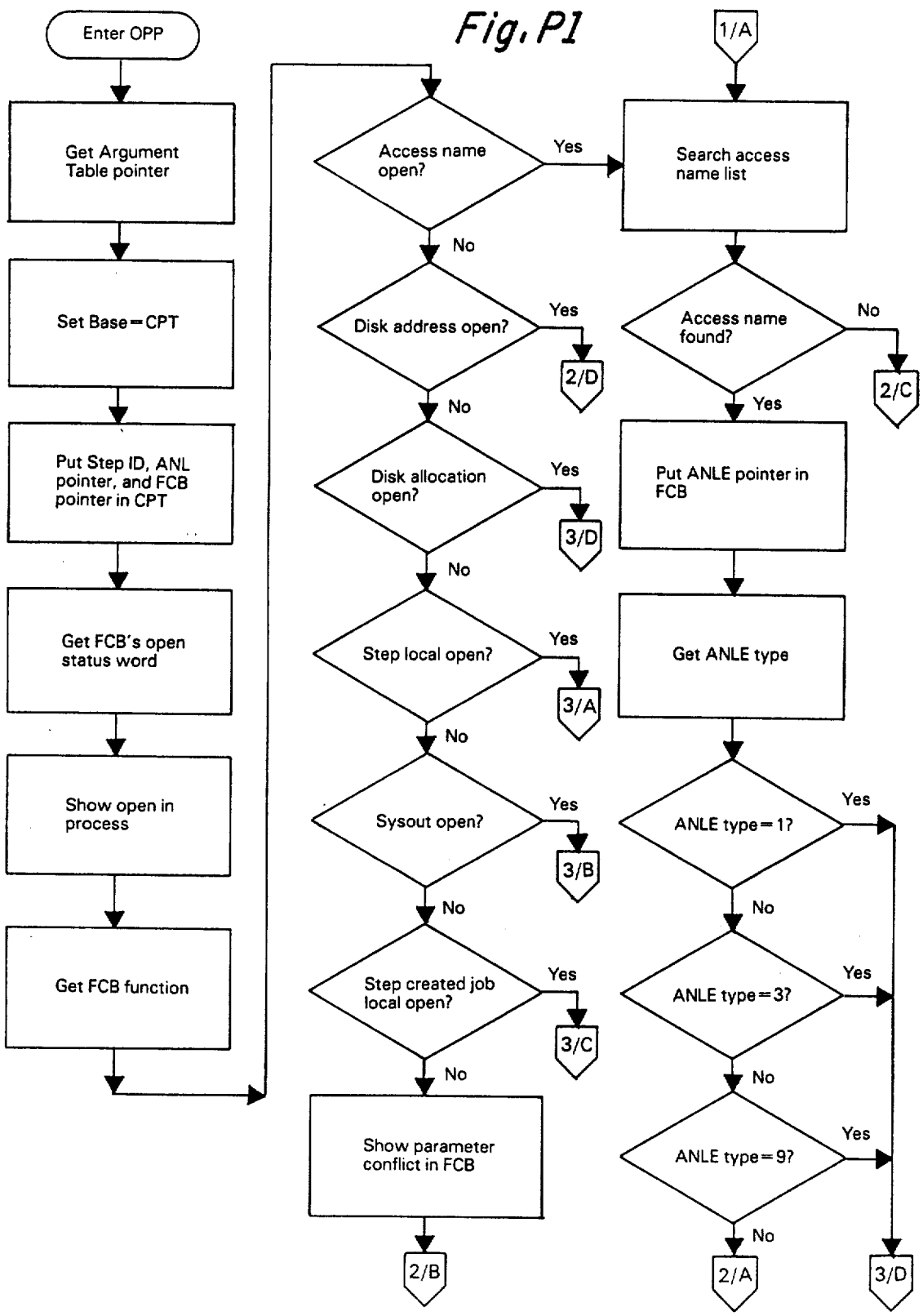
Fig. P1

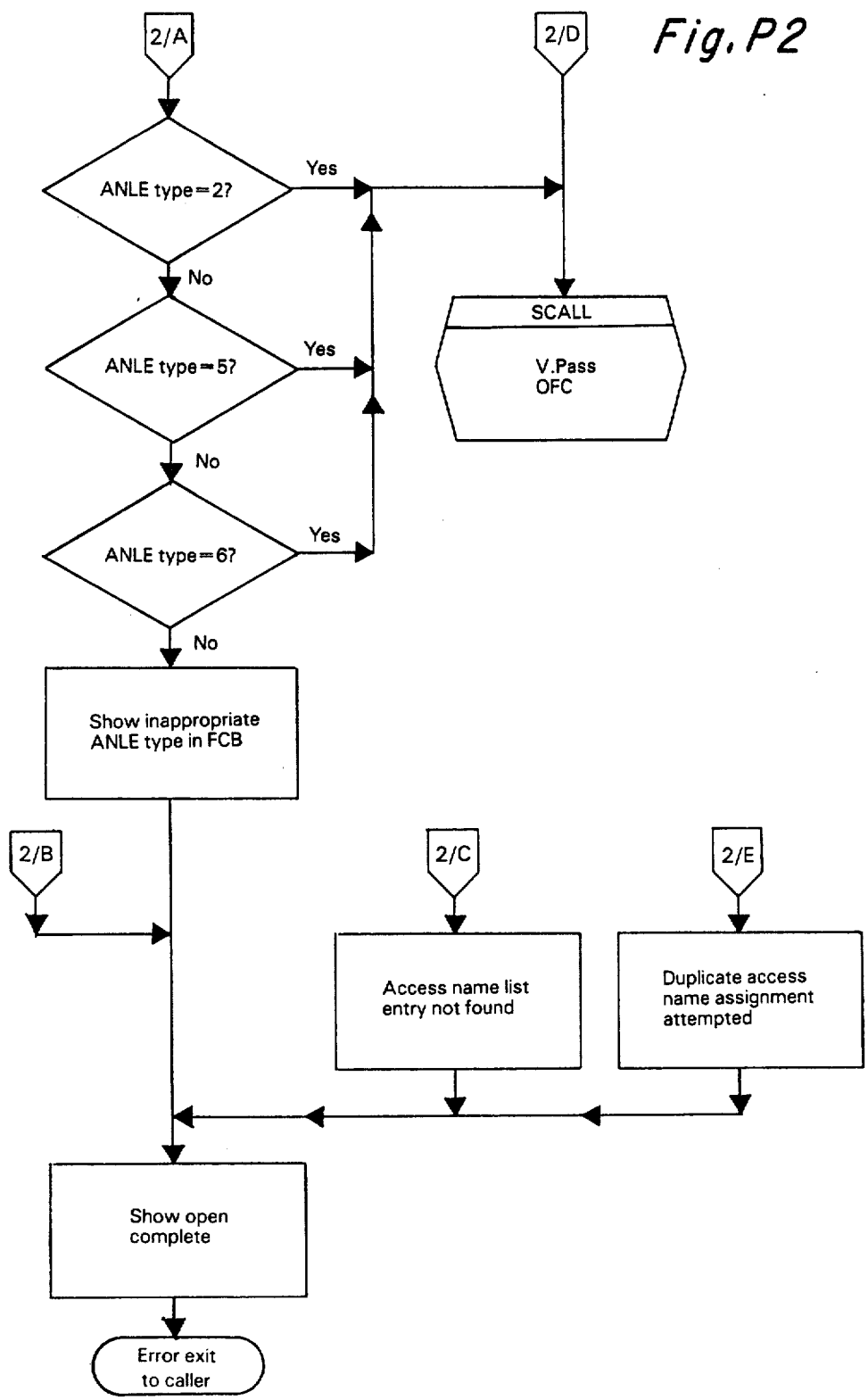
Fig. P2

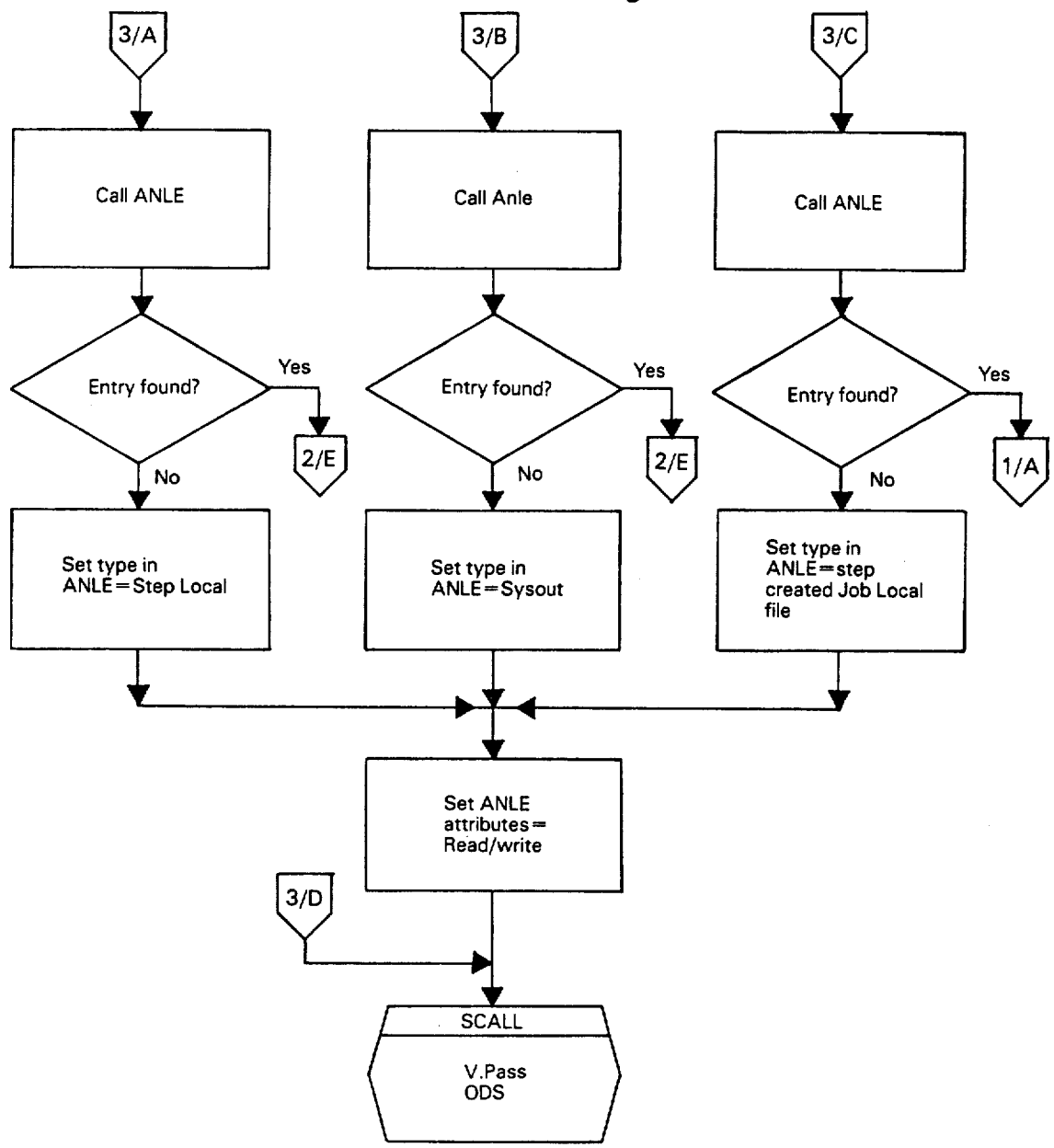
Fig. P3

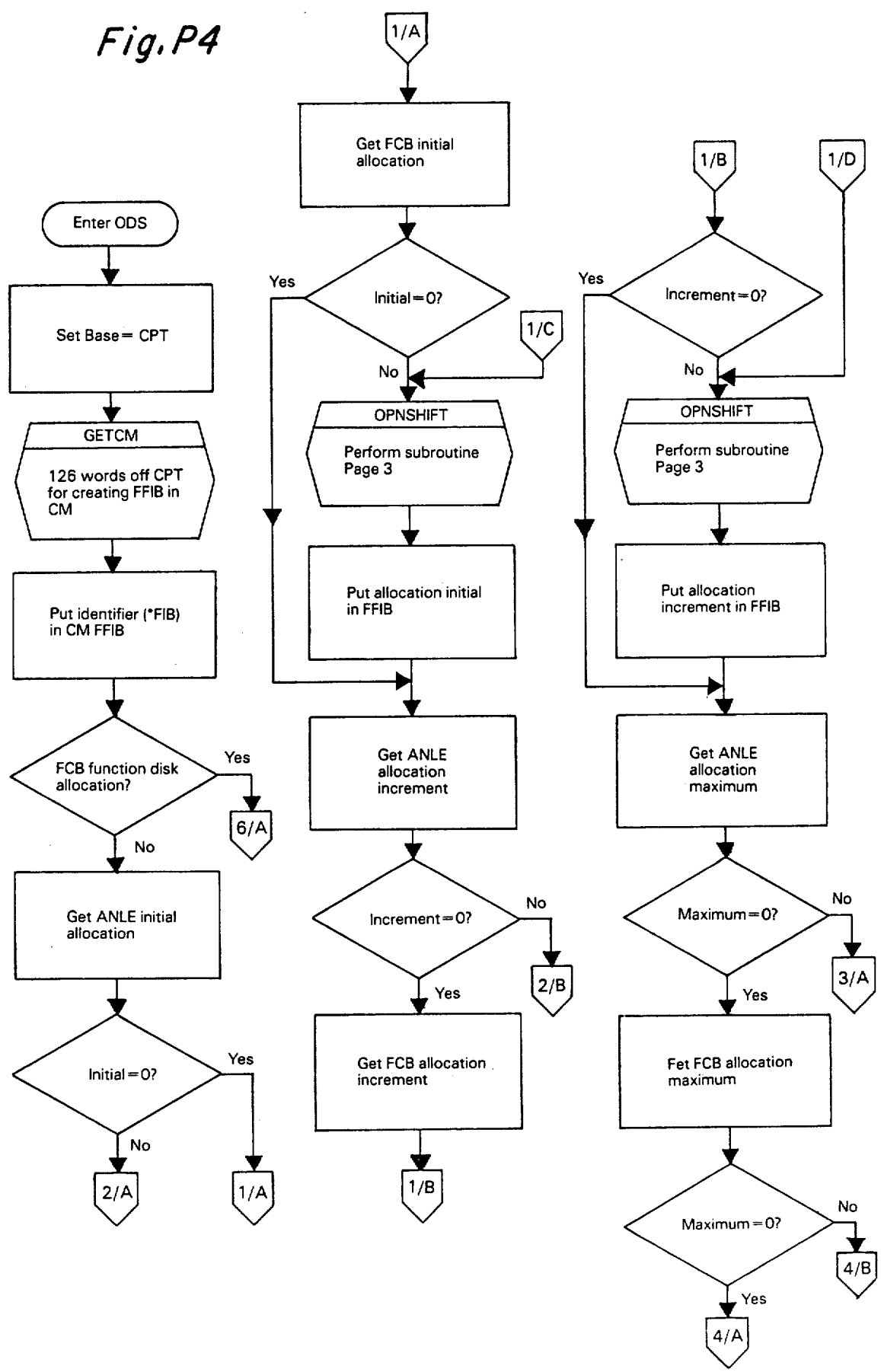
Fig. P4

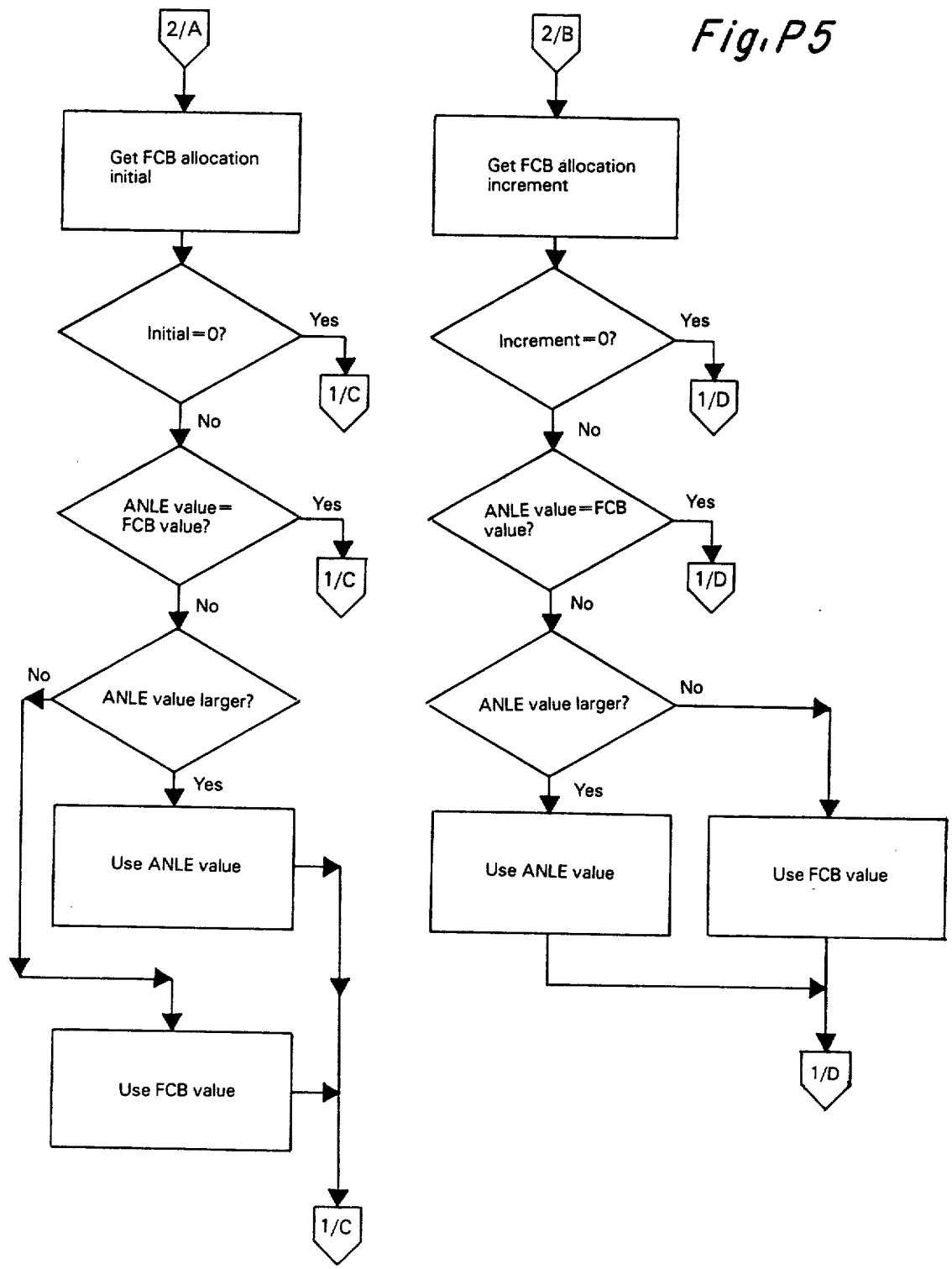
Fig. P5

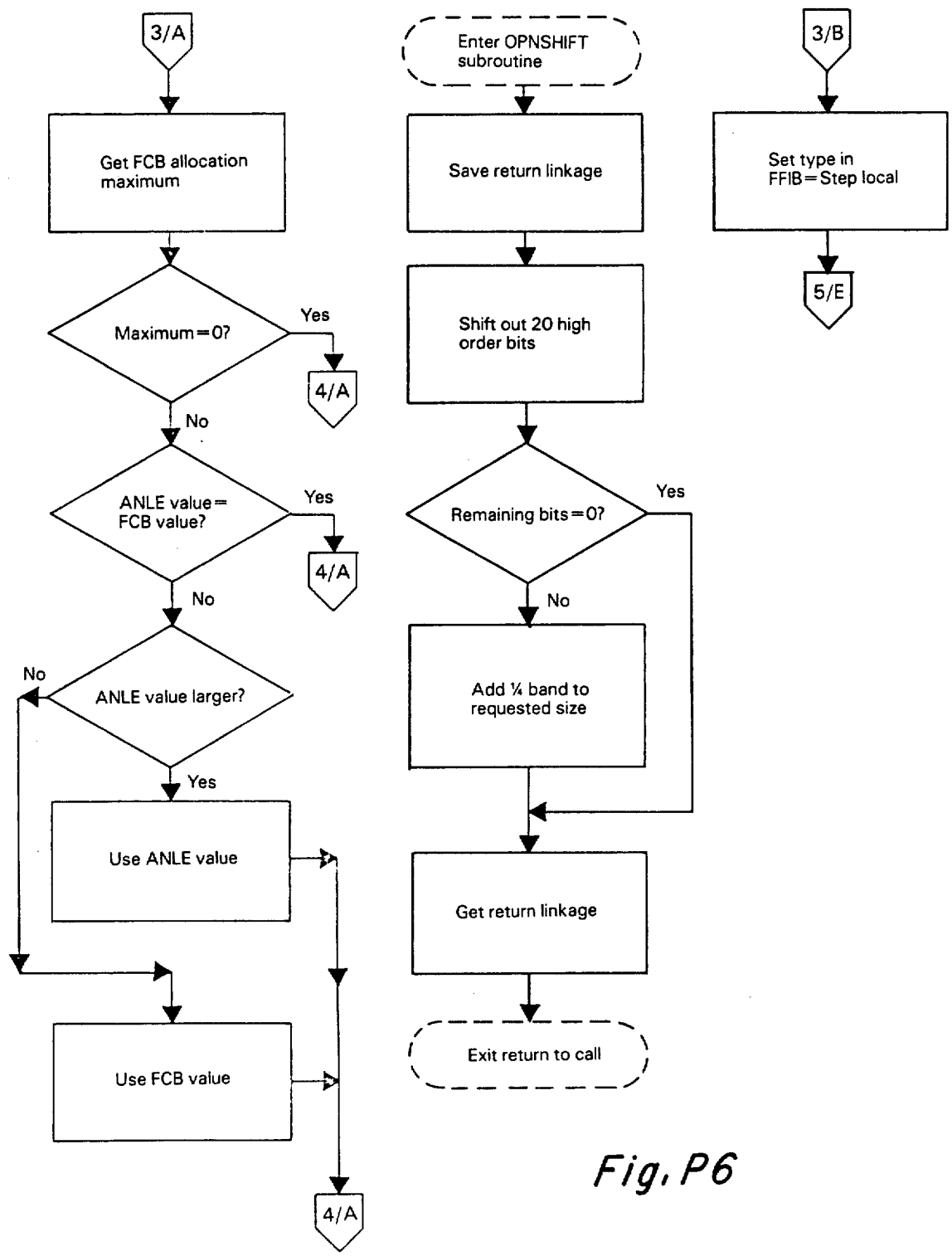
Fig. P6

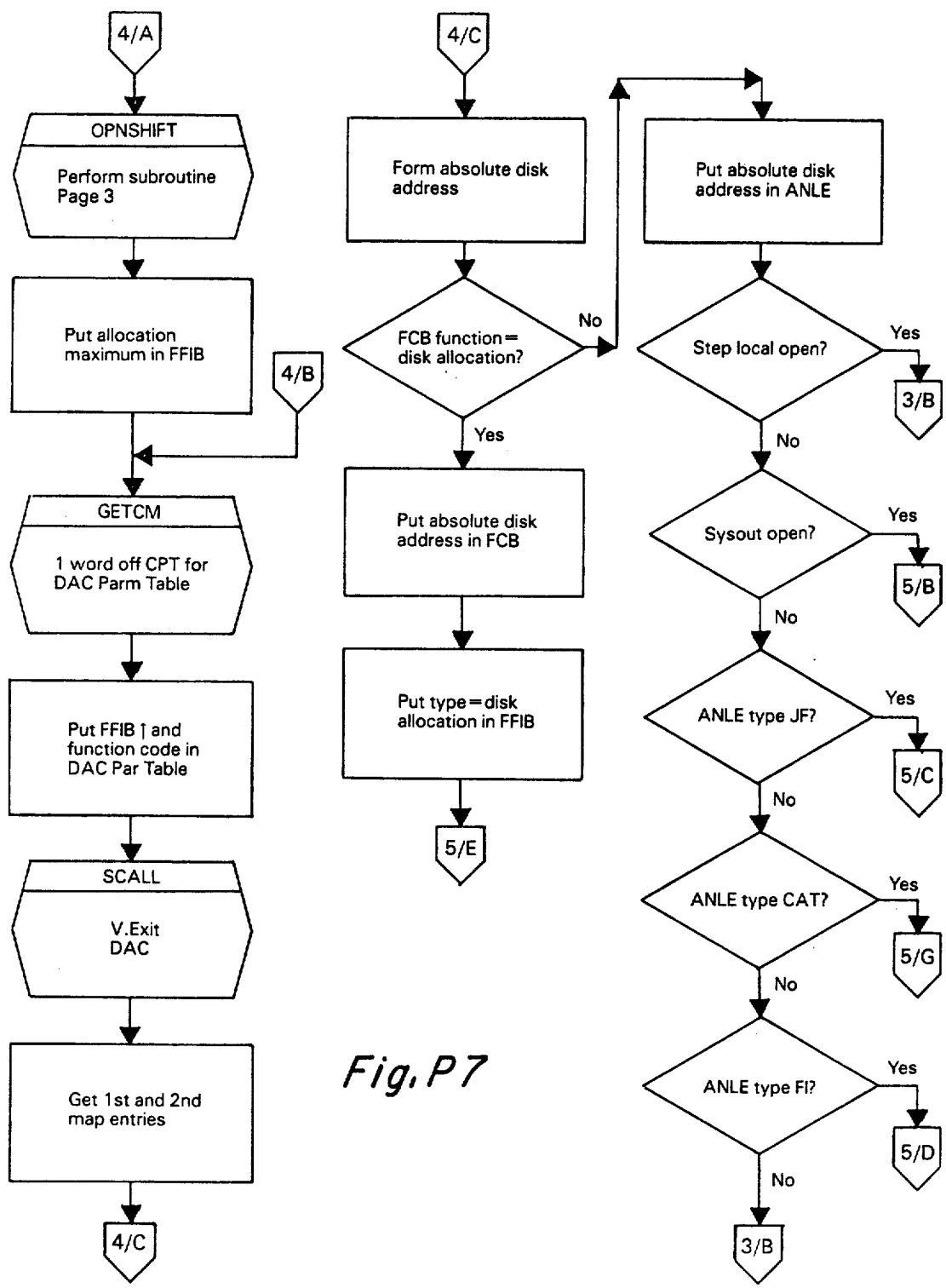
Fig. P7

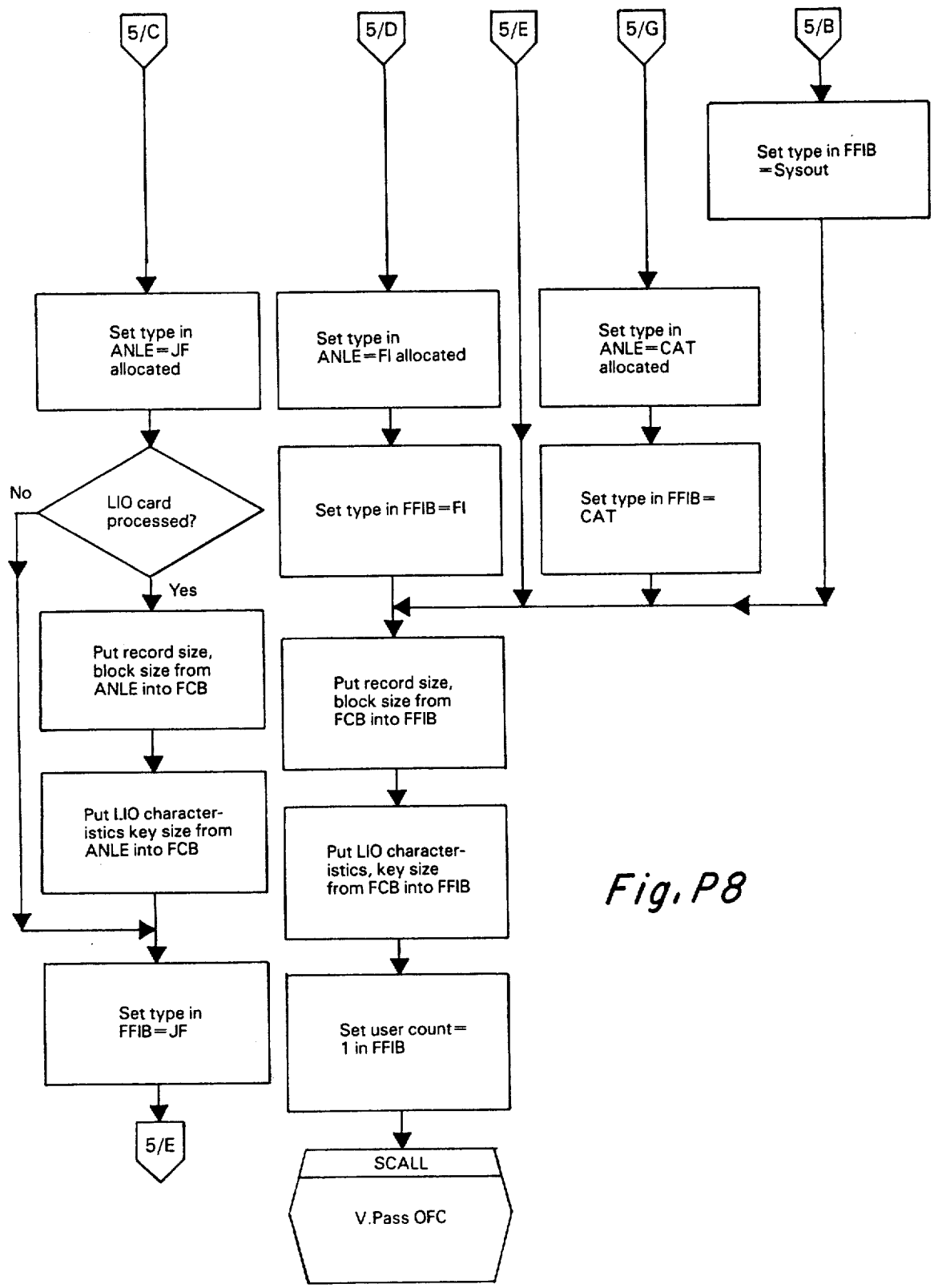
Fig. P8

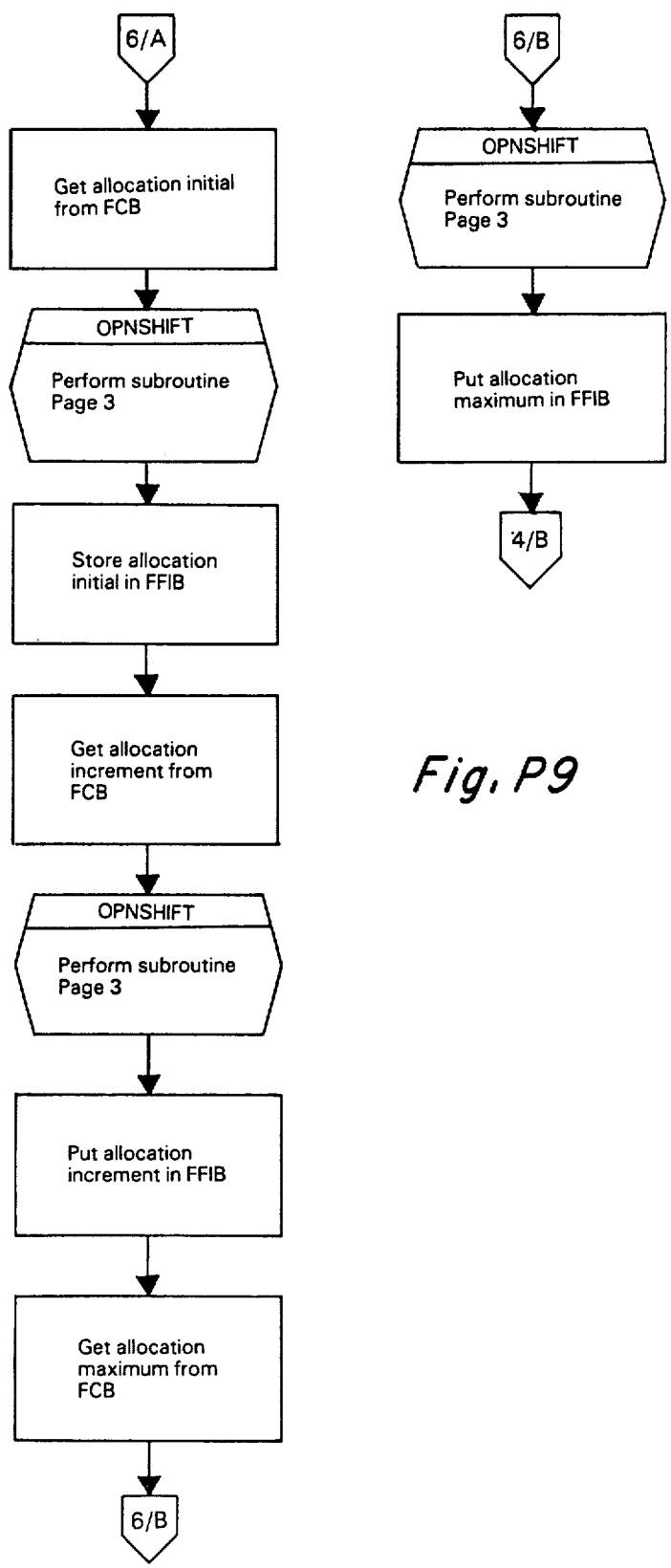
Fig. P9

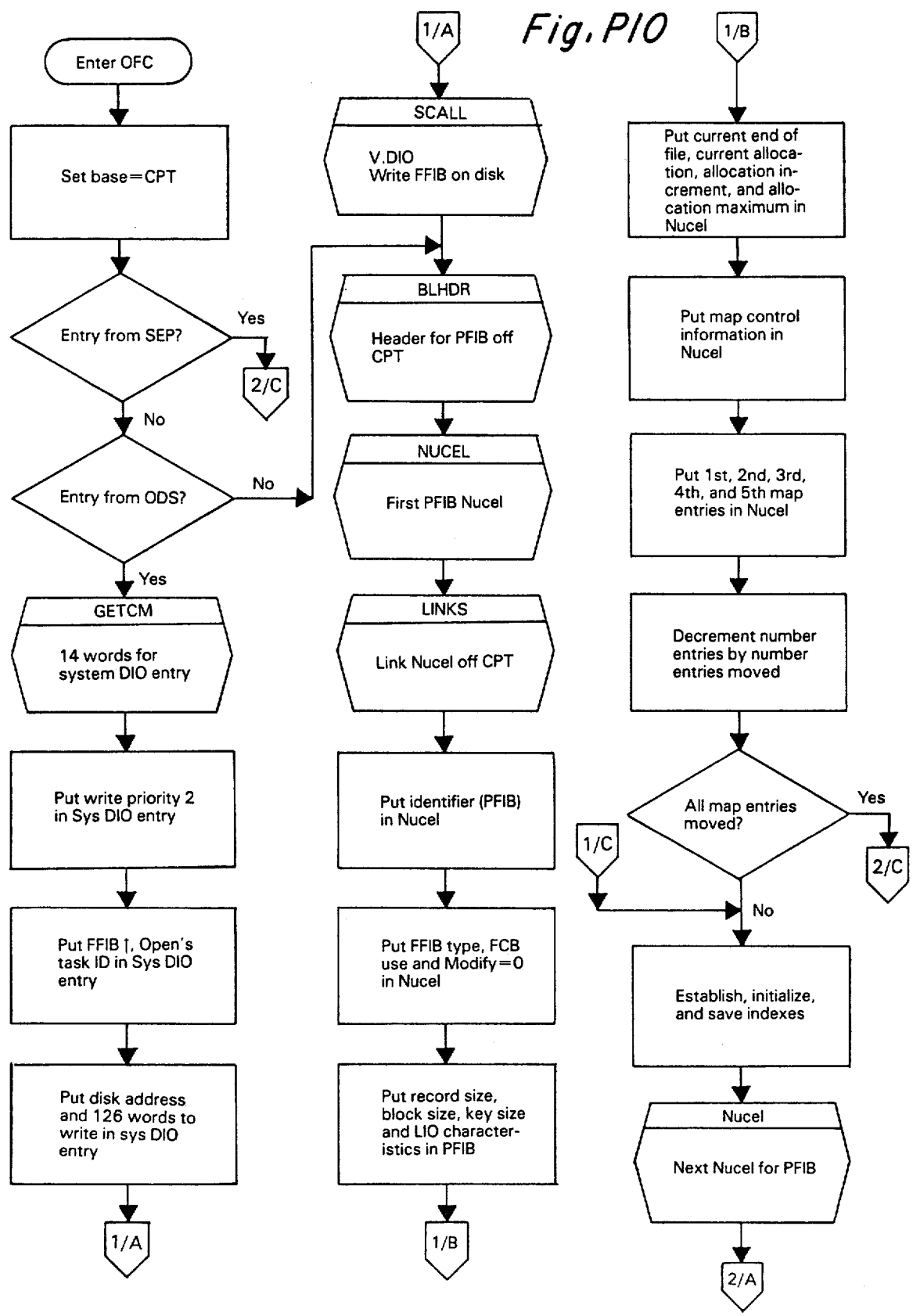
Fig. P10

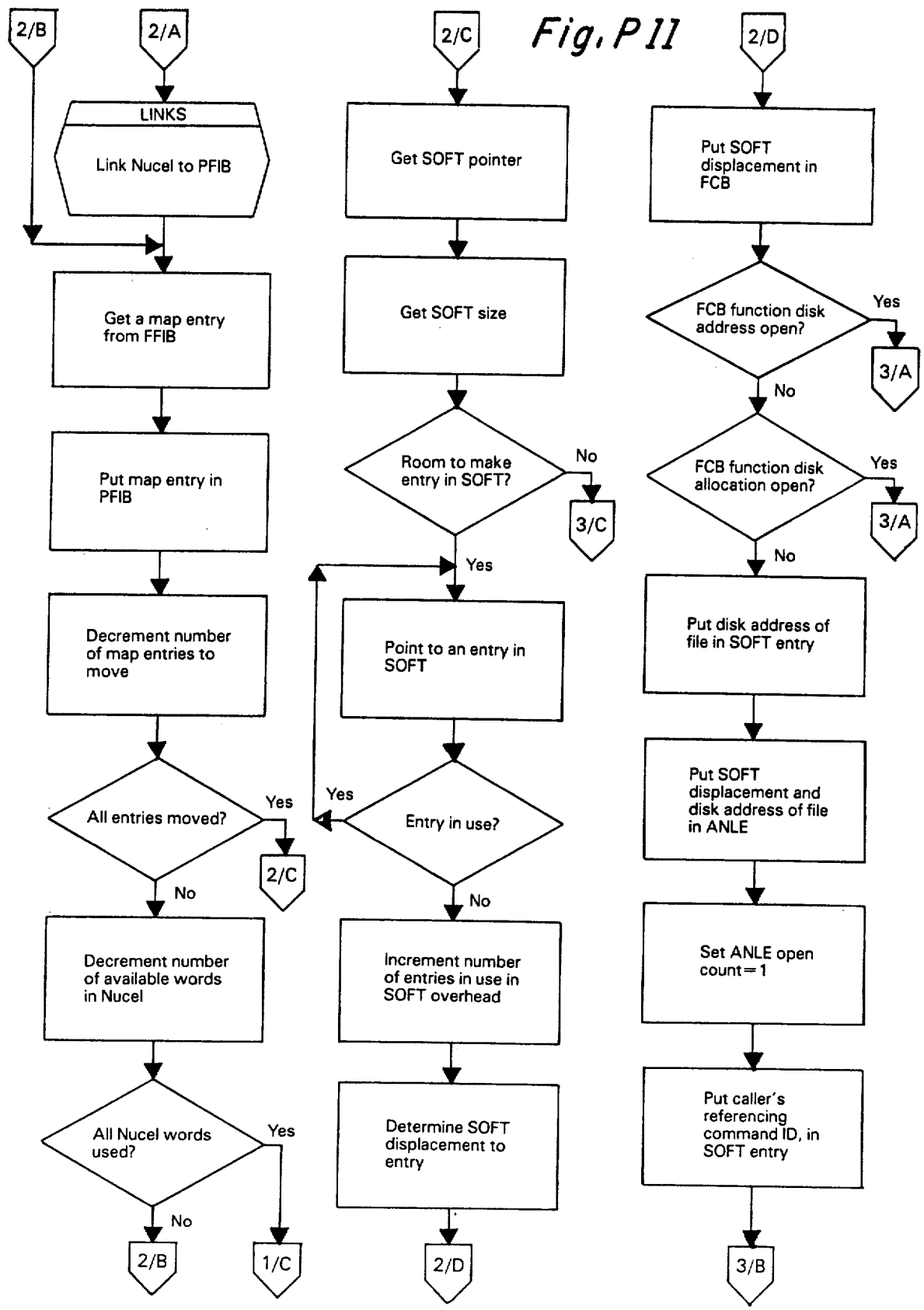
Fig. P11

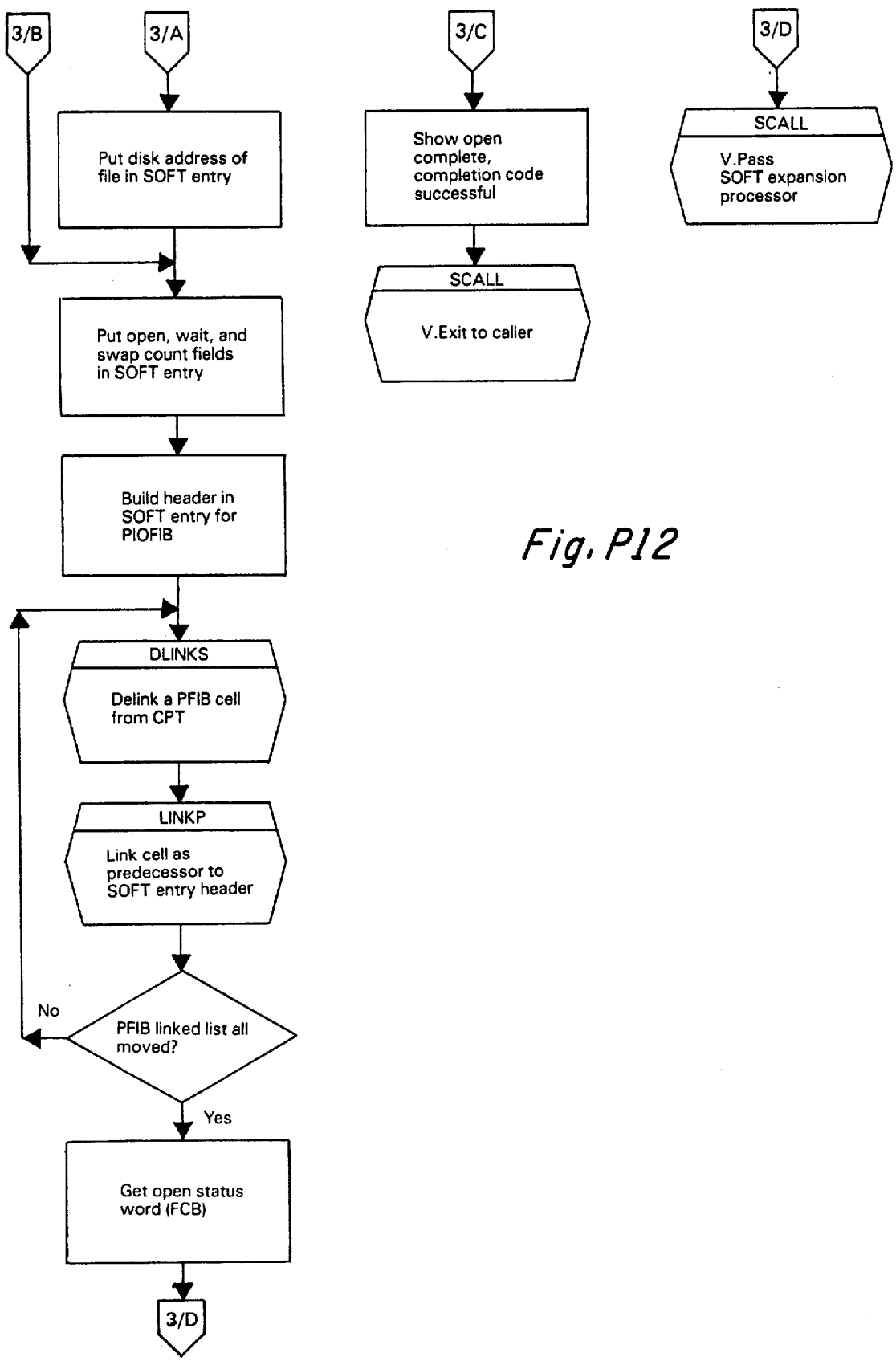
Fig. P12

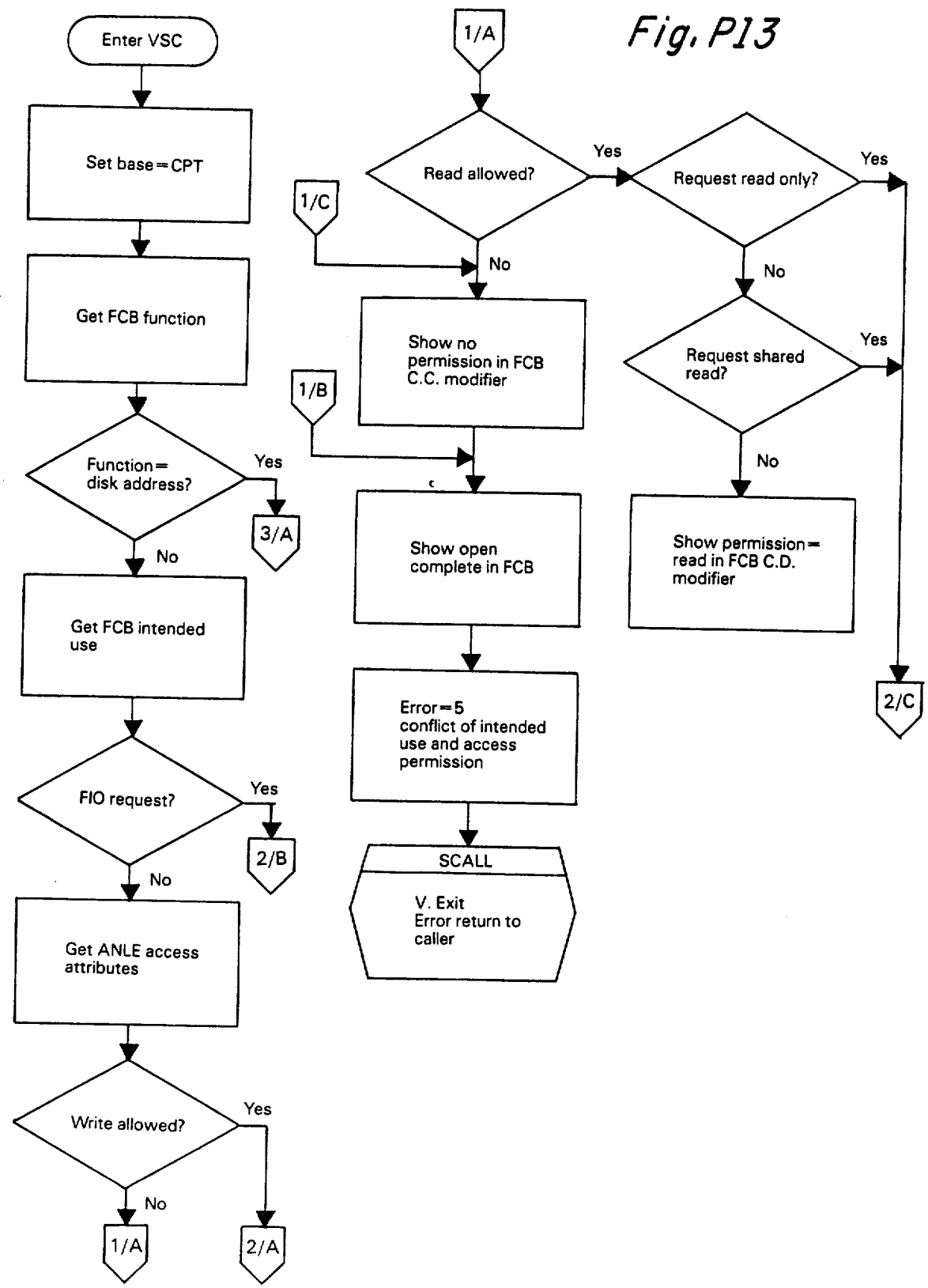
Fig. P13

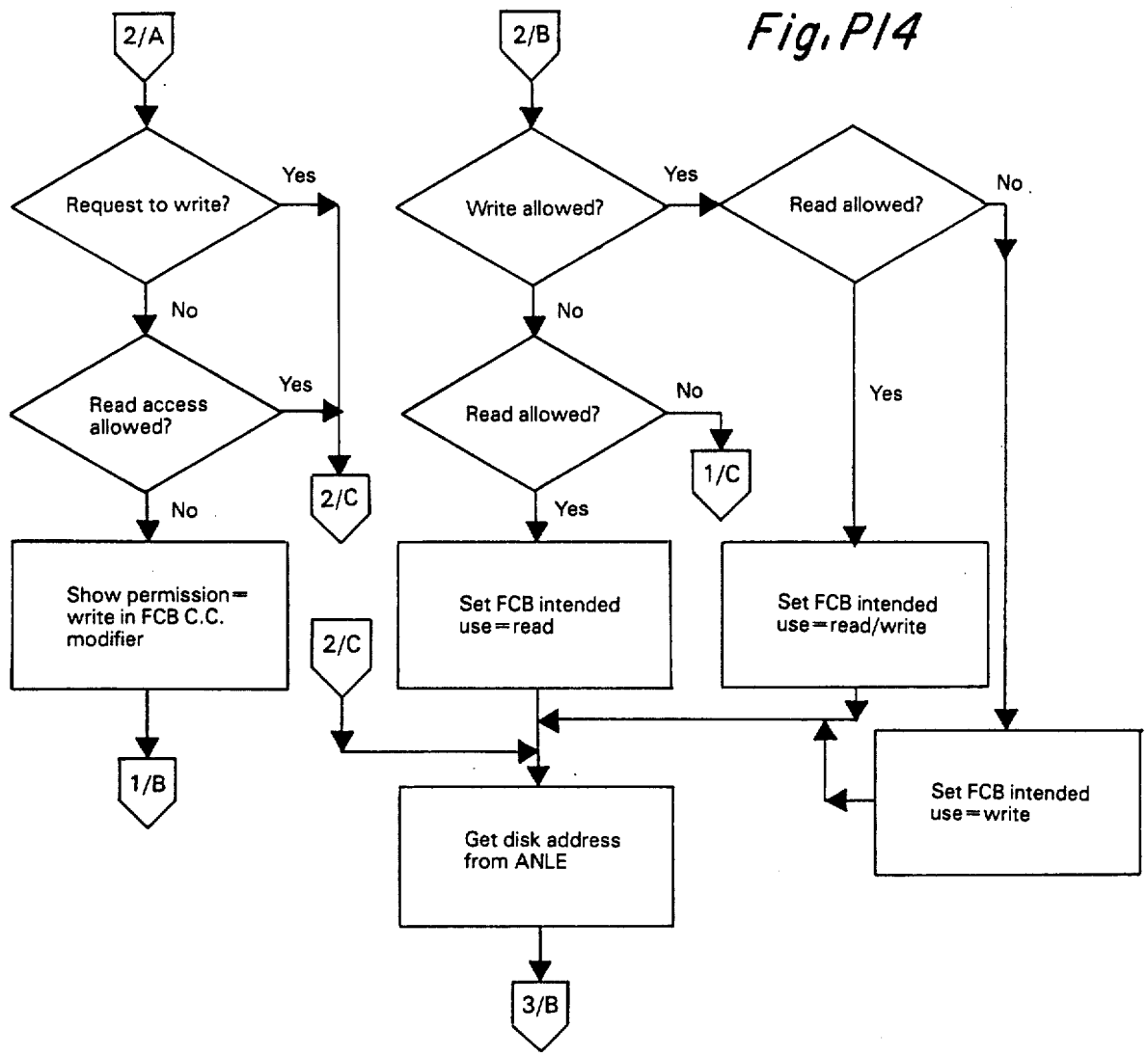
Fig. P14

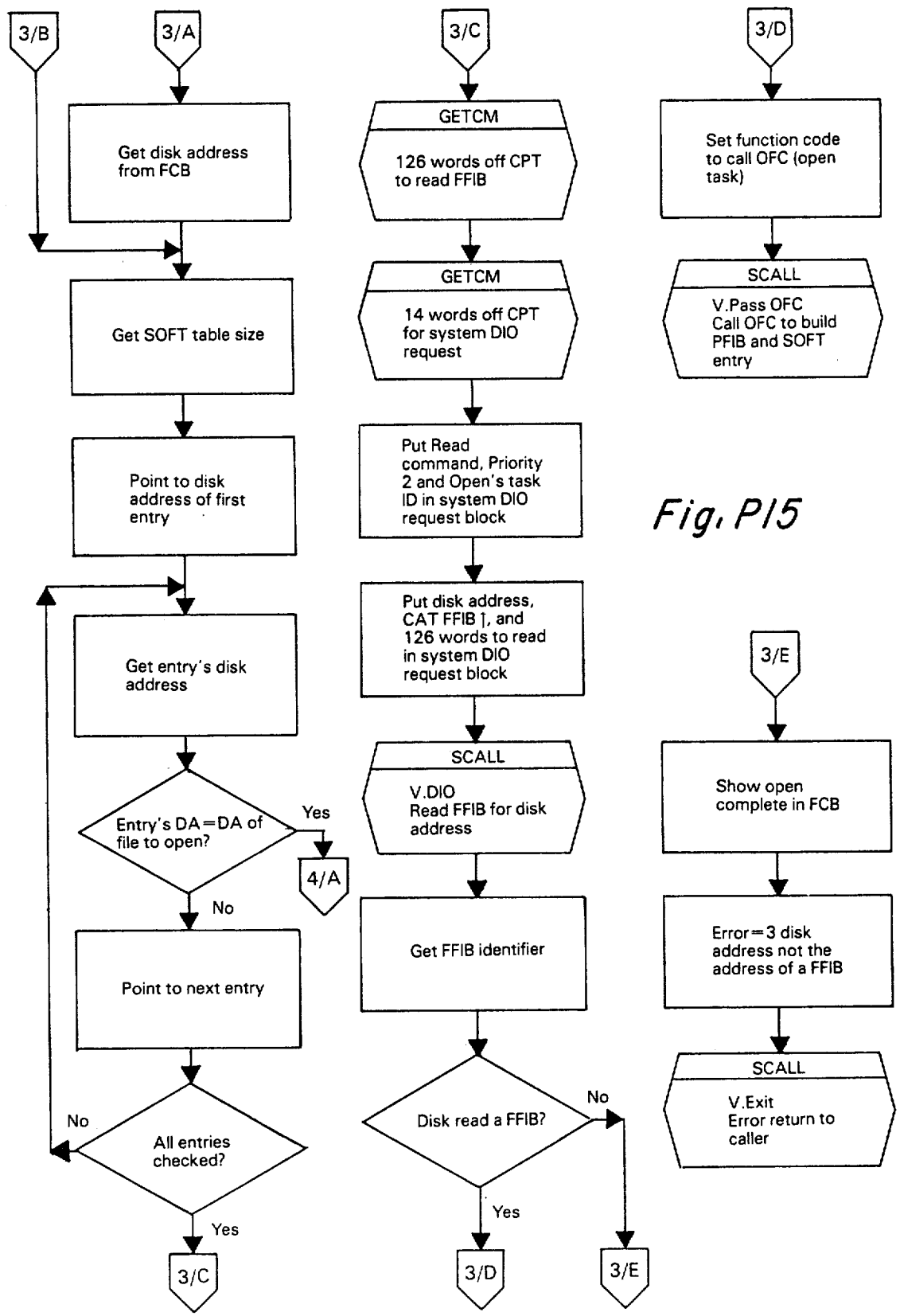
Fig. P15

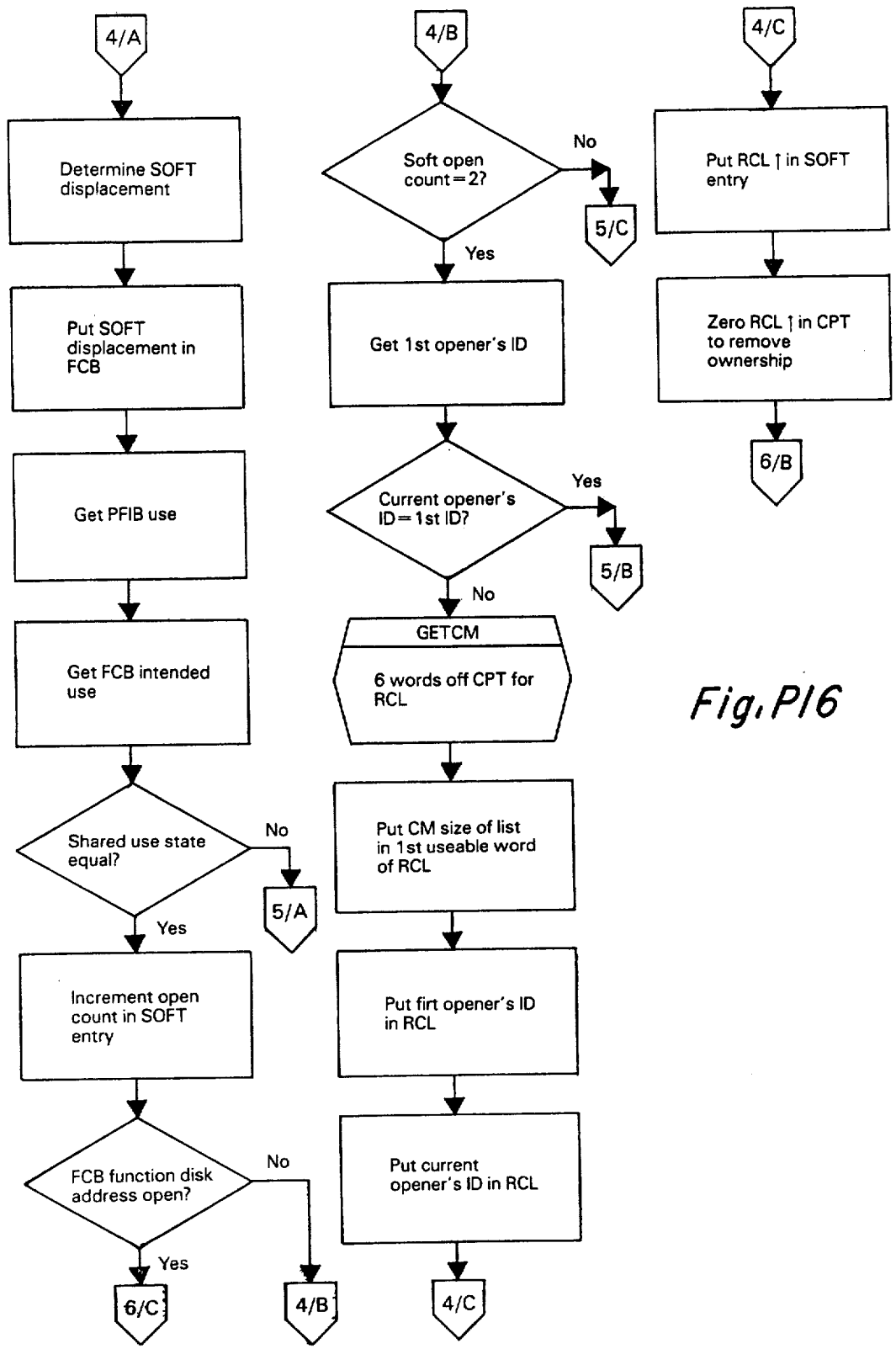
Fig. P16

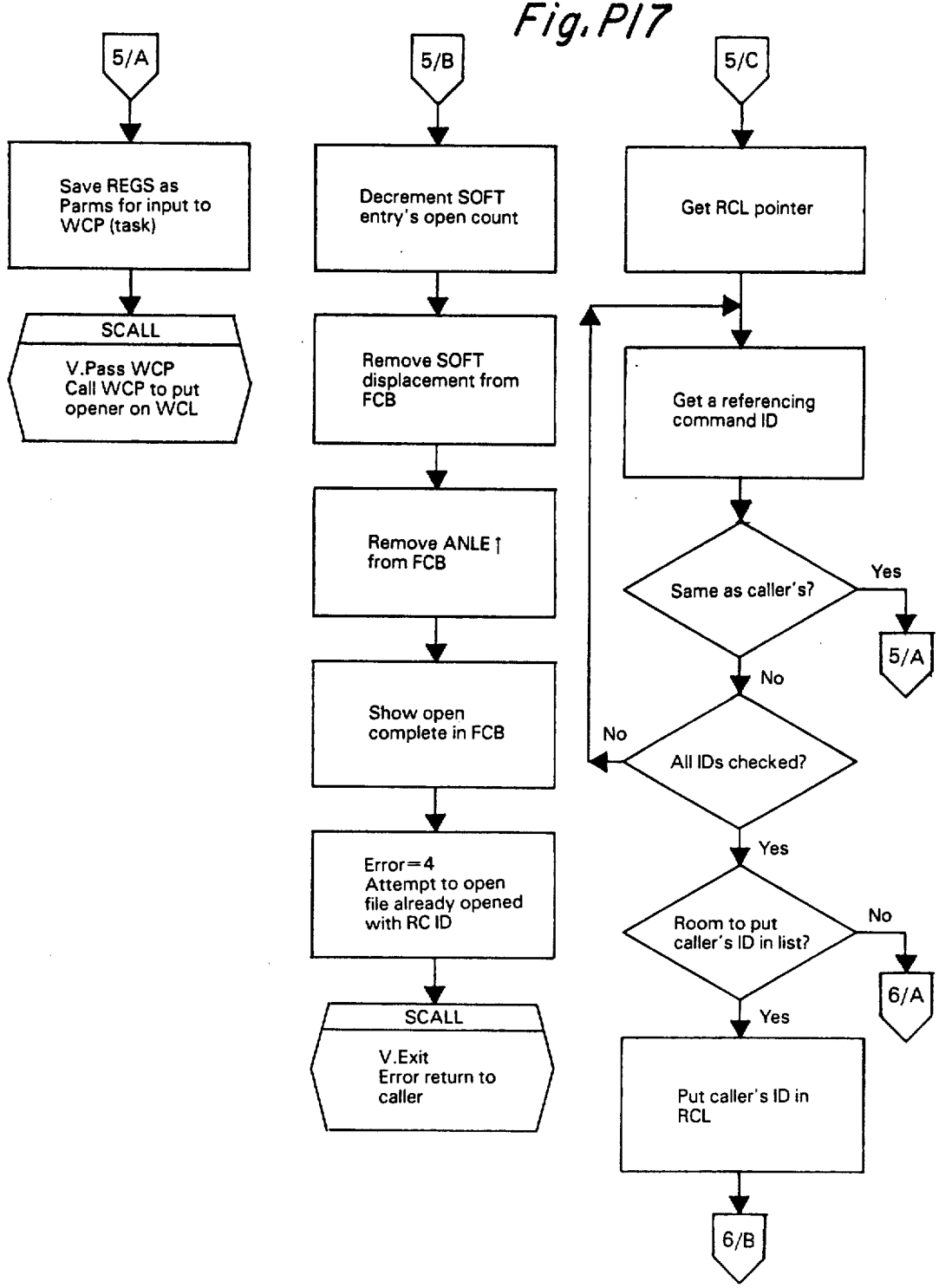
Fig. P17

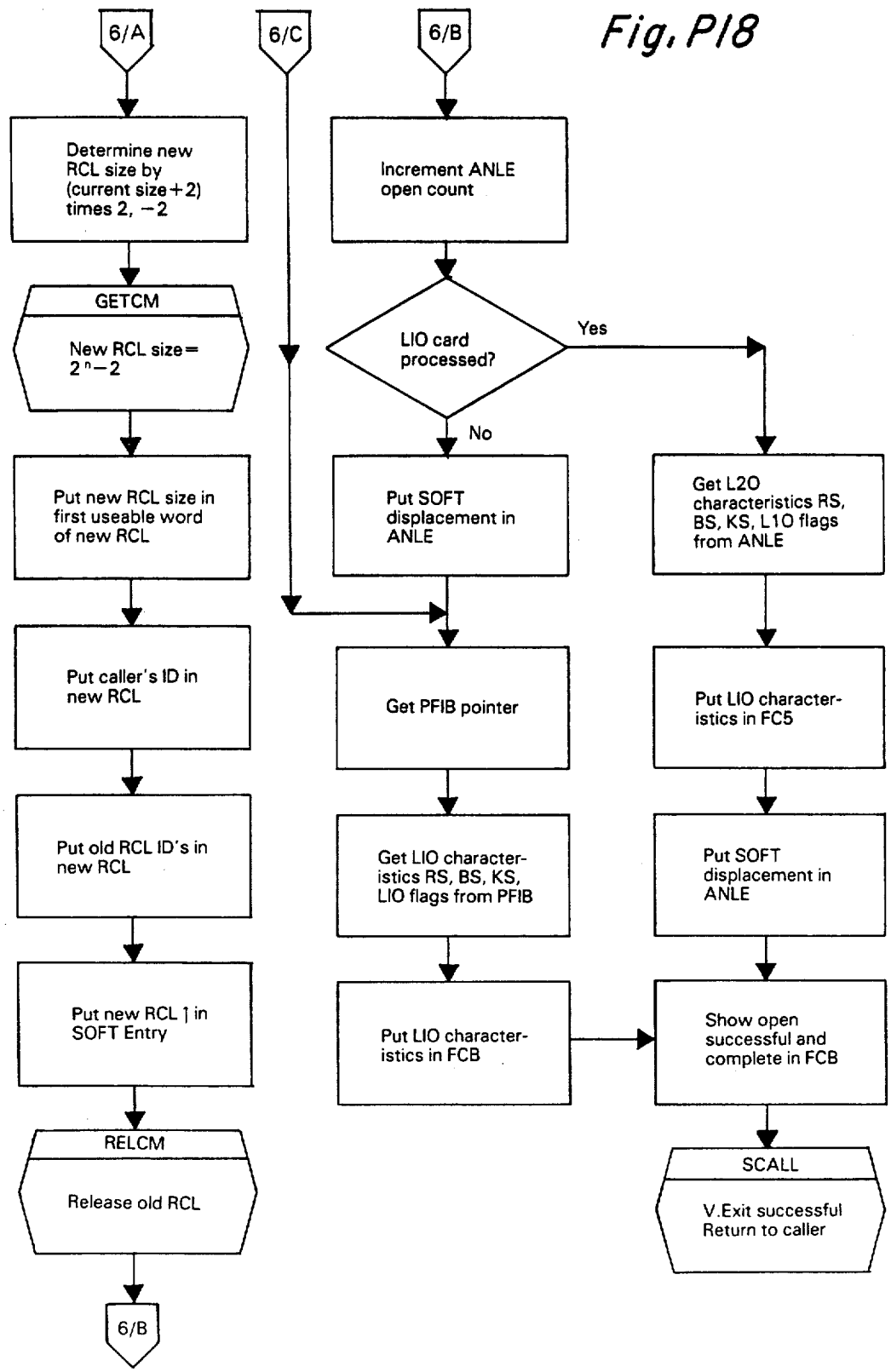
Fig. P18

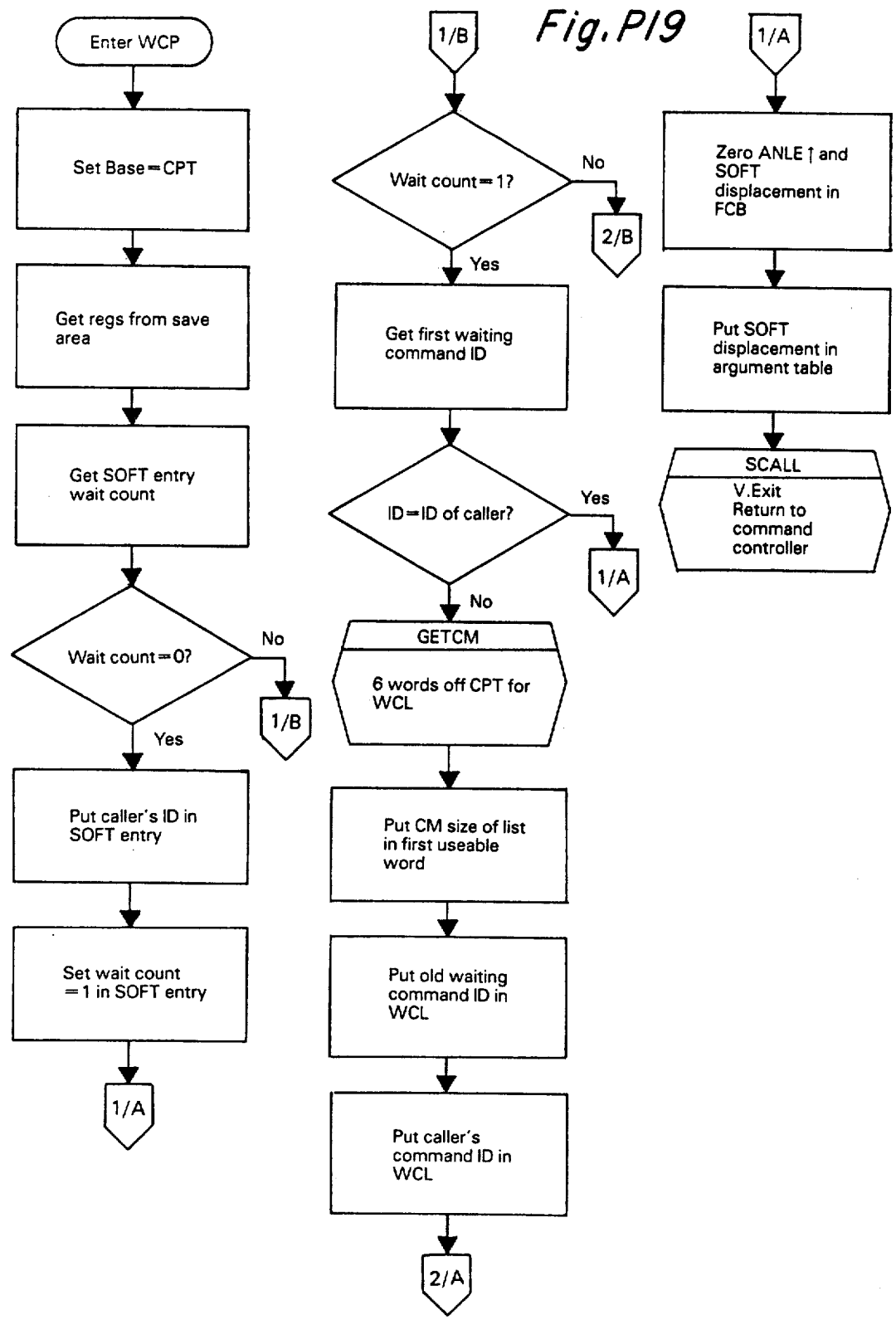
Fig. P19

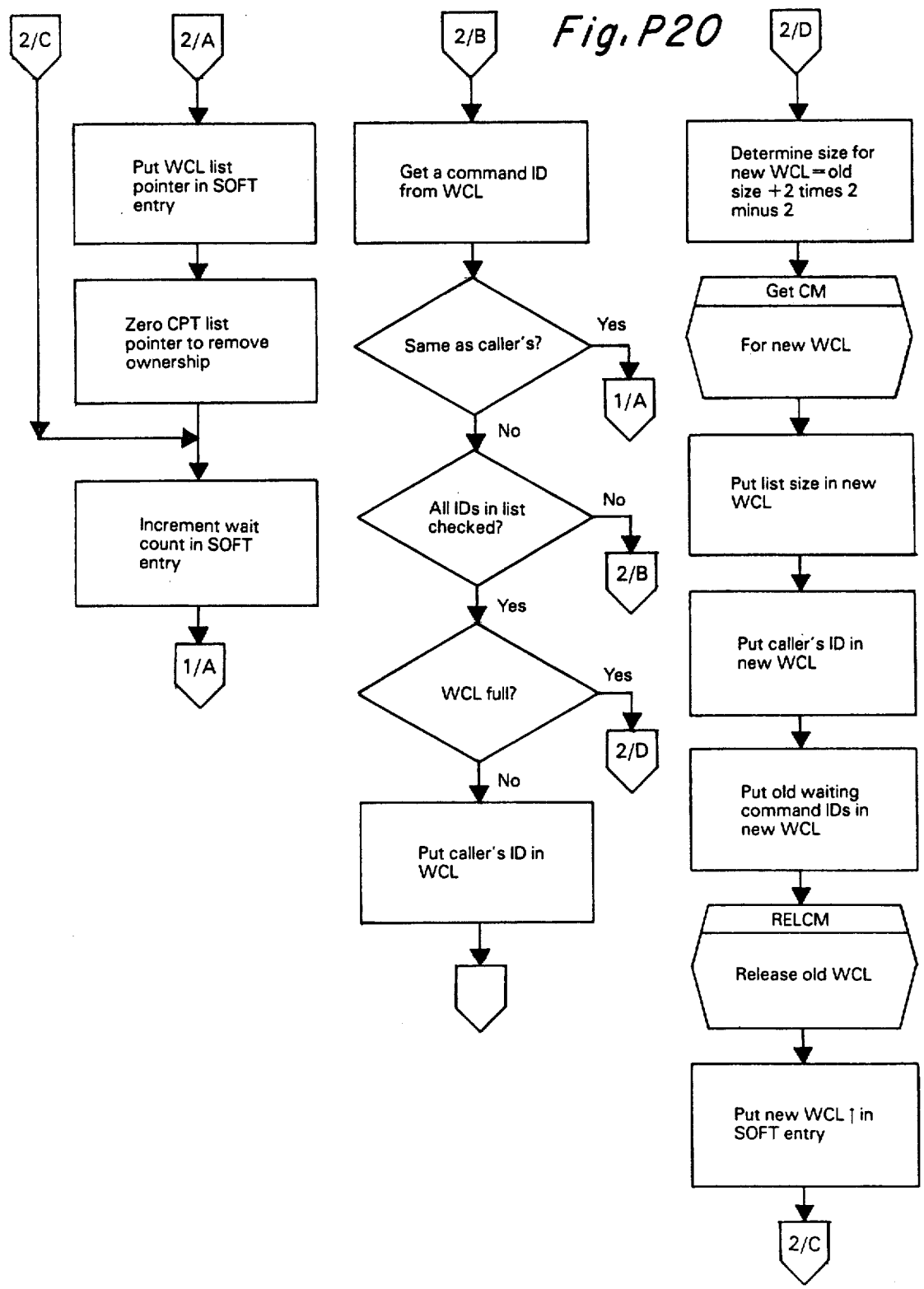
Fig. P20

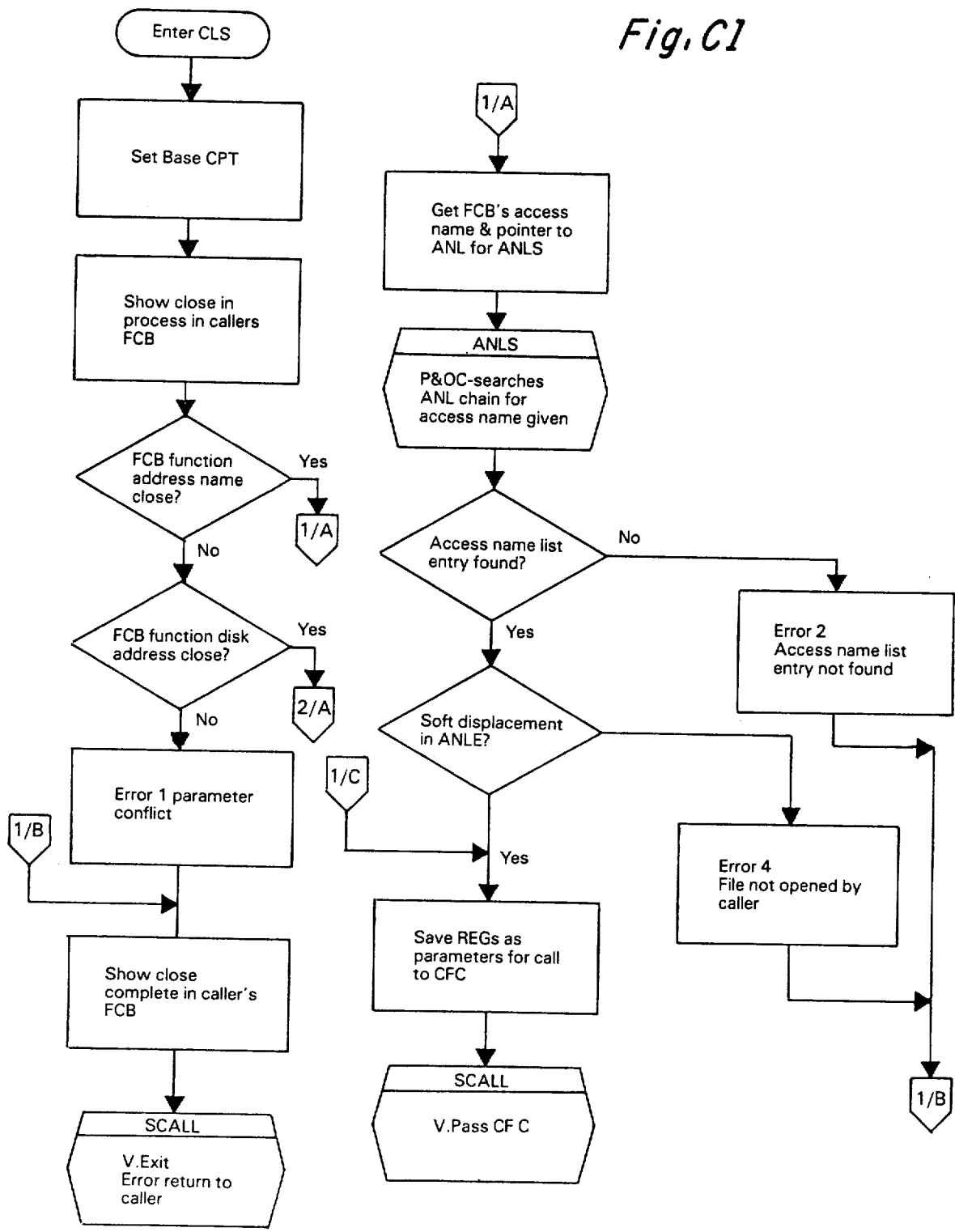
Fig. C1

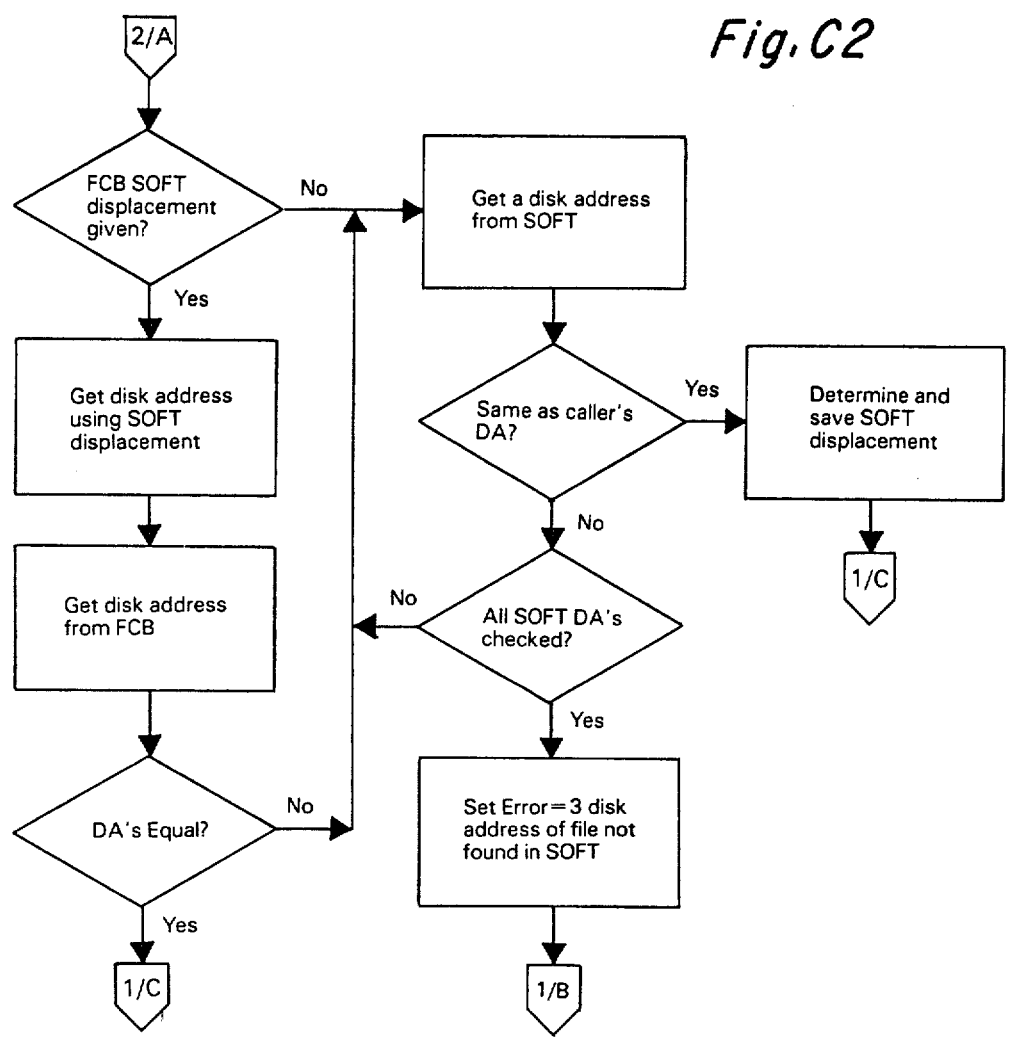
Fig. C2

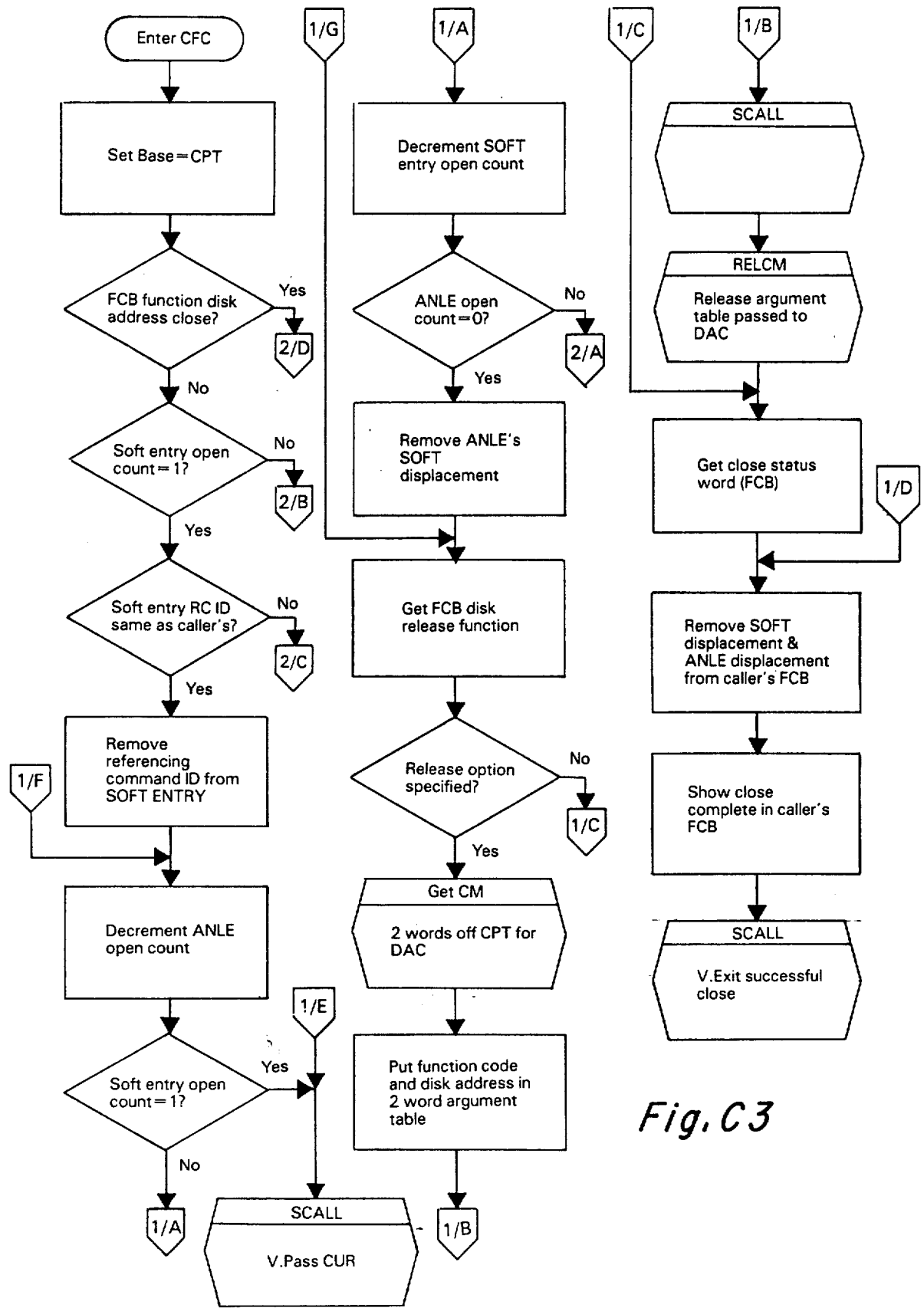
Fig. C3

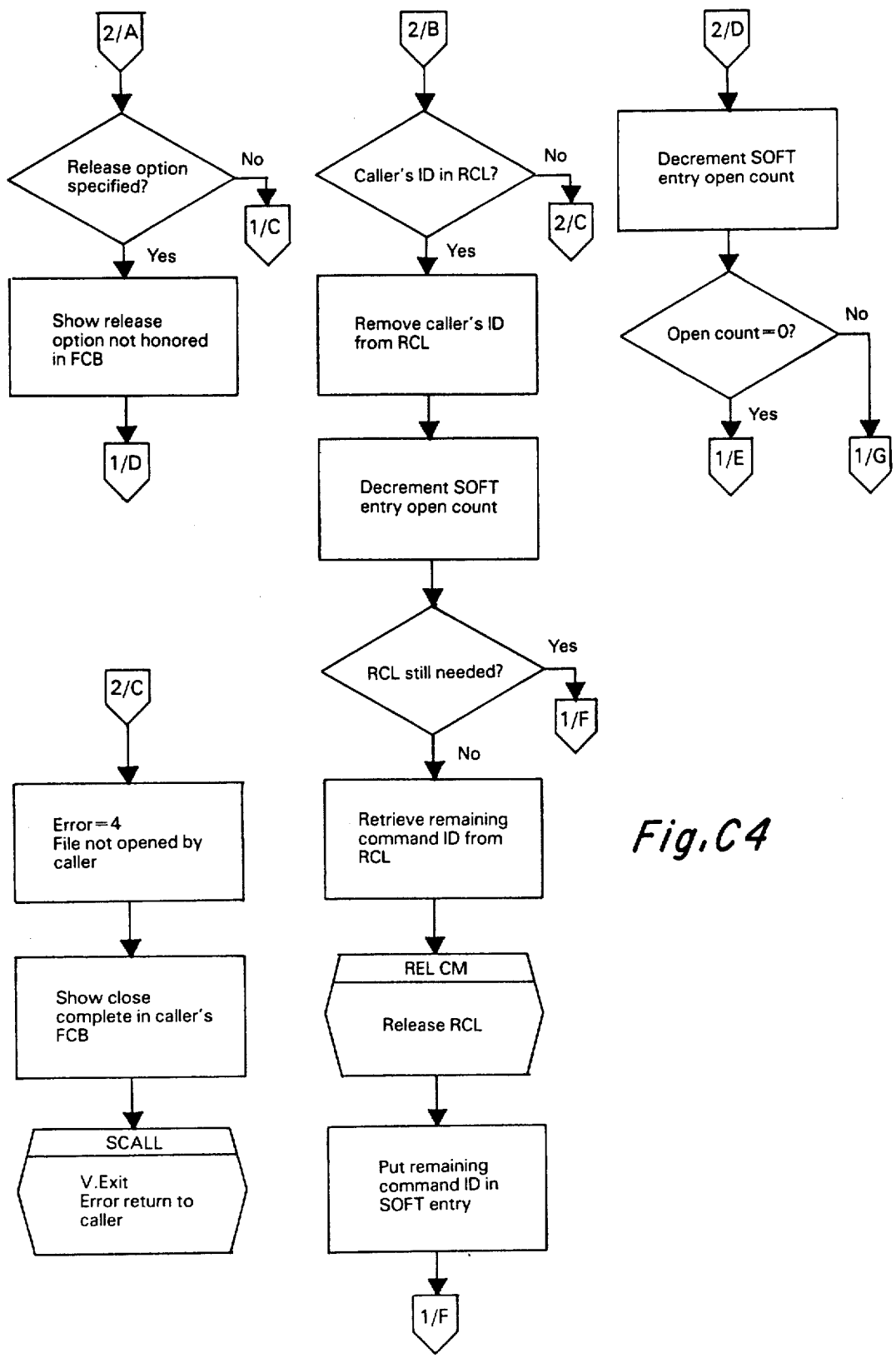
Fig. C4

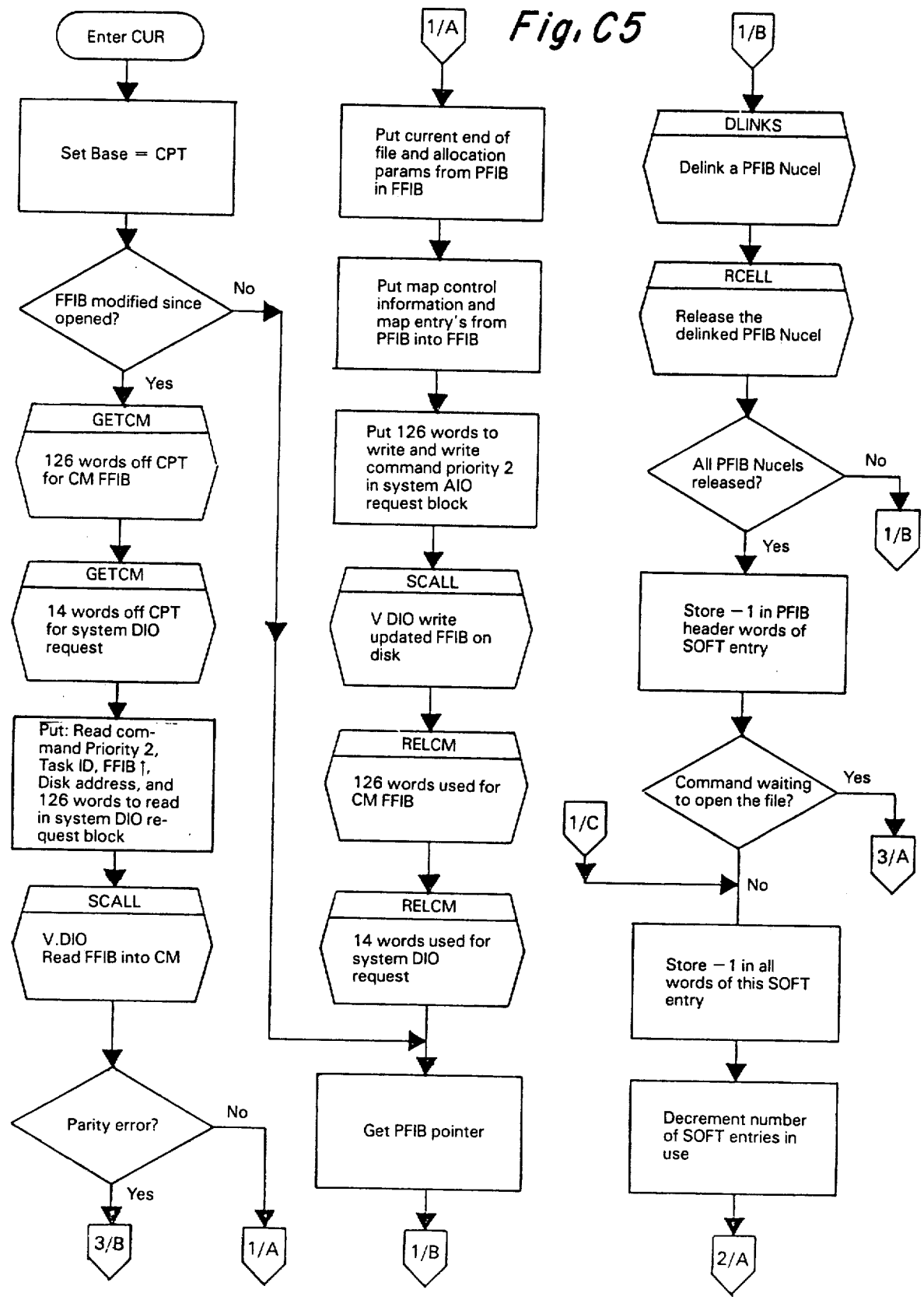

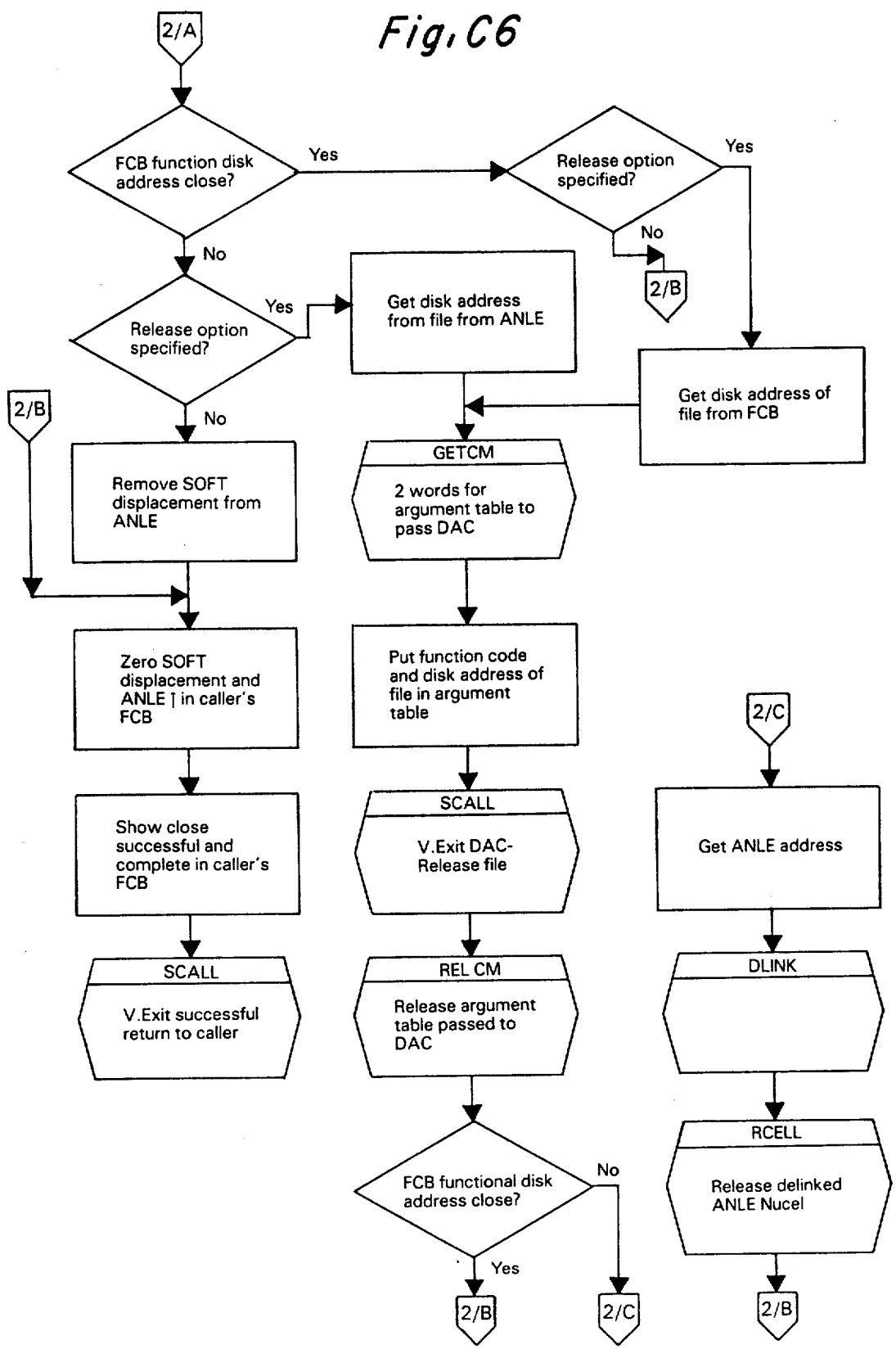

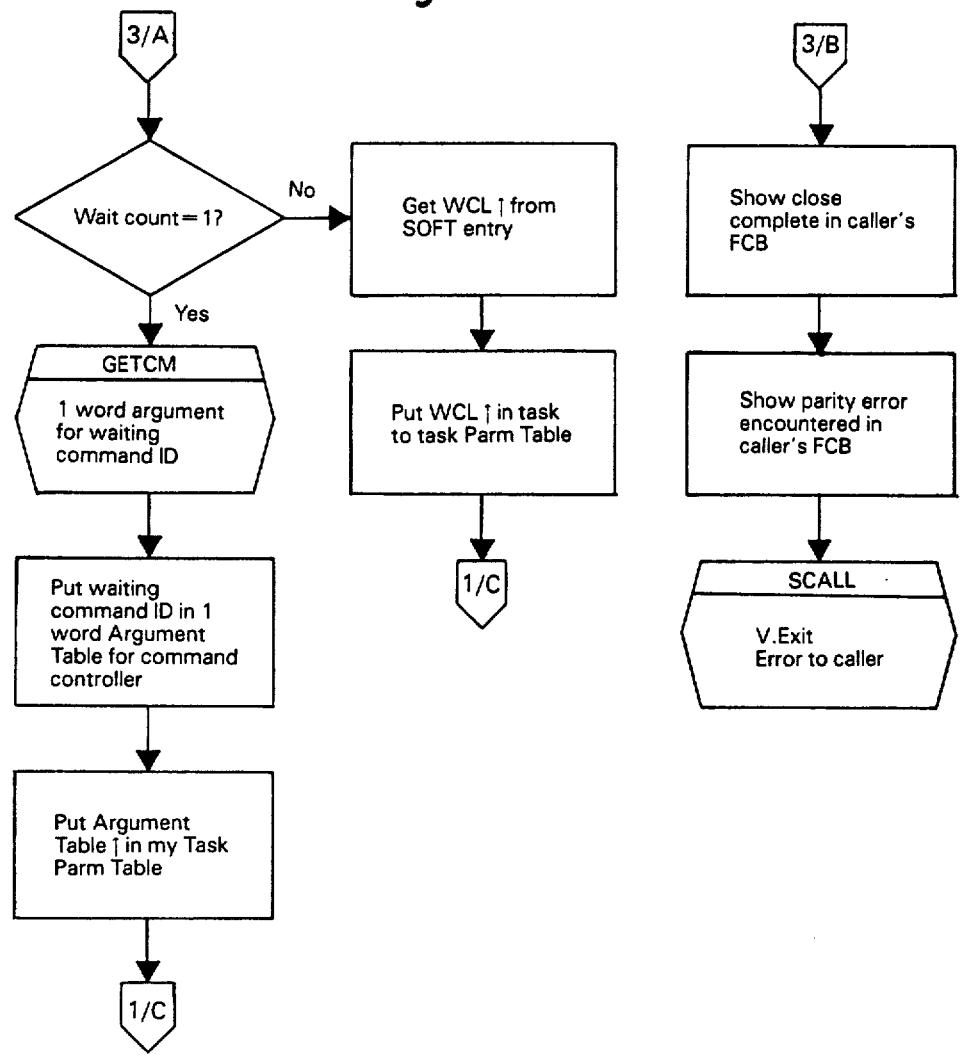
Fig. C7

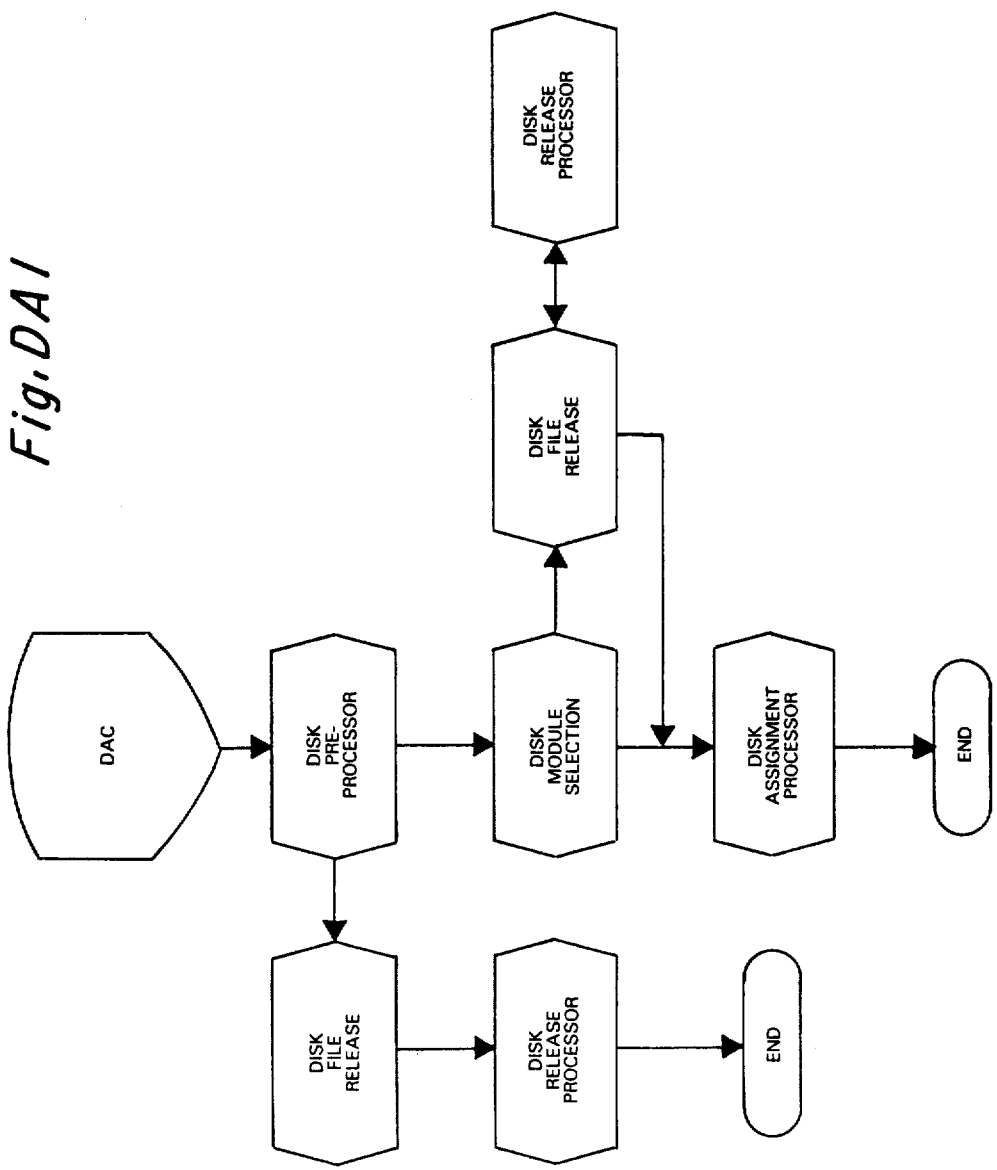
Fig. DA1

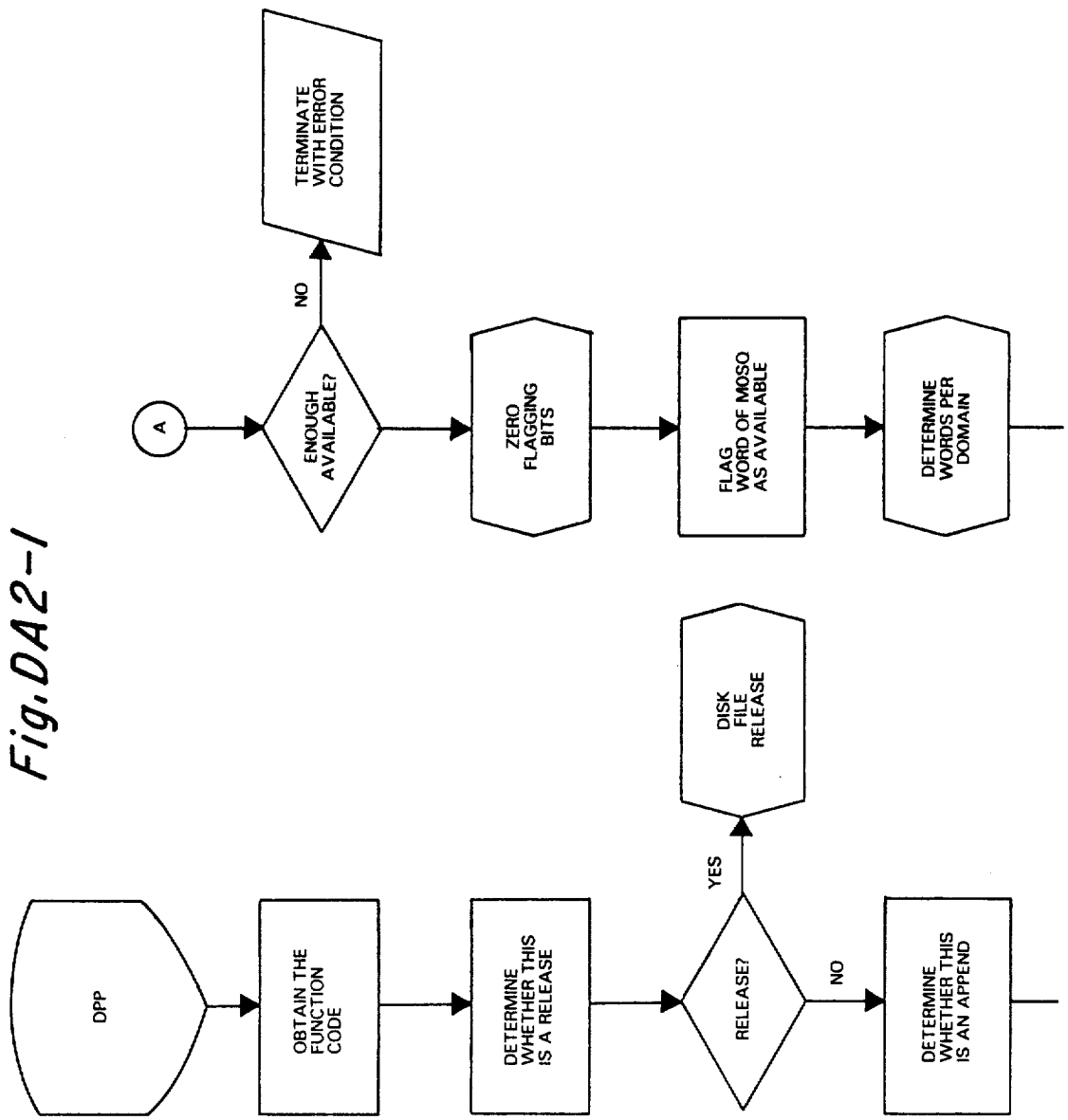
Fig.DA2-1

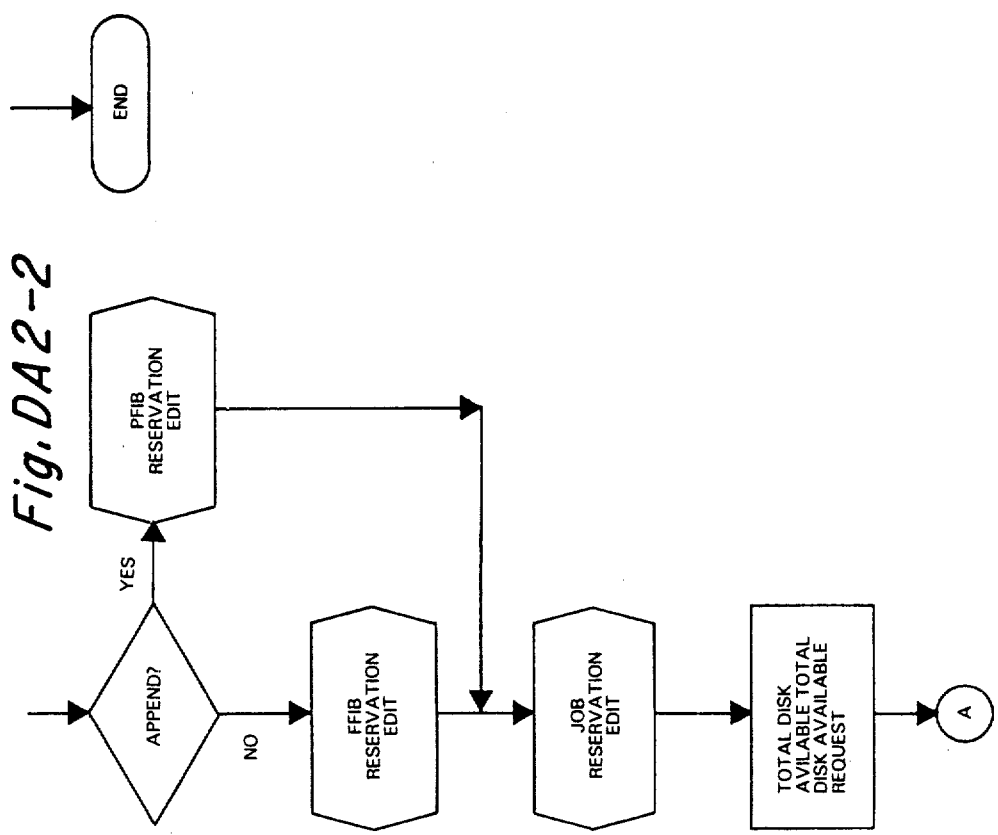
Fig. DA2-2

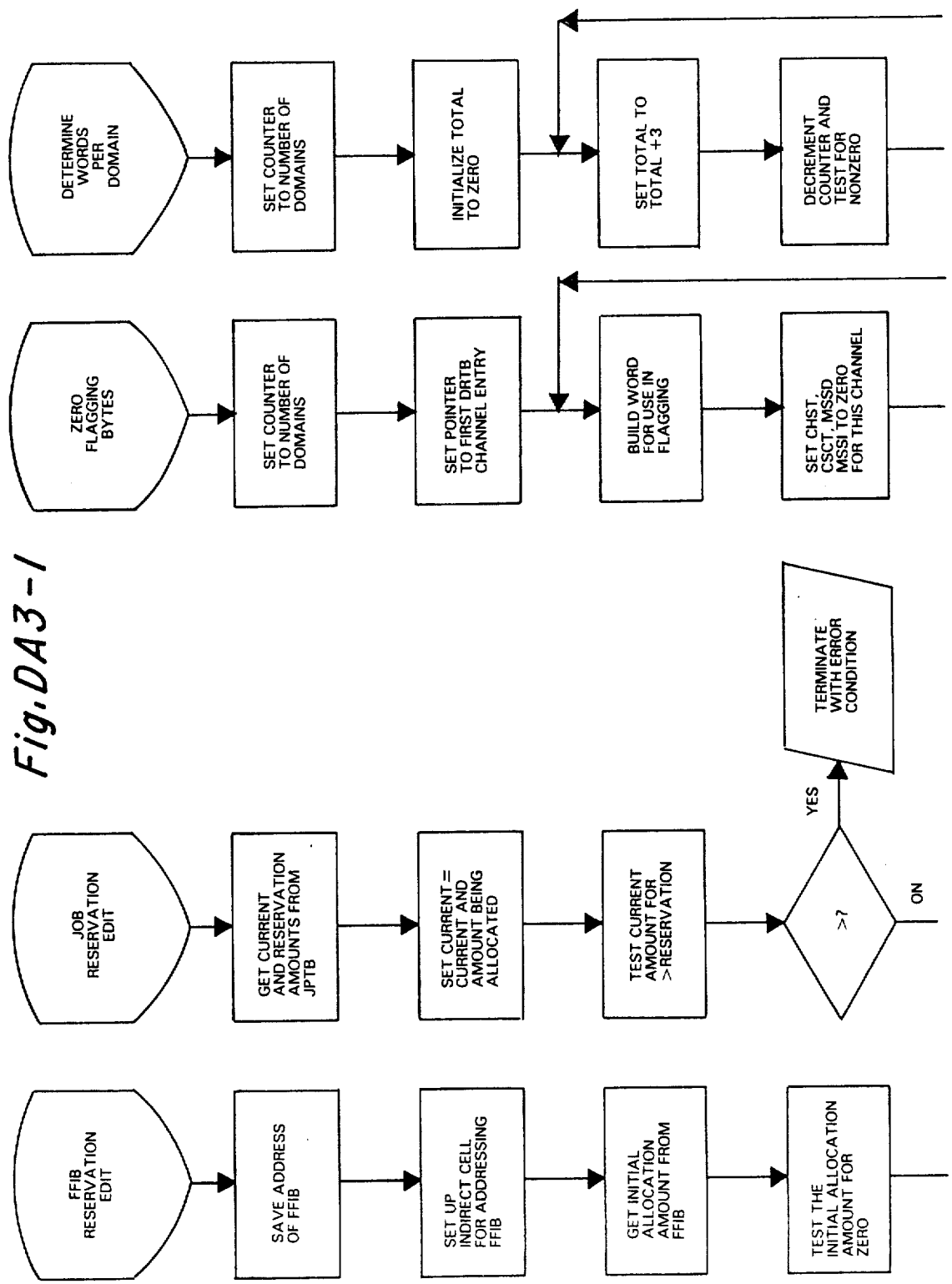
Fig.DA3-1

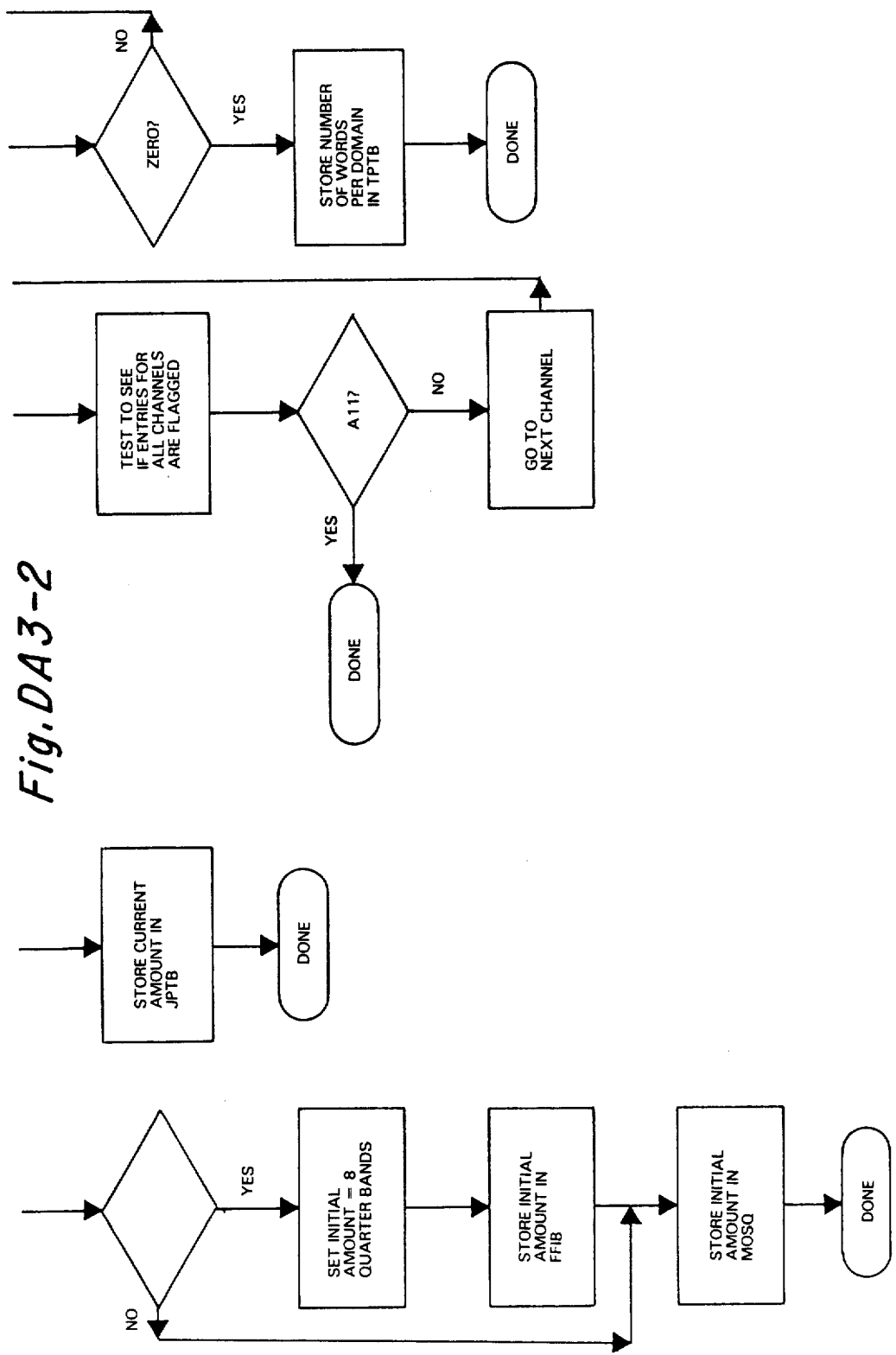
Fig.DA3-2

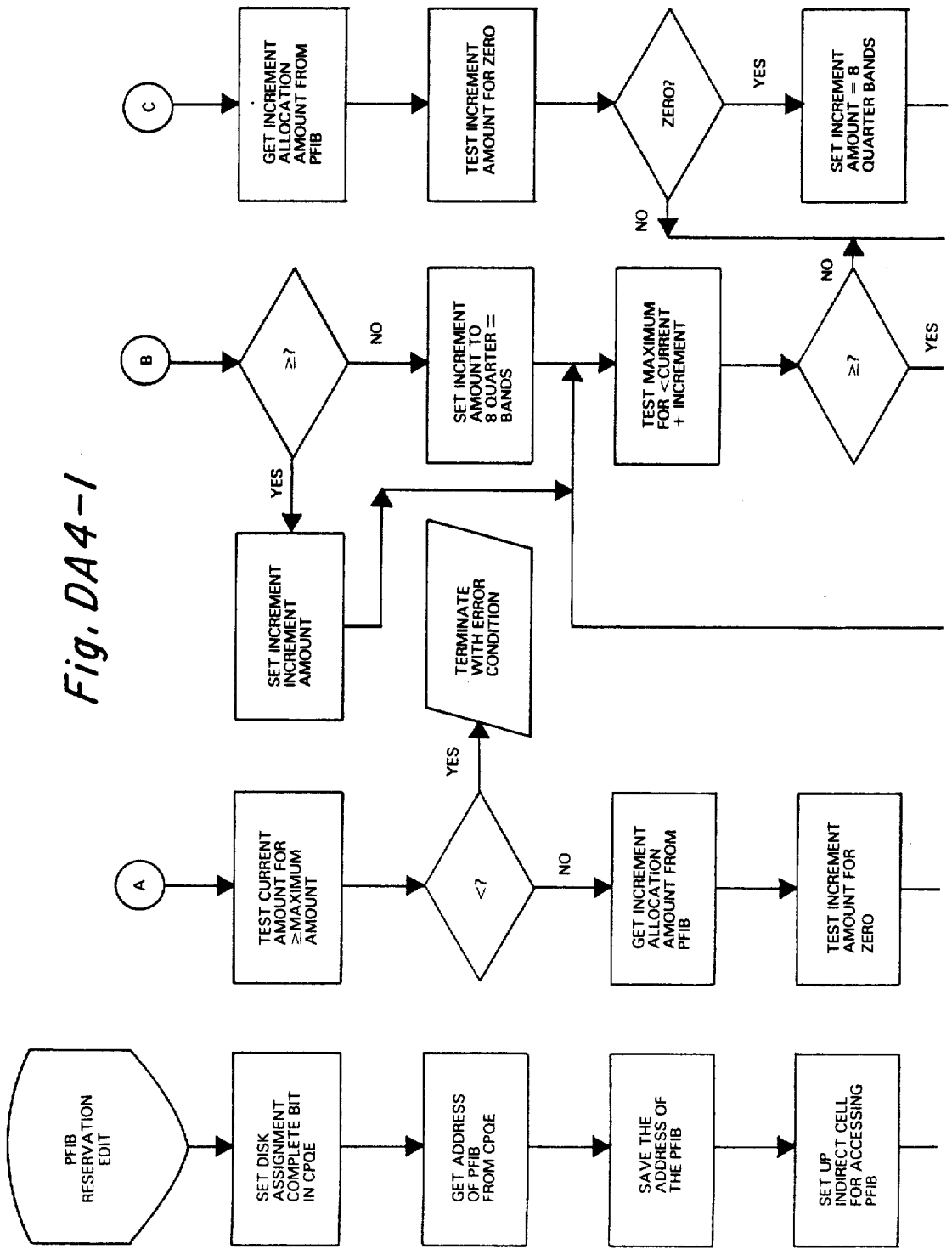
Fig. DA4-1

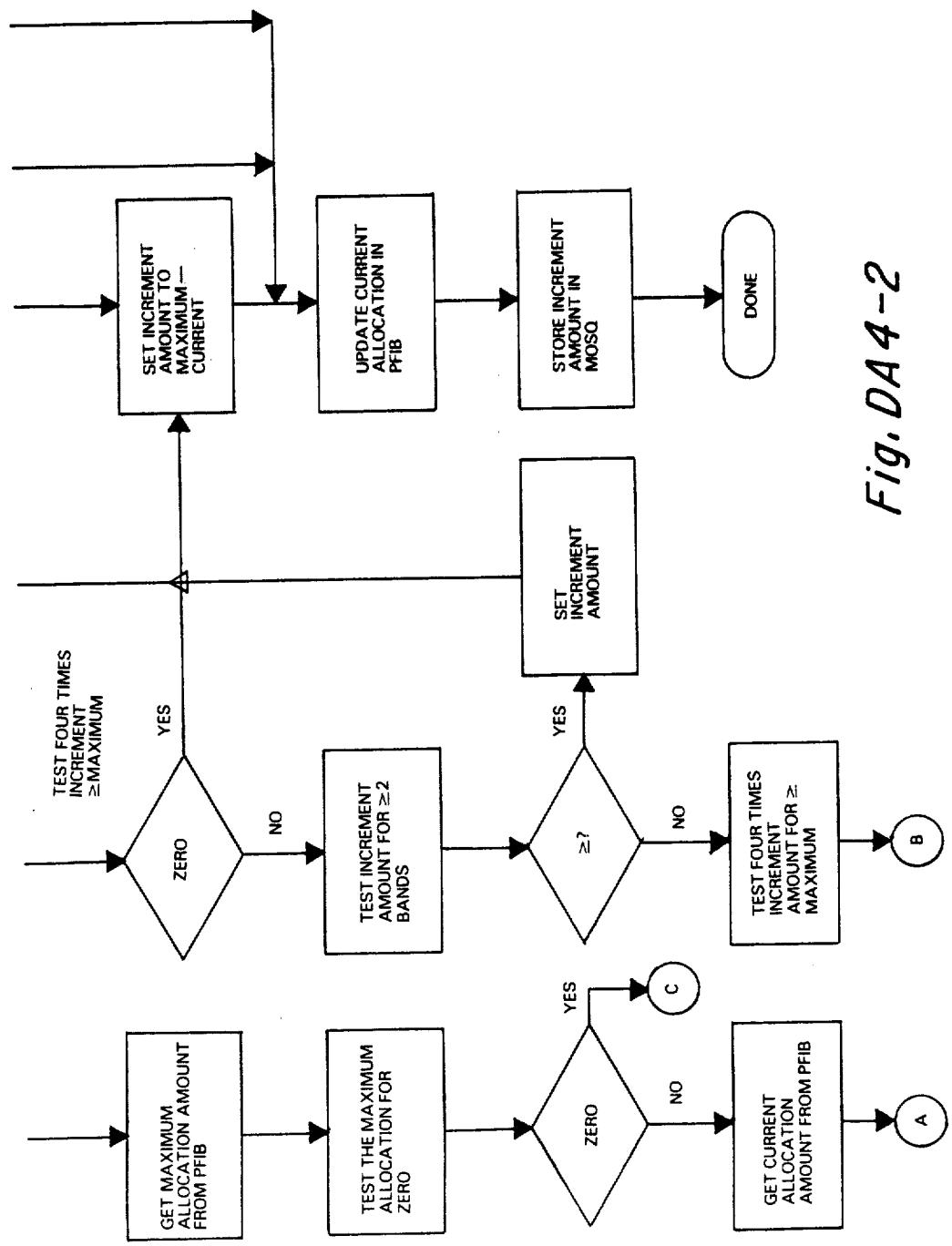
Fig. DA4-2

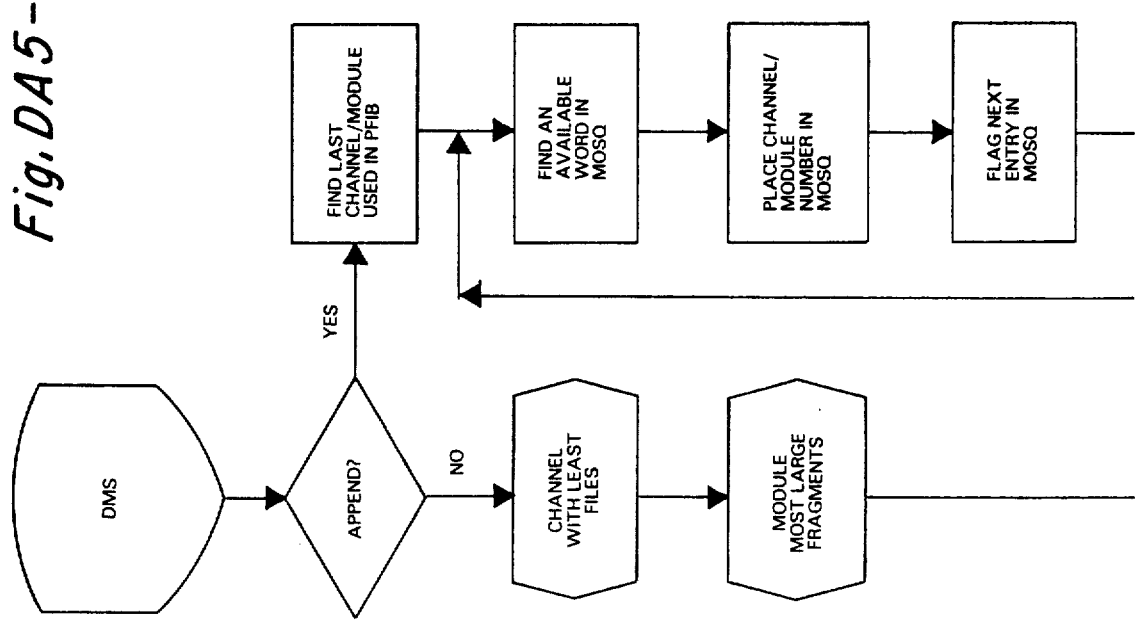
Fig. DA5-1

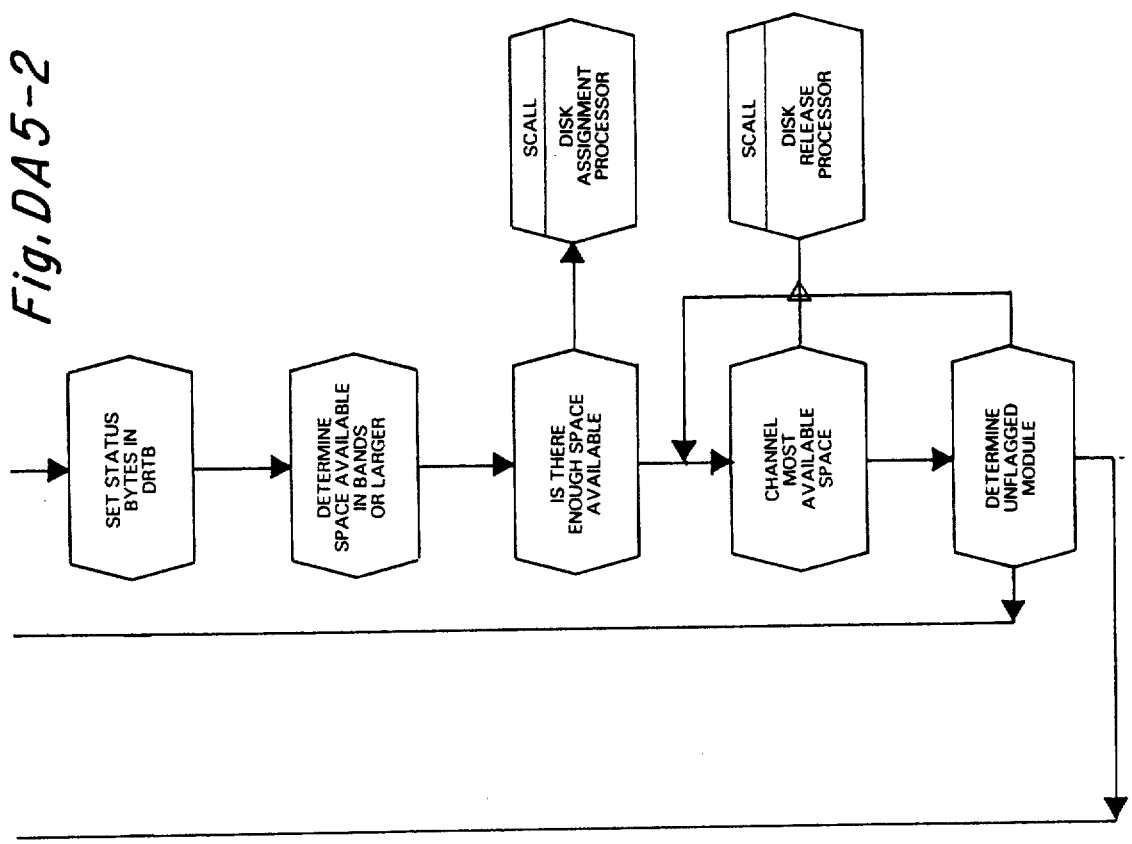
Fig. DA5-2

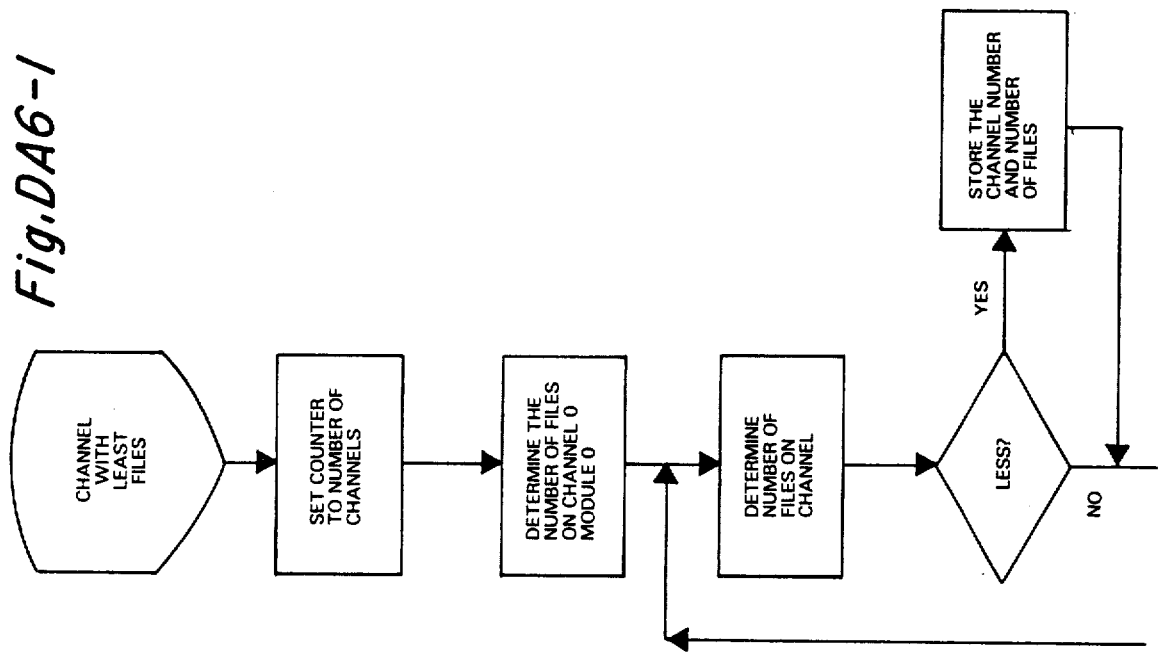
Fig.DA6-1
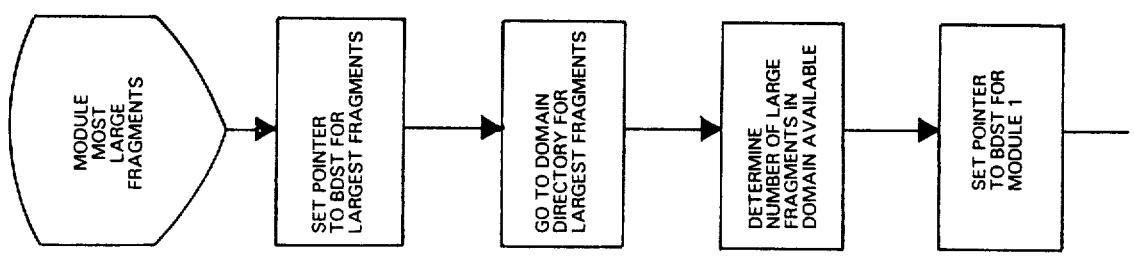

ALLOCATION OF ROTATING MEMORY DEVICE STORAGE LOCATIONS

This is a continuation, of application Ser. No. 413,461, filed Nov. 7, 1973, itself a continuation of application Ser. No. 252,708 filed on May 12, 1972, both now abandoned.

This invention related to stored program electronic digital computers and, more specifically, to a technique for assigning memory resources on rotating storage devices associated with said computers.

Rotating storage devices are typically used to supplement central memory in computing system configurations. Rotating storage devices provide an efficient and convenient means of storing data files as said files await transfer to and from central memory and peripheral input/output devices.

During normal computer operation, a plurality of files are created and deleted on one or more rotating storage devices, wherein said operation may leave a randomly distributed arrangement of assigned and unassigned storage areas on said storage devices. It is desirable for efficiency purposes to avoid transferring files within the rotating devices in order to group unassigned storage areas into contiguous storage areas. Thus, the problem exists of how to efficiently allocate space on rotating storage devices without shuffling files of data and, in addition, minimizing fragmentation of files in allocating large files to a plurality of discontiguous storage areas on said rotating devices.

The invention herein is an efficient technique for managing the assignment of rotating storage device resources for a plurality of data files. The rotating storage device for which the invention herein is described is a head-per-track disc, but the concepts involved apply also to magnetic drum memories, moveable arm discs, and other cyclic memory devices.

Each disc module is partitioned into sections called domains which are further partitioned into sections called fragments. All fragments within a given domain are the same size, but the size of fragments differs between domains. Said domains are physically arranged on each device such that said domains with larger fragment sizes have lower absolute disc addresses than domains with smaller fragments.

Physically, each data channel controls two disc modules, with each module divided into 1536 bands, 256 sectors per band, and 64 32-bit words per sector. The computing system to which the present invention may apply may have a plurality of said data channels.

The domains contain fragments consisting of $\frac{1}{2}$, 1, 2, 4, 8, 16, or 32 bands of memory. The specific partitioning of a disc module into fragment sizes is a variable set during installation of the computer to correspond with the distribution of file sizes to be used.

When a file of data is to be created, tables in memory which contain pertinent information describing the data structure on each data channel and on each disc module are consulted and the data channel with the greatest amount of available memory is selected as the storage resource. Next, the disc module with the greater amount of available memory on the selected data channel is determined. The request for each file of data to be created contains the specification for file size. The method attempts to locate, by referencing the data structure tables, a fragment on the selected disc module which satisfies the request with a minimum of unused memory within said fragment. If the largest sized fragment is not sufficient to satisfy a request, the file request is satisfied by utilizing a series of the largest fragments available. The series of fragments comprising a given file are represented as a mapping in file information tables for subsequent addressing purposes.

It is, therefore, an object of the invention herein to provide a new and improved method for allocating files of data on a rotating storage device such as a disc.

It is a further object of the invention herein to organize data areas on a rotating storage device into memory domains wherein each domain is partitioned into equal-sized memory fragments wherein said organization provides for efficient utilization of said rotating device resources.

For a more complete understanding of the invention and for further objects and advantages thereof, reference may now be had to the following description taken in conjunction with the accompanying drawings in which.

Figure 1:
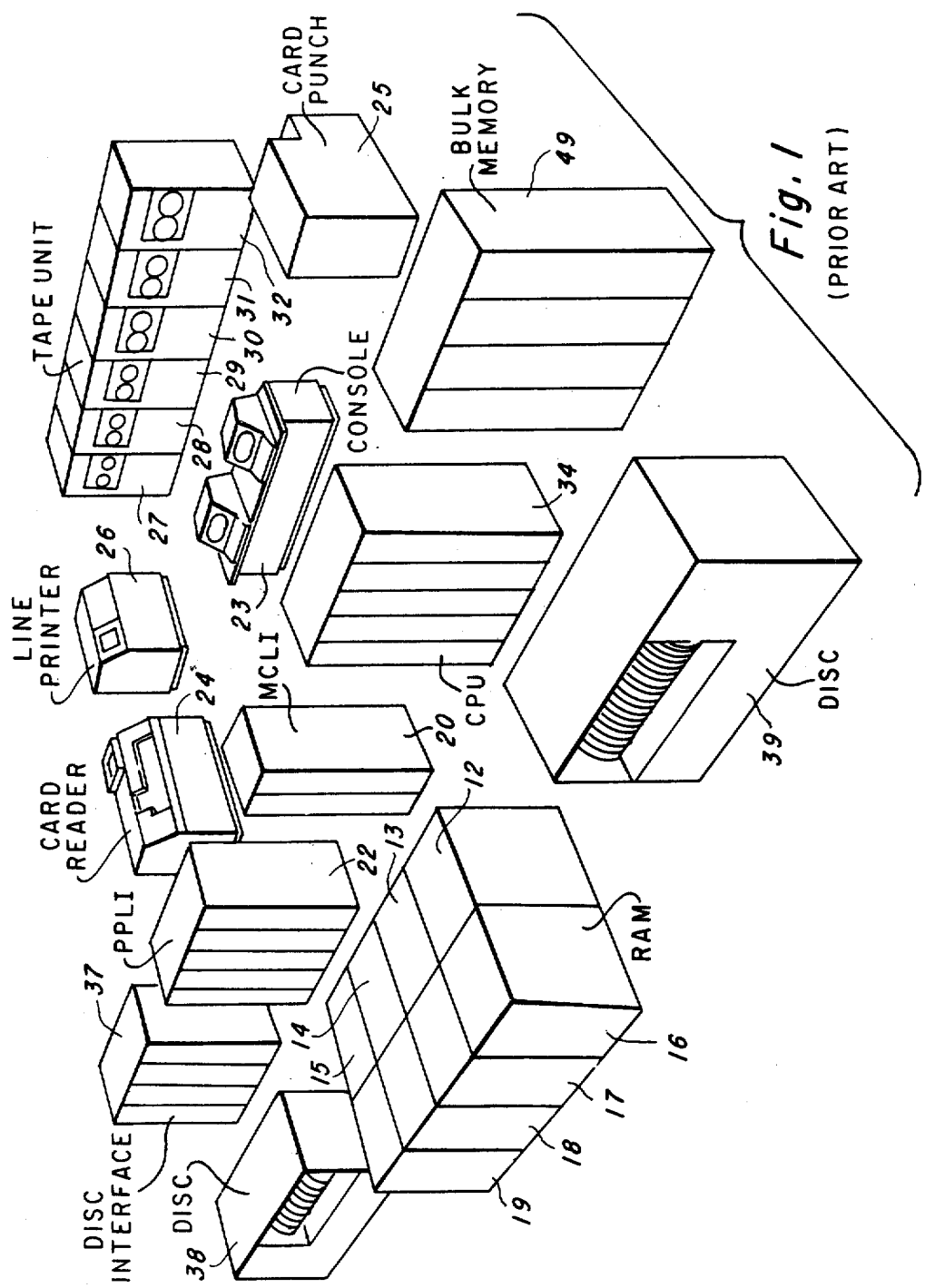
FIG. 1 illustrates an arrangement of the computer components to which the present invention may apply.
Figure 2:
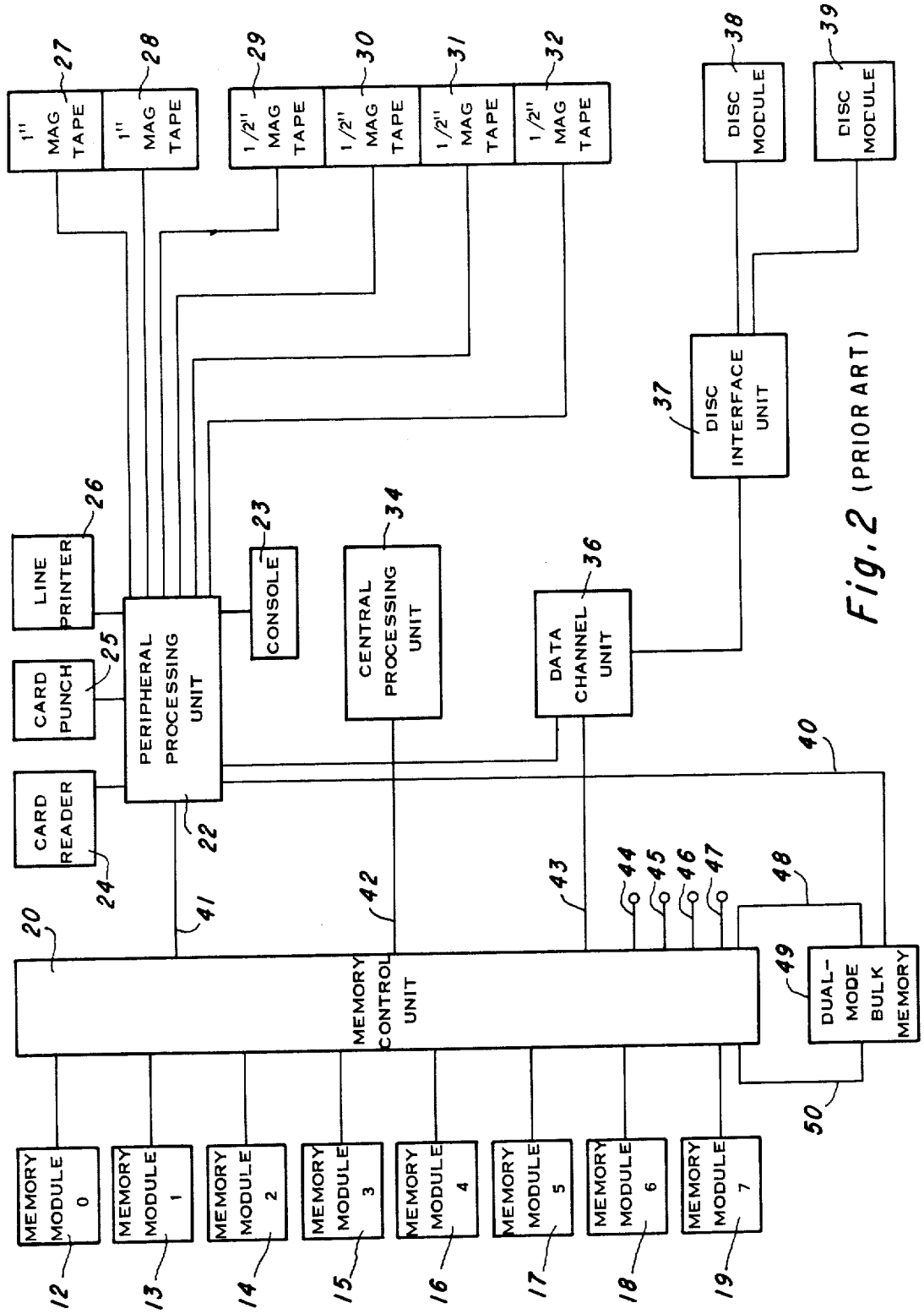
FIG. 2 is a block diagram of the system of FIG. 1.
Figure 3:
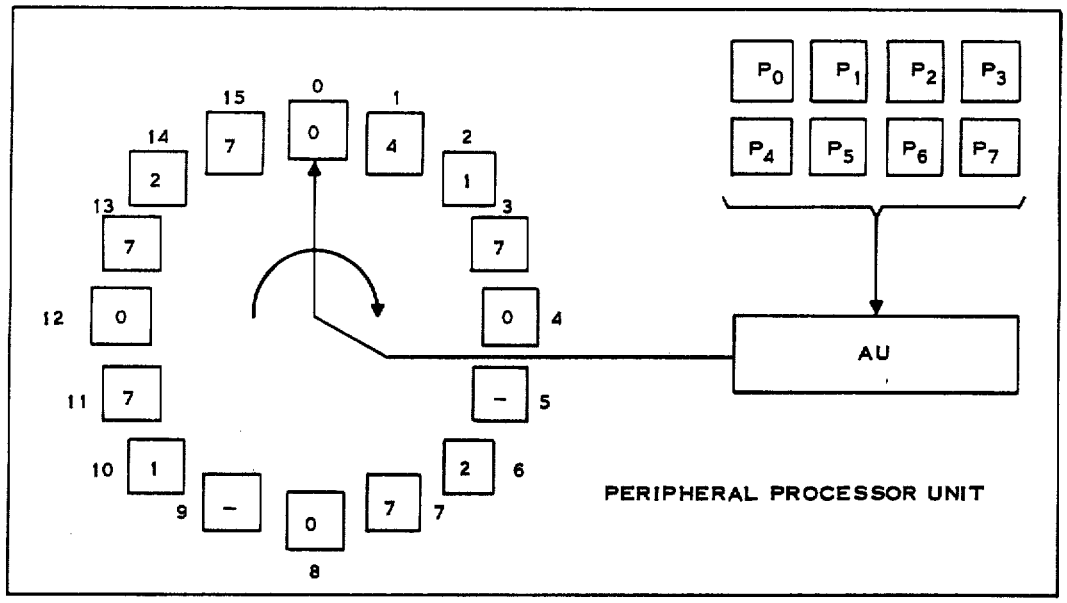
Figure 7:
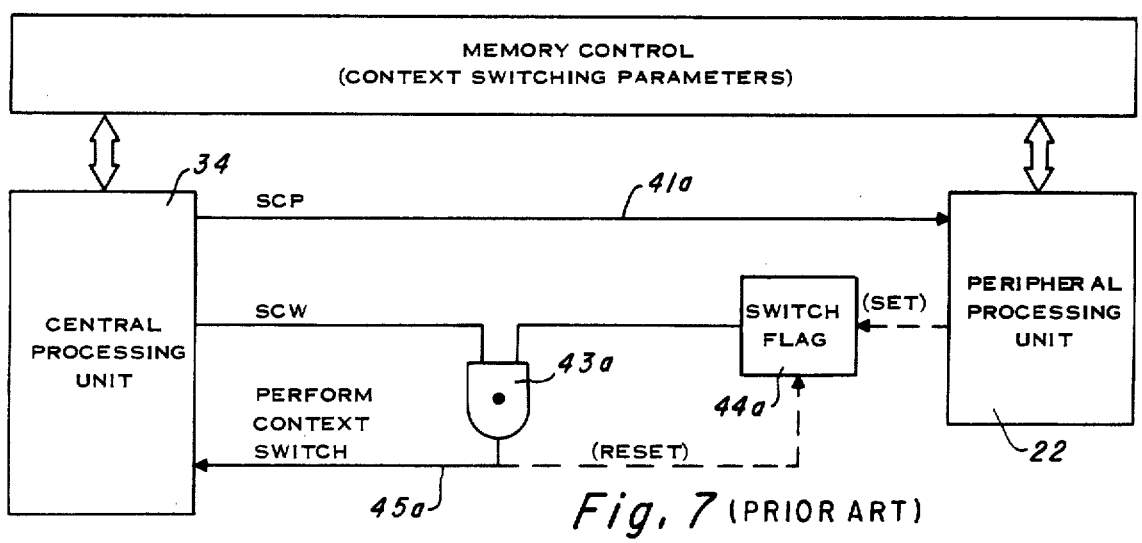
Figure 4:
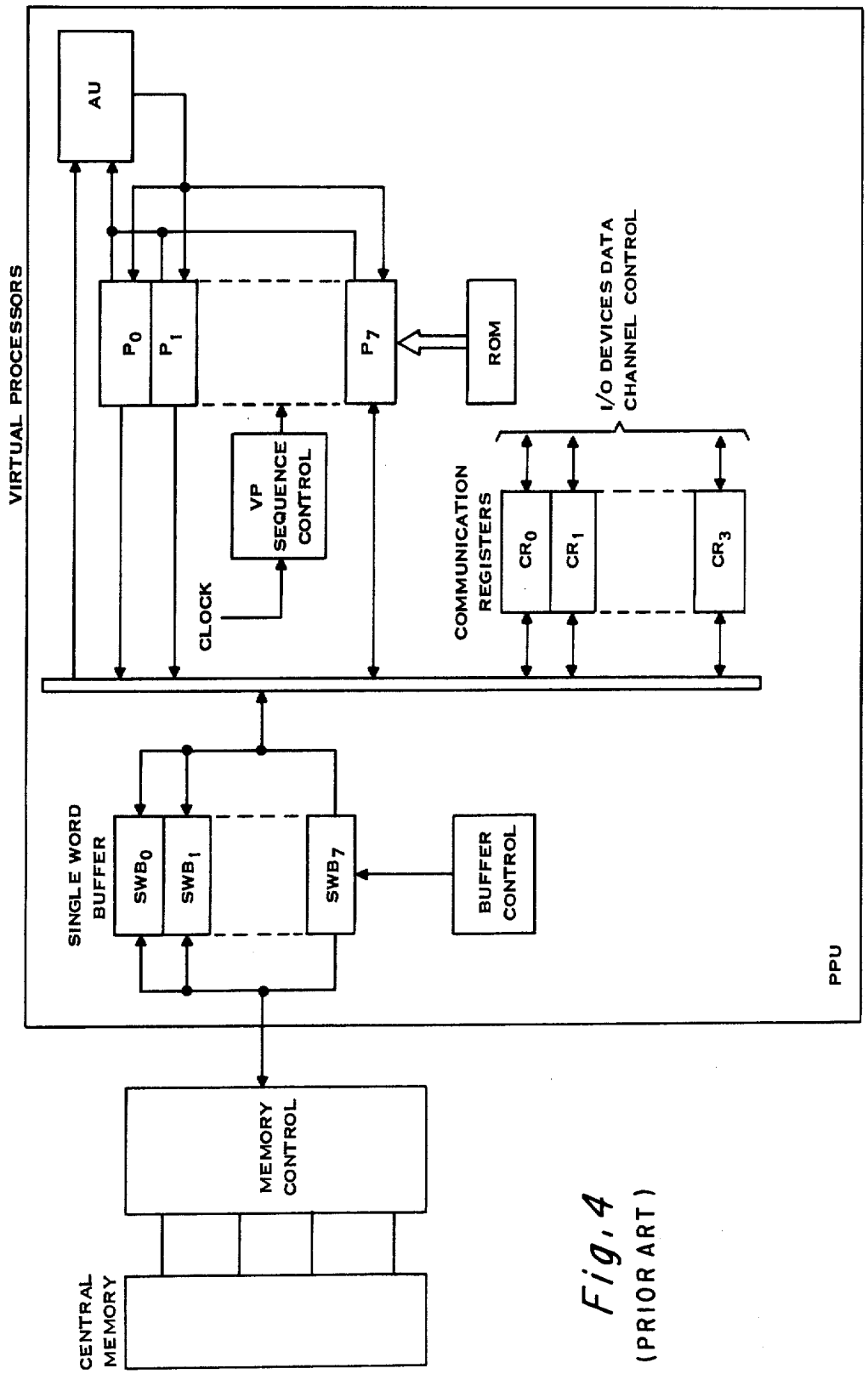
Figure 8:
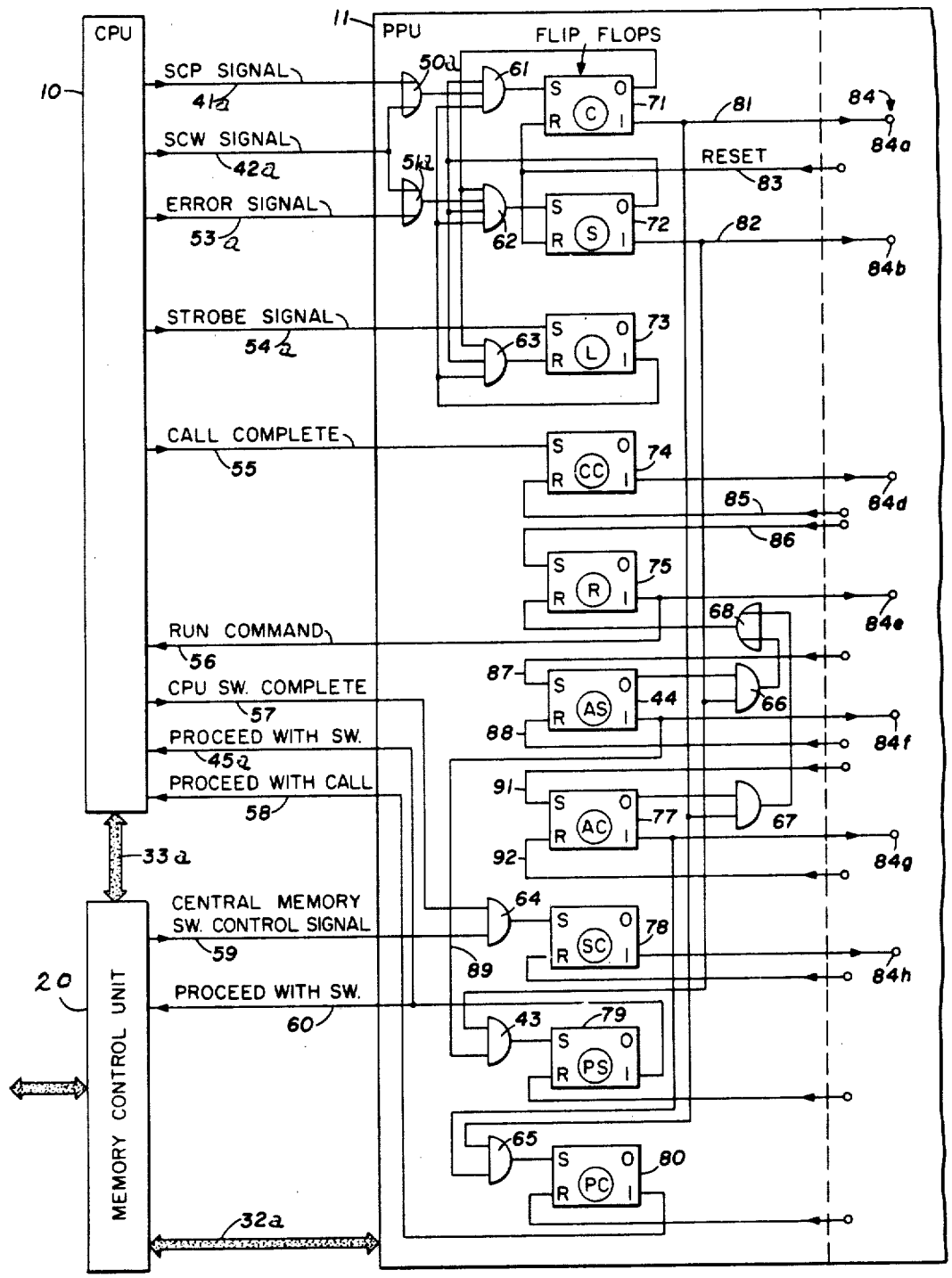
Figure 9:
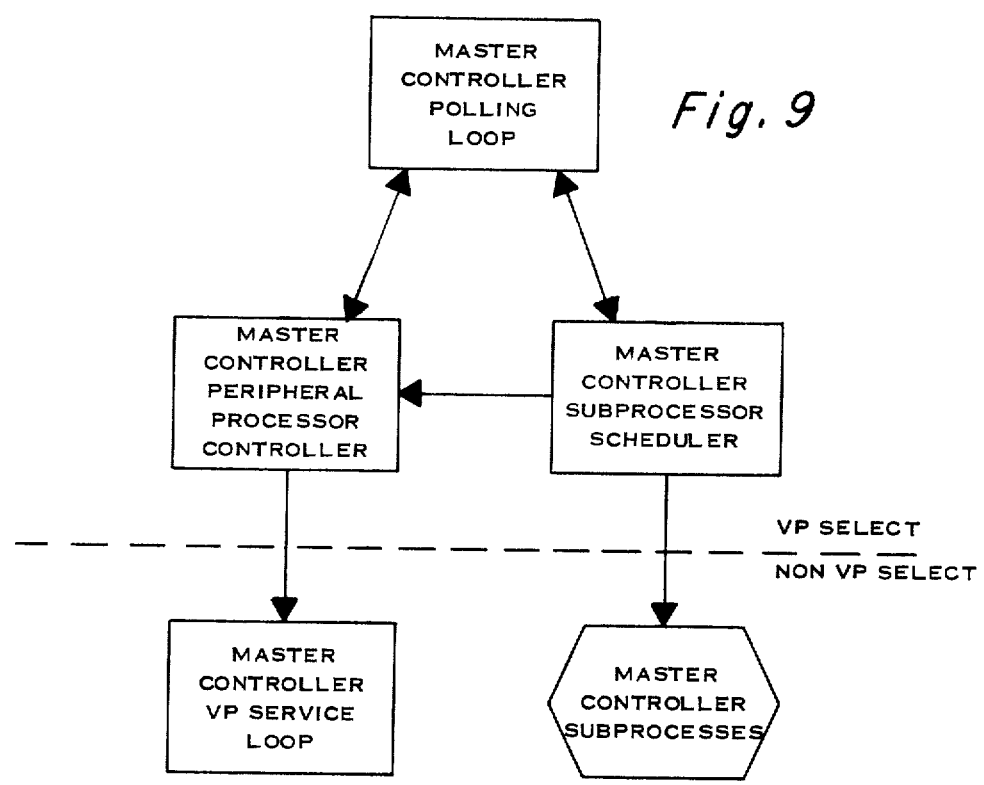
Figure 10:
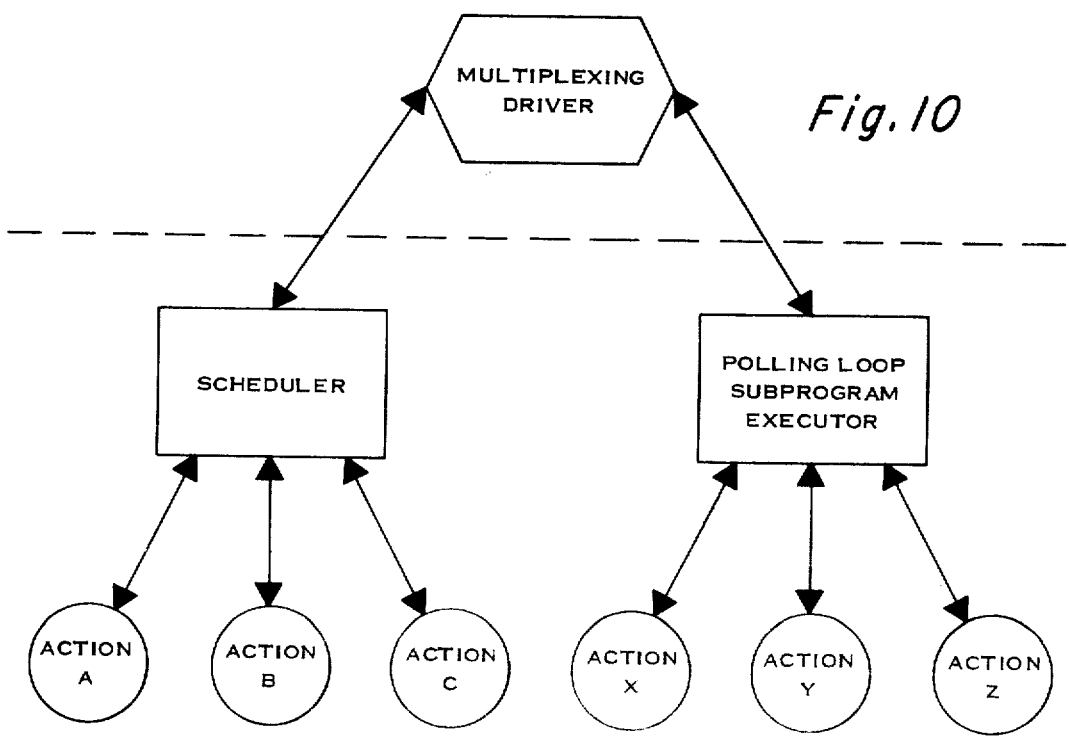
Figure 11:
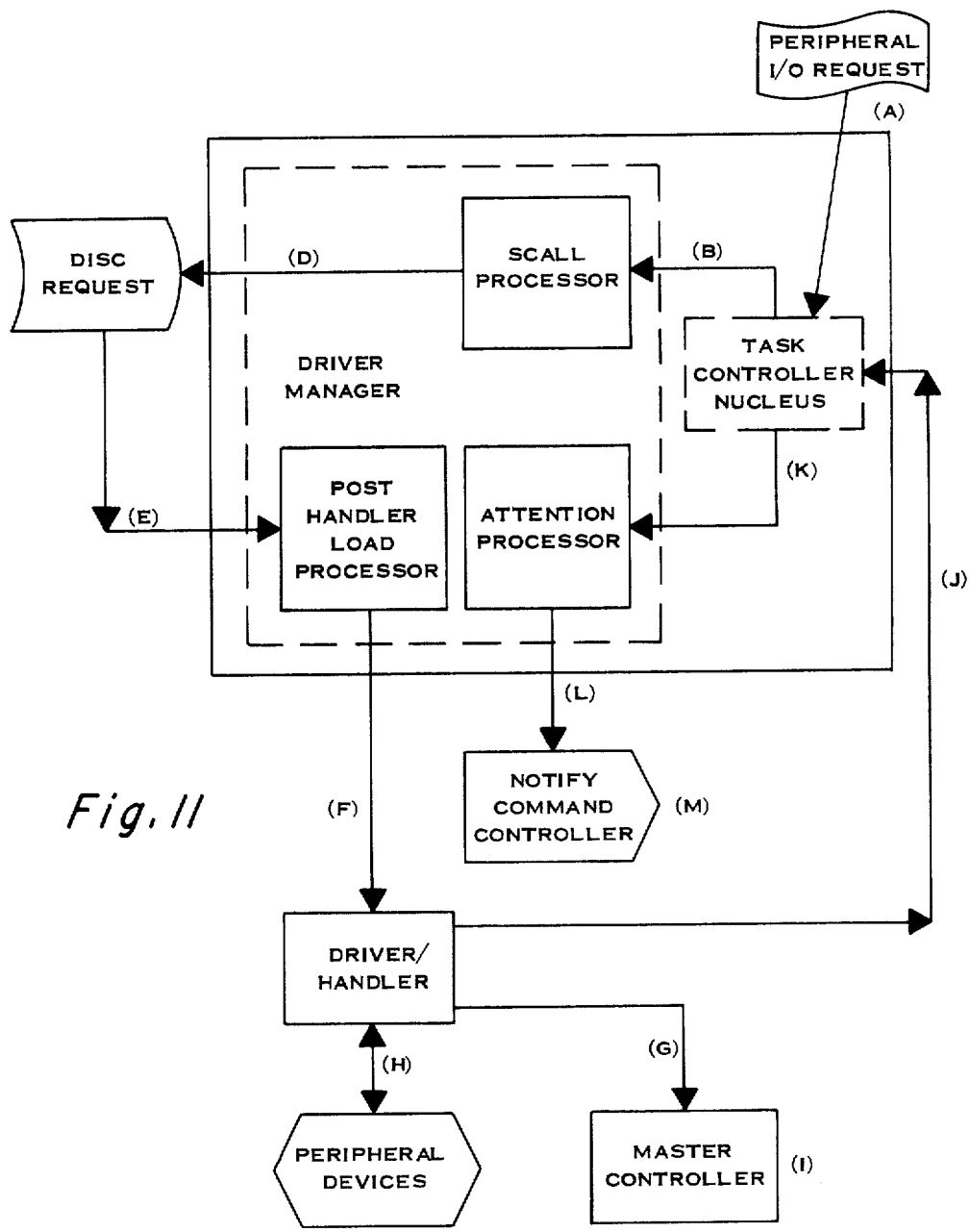
Figure 12:
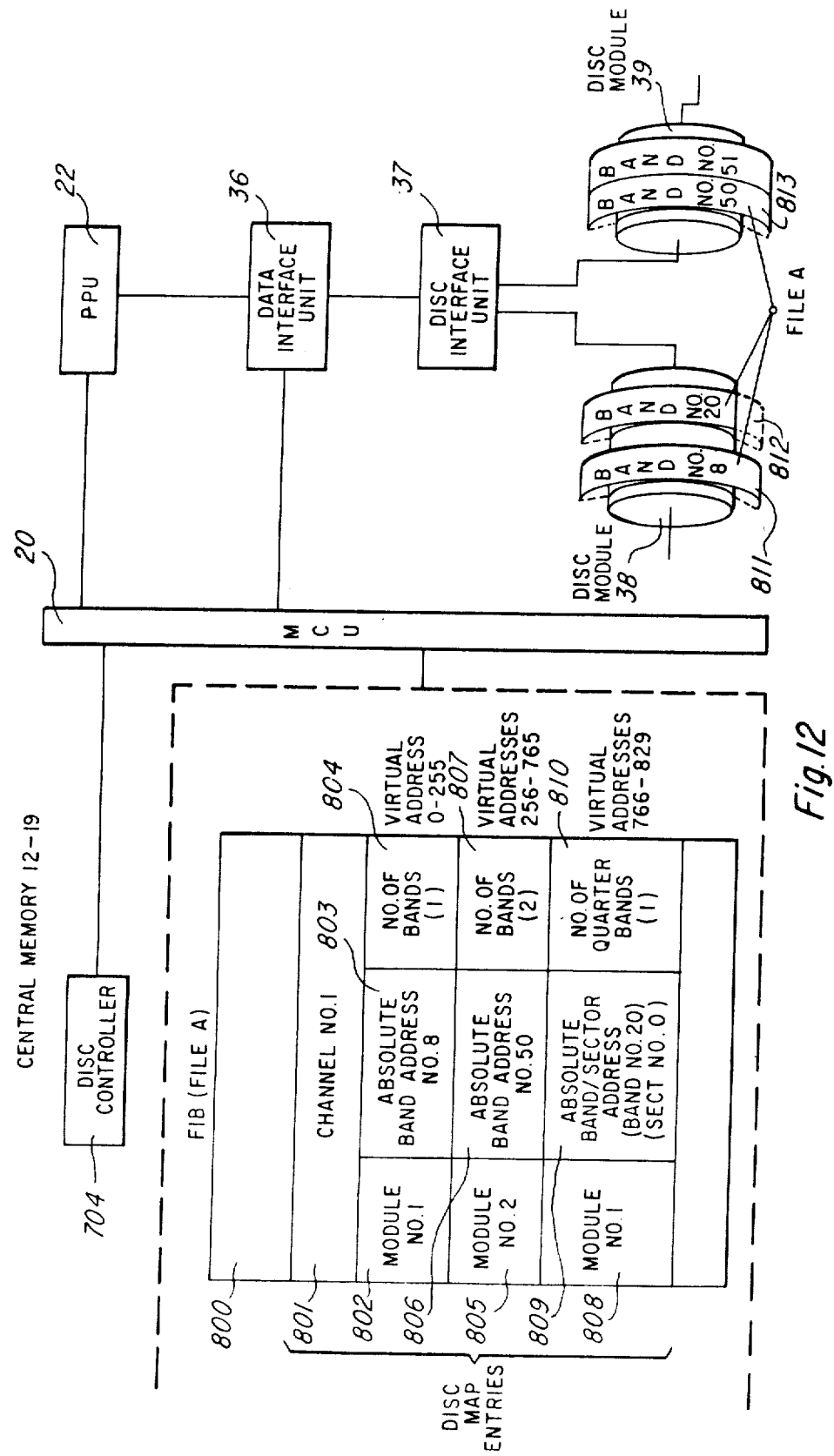
Figure 13:
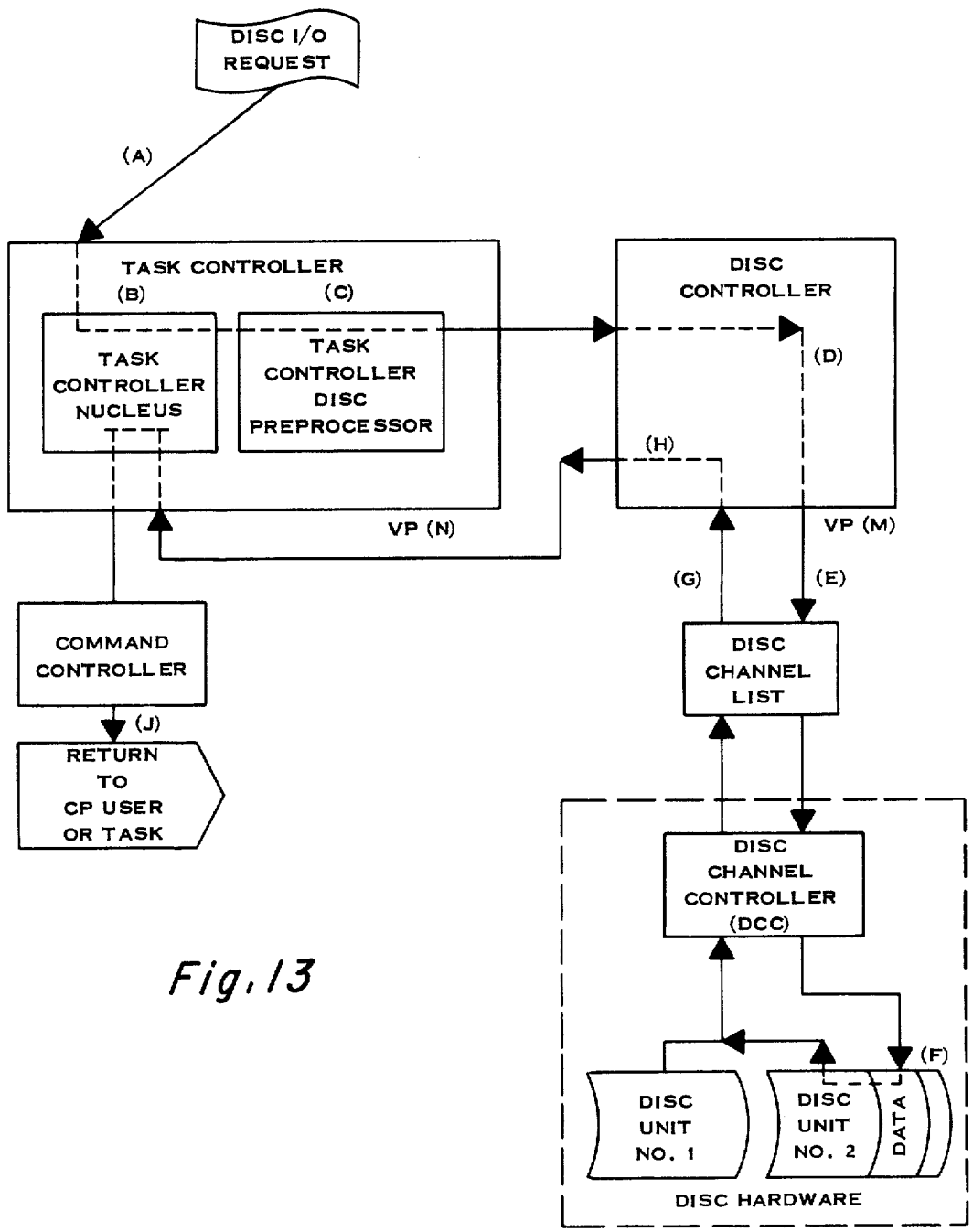
Figure 14:
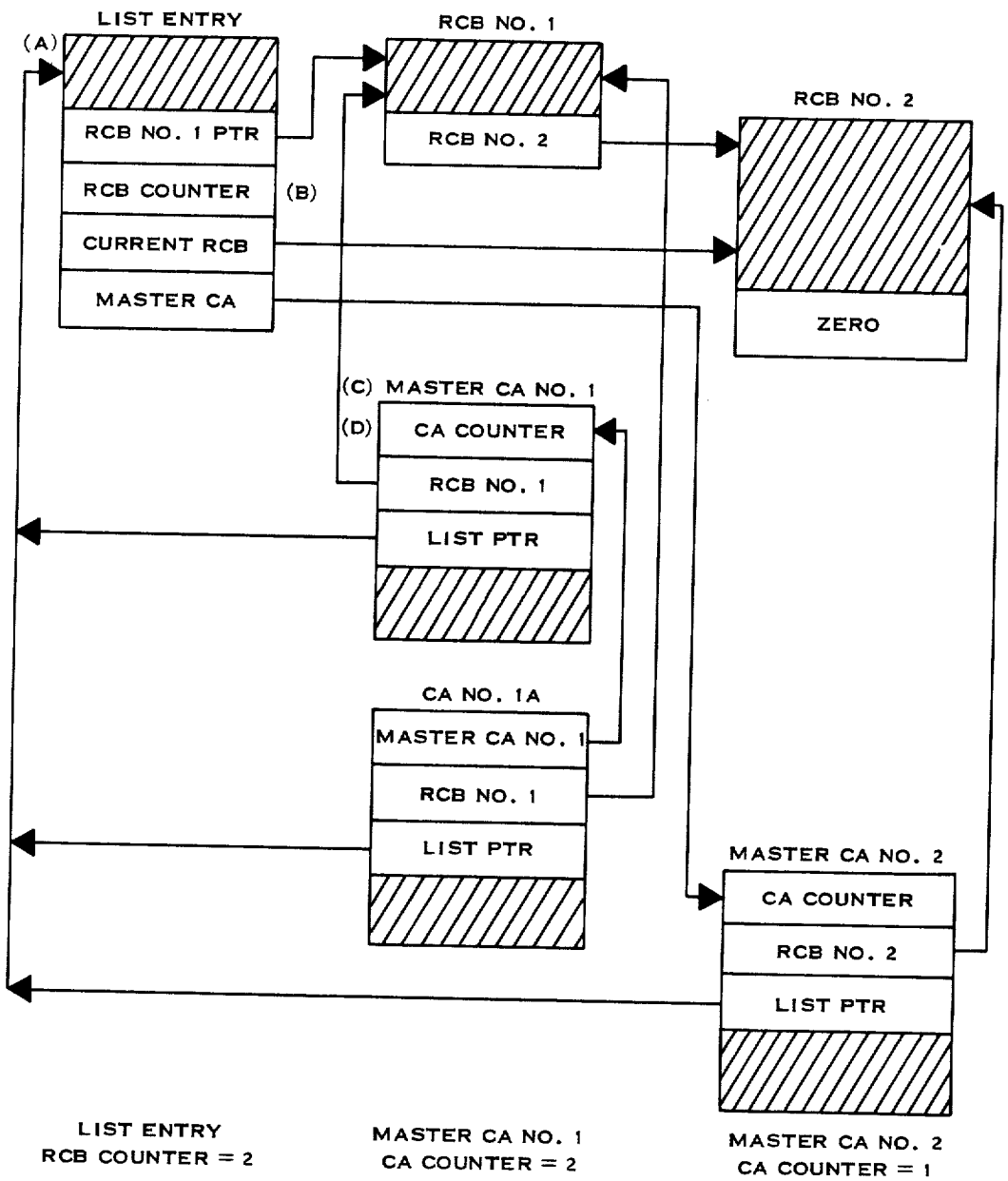
Figure 15:
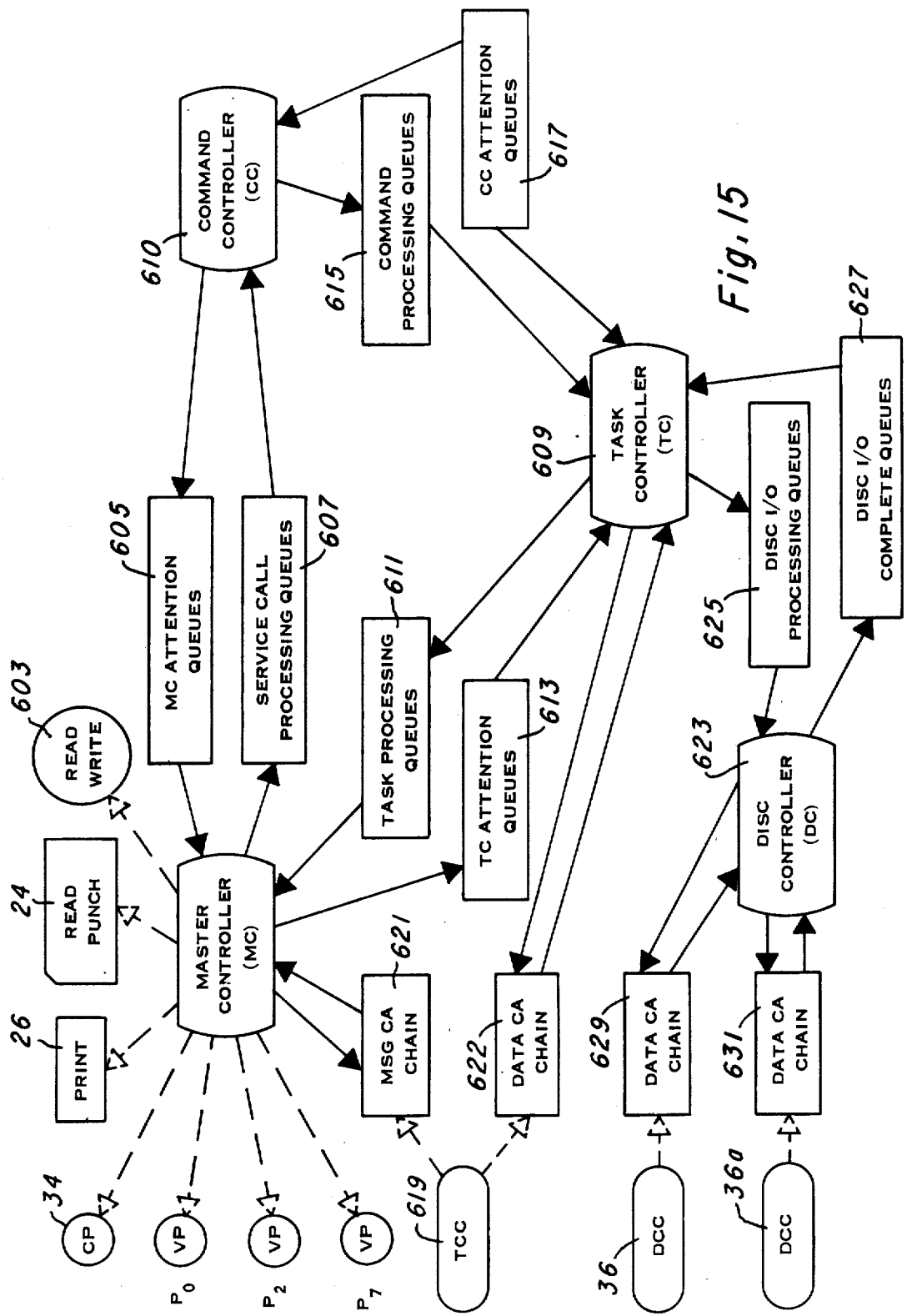

FIG. 3 diagrammatically illustrates timesharing of virtual processors in the peripheral processor of FIGS. 1 and 2;

FIG. 4 is a block diagram of the peripheral processor;

FIG. 5 illustrates access to a bit or cell within the communication register of FIG. 4;

FIG. 6 illustrates the virtual processor sequence control of FIG. 4;

FIG. 7 shows a block diagram of the context switching;

FIG. 8 shows the structure of the context switching;

FIG. 9 shows the structure of the Master Controller;

FIG. 10 shows the logical structure of the Command Controller;

FIG. 11 illustrates the interfaces involved for driver management from a peripheral I/O request which was initiated to the task controller;

FIG. 12 shows the relationship between the disc maps, the virtual disc addresses and the physical location of the file on disc;

FIG. 13 shows the disc input/output flow;

FIG. 14 illustrates the post request processor controls;

FIG. 15 is a block diagram of the control system for the computer of which the invention forms a part.

Figure 16:
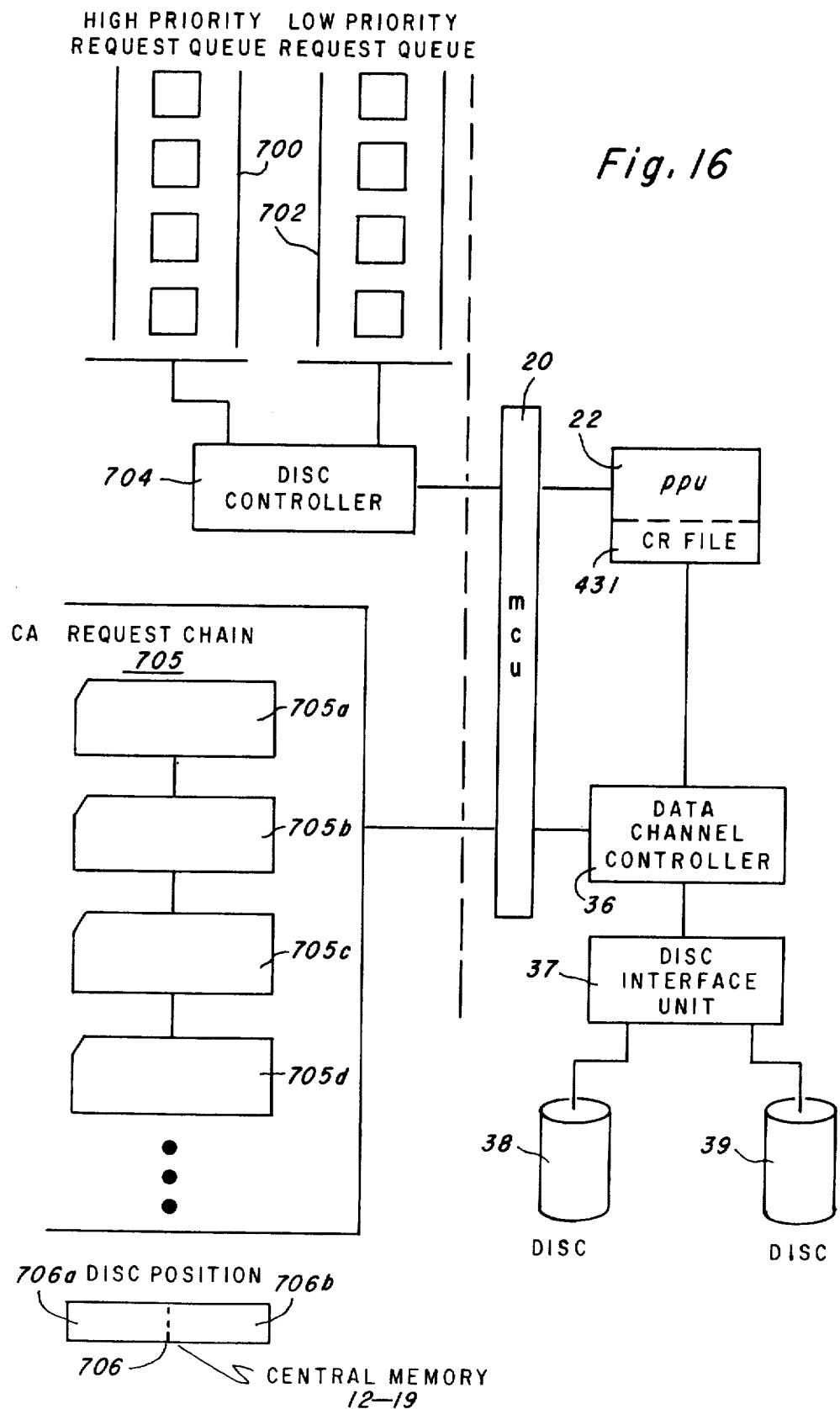

FIG. 16 is a block diagram which shows the relationship between the hardware interface and stored program components of the computer system for which the invention applies.

Figures in the DA series are:

FIG. DA1 shows the Disc Assignment Component (DAC).

FIGS. DA2–DA4 show the Disc Assignment Pre-Processor.

FIGS. DA5–DA9 show the Disc Module Selection routine.

FIGS. DA10–DA19 show the Disc Assignment Processor routine.

FIGS. DA20–DA25 show the Disc File Release routine.

FIGS. DA26–DA32 show the Disc Release Processor.

Figures in P series are:

FIGS. P1–P3 show the entry task of the Open Command.

FIGS. P4–P9 show the ODS task of the Open Command.

FIGS. P10–P12 show the OFC task of the Open Command.

FIGS. P13–P18 show the VSC task of the Open Command.

FIGS. P19–P20 show the WCP task of the Open Command.

Figures in the C series are:

FIGS. C1–C2 show the Close Preprocessor of the Close Command.

FIGS. C3–C4 show the Close File Component of the Close Command.

FIGS. C5–C7 show the Close Update Release Component of the Close Command.

In order to describe the present invention, an advanced scientific computer system of which the present invention forms a part, will first be described generally, and then individual components in the role of the present invention and its interaction with other components of the system will be explained.

Referring now to FIG. 1, the computer system includes a central processing unit (CPU) 34 and a peripheral processing unit (PPU) 22. Memory is provided for both CPU 34 and PPU 22 in the form of eight modules of active element random access memory units 12–19. Such storage units may be of the type known in the art. In the form illustrated, each of the storage modules provides 16,384 32-bit words.

The memory provides for 140 nanosecond cycle time, and on the average, 120 nanosecond access time. Each memory access results in the transfer of information in groups of 8 32-bit words, hereafter referred to as an octet. Thus, each memory module 12–19 is partitioned into 2048 octets.

In addition to storage modules 12–19, rapid access disc storage modules 38 and 39 are provided wherein the access time on the average is about 16 milliseconds.

A memory control unit 20 is provided for control of memory operations, access and storage.

A card reader 24 and a card punch unit 25 are provided for input and output. In addition, tape units 27–32 are provided for input/output (I/O) purposes as well as storage. A line printer 26 is also provided for output service under the control of the PPU 22. The elements of the computer are interconnected by cables.

It is to be understood that the processor system thus has a memory or storage hierarchy of five levels. The most rapid access storage is in the CPU 34 which has nine octet buffers, each octet consisting of 256 bits. The next most rapid access is in the active element memory units 12–19. The next most rapid access is in the bulk memory extension 49. The next most available storage is the disc storage units 38 and 39. Finally, the tape units 27–32 complete the storage array.

A twin-cathode-ray tube (CRT) monitor console 23 is provided. The console 23 consists of two adapted CRT-keyboard terminal units which are operated by the PPU 22 as input/output devices. It can also be used through an operator to command the system for both hardware and soft-ware checkout purposes and to interact with the system in an operational sense permitting the operator through the console 23 to interrupt a given program at a selected point for review of any operation, progress or results, and then to determine the succeeding operation. Such operations may involve the further processing of the data or may direct the unit to undergo a transfer in order to operate on a different program or on different data.

There will now be described in a general manner the organization of the computer system by reference to FIG. 2. Memory modules 12–19 are controlled by the memory control unit 20 in order to input or output octets of data to and from the memory modules. Memory control unit 20 provides gating, mapping and protection of the data within the memory stacks as required.

A signal bus 43 extends between the memory control 20 and data channel unit 36 which is connected to the head per track discs 38 and 39 by way of a disc interface unit 37. Each disc module has a capacity of 25 million words. The data channel unit 36 and the disc interface unit 37 support the disc units 38 and 39. The data channel unit 36 is a simple wired program computer capable of moving data to and from memory discs 38 and 39 through the disc interface unit 37. Upon command only from the PPU 22, the data channel unit 36 may move memory data from the discs 38 and 39 via the bus 43 through the memory ccontrol unit 20 to the memory modules 12–19 or to the memory extension 49.

Bidirectional channels extend between each disc 38 and 39 and the disc interface unit 37. One data word at a time is transmitted between a disc unit 38 and 39 and the data channel unit 36 through the disc interface 37. Data from memory stacks 12–19 are transmitted to and from data channel 36 in the memory control unit 20 in eight-word blocks.

A single bus 41 connects the memory control unit 20 with the PPU 22. PPU 22 operates all I/O devices except the discs 38 and 39. Data from the memory modules 12–19 are transferred to and from the PPU 22 via a memory control unit 20 in eight word blocks.

When a read occurs from memory, a read/restore is carried out in the memory stack 12–19. The eight words are "funneled down" in the PPU 22 with only one of the eight words being used within the PPU 22 at a time. Such "funnelling down" of data words within the PPU 22 is desirable because of the relatively slow usage of data required by the PPU 22 and the I/O devices as compared with the CPU 34. A typical available word transfer rate for an I/O device controlled by the PPU 22 is about 100 kilowords per second.

The PPU 22 contains eight virtual processors therein, the majority of which may be programmed to operate various ones of the I/O devices as required. The tape units 27 and 28 operate a 1" wide magnetic tape, while tape units 29–32 operate with ½" magnetic tapes to enhance the capabilities of the system.

The virtual processors in the PPU 22 take instructins from the central memory and operate upon these instructions. The virtual processors include program counters and a time-shared arithmetic unit in the peripheral processing unit. The virtual processors execute programs under the instruction control. The PPU 22 and the virtual processors are described in more detail in U.S. Pat. No. 3,573,852 for "Variable Time Slot Assignment of Virtual Processors," assigned to Texas Instruments Incorporated and incorporated herein by reference.

The PPU 22 operates upon the program contained in memory and executed by virtual processors in an efficient manner and additionally provides monitoring controls to the programs being run in the CPU 34.

CPU 34 is connected to memory stacks 12–19 through the memory control 20 via a bus 42. The CPU 34 may utilize all eight words in an octet provided from the memory modules 12-19. Additionally, the CPU 34 has the capability of reading or writing any combination of those eight words. Bus 41 handles three words every 60 nanoseconds, two words input to the CPU 34 and one word output to the memory control unit 20.

Buses 44-47 are provided from the memory control unit 20 to be utilized when the capabilities of the computer system are to be enlarged by the addition of other processing units and the like.

Each of the buses 41-48 is independently gated through the memory control unit 20 to each memory module 12-19 thereby allowing memory cycles to be overlapped to increase processing speed. A fixed priority preferably is estabilished in the memory controls to service conflicting requests from the various units connected to the memory control unit 20. The internal memory control unit 20 is given the highest priority with the external buses 43, 41, 42, 43 and 44-47 being serviced in that order. The external bus processor connectors are identical, allowing the processors to be arranged in any other priority order desired.

The dual mode bulk memory unit 49 is connected to the memory control unit 20 by means of buses 50 and 48. The maximum data rates over busses 48 and 50 is 40 megawords per second. Data in the dual mode bulk memory unit 49, transferred bia bus 50, is in the address space of the high speed memory modules 12-19, and randomly accessed, 8 words per fetch cycle. Data may be moved to and from the dual mode bulk memory unit 49 via bus 50 in a random access fashion from any processor located on buses 41-48 which includes the bulk memory unit itself. Blocks of contiguous data are moved to and from the dual mode bulk memory unit 49 over bus 48 to and from any memory module 12-19 by contrtol of a data channel built into the bulk memory unit 49. The data channel unit built into the bulk memory unit 49 is initiated by the PPU 22 by communication via bus 40.

In typical operation, programs awaiting execution on the discs 38 and 39 are moved by control of the data channel unit 36 through bus 43 by way of memory control unit 20 and through bus 50 to the dual mode bulk memory unit 49. When storage becomes available in the high speed memory, consisting of modules 12-19, regions of data can be transferred at 40 megawords per second from the bulk memory unit 49 by way of bus 48 under control of the memory control unit 20 to any one of the memory modules 12-19. This action is controlled exclusively by the PPU 22.

The PPU 22 in the present system is able to anticipate the need and supply demands of the CPU 34 and other components of the system generally by utilization of the particular form of control for time-sharing as between a plurality of virtual processors within the PPU22. More particularly, programs are to be processed by a collection of virtual processors within the PPU22. Where the programs vary widely, it becomes advantageous to deviate from unpartial time-sharing as between virtual processors.

In the system shown in FIG. 3, some virtual processors may be greatly favored in allocation of processing time within the PPU22 over other virtual processors by the multiprocessor control system. Further, provision is made for changing frequently and drastically the allocation of time as between the processors.

FIG. 3 indicates that the virtual processors $P_0$-$P_7$ in the PPU22 are serviced by the arithmetic unit AU400 of PPU22.

The general concept of cooperation on a time sharing sense, as between an arithmetic unit, such as unit 400 and virtual processors such as processors $P_0$-$P_7$ is known. The system for controlling such a configuration is descirbed herein. The processors $P_0$-$P_7$ are virtual processors occupying sixteen time slots. The construction of the present system provides for variable control of the time allocations in dependence upon the nature of the task confronting the overall computer system. $P_0$ is a dedicated processor in which the master controller executes at all times.

In FIG. 3, eight virtual processors $P_0$-$P_7$ are employed in PPU22. The arithmetic unit 400 of PPU22 is to be made available to the virtual processors one at a time. More particularly, one virtual processor is channeled to the arithmetic unit 400 with each clock pulse. The selections from among the virtual processors is performed by a sequencer diagramatically represented by switch 401. The effect of a clock pulse represented by a change in position of the switch 401 is to actuate the arithmetic unit 400 which is coupled to the virtual processors in accordance with the code selected for time slots 0-15. Only one virtual processor may be used to the exclusion of all the others at one extreme. At the other extreme, the virtual processors might share the time slots equally. The system for providing this flexibility is shown in FIGS. 4-6.

FIG. 4. The organization of the PPU22 is shown in FIG. 4. The central memory 12-19 is coupled to the memory control unit 20 and then to channel 32. Virtual processors $P_0$-$P_7$ are connected to the arithmetic unit 400 by means of a bus 402 with the arithmetic unit 400 communicating back to the virtual processors $P_0$-$P_7$ by way of bus 403. The virtual processors $P_0$-$P_7$ communicate with the internal bus 408 of the PPU22 by way of channels 410-417. A buffer unit, 419, having eight single word buffer registers 420-427 is provided. One register is exclusively assigned to each of the virtual processors $P_0$-$P_7$. The virtual processors $P_0$-$P_7$ are provided with a sequence control unit with the sequence control unit 418 in which implementation of the switch 401 of FIG. 3 is located. Control unit 418 is driven by clock pulses. The buffer unit 419 is controlled by a buffer control unit 428. The channel 429 extends from the internal bus 408 to the arithmetic unit 400.

The virtual processors $P_0$-$P_7$ are provided with a fixed, read-only memory 430 known in the art. In the preferred embodiment of the invention, the read-only memory 430 is made up of pre-wired, diode array programs for rapid access.

A set of 64 communication registers 431 is provided for communicating between the bus 408, the I/O devices, and the data channels. In this embodiment of the system, the communication registers are provided in the unit 431.

The shared elements include the arithmetic unit 400, the read-only memory 430, the file of communication registers 431 and the single word buffer 419 which provide access to central memory units or modules 12-19.

The read-only memory 430 contains a pool of programs and is not accessed except by reference from the program counters of the virtual processors. The pool excludes a skeletal executive program and at least one control program for each I/O device connected to the system. The read-only memory 430 has an access time of 20 nanoseconds and provides 32-bit instructions to the virtual processors $P_0$–$P_7$. Total program space in the read-only memory 430 is 1024 words. The memory is organized into 256 word modules so that portions of the programs can be modified without complete re-fabrication of the memory.

The I/O device programs may include control functions for the device storage medium as well as data transfer functions. Thus, motion of mechanical devices can be controlled directly by the program rather than by highly special purpose hardware for each device type. Variations to a basic program are provided by parameters supplied by the basic problem. Such parameters are carried in central memory units 12–19 or in the accumulator registers of the virtual processor executing the program.

The source of instructions for the virtual processors may be either read-only memory 430 or central memory modules 12–19. The memory being addressed from the program counter in a virtual processor is controlled by the addressing mode which can be modified by the branch instruction, or by clearing the system. Each virtual processor is placed in the read-only memory mode when the system is cleared.

When a program sequence is obtained from central memory, it is acquired via the buffer 419. Since this is the same buffer used for data transfer to or from central memory 12–19 and since central memory access is slower than read-only memory access, execution time is more favorable when a program is obtained from read-only memory 430.

Time slot zero may be assigned to one of the eight virtual processors by a switch on the control maintenance panel. This assignment cannot be controlled by the program. The remaining time slots are initially unassigned. Therefore, only the virtual processors selected by the maintenance panel switch operate at the outset. Furthermore, since program counters in each of $P_0$–$P_7$ are initially cleared, selected virtual processor begins executing program from address zero of read-only memory 430 which contains a starter program typically known as a bootstrap. The selection switch on the maintenance panel also controls switch one of the eight bits in the file 431 is set by a bootstrap signal initiated by the operator.

The buffer 419 provides the virtual processors access to central memory modules 12–19. The buffer 419 consists of eight 32-bit data registers, eight 24-bit address registers and controls. Viewed by a single processor, the buffer 419 appears to be only one memory data register and one memory address register. At any given time, the buffer 419 may contain up to eight memory requests, one for each virtual processor. These requests preferably are processed on a combined basis of fixed priority, and first-in-first-out priority. Preferably, four priority levels are established, and if two or more requests of equal priority are unprocessed, at any time, they are handled on a first-in, first-out basis.

When a request arrives at the buffer 419, it automatically has a priority assignment determined by the memory modules 12–19 arranged in accordance with virtual processor numbers and all requests from a particular processor receive the priority encoded in two bits of the priority file. The contents of the file are programmed by the executive program and the priority code assignment for each virtual processor is a function of the program to be executed. In addition to these two priority bits, a time tag may be employed to resolve cases of equal priority. The registers 431 are each of 32-bits. Each register is addressable from the virtual processors and can be read or written by the device to which it connects. The registers 431 provide the control and data links to all peripheral equipment including the system console. Some parameter switch control system functioning are also stored in the communication registers 431 from which control is exercised through the stored program controllers. FIG. 5: each cell in register 431 has two sets of inputs as shown in FIG. 5. One set is connected into the PPU22 and the other set is available for use by the peripheral device. Data from the PPU22 is always transferred into the cell in synchronism with the system clock. The gate for riding into the cell from the external device may be generated by the device interface, and not necessarily synchronously with the system clock.

FIG. 6. FIG. 6 illustrates structure which will permit allocation of a preponderance of the time available to one or more virtual processors $P_0$–$P_7$ in preference to the others or to allocate equal time.

Control of the time slot allocation has between processors $P_0$–$P_7$ is by means of two of the communication registers 431. Registers 431$_n$ and 431$_m$ are shown in FIG. 6. Each 32-bit register is divided into eight segments of four bits per segment. For example, the segment 440 of register 431$_n$ has four bits a-b which are connected to AND gates 441–444 respectively. The segment 445 has four bits a-b connected to AND gates 446–449 respectively. The first AND gates for all groups of four or the gates for all the "a" bits, namely AND gates 441 and 446, etcetra, are connected to one input of an OR gate 450. The gates for the "b" bits in each group are connected to OR gates to an OR gate 451 the third to OR gate 452, the fourth to OR gate 453.

The outputs of the OR gates 450–453 are connected to the register 454 whose output is applied to a decoder 455. Eight output decoder lines extend from the decoder 455 to control the inputs and the outputs of each of the virtual processors $P_0$–$P_7$.

The sequence control unit 418 is fed by clock pulses on channel 460. The sequence control 418 functions as a ring counter of 16 stages with an output from each stage. In the present case, the first output line 461 from the first stage is connected to one input of each of AND gates 441–444. Similarly, the output line 462 is connected to the AND gates 446–449. The remaining 14 lines from sequencer 418 are connected to successive groups of four AND gates.

Three of the four bits 440, the bits b, c and d, specify one of the virtual processors $P_0$–$P_7$ by a suitable state on the line of the output of decoder 455. The fourth bit, bit a, is employed to either enable or inhibit any decoding for a given set, depending upon the state of bit a, thereby permitting a given time slot to be unassigned.

It will be noted that the arithmetic unit 400 is coupled to the register 431$_n$ and 431$_m$ as by channels 472 whereby the arithmetic unit 400 under the control of the program, will provide the desired allocations in the registers 431$_n$ and 431$_m$. In this response, thus in response to the clock pulses on line 460 the decoder 455 may be stepped on each clock pulse from one virtual processor to another depending on the contents of the register 431$_n$ and 431$_m$ the entire time may be devoted to one of the processors or may be divided equally or as unequally as the codes in the registers 431$_n$ and 431$_m$ determine.

Turning now to the control lines leading from the output of the decoder 455, it is to be understood at this point that the logic leading from the registers 431$_n$ and 431$_m$ to the decoder have been illustrated at the bit level. In contract, the logic leading from the decoder 455 to the arithmetic unit 400 for control of the virtual processors P$_0$–P$_7$ is shown, not at the bit level, but at the total communication level between the processors P$_0$–P$_7$ and the arithmetic unit 400.

Code lines 463–470 extend from decoder 455 to the units P$_0$–P$_7$, respectively.

The flow of processor data on channels 478 is enabled for inhibited by states on lines 463–470. More particularly, channel 463 leads to an AND gate 490 which is also supplied by channel 478. An AND gate 500 is in the output channel of P$_0$ and it is enabled by a state on line 473. Similarly, gates 491–497 and gates 501–507 control virtual processors P$_1$–P$_7$.

Gates 500–507 are connected through OR gate 408 to the arithmetic unit 400 for flow of data thereto. By this means, only one of P$_0$–P$_7$ operates at any one time and the time is proportioned by the contents of the cells 440–445 etcetra as clocked by the sequencer 418.

FIG. 7 illustrates in block diagram, the interface circuitry between the PPU 22 and the CPU 34 to provide automatic context switching of the CPU while "looking ahead" in time in order to eliminate time consuming dialog between the PPU 22 and CPU 34. In operation, the CPU 34 executes user programs on a multi-program basis. The PPU 22 services requests by the programs being executed by the CPU 34 for input and output services. The PPU 22 also schedules the sequence of user programs operated upon by the CPU 34.

More particularly, the user programs being executed within the CPU 34 requests I/O service from the PPU 22 by either a "system call and proceed" (SCP) command or a "system call and wait" (SCW) command. The user program within the CPU 34 issues one of these commands by executing an instruction which corresponds to the call. The SCP command is issued by a user program when it is possible for the user program to proceed without waiting for the I/O service to be provided but while it proceeds, the PPU 22 can secure or arrange new data or a new program which will be required by the CPU in future operations. The PPU 22 then provides the I/O service in due course to the CPU 34 for use by the user program. The SCP command is applied by way of the signal path 41a to the PPU 22.

The SCW command is issued by a user program within the CPU 34 when it is not possible for the program to proceed without the provision of the I/O service from the PPU 22. This command is issued via line 42a. In accordance with the present invention the PPU 22 constantly analyzes the programs contained within the CPU 34 not currently being executed to determine which of these programs is to be executed next by the CPU 34. After the next program has been selected, the switch flag 44a is set. When the program currently being executed by the CPU 34 reaches a state wherein SCW request is issued by the CPU 34, the SCW command is applied to line 42a to apply a perform context switch signal on line 45a.

More particularly, a switch flag unit 44a will have enabled the switch 43a so that an indication of the next program to be executed is automatically fed via line 45a to the CPU 34. This enables the next program or program segment to be automatically picked up and executed by the CPU 34 without delay generally experienced by interrogation by the PPU 22 and a subsequent answer by the PPU 22 to the CPU 34. If, for some reason, the PPU 22 has not yet provided the next program description, the switch flag 44a will not have been set and the context switch would be inhibited. In this event, the user program within the CPU 34 that issued the SCW call would still be in the user processor but would be in an inactive state waiting for the context switching to occur. When context switching does occur, the switch flag 44a will reset.

The look ahead cpaability provided by the PPU 22 regarding the user program within the CPU 34 not currently being executed enables context switching to be automatically performed without any requirement for dialog between the CPU 34 and the PPU 22. The overhead for the CPU 34 is dramatically reduced by this means, eliminating the usual computer dialog.

Having described the context switching arrangement between the central processing unit 34 and the peripheral processing unit 22 in a general way, reference should now be had to FIG. 8 wherein a more detailed circuit has been illustrated to show further details of the context switching control arrangement.

In FIG. 8, the CPU 34, the PPU 22 and the memory control unit 20 have been illustrated in a functional relationship. The CPU 34 produces a signal on line 41a. This signal is produced by the CPU 34 when, in the course of execution of a given program, it reaches a SCP instruction. Such a signal then appears on line 41a and is applied to an OR gate 50a.

The CPU may be programmed to produce an SCW signal which appears on line 42a. Line 42a is connected to the second input of OR gate 50a as well as to the first input of an OR gate 51.

A line 53 extends from CPU 34 to the second input of OR gate 51. Line 53 will provide an error signal in response to a given operation of the CPU 34 in which the presence of an error is such as to dictate a change in the operation of the CPU. Such change may be, for example, switching the CPU from execution of a current program to a succeeding program.

On line 54, a strobe signal may appear from the CPU 34. The strobe signal appears as a voltage state which is turned on by the CPU after any one of the signals appear on lines 41a, 42a or 53.

The presence of a signal on either line 41a or 42a serves as a request to the PPU 22 to enable the CPU 34 to transfer a given code from the program then under execution in the CPU 34 into the memory through the memory control unit 20 as by way of path 33a. The purpose is to store a code in one cell reserved in central memory 12–19 (FIG. 1) for such interval as is required for the PPU 22 to interrogate that cell and then carry out a set of instructions dependent upon the code stored in the cell. In the present system, a single word location is reserved in memory 12–19 for use by the system in the context switching and control operation. The signal appearing on line 55 serves to indicate to the PPU 22 that a sequence, initiated by either an SCP signal on line 41a or an SCW signal on line 42a, has been completed.

On line 56 a run command, a signal is applied from the PPU 22 to the CPU 34 and, as will hereinafter be noted, is employed as a means for stopping the operation of the CPU 34 when certain conditions in the PPU 22 exist.

A signal appears on line 57 which is produced by the CPU in response to a SCW signal on line 42a or an error signal on line 53. The PPU 22 initiates a series of operations in which the CPU 34, having reached a point in its operation where it cannot proceed further, is caused to transfer to memory a code representative of the total status of the CPU 34 at the time it terminates its operation on that program. Further, after such storage, an entirely new status is switched into CPU 34 so that it can proceed with the execution of a new program. The new program beings at the status represented by the code switched thereinto. When such a signal appears on line 57, the PPU 22 is so conditioned as to permit response to the succeeding signal on lines 41a, 42a, or 53. As will be shown, the PPU 22 then monitors the state appearing on line 57 and in response to a given state thereon will then initialize the next succeeding program and data to be utilized by the CPU 34 when an SCW signal or an error signal next appear on lines 42a and 53 respectively.

Line 45a, shown in FIGS. 7 and 8, provides an indication to the CU 34 that it may proceed with the command to switch from one program to another.

The signal on line 58 indicates to the CPU 34 that the selected reserved memory cell is available for use in connection with the issuance of an SCP or an SCW.

The signal on line 59 indicates that insofar as the memory control unit is concerned the switch command has been completed so that coincidence of signals on lines 57 and 59 will enable the PPU 22 to prepare for the next CPU status change. The signal on line 60 provides the same signal as appeared on line 45a but applies it to memory control unit 20 to permit unit 20 to proceed with the execution of the switch command.

It will be noted that the bus 32a and the bus 33a of FIG. 8 that the switching components responsive to the signals on lines 41a, 42a and 53–60 are physically located within and form an interface section of the PPU 22. The switching circuits include the OR gates 50a and 51. In addition, AND gates 61–67, AND gate 43a, and OR gate 68 are included. In addition, ten flip-flop storage units 71–75, 77–80 and 44a are included.

The OR gate 50a is connected at its output to one inut of the AND gate 61. The output of AND gate 61 is connected to the set terminal of unit 71. The 0-output of unit 71 is connected to a second input of the AND gate 61 and to an input of AND gates 62 and 63.

The output of OR gate 51 is connected to the second input of AND gate 62, the output of which is connected to the set terminal of unit 72. The 0-output of unit 72 is connected to one input of each of AND gates 61–63. The strobe signal on line 54 is applied to the set terminal of unit 73. The 1-output of unit 73 is connected to an input of each of the AND gates 61–63.

The function of the units 50a, 51, 61–63 and 71–73 is to permit the establishment of a code on an output line 81 when a call is to be executed and to establish a code on line 82 if a switching function is to be executed. Initially such a state is enabled by the strobe signal on line 54 which supplied an input to each of the AND gates 61–63. A call state will appear on line 81 only if the previous states of 0 unit 71 and S unit 72 are zero. Similarly, a switching state will appear on line 82 only if the previous states of units 71 and 72 were zero.

It will be noted that a reset line 83 is connected to units 71 and 72 the same being controlled by the program for the PPU 22. The units 71 and 72 will be reset after the call or switch functions have been completed.

It will be noted that the lines 81 and 82 extend to terminals 84a and 84b of a set of terminals 84 which are program accessible. Similarly, 1-output lines from units 74, 75, 44,77 and 78 extend to program accessibel terminals. While all of the units 71–75, 77–80 and 44a are program accessible, those which are significant so far as the operation under discussion is concerned in connection with context switching has been shown.

Line 55 is connected to the set terminal of unit 74. This records or stores a code representing the fact that a cell has been completed. After the PPU 22 determines or recognizes such fact indicated at terminal 84d, then a reset signal is applied by way of line 85.

A program insertion line 86 extends to the set terminal of unit 75. The 1-output of unit 75 provides a signal on line 56 and extends to a program interrogation terminal 84e. It will be noted that unit 75 is to be reset automatically by the output of the OR gate 68. Thus, it is necessary that the PPU 22 be able to determine the state of unit 75.

Unit 44a is connected at its reset terminal to program insertion line 88. The 0-output of unit 44a is connected to an input of an AND gate 66. The 1-output of unit 44a is connected to an interrogation terminal 84f, and by way of line 89, to one input of AND gate 43a. The output of AND gate 66 is connected to an input of OR gate 68. The second input of OR gate 68 is supplied by way of AND gate 67. An input of AND gate 67 is supplied by the 0-output of unit 77. The second input of AND gate 67 is supplied by way of line 81 from unit 71. The set input of insertion line 91. The reset terminal is supplied by way of line 92. The function of the units 44a and 77 and their associated circuitry is to permit the program in the PPU 22 to determine which of the functions, call or switch, as set in units 71 and 72, are to be performed and which are to be inhibited.

The unit 78 is provided to permit the PPU 22 to interrogate and determine when a switch operation has been completed. The unit 79 supplies the command on lines 45a and 60 which indicates to the CPU and the memory control unit 20, respectively, that they should proceed with execution of a switch command. Unit 80 provides a signal on line 58 to instruct CPU 34 to proceed with the execution of a call command only when units 71 and 77 have 1-outputs energized.

The foregoing thus illustrates the manner in which switching from one program to another in the CPU 34 is carried out automatically in dependence upon the status of conditions within the CPU 34 and in dependence upon the control exercised by the PPU 22. This operation is termed context switching and may be further delineated by Table I below which describes the operations, above discussed, in equation form.

The salient characteristics of an interface between the CPU 34 and PPU 22 for accommodating the SCW and SCP and error context switching environment are:

(a) A CPU request is classified as either
   (1) an error stimulated request for context switch,
   (2) an SCP, or
   (3) an SCW.
(b) One CPU request is processed at a time.
(c) Context switching and/or call completion is automatic, without requiring PPU intervention, through the use of separate flags for "call" and "switch."
(d) One memory cell is used for the SCP and SCW communication.
(e) Separate completion signals are provided for the "call" and "switch" of an SCW so that the "call" can be processed prior to completion of "switch."
(f) A CPU run/wait control is provided.

(g) Interrupt for PPU when automatically controlled CPU requests have been completed. This interrupt may be masked off.

Ten OR bits, i.e.: bits in one or more words in the communication register 431, FIG. 11, later to be described, are used for this interface. They are as follows in terms of the symbols shown in FIG. 4.

TABLE I

[C] monitor "call" request storage (request signal c')

[S] context switch request storage (request signal s')

[L] C, S load request/reply storage (request signal a')

$$\left.\begin{array}{l}\text{set } C = L\,\overline{C}\,\overline{S}\,c' \\ \text{set } S = L\,\overline{C}\,\overline{S}\,s'\end{array}\right\} \text{reset by PPU at end of request processing}$$

set L = l'
reset L = $\overline{C}\,\overline{S}\,L$

[AS] automatic context switching flag set AS: by PPU when automatic context switching is to be permitted
    reset AS: by PPU when automatic context switching is not to be permitted

[AC] automatic call processing flag set AC: by PPU when automatic call processing is to be permitted
    reset AC: by PPU when automatic call processing is not permitted

TABLE I-continued

[R] CPU run flag set R: by PPU when it is desired that the CPU run reset R = $\overline{AS} \cdot S + \overline{AC} \cdot C$

[CC] call complete storage (complete signal cc')

set CC = cc'
    reset CC: by PPU when C and S are reset

[SC] switch complete storage $\left(\begin{array}{l}\text{CPU complete signal: PSC} \\ \text{MCU complete signal: MCS}\end{array}\right.$ set SC = PSC · MSC
    reset SC: by PPU when C and S are reset

[PS] proceed command to CPU to initiate context switching set PS = AS · S
    reset PS: by PPU when C and S are reset

[PC] proceed command to CPU to initiate use of memory call set PC = AC · C
    reset PC: by PPU when C and S are reset Further to illustrate the automatic context switching operations, Tables II and III portray two representative samples of operation, setting out in each case the options of call only, switch only, or call and switch.

TABLE II

Automatic context switching
and call processing,
continuous CPU running

| Time | AC | AS | PC | PS | R | L | CC | SC | C | S | Flip Flop (FIG. 4) |
|---|---|---|---|---|---|---|---|---|---|---|---|
| i | 1 | 1 | 0 | 0 | 1 | 0 | 0 | 0 | 0 | 0 | |
| ii | 1 | 1 | 0 | 0 | 1 | 1 | 0 | 0 | 0 | 0 | |
| iii 1100 1000 01 | 1 | 1 | 0 | 0 | 1 | 0 | 0 | 0 | 1 | 0 | 1100 1000 11 |
| iv 1101 1000 01 | 1 | 1 | 1 | 0 | 1 | 0 | 0 | 0 | 1 | 0 | 1111 1000 11 |
| v | 1 | 1 | 1 | 0 | 1 | 0 | 1 | 0 | 1 | 0 | 1111 1010 11 |
| vi 1101 1001 01 | | | | | | | | | | | 1111 1011 11 |

PPU re-initializes where, during time
i - waiting for CPU request;
ii - CPU strobe signal received;
iii - request code loaded;
iv - begin procedure;
v - call complete; and
vi - switch complete.

TABLE III

Automatic call processing, automatic context switching disabled, CPU running until context switching occurs TABLE III-continued

|   | Time | AC | AS | PC | PS | R | L | CC | SC | C | S | Flip Flop (FIG. 4) |
|---|---|---|---|---|---|---|---|---|---|---|---|---|
| i |   | 1 | 0 | 0 | 0 | 1 | 0 | 0 | 0 | 0 | 0 |   |
| ii |   | 1 | 0 | 0 | 0 | 1 | 1 | 0 | 0 | 0 | 0 |   |
| iii | PPU \1 0 0 0  1 0 0 0  0 1 | 1 | 0 | 0 | 0 | 1 | 0 | 0 | 0 | 1 | 0 | 1 0 0 0  1 0 0 0  1 1/PPU |
| iv | Note A/1 0 0 1  0 0 0 0  0 1 | 1 | 0 | 1 | 0 | 1 | 0 | 0 | 0 | 1 | 0 | 1 0 1 1  0 0 0 0  1 1 \Note B |
| v |   | 1 | 0 | 1 | 0 | 1 | 0 | 1 | 0 | 1 | 0 | 1 0 1 1  0 0 1 0  1 1 |
| vi | 1 0 0 1  0 0 0 1  0 1 |   |   |   |   |   |   |   |   |   |   | 1 0 1 1  0 0 1 1  1 1 |

PPU re-initializes where, during time
i - waiting for CPU request;
ii - CPU strobe signal received;
iii - request code loaded;
iv - begin procedure;
v - call complete; and
vi - switch complete.
NOTE A:
The PPU initiates the context switching by setting PS to 1.
NOTE B:
PC will be set to 1 automatically, for this case. This will allow "call" to process automatically. However the PPU must initiate "switch" by setting PS to 1.

Disc Allocation and Mapping

FIG. 12 shows the embodiment of the invention within an advanced scientific computer. The allocation of disc space on discs 38 and 39 is managed by the Disc Controller 704 which is a stored program controller located in Central Memory Stacks 12-19 wherein said controller executes within the PPU 22. The PPU 22 and other hardware processors access data from Central Memory Stacks 12-19 via the Memory Control Unit 20 which provides the necessary interface electronics. The Data Channel Controller 36 provides control for the moving of data between Memory Stacks 12-19 and the Disc Modules 38 and 39. The Disc Interface Unit 37 directs commands from the Data Channel Controller 36 to either Disc 38 or disc 39.

The allocation of space on disc modules 38 and 39 is reflected by mapping tables, call File Information Blocks, in Central Memory 12-19. Fragments of space on the disc modules 38 and 39 are selected to accommodate the amount of space requested for file A using as few disc fragments as possible with a minimum of excess space allocated. In this example the algorithm allocated two and one-fourth bands of a disc space and the mapping of three discontiguous sections on the two disc modules 38 and 39 is shown in the File Information Block 800. The first entry in the File information Block is a channel entry 801 which shows the channel address for the map entries which follow. Words in memory consisting of word sectors 802-804, 805-807, and 808-810 comprise map entries wherein each of said map entries gives the disc module number (802, 805, 808) beginning absolute disc address (803, 805, and 809) for the associated disc fragment and the number of bands allocated (804, 807, 810). In the example shown, there has been allocated three separate fragments of disc space 811-813. Each fragment 811-813 allocated for File A has a corresponding map entry in the File Information Block 800. The order of the disc map entries determines the order of the file. The mapping of the disc allows the computer user to employ disc addressing by considering a file as contiguous sectors of the disc.

CONTROL SYSTEM

In FIG. 15, the Master Controller 601 is shown having access to the Central Processor 34, the Virtual Processors $P_0$-$P_7$, the Printer 26, the Reader Punch 24 and the Read-Write 603. The Master Controller 601 will assign program units to the processors including the Central Processor and will perform initial interface with the external devices and monitor all processes.

The Master Controller is connected to the Command Controller 610 through the Master Controller Attention Queues 605 and the Service Call Processing Queues 607. The Master Controller 601 is connected to the Task Controller 609 through the Task Processing Queues 611 and Task Controller Attention Queues 613. The Command controller 610 is connected to the Task Controller 609 through the Command Processing Queues 615 and the Command Controller Attention Queues 617. The Master Controller 601 is connected to the Terminal Channel Controller 619 through the Message Communication Area Chain 621. The Task Controller 609 is connected to the Terminal Channel Controller 619 through the Data Communication Area Chain 621. The Task Controller 609 is connected to the Disc Controller 623 through the Disc I/O Processing Queues 625 and the Disc I/O Complete Queues 627. The Disc Controller 603 connects to the Disc Channel Controller 36 through a Data Communication Area Chain 629 and a second Disc Channel Controller 36a may be connected to the Disc Controller 623 through the Data Communication Area Chain 631.

The Command Controller schedules jobs and commands within the job. It allocates disc space. The Command Controller controls flow of work by initiating commands and passing work to Task Controller for execution.

The Task Controller schedules individual tasks and Central Processor steps within a command for execution. It allocates Central Memory. The Task Controller passes Disc I/O requests to the Disc I/O Controller. The Task Controller passes tasks and Central Processor programs to the Master Controller for proccesor assignment.

DISC I/O CONTROLLER

The Disc I/O Controller acts as the interface with the hardware Channel Controller. The Disc I/O Controller manages all disc requests so as to optimize effective channel bandwidth.

Data Storage and Retreival in Cyclic Storage Devices

More particularly, FIG. 16 shows a block diagram of a part of the computer system of which the invention applies. Request for reading or writing on disc are generated by the control system of the computer of which the invention applies and are positioned into a High Priority Request Queue 700 or a Low Priority Request Queue 702, both of said queues being located in central memory stacks 12-19. The Disc Controller 704 is a stored controller also located in central memory 12-19 which executes within the pheripheral processor unit 22. The Disc Controller 704 operates upon requests in the two request queues 700 and 702, and always services all requests in the High Priority Request Queue 700 before those requests residing in the Low Priority Request Queue 702. All disc requests are operated upon by the Disc Controller 704 and placed in a variable length communication area (CA) Request Chain 705a, 705b, 705c, etc. The chain is a linked list of requests located in central memory 12-19 wherein the chain is constructed with the request ordered according to the physical areas on the discs 38-39 which the request addresses. In ordering the requests, Disc Controller 704 consults a 32-bit Disc Poisiton Word 706 in central memory which contains the present sector address of disc 38 in the first half of the word 706a and the sector address of disc 39 in the second half of the work 706b. Each disc module 38 and 39 contains a hardware register with the angular position address which is frequently read and placed in central memory location 706 by the control system. The Disc Controller 704 may place a new request between requests already existing on the Request Chain 705 when there is time to complete all requests in this order. In all cases where High Priority Requests and Low Priority Requests are vying for the same position in the chain 705, and when there is not sufficient time to service both requests, the low priority request is displaced in favor of the high priority request. The PPU 22 signals the Data Channel Controller 36 by means of changing the status of a bit in the Communication Register (CR) File 431. Once the Data Channel Controller is activated by the PPU 22, all requests on the CA Request Chain 705 are serviced without interruption. Each data link in the CA Request Chain 705 is composed of up to two octets of information which describe each request with such information as the address of the next octet in the chain, whether the request is a read or write, whether the request is for Disc Module 38 or 39, the address on said module, the address in central memory to or from which the data is to be transferred, and the number of words to transfer between the disc module and central memory.

For a more complete understanding of the invention, the control system for the computer in which the invention forms a part is described. A more complete and detailed description of the control system may be found in patent application, Ser. No. 178,357, filed Sept. 7, 1971 now U.S. Pat. No. 3,573,852, and assigned to Texas Instruments Incorporated.

A control system for said computer provides control, scheduling, and resources necessary for the orderly and efficient flow of stored computer programs in a multiprogramming environment. The control system is composed of a hierarchy of four stored program controllers with each controller exercising control over a given level of work. Each of said controllers is responsible for servicing certain computer resources and makes scheduling decisions within its respective area of responsibility.

The four stored program controllers which operate in different virtual processors within the computing system are the Master Controller, the Command Controller, the Task Controller, and the Disk I/O Controller. Each controller has one or more input and output queues which are configured in doubly linked-list fashion which provides for communication necessary between controllers. Typically, the output of one controller is positioned into the input queue of another controller.

Said Master Controller is at the top of the controller hierarchy and communicates with all processors and devices through an array of communication registers. Several of said registers are partitioned into bit fields which represent the request status of processors and devices which are monitored frequently by the Master Controller to determine when certain functions are to be performed. The Master Controller acknowledges requests by changing the bit status in the communication registers and passes the request to the next lowest level controller, the Command Controller.

The Master Controller has the ultimate scheduling authority for all hardware in the computer system and may force a processor to yield if a high priority resources requests service.

The Command Controller is responsible for scheduling the sets of computer instruction groups, called commands, each of which performs a function with a predetermined and reserved resource. The controller constructs the sequence of commands in a queue necessary to define a process.

The execution of the command queue resulting from the operation of Command Controller is controlled by the next level of the control hierarchy, the Task Controller. To obtain the optimum efficiency of the virtual processors, it is desirable to time share their processing power among small program units. The commands in the queue constructed by the Command Controller are broken down into small program units called tasks. Each task has memory and execution time limits such that no system command will monopolize a processor in an unproductive manner. The Task Controller is the next in the controller hierarchy and has the function of scheduling each task, monitoring task linkage, managing transient system central memory, and insuring completion of commands as directed by the Command Controller. Task controller also has the responsibility of servicing requests for data transfers between memory and secondary and peripheral storage devices.

Task Requests for disc processing are the responsibility of the Disc Controller. The Task Controller constructs lists of disc input/output requests and the Disc Controller reorders said requests so that the use of the data channel associated with the discs is optimized.

The computer described herein is a multiprocessor. There are nine different processors in the computer with one central processing unit and eight virtual processors. There are thus in effect nine independent computers in the computing system. There are four control functions in the computer with a hierarchy of control.

Four of the virtual processors are dedicated to the controller functions.

All nine computers have an access to many locations in central memory. Thus there is an identical address accessibility. In addition, each computer has access to the communication register file.

These are four controllers in the computing system. The Master Controller, the Command Controller, the Task Controller and the Disc I/O Controller.

The Command Controller assigns groups of command sequences over groups of tasks to the computers. The Task Controller determines the task to be done such as intelligence gathering and the like. The Master Controller decides what processors will do the tasks. The Disc I/O Controller will control the transfer of data between the discs and central memory.

The control system described herein is different from previous computers in that there are not different independent controllers in the computing system but four controllers with a hierarchy of control.

MASTER CONTROLLER (1) provides software control of the virtual processor and central processor utilization, (2) responds to asynchronous signals from the peripheral devices and interactive digital communication terminals, (3) monitors system error processing, and (4) bootstraps and initializes the system.

There is a nucleus, which is the main polling loop of the Master Controller. The main polling loop of the Master Controller responds to device attention signals to provide a sufficient control of the virtual processors, central processor, the peripheral devices and terminals.

The major share of the Master Controller's work is initiated in a dedicated virtual processor to achieve a quick response time. This dedicated or nonselected virtual processor may be termed the Master Controller Virtual Processor and is one of the eight virtual processors other than a virtual processor which is allocated to the nucleus for the Master Controller.

VIRTUAL PROCESSOR UTILIZATION

The Master Controller performs four types of virtual processor utilization and control functions. These functions provide for:

(1) allocation of a virtual processor to a system task, (2) allocation of a virtual processor for Master Controller work (subprocess).

(3) control of the virtual processors through a Master Controller service component (virtual processor service loop), and (4) taking an active task out of virtual processor execution (trapping).

VIRTUAL PROCESSOR SERVICE LOOP

There is a virtual processor service loop component in the Master Controller which controls the nonselect virtual processes. The nonselect virtual processors enter and execute the Master service controller service loop upon completion of (1) a standard system call (SCALL) from a task, (2) virtual processor execution for a task, (3) priming a task for executing, and (4) a Master Controller subprocess.

Control is also exerted over the nonselect virtual processors during Master Controller service loop execution to a yield indication provided in the communication register file. This is carried out through each logical break point in the virtual processor service loop execution, the nonselect virtual processors will test the yield indicator and will determine whether that nonselect virtual processor is to report to the Master Controller through the ROM idle loop. The yield indicators in the communication register file provide a means to interrupt a virtual processor during service loop execution so the Master Controller can use the nonselect virtual processor for special purposes.

The nonselect virtual processors report to a ROM idle loop when a nonselect virtual processor in the service loop detects a task processing and subprocessing scheduling lists are empty. The ROM idle loop indicates to the Master Controller that the nonselect virtual processors are idle and available for scheduling work.

TRAPPING VIRTUAL PROCESSORS

The Master Controller can exert control over a virtual processor during task execution by trapping (i.e., taking an active task out of virtual processor execution (a given virtual processor for use by the Master Controller). Trapping is accomplished through the setting of communication register file bits to which peripheral processor hardware responds, and the virtual processor traps to a ROM location where control is returned to Master Controller service loop.

Trapping is accomplished at the task level. All status information associated with the trapped disc is saved in the task parameter table and the task entry is placed at the front of the high priority task process list. Placement on the task process list allows a task to be rescheduled for execution in the next available virtual processor.

SUBPROCESSES

Subprocesses are initiated to perform systems services required at the Master Controller. By definition, a subprocess is a component of the Master Controller that performs a vital service and executes in a nonselect virtual processor. Subprocesses share a common data base with the nucleus of the Master Controller. Subprocess scheduling is a parameter of system generation in that some subprocesses may or may not be scheduled for nonselect virtual processor processing.

The Master Controller subprocess scheduler determines the order in which subprocesses are to be executed. The virtual processor service loop initiates subprocesses upon detection of entries on the subprocess scheduling list. The subprocess which are scheduled by the suprocess schedular are as follows:

(1) terminal input/output communication area processor, (2) timer tube processor (3) error processing (4) terminal input/output processor, (5) performance information selective processor, (6) device attention processor, (7) central processor controller, and (8) Master Controller communication list processor.

VIRTUAL PROCESSOR ALLOCATION FOR TASKS

System tasks are inputted to the Master Controller on one of two priority task priority processing lists for virtual processor allocation. When a task is selected for virtual processor execution, the task entry is removed from the task processing list and is then primed for execution. Prior to task execution, the Master Controller builds table entries which point to an active tasks task entry and task parameter table, and loads a base program counter and a virtual process register file. The base program counter and the virtual processor register file are both contained in the task processor table. The control of the virtual processor is then passed to the task for execution.

The time a task is permitted to execute in the virtual processor can be controlled by the Master Controller. A virtual processor which enters an endless program loop in execution will be discovered by the Master Controller and will be removed from virtual processor execution. The Master Controller also services requests from task execution in the virtual processor for resetting the communication register file or the central memory protection when required. A task is post-processed by the Master Controller upon completion of virtual processor execution. This post-processing may be termined a task wrap-up.

Following the task execution, the base program counter and the virtual process registers for that task are saved in the task parameter table. The task parameter table is removed from the task parameter table address list and the task entry is removed from the active task list. The task entry is placed on the task complete queue for the task controller's wrap-up of the task, and control is returned to the virtual processor service loop.

CENTRAL PROCESSOR UTILIZATION

The central processor utilization is accomplished by the Master Controller through
(1) allocation of the central processor to central processor steps,
(2) responding to serve at central processor service calls, and
(3) control of the central processor.

The Master Controller exerts control over the central processor hardware logic that is necessary to place a central processor program into execution. Allocation is accomplished by removing entries from the central processor execution list and placing the address of the program into a dedicated word which causes the hardware to start execution of the program.

The Master Controller services the central processor for context switching issued by a central processor step through a monitor call and wait instruction. Context switching is the hardware mechanism for removing the central processor from execution and saving the status associated with the central processor step.

A central processor step will issue a service call (the step may or may not be context switched) that signals the Master Controller through the communication registers that the central processor step requires system services. The Master Controller intercepts the service call and builds a service request entry for passing the necessary information to the command controller for processing.

Context switches of the central processor may be forced by the Master Controller when a high priority step needs to be assigned to immediate central processor execution. Priority steps may also be forced from execution when they have exceeded a given time limit or for the purpose of time slicing the central processor. The central processor step is normally context switched automatically by the hardware for step termination. However, when there are no central processor steps waiting or trying for central processor execution, the Master Controller forces a central processor step out of execution through use of the central processor maintenance hardware logic to terminate a step. The Master Controller also forces the central processor steps into execution through use of the central processor maintenance hardware logic.

The Master Controller monitors the peripheral devices (for instance, tapes, printer, punch, terminals) for attention by way of the communication register file. The input information from these peripheral devices and the control signal outputs to these devices will be through the communication register file. In response to asynchronous signals from peripheral devices, the Master Controller builds a service request entry which contains an image of the device attention bits for the command controller for analysis. These entries are then used by the Command Controller to initiate appropriate commands for processing of the devices.

The Master Controller responds to the digital communication terminal in two ways:
(1) the Master Controller monitors signals (communication register bits) which indicate that a terminal input message requires transferring to the operating system. When the appropriate communication register bit is set a communication area is linked on the terminal channel controller's high priority communication area chain for input.
(2) the Master Controller monitors communication of completed communication areas on the high priority terminal channel list. When a completed message has been detected, the completed message is removed from the high priority channel list and passed to the command controller for analysis and subsequent processing. The Master Controller also places output messages from the command controller on the high priority terminal channel list which are communications to the terminal word.

The Master Controller interfaces with the peripheral devices, peripheral processor, central processor, and the terminal channel controllers to the central register file. Information may be inputted from new devices and control signals may be outputted through these devices from the communication register file.

SPECIAL FUNCTIONS

ERROR PROCESSES

The master controller monitors system error processing by detecting a system error bit set in the communication register file. The system error bits are set by the system control component by tasks.

When an error is detected, the master controller initiates necessary routines to service the error. If an error is severe enough, then the master controller takes the action necessary to shut down the system. The system shut down may be either:
(1) an orderly shut down or
(2) a crash shut down.

The master controller is responsible for the initial system loading. The initial system loads consist of bootstrapping the system, the subsequent initialization of all system components and bringing the system up to an operational level.

MASTER CONTROLLER DEBUG

The master controller provides special functions for master control debug. Special control of the virtual processors is permitted by an exercise task which completes execution to stop all other exercise virtual processors at that time. The master control debug users can then examine the relationship between one or more virtual processors in simultaneous execution.

PERFORMANCE INFORMATION COLLECTION

The master controller provides special functions for performance information collection processing. The master controller saves scheduling and processing information in special performance information collection processing buffers which are used for system evaluation.

The master controller also provides a special interface for initiating the execution of the performance information collection central processing step that empties and processes operating system data collection buffers.

STRUCTURE OF MASTER CONTROLLER (AS SHOWN IN FIG. 9)

The nucleus of the master controller executes at a selected virtual processor that is composed of three main components. These components are:
(1) the main polling loop,
(2) the subprocess scheduler, and
(3) the peripheral processor controller.

These three components share various tables and have a common data base structure. The nucleus of the master controller monitors the communication register file, in order to communicate with the virtual processors, the central processor, the peripheral devices and the terminal channel.

MAIN POLLING LOOP

The main polling loop of the master controller monitors requests from the external world. Whenever a signal is detected for master controller work, the main polling loop initiates the appropriate action. To initiate the request, the main polling loop will pass control to the peripheral processor controller or the subprocess scheduler in the selected virtual processor.

When the main polling loop detects that the execution of a subprocess is required, control is passed to the subprocess scheduler. The subprocess scheduler may pass control to the requested subprocess if the master controller virtual processor select scheduling is required. The scheduling is time dependent, then subprocessor schedular passes control to the peripheral processor controller for immediate virtual processor allocation. If the subprocess is not time dependent and there is no available virtual processor, than the subprocess schedular makes an entry in a table so the subprocess qwill be executed by the next available virtual processor. After the scheduling of a subprocess, control is returned to the main polling loop of the master controller.

Control of virtual processor select is passed to the peripheral processor controller whenever the slave to master or availability communication register bits are set. These bits indicate that a virtual processor needs servicing by the peripheral processor controller. The reason word indicates to the peripheral process controller the state of the virtual processor. Following servicing, control is returned to the main polling loop of the master controller.

MAIN POLLING LOOP

The function of the main polling loop is to detect signals from the various hardware and software components to which the master controller has been assigned service responsibility. The components and associated conditions monitored can be summarized as follows.

The central processor is monitored for:
(1) context switching,
(2) initial step loading,
(3) step terminating and unloading for step time slicing,
(4) step time limit control,
(5) step priority override,
(6) service call processing, and
(7) system error processing.

The peripheral processors are monitored for virtual processor availability and system error detection.

Peripheral devices are monitored for device attenuation signals.

The system timer list is monitored for a list entry time expiration.

The terminal channel is monitored for:
(1) communication error completions,
(2) input message requests,
(3) output message requests, and
(4) system error detection.

System tasks are monitored for:
(1) protected communication register access requests,
(2) protected central memory access requests,
(3) system error processing, and
(4) execution time control.

The master controller debug component is monitored by special virtual processor control requests.

Subprocess scheduling can be controlled by establishing a time limit control.

SUBPROCESS SCHEDULER

The function of the subprocess scheduler is to schedule the execution of subprocesses in response to the servicing requirements as detected by the main polling loop. A scheduling table controls the way in which a particular subprocess is scheduled. This scheduling type table (SYSGEN) initialized table permits four types of scheduling:
(1) virtual processor-select only,
(2) available virtual processor, a virtual processor-select immediately,
(3) available virtual processor, or trapped virtual processor,
(4) next virtual processor becomes available.

Subprocesses which are scheduled for execution into a virtual processor other than the master controller virtual processor-select may be queued up while waiting for a virtual processor to become available.

PERIPHERAL PROCESSOR CONTROLLER

The function of the peripheral processor controller is to service requests associated with the peripheral processor. These include:
(1) protected communication register and access requests,
(2) protected central memory access requests,
(3) available virtual processor scheduling, and
(4) master controller debug virtual processor control.

These requests are signalled from nonselect virtual processors through communication register bits assigned to each virtual processor and an octet of dedicated central memory. A virtual processor requiring servicing sends its communication register bit, called slave-to-master bit, indicating that it has stored a slave-to-master reason in the dedicated central memory octet. This reason in the dedicated central memory octet has been accessed by the peripheral processor controller when the appropriate action is taken.

COMMAND CONTROLLER

The command controller is the controller of the computer system responsible for scheduling activities. This includes scheduling of jobs which can be batch jobs, terminal jobs, or remote batch jobs. Remote batch jobs are treated the same as batch jobs except for disposition of data. The command controller analyzes its service requests to determine resource requirements and subsequently schedules execution of the service requests.

In the process of scheduling execution of the service requests, the command controller handles the reservation of two resources: the disc and the central memory. The command controller effectively allocates disc space but it does not actually decide which physical portion of a disc a job or a task will be assigned to. The assignment of disc space is made by a command initiated by the command controller. The command controller checks the amount of disc space that any command is going to use before the command starts executing. The command controller does not allow execution to begin if the command will require more disc space than is available. Thus, the command controller does not decide the actual physical assignment of disc space but it does decide the amount of assignment.

To perform the job execution functions, the command controller interprets the in toto job specification language file (IJSL) and controls the terminals in a sense of deciding which terminal will be allowed to come on line or which messages will be accepted at a given time.

The command controller's primary responsibility is to control the system resources and guarantee that the system optimizes the use of these resources. Command controller is aware of all command terminations. The command controller has the job level information required in the scheduling of jobs. The command controller can give high priority to commands associated with the particular job when trying to speed the throughput for that job.

JOB PROCESSING

The command controller is responsible for scheduling the different stages of job processing which are:
(1) initiation,
(2) job specification language translation,
(3) preprocessing,
(4) execution, and
(5) termination.

The command controller initiates the job input stream reader which is the component of the system which brings jobs into the system from an external source. For the initiation of the job input stream reader, it is determined whether enough disc space is available for reading in source jobs.

Included in job initiation is the control of remote batch jobs from the terminals. The command controller determines the type of device (for instance, curve meter, tape drives, disc) to be used as a job source input device.

When there are jobs in the source state the command controller decides when and which jobs to have translated by the job specification language translator. The job specification language translator is initiated for the source jobs that are available as the disc becomes available for the internal job specification file. The job specification language translator takes the job specification language source statements and produces an internal job specification language file. The internal job specification language file is in a machine-oriented form which is easier to analyze by the computer system than the source job specification language and if there is a syntax error, the command controller does not schedule the execution of the job.

After the job has been translated, the command controller decides which jobs have been translated so preprocessing can be initiated. To determine which jobs can have preprocessing iniated, the command controller needs to makde sure that all resources needed to start the job execution are available. For instance, catalogs, specific tape reels and other resources.

The command controller checks the internal job specification language job parameters to see how much disc space, central memory and processing time is required for the job. From this check which determines what resources are available and what resources are required, the command controller decides whether to run the job or wait until more resources are available (the requirement for disc space is usually the main consideration to determine whether the job is to be run or to wait).

When a job is in the preprocessing phase, each command sequence in the preprocessing function is scheduled. The command controller then decides which jobs to schedule for execution from those jobs which have been preprocessed. During job execution itself, the scheduling becomes more involved in the command controller must balance the memory and disc requirements for each job step. A job may execute job specification language statements which increase or decrease disc requirements at different stages within job execution. The command controller considers this during the scheduling of job execution.

The command controller is responsible for job termination. This process is accomplished in the command controller by job termination command sequence which involves closing all the files of the job, doing job accounting and sending the job output to the appropriate location.

At job termination, the command controller closes the job file and releases memory that the particular job being terminated used during execution. The main scheduling problem at job termination is that of disposing of all the print files acquired during the job. Printing jobs may be awaiting termination if there are not enough printers available. Also batch output could be routed to other local devices for off-line printing. Remote batch output could be printed locally if the original input terminal or at some other terminal designated by the job or the operator.

COMMAND PROCESSING

Command controller is responsible for the scheduling of commands. Commands are sequences of tasks identified by the command controller to provide logical breakpoints in the resource needs for scheduling purposes. A command is either an analysis or an execution command. An analysis command is initiated by the command controller to obtain scheduling information. If an analysis command determines that resources are available, then an execution command may be initiated to perform a requested system service.

Many of the commands a command controller schedules are context independent, that is, they perform some basic processing function, but this type of function is needed in more than one type of work. (A function which opens files can be used for file management, as a file input/output, and as a system service.

The command controller is responsible for the preparation of commands for scheduling. For each command sequence in the system, there is an entry in a table termed the command sequence table which defines the commands in that particular sequence in the order in which these commands execute and the attributes of the command. Command controller determines if the command sequence table which commands in the sequence to schedule it.

The command controller manipulates the data structures associated with a command. The standard command parameter table is built for the first command in the sequence. For a command which has terminated, the command controller determines whether a command parameter table of the terminating command should be released and a new one built for the next command in the sequence.

An argument table may or may not be passed by a terminating command. Due to the context independent features of commands, an argument table may be passed in one command sequence using a particular command and not be passed in another command sequence using the same command. The command sequence table specifies whether an argument table will be passed by a particular command in the sequence.

After evaluating the data attributes of a command, the command controller determines whether the command to be scheduled is a non-reintrant command. If the command is non-reintrant and all the data associated with the command is correct, then the command entry is placed on a scheduling list.

When a command is scheduled, the command entry for that command is placed on the command processing list. A task entry is placed on the task request queue by command controller for the first task in the command to be initiated by task controller.

When a command completes execution, command termination is initiated by the task controllers placing the command entry for that command on a command attention list. For standard command exits, the command sequence table is interrogated and the next command in that command sequence is scheduled.

COMMAND SEQUENCE PROCESSING

The command controller uses a table-driven implementation technique called Command Sequences to control the execution of commands needed to perform a request. The Command Sequences perform various tyes of activities, by specifying a sequence of specialized functions (commands) to perform a larger more global function. Examples of system functions performed by Command Sequences are as follows:

(1) the internal job specification language analyzer which is a part of the command controller request command sequences to processs the work specified on job specification language statements. The master controller receives service calls from the central processor and passes the requests to the command controller. The command controller then initiates the command sequences needed to analyze the requests. The peripheral processor debug, which is the on-line operating system debugging system, generates requests for command sequences to handle operation interaction with the peripheral processor and the central processor debug facilities. The system communicator operates requests for command sequences to handle operator interaction, to cancel jobs, to delete input/output requests and the like. The command sequences are also used for the analysis and processing of terminal requests by the command controller.

All command sequences have certain attributes such as central memory and disc space requirements, estimated number of input/output requests, and estimated amount of time required to execute the command sequences. From these attributes, and from the job level information to which the command controller has access the command controller decides which command sequences to initiate. Each command within a command sequence is also scheduled based upon the same consideration as the scheduling of the command sequences themselves.

COMMAND CONTROLLER SUBPROGRAMS

The command controller subprograms are functionally similar to tasks since a command controller subprogram represents a certain unit of code or a certain sequence of instruction. However, the command controller subprograms are actually exeucted in the command controller's dedicated virtual processor. Because the command controller comprehends commands as units of work, the command controller subprograms have command level data structures. That is, the command controller subprograms are activated by an entry in the command sequence table and have a command entry and a command parameter table. The command controller subprograms perform different functions for the control system.

The first function is that of sequence dependent work. That is, at certain points in some of the command sequences, some cleanup work is done. Data structure may have to be manipulated or some work is done which cannot be delegated to a task; thus, this type of work is done by a command controller subprogram.

The second type of subprogram manipulates lists within the command controller. Command controller subprograms which manipulate lists solve a lockout problem. More than one component accesses a list to add or remove list entries a lockout problem may exist. The command controller subprograms resolve this type of problem since only one subprogram will be executed in the command controller's dedicated virtual processor.

The command controller subprograms are also used to resolve interface incompatibility that has occurred because of miscommunication or unforeseen problems in the design phase. For example, a command may need parameters not available to the calling components. The command controller subprogram can obtain and supply these parameters which will be necessary for that command to execute.

The command controller subprograms may also be used because of size. Where the code requires less than 20 instructions, it becomes reasonably economical to execute these instructions in the command controller's dedicated virtual processor. This type of subprogram cannot be exectuted as a last task of a command because if the command is context independent it may thus be a command in other command sequences which do not require execution of the subprogram.

Because command controller subprograms have a command entry and command parameter table structure and are initiated through a command sequence table, the command controller subprograms can be used in making disc input/output calls, that is, a disc input/output call by the command controller is made by using a subprogram and as such is indistinguishable from a command making a disc/output call as far as the task controller is concerned.

COMMAND CONTROLLER STRUCTURE

The command controller multiplexes two functional units within one virtual processor as shown in FIG. 10. These two functional units are the scheduler component of the command controller and the polling loop subprogram executer component and command controller. This design of the command controller allows the scheduling components to be altered without impacting any of the bookkeeping and commands sequence interpretation functions of the command controller.

The scheduling component of the command controller determines when command sequences will be initiated when commands will be started and when subprograms will be executed. The polling loop and subprogram executor component of the command controller holds the various input queues for the command controller and executes subprograms that have been scheduled by the schedler component.

Both the scheduler and the polling loop components are divided into subcomponents called actions. An action is a modulo module of code which performs a specialized function in the command controller. Actions are implemented to provide a modular design for the command controller. The sequence in which these actions are executed is determined by an action sequence table in the command controller's task parameter table. The action sequence table contains an entry for each action in each entry defines two possible exits for that action, thus determining which action will be performed next. There are two action sequence tables: one for one scheduler and one for the polling loop and subprogram executor.

After each action control is returned to the multiplexing driver. This driver decides which of the two components of the command controller will execute next. This is accomplished by checking in ratio (scheduler-executor ratio) built into the command controller's task parameter table at system generation time. This ratio determines which component will be allowed to execute more frequently. For example, the scheduler could be allowed to execute one hundred actions for every five actions that the polling loop executes. The multiplexing driver must keep a running count of the number of actions executed by each component and initiate succeeding actions accordingly. When an action terminates, an action sequence table interpretor determines which action for this component should be executed next and stores the address of that action in the dedicated word of the command controller's task parameter table. Control is transferred to the multiplexing driver which determines which component will execute next and transfers control directly to the correct action of that component.

The command controller has the same basic data structure as a task, that is, a task entry, a task parameter table, a command entry and a command parameter table under a system job. The command controller has base relative access to its own task parameter table and stores information in it. Temporary storage is provided for command controller execution, and data constant areas are provided for the different components of command controller. Within the data constant areas, there are counters which control the execution flow within command controller by indicating to the various components how many times queues should be scanned and how many entries should be removed from a queue each time it is scanned.

Command controller's task parameter table contains the command directory of all the commands in the system. Each entry in the command directory contains information such as:

(1) amount of disc used by the command,
(2) amount of central memory required by the command,
(3) number of tasks in the command,
(4) whether the command does disc input/output,
(5) whether the command is reentrant,
(6) whether the command is resident,
(7) whether the command is currently loaded, and
(8) whether the command is currently active.

Also, in the command controller's task parameter table, there is a command sequence table directory which contains the addresses of all the command sequence tables, the address of the first command in each command sequence, and other information similar to that in the command directory. The action sequence tables are also in command controller's task parameter table and are used to control the flow of work inside the command controller.

TASK CONTROLLER

The task controller is the component of the ASC Operating System responsible for monitoring the flow of tasks through the system. A task is the most basic unit of work scheduled by the sytem. Task controller is central memory resident and executes in a dedicated virtual processor.

Task controller performs the following basic functions:

(1) allocates central memory for executable code and builds parameter tables needed for the execution of a task,
(2) manages all communication and transfer of control between tasks,
(3) preprocesses all disc input/output requests,
(4) facilitates the transfer of data between the ASC and remote terminals, and
(5) provides the interface between the system and the peripheral device driver/handlers.

TASK PROCESSING

Task processing can be broken into two major areas:
(1) the preprocessing of tasks and
(2) monitoring task comletions.

In preprocessing tasks, task controller loads tasks from disc to central memory if the tasks are not currently residing in central memory. After tasks have been loaded into central memory, task controller builds a task parameter table to satisfy the task data structure requirements for task execution. Task controller also records the current status of a task which involves the setting of a task which involves the setting of various indicators contained in the task directory. Task execution is initiated by placing the task entry on a processing list to master controller for virtual processor allocation.

Task controller also services tasks which has completed execution. Task completions result from the execution of a standard call (SCALL). A SCALL is a standard system linkage to initiate a subsequent task or pass control to a system control component. For a task-to-task call, task controller modifies the activation record of the terminating task to reflect initiation of the requested task and performs the preprocessing required to initiate the task being called. If a task's SCALL request requires command controller attention, task controller places the task entry of the calling task on the proper action list for command controller to process. For a SCALL requesting disc input/output services, task controller links the disc input/output request on a list for disc preprocessing. For SCALLs to terminal input/output and to drive manager, the appropriate list entry, previously built by the calling task, is placed on the proper list for processing.

TASK DIRECTORY

The task directory is a control component system table which contains an entry for each task in the system. Each task directory entry contains all the information required by task controller to preprocess the task. Whenever the task directory is accessed, the entry which is used is locked out from other system components which might try to access the same entry.

The task directory entry for each task specifies whether the task is currently resident in central memory or whether it is to be loaded from disc into central memory. Certain tasks will always be central memory resident, but most tasks will reside in central memory only during the execution of the task code. The task directory also indicates whether the task is serially reusable or reentrant.

The task directory indicates to task controller when central memory utilized by a task should be deallocated. Task code may be deallocated upon completion of execution of the task, or task code may remain in central memory and be deallocated by the task deallocator when central memory resources are critical. The task deallocator increases the amount of central memory available to the system by deallocating task code not currently being executed.

The task directory indicates to the system if a task is trap inhibited. If a task is trap inhibited the task may not be interrupted by master controller during task execution.

The task directory contains a count of the number of users currently using a particular copy of task code. The count is updated by task controller upon preprocessing and completion of task code.

The task directory indicates to task controller the amount of central memory required by a task during execution for the task parameter table. Before the central memory is reserved, task controller sugments the task parameter table size to include all overhead words required by the system. Another task directory parameter indicates the actual code length, including all data constants, required for a particular task. The task code length is required by task controller if a disc input/output request is required to load the task from disc. A data displacement parameter in the task directory indicates the displacement from the load point of a task to the data constants associated with the task.

A central memory address is contained in the task directory to indicate the load point of a task when the task is in central memory. For code being loaded by a disc input/output request, task controller updates this central memory address to indicate the current position in central memory of the task code. There is also a word in each task directory entry to indicate the absolute disc address of tasks which reside on disc.

TASK CONTROLLER STRUCTURE

The basic structure of task controller consists of the following components:
(1) main polling loop,
(2) driver manager,
(3) disc preprocessor, and
(4) terminal servicing component.

Task Controller Polling Loop

Task controller's polling loop is that component of task controller which provides the input that drives the task controller. The polling loop consists of linked lists, dedicated central memory words, and an unconditional transfer of control to disc input/output preprocessor. The linked lists, if non-empty, contain input elements which task controller services. The dedicated central memory words in task controller's polling loop are driver manager completion words which, when non-zero, cause task controller to activate its driver manager component.

The input lists to task controller consist of the following:
(1) task request lists, on which command controller and task controller place task activation records for tasks to be executed;
(2) task complete lists, on which master controller places task entries of tasks having executed a SCALL;
(3) disc input/output complete lists, on which the disc input/output controller places completed disc requests for task controller to direct to the proper source;
(4) memory deallocation list, on whih command controller and task controller place task entries and task parameter tables for task controller to deallocate later;
(5) large memory request list, on which command controller places task entries for task requests requiring central memory at the page (4096 words) level;
(6) terminal input/output communications area chain that task controller polls for completed terminal data transfers;
(7) breakpoint complete list, on which master controller places task entries of tasks having executed a software breakpoint;
(8) breakpoint restart list, on which command controller places task entries of tasks to be restarted after executing a software breakpoint.

The priorities of the various input lists are satisfied by the multiple occurrence of a list or lists in the polling loop. Once an event is detected in the polling loop, task controller exits the loop to the particular processor required and returns to the polling loop when all processing is completed.

Driver Manager

Driver manager is that part of task controller which provides the interface with the peripheral input/output driver/handlers to effect data transfers between central memory and the peripheral devices (e.g., tape, card reader, punch, printer).

When peripheral I/O needs to be done for a task, the task will pass control to task controller via a special SCALL. After the task controller recognizes from the SCALL type that peripheral input/output activity needs to be initiated, control will be passed to a part of task controller called driver manager. Driver manager will initiate the peripheral input/output activity as indicated by an argument table passed to task controller by the calling task.

Driver manager will pass control to a device driver/handler component to initiate the data transfer. When the data transfer has been completed, control will be returned to the driver manager portion of task controller by the driver/handler. Driver manager will then pass control to the command controller, which will continue to process the command sequence that requested the peripheral input/output.

FIG. 11 and outline description illustrate the interfaces involved for driver manager from a peripheral I/O request which was initiated to task controller.

(a) SCALL to task controller with a peripheral I/O request
(b) task controller nucleus passes control and the peripheral I/O request to the driver manager SCALL processor.
(c) if the device handler is in central memory, the driver manager SCALL processor transfers the data from the peripheral I/O request into a dedicated communication area and sets a communication register bit which causes a driver to initiate a device handler. Driver manager SCALL processor may make an entry on a task processing list for a driver if the driver is not executing in a virtual processor.
(d) if the device handler is not in central memory, driver manager SCALL processor will make a disc I/O request for the handler to be loaded from disc.
(e) when the disc I/O request is completed, control is given to the post handler load processor.
(f) the post handler load processor does the same processing that is described for the driver manager SCALL processor under point (c) above.
(g) for double buffered tape requests only, when a buffer is filled, the device handler sets a slave-to-master bit which notifies master controller.
(h) the device handlers interface directly with the hardware to perform data transfers between the peripheral I/O devices and central memory.
(i) the master controller nucleus passes control to the buffer attention processor. The buffer attention processor puts a disc I/O request on a list which will activate disc I/O preprocessing in task controller. The disc I/O request is supplied by the task whose peripheral I/O request is being serviced.
(j) when the device handler completes servicing a communication area, task controller will be notified.
(k) the task controller nucleus will pass control to the driver attention processor.
(l) the driver attention processor informs command controller of the completion of the peripheral I/O request.
(m) command controller continues processing of the command sequence which issued the peripheral I/O request.

Task Controller Disc Preprocessor (TCDP)

The task controller disc preprocessor validates the user disc I/O request, allocates central memory to be used for communication areas, and builds the communications areas that are used by the disc data channels for the actual transfer of data between central memory and the disc.

Task Controller Disc Preprocessor is a list driven component. A list entry is placed on one of three disc I/O requests lists by task controller before task controller disc preprocessor is called. Task controller calls TCDP as a subroutine through the vector table. There are three priority disc I/O requests lists, the highest priority being used for one inch streaming tapes. Although the list entry is the only form of input for TCDP, the list entry contains pointers to control blocks. These control blocks contain the information necessary to service a disc I/O request.

TCDP validates all user I/O requests to insure proper use of the disc. Depending upon the type of disc I/O user, the TCDP validates the
(1) request control block (RCB),
(2) file use,
(3) central memory use, and
(4) disc file appendages.

When errors are detected during validation, the appropriate status is recorded and the request control block aborted.

Upon successful completion of a disc request validation, the TCDP then converts the user's virtual disc address to an absolute disc address. The virtual disc address is converted to an absolute disc address by using the disc map contained in the file information block (FIB) to calculate the physical location on disc. TCDP also determines if a discontiguous break in disc space has occurred by adding the number of words (to be transferred) to the beginning absolute disc address and then checking the disc map for that file. For every discontiguous disc break that occurs for an I/O request, there will be built a corresponding communication area.

Communication areas (CAs) are allocated and built by TCDP upon completion of request validation and absolute disc address calculations. The communication areas are used by the disc hardware to obtain the information that is required for the actual disc data transfers. After being built, a communication area is linked on one of two lists which initiates disc controller processing. Task controller disc preprocessor returns to the task controller when an error condition occurs or all communication areas have been built for a given request control block. When all the communication areas have been built for a disc I/O request (more than one request control block may compose a disc I/O request), the disc request list entry is removed from the task controller disc preprocessor input list and placed on an "in process" list.

One other function of task controller disc preprocessor is to provide disc controller the linkages needed to relate completed communication areas to the originating disc request list entry.

Terminal Servicing Component

The task controller is responsible for the transfer of large blocks of data and certain communication messages between the advanced scientific computer and the terminal environment. The main terminal input/output (TIO) function of the task controller is to manage queues which are responsible for the transfer of data between the ASC central memory and either the terminal world or the disc.

A parameter block is passed to task controller by the command requesting that a terminal input/output transfer take place. While task controller is processing the request, the initiating command will be suspended. The parameter block which is passed will contain all of the information required. The parameter block will be a terminal communication information block (TCIB) which was built by the master controller when the service request message was input to the ASC programming system or by a command sequence started to process a command parameter service call. The communications area will be updated and ready for the data transfer. The terminal communication information block will contain a pointer to the disc input/output queue entry which contains a pointer to the request control block, both of which were constructed by the calling command for the disc to central memory part of the transfer. The block of central memory required for storage of the data between transfers is obtained by task controller.

Task controller will link the queue entries provided onto the necessary queues to see that the data transfers are carried out. When they have been completed, the terminal communication information block will be passed back to the calling task and the task restarted at Call+1.

TASK CONTROLLER LIST PROCESSING

A major portion of task controller's function is accomplished through response to inputs on linked lists which task controller polls. The main polling loop of task controller monitors the lists associated with task controller processing and initiates activity to process the list entries.

To initiate a task, command controller places an entry on the task request list. When task controller finds the entry on the task request list, the task to be started is preprocessed and initiated by task controller.

Another element on task controller's polling loop is the large memory request list. Inputs on the large memory request list are similar to inputs found on the task request list in that entries on the large memory request list are task entries for the initiation of tasks. The difference is that tasks being initiated through the large memory request list require central memory usage at the page (4K words) level. Tasks such as the central processor step loader and tasks requiring peripheral I/O transfers with large central memory buffers are placed on the large memory request list. Task controller processes the large memory request list by searching the list, determining the memory requirements, and communicating with page management (a component of memory management) to determine if the central memory requirements are available. The required amount of memory is reserved when page management can satisfy the memory needs of a task entry on the large memory request list. After satisfying the memory requirements, the large memory request entry is processed in the same manner as entries from the task request list.

Task controller polls a deallocation list to determine if any task activation records are to be deallocated. The deallocation list may contain a task parameter table (TPT) or a task entry (TE). Task controller deallocates the task entry, the task parameter table and all blocks of central memory associated with the the task.

Task controller polls the disc I/O (DIO) complete list for completed disc I/O requests and determines the destination of completed disc I/O requests. If the disc input/output request was from task controller to load (disc to central memory) a task, task controller completes preprocessing and initialization of the task that was loaded. All other disc I/O requests are returned to command controller by placement on a command attention list to notify command controller of disc I/O completion.

Task controller polls the low priority terminal I/O list to determine when a terminal I/O request is complete. If the list entry indicates that the request is complete, task controller delinks the entry and deallocates the memory for that entry. If a disc I/O request is required to complete a terminal-to-disc transfer, task controller is responsible for initiating the disc input/output request. If a disc I/O request has completed and a central memory-to-terminal transfer is required, task controller initiates the transfer. Task controller also allocates and deallocates all central memory required for terminal-to-disc and disc-to-terminal transfers.

Master controller places task entries on the task complete list for SCALLs being processed in the task's virtual processor. For standard task-to-task communication, task controller completes the wrapup of the current task and preprocesses the task being requested. For disc I/O or driver manager SCALLs, task controller is responsible for passing an argument list to the particular I/O preprocessor. For terminal I/O calls, task controller passes an argument table to the terminal I/O preprocessor. Also for terminal I/O calls, task controller is responsible for initiation data transfers from disc to terminal, terminal to disc, and for providing the central memory necessary for these transfers. For central processor execution requests, task controller places the argument list passed (a step entry) onto the central processor execution list. All other SCALL types are treated as exits to command controller. Task controller places a status and function code in a command entry and places this entry on command controller's command attention list.

Breakpoint Processing

Software breakpoints in the operating system interface with the systems analyst via the master controller debug component (MCD). Prior to invoking the master controller debug component, however, all levels of control are involved in breakpoint servicing.

When a task hits a breakpoint, master controller places the task entry (TE) on a breakpoint complete list to task controller. If the breakpoint was to interrupt other executing tasks, their task entries are also placed on the breakpoint complete list. The task entry and task parameter table of the task retain sufficient task status information to allow the restart of the task. Task controller's functions at breakpoint time are to (1) gather all task entries on the breakpoint complete list associated with one breakpoint into an argument list, (2) move all associated command entries (CEs) to the command breakpoint waiting list, and (3) invoke the master controller debug component command sequence which services the argument list of task entries.

Upon the master controller debug component's completion of breakpoint servicing, command controller places the command entries back on the command processing list and task controller receives the task entries. If the task entry indicates the breakpoint halted this task during execution of the task code proper, the task is placed on the front of the high priority task processing list for restarting by master controller. If the breakpoint in another task caused this task to be terminated during the execution of a SCALL, the SCALL was allowed to complete and task controller places this task entry on the task complete list for SCALL servicing.

EXERCISE TASK FACILITIES

Task controller supports the master controller debug component by recognizing exercise tasks and servicing them in a special fasion. An exercise task is either (1) a task entered into the system after SYSGEN time on a temporary basis or (2) a system task which, during execution, will be treated as an exercise.

The task controller services for exercise tasks consist of maintaining an exercise task directory for those temporary tasks entered into the operating system by the master controller debug component user. The exercise task directory is a variable-length linked list of entries supplied by the master controller debug component. Each entry contains the exercise task's identification number as well as all of the information as specified for each system task in the system task directory, with the one exception being the disc address since exercise tasks will be central memory resident for the duration of their existence. Task controller accepts exercise task directory entries from the master controller debug, validates them with respect to their being central memory resident, in central memory flags, and enters them in the exercise task directory. Task controller also deletes entries from this directory upon request of the master controller debug component.

DISC CONTROLLER

Disc management is responsibe for the processing of all ASC disc requests. Disc requests are composed of two major categories:

(1) disc data transfers and
(2) allocation of disc space.

Disc input/output (DIO) controls the processing involved with I/O requests that require disc data transfers. Disc I/O validates disc I/O requests and builds the control blocks needed by the ASC hardware for disc data transfers. Disc I/O provides the means for scheduling of disc requests and for the optimization of disc requests according to their physical positions on the disc. Disc I/O monitors all disc I/O requests upon their completion by the disc hardware.

The disc assignment component (DAC) provides the capability to allocate disc space for user or system files. The disc assignment provides the means for recording the physical units of disc space allocated for a file, thus allowing the capability to "map" discontiguous units for a disc file. The disc assignment component also releases disc space for reassignment when a file is no longer needed ore required.

ACCESS CAPABILITIES

There is a collection of components which provides different levels of I/O control. The I/O components are:

(1) Fortran I/O (FIO),
(2) Logical I/O (LIO), and
(3) Disc I/O (DIO).

Each I/O component is relatively independent; i.e., the interfaces between them are obtained through standard system linkages and control blocks.

The logical I/O central processor subroutine provides central processor (CP) users with a logical record file concept and removes the responsibility for physical block formatting of disc records from disc I/O. Fortran and assembly language programs use logical I/O to process their disc files. Logial I/O processing provides the user the capability to transfer records between disc and central memory (CM), therefore relieving the user of responsibility of making physical disc I/O requests.

Fortran I/O is a central processor subprogram that provides an interface component between the Fortran program and logical I/O. Fortran I/O is used only during execution of a program, and a separate copy of the required components of Fortran I/O is loaded with each central processor program.

Disc I/O (a logical name which represents a group of Operating System components responsible for disc Input/Output) provides the user capabilities to access or transfer to disc physical blocks of data. Once a file is open, the user may issue a command to access the disc file. The user communicates with disc I/O through commands (i.e., READ, WRITE) contained in standard control blocks. These commands and control blocks define the type of disc I/O requests and the extent of the user's access areas.

Disc management also provides the user a standard set of system procedures for defining a disc I/O request. These procedures are used by the central processor user to allocate control block space and to define the type of disc I/O request. The request control block (RCB) shown in FIG. 14 contains the control parameters necessary for executing a disc request. A facility is also available to chain 705 or stack 700, 702 requests, but only one call is issued the system for serving the request. The system accepts the disc requests and passes them to disc input/output (DIO) for processing. Upon completion of the disc request the associated status is recorded in the request control block. A system service that tests for the completion of the disc request is provided to be called by the central processor program.

DISC MAPPING

The ASC system provides a means to map allocated disc space. "Mapping" the disc allows the user to employ virtual disc addressing, thus viewing a file as contiguous sectors on the disc. Virtual disc addressing eliminates the need to know the physical location of the allocated disc and makes that location transparent to the user.

The disc assignment component is responsible for managing the assignment of disc space and the subsequent mapping of the allocated disc space. The disc map for a file is contained in the file information block (FIB) and the disc I/O file information block (DIOFIB). The disc I/O file information block is a central memory resident table used by disc I/O to convert virtual disc addresses to absolute addresses for a disc request. The file information block is needed to retain a disc copy of the file characteristics and the disc map.

Virtual disc addresses for a disc file range from zero to some maximum. Due to virtual disc addressing the user never knows the physical location of a disc file. The disc space allocated for a disc file may be contiguous or discontiguous fragments of the disc. The following example illustrates the word format for virtual disc addresses:

```
64 WORDS = 1 SECTOR
256 SECTORS = 1 BAND
       BAND         SECTOR  WORD
BITS 0            1718    2526   31
```

The format of the virtual disc address allows the user to logically view a file as contiguous words. This is because the overflows resulting from a binary add will increment the sector or band fields as required. Thus there is no required need for individual fields for a virtual disc address.

FIG. 12 shows the relationship between the disc maps in the File Information Block, the virtual disc addresses, and the physical location of the file on disc. The example illustrated is one particular case of how a file has been allocated. For file A, there has been allocated three separate fragments of disc space. Each fragment allocated for file A has a corresponding map entry in the file information block. The first entry is disc map contains a channel entry which shows the channel address for the following map entries. The order of the disc map entries determines the order of the file. Each map entry gives the beginning absolute disc address for the associated disc fragment and the number of allocated quarter bands or whole bands. Also contained in a map entry is a field which shows the disc module address. The virtual disc addresses are converted to absolute addresses by starting with the first map entry and calculating the number of words associated with that entry. If the virtual disc address is within the calculated range, then the virtual disc address is associated with that disc map entry. If no match is found, the number of words for each disc map entry is added to the counter and compared to the virtual disc address until a match is found. Note that the total number of bands or quarter bands fields from all the disc map entries equals the maximum virtual disc address.

DISC INPUT/OUTPUT COMPONENTS

The task controller disc preprocessor and disc controller are logically combined under the heading of disc I/O to facilitate the following discussion.

The disc I/O system consists of two basic components:

(1) task controller disc preprocessor, and
(2) disc controller (DC).

The above mentioned components are serially reusable and are central memory resistant code. Task controller disc preprocessor and task controller execute in the same virtual processor. Disc controller executes in its own dedicated virtual processor.

FIG. 13 illustrates the flow of a disc request and the interrelationship between disc controller and task controller disc preprocessor. To use this diagram, follow in order the alphabetical path and read the corresponding description:

(a) SCALL to task controller (TC) with a disc I/O request.

(b) task controller links the disc request on a list and passes control to the task controller disc preprocessor (TCDP).

(c) the task controller disc preprocessor validates the disc request, builds a communication area (CA), and links the communication area on a list which initiates the disc controller (DC).

(d) the disc controller schedules the disc request.

(e) the disc controller links the communication area on a disc channel list which drives the disc hardware.

(f) the disc request has physically been serviced by the disc hardware.

(g) the disc controller notes the completion of the disc request in the disc channel list.

(h) the disc controller delinks the completed communication area and shows completion of the disc request to the task controller.

(i) the task controller notes completion of the disc request and informs command controller.

(j) the program which issued the disc request is notified of completion or restarted if in a "Wait" state.

Task Controller Disc Preprocessor (TCDP)

The task controller disc preprocessor validates the user disc I/O request, allocates central memory to be used for communication areas (CA), and builds the communication areas that are used by the disc data channels for the actual transfer of data betwen central memory and the disc.

TCDP is a list driven component. A list entry is placed on one of three disc I/O request lists by task controller before TCDP is called. Task controller calls TCDP as a subroutine through the vector table. There are three priority disc I/O request lists, the highest priority being used for one inch streaming tapes. Although the list entry is the only form of input for TCDP, the list entry contains pointers to control blocks. These control blocks contain the information necessary to service a disc I/O request.

TCDP validates all user I/O requests to insure proper use of the disc. Depending upon the type of disc I/O user, the TCDP validates the (1) request control block (RCB),
(2) file use,
(3) central memory use, and
(4) disc file appendages.

When errors are detected during validation, the appropriate status is recorded and the request control block aborted.

Upon successful completion of a disc request validation, the TCDP then converts the user's virtual disc address to an absolute disc address. The virtual disc address is converted to an absolute disc address by using the disc map contained in the file information block (FIB) to calculate the physical location on disc. TCDP also determines if a discontiguous break in disc space has occurred by adding the number of words (to be transferred) to the beginning absolute disc address and then checking the disc map for that file. For every discontiguous disc break that occurs for an I/O request, there will be built a corresponding communication area.

Communication areas (CAs) are allocated and built by TCDP upon completion of request validation and absolute disc address calculations. The communication areas are used by the disc hardware to obtain the information that is required for the actual disc data transfers. After being built, a communication area is linked on one of two lists which initiates disc controller processing. TCDP returns to the task controller when an error condition occurs or all communication areas have been built for a given request control block. When all the communication areas have been built for a disc I/O request (more than one request control block may compose a disc I/O request), the disc request list entry is removed from the TCDP input list and placed on an "in process" list.

One other function of TCDP is to provide the disc controller the linkages needed to relate completed communication areas to the originating

Disc Controller

The disc controller (DC) is composed of three major subcomponents:
(1) priority scheduler,
(2) post request processor, and
(3) disc optimization.

Priority Scheduler

The priority scheduler is basically a "polling loop" which determines the order of events that are to take place in disc controller. The priority scheduler may also be considered as the nucleus of disc controller which initiates "actions". Actions are initiated as a response to some scheduling decision. The three major action groups are:
(1) scheduling and linking communication areas on the disc channel lists (disc optimization),
(2) completion of disc I/O requests (post request processor), and
(3) error processing.

There are three basic inputs that priority scheduler uses in the analysis for the determination to start an action:
(1) the communication area input lists,
(2) completed communication areas on a channel list, and
(3) detection of communication register (CR) file error conditions.

Any severe system error conditions that are detected will be processed first and cause the disc controller to stop processing. When a parity error is detected for a completed communication area, priority scheduler will reschedule the communication area so the error may be corrected. Part of priority scheduler's work is to determine if any CAs have been completed by the disc hardware. If a high priority CA on a disc channel list has been completed, then priority scheduler will schedule this communication area (CA) for postprocessing before entries on the CA input lists. There are two priority CA input lists in which entries are supplied by task controller disc preprocessor. The priority scheduler will schedule the highest priority list entries first for processing. In summary, priority scheduler provides the analysis necesary to determine what action is to take place next in disc controller.

Disc Optimization

Disc Optimization is activated by priority scheduler as an action. The basic function of disc optimization is to schedule and link communication areas on the disc channel list for disc hardware processing.

The majority of disc optimization's work is done in the scheduline of communication areas. Scheduling is basically determining the placement of a communication area on one of the disc channel lists according to:

(1) a communication area's priority,
(2) the first-in-first-out (FIFO) method,
(3) the current physical position of the disc in relation to disc head, otherwise known as the shortest-access-time-first method, and
(4) the size of the data transfer.

As a result of scheduling, communication areas are not necessarily placed on the disc channel lists in the same order as received from task controller disc preprocessor. Some previously scheduled communication areas (non-priority) can have their positions altered on the disc channel lists by disc optimization. Sector addressing conflicts between (previously scheduled) non-priority communication areas and a priority communication area (that is yet to be scheduled) can cause the repositioning of non-priority communication areas on the disc channel list so the priority communication area can occupy that contested position. Priority requests are scheduled first because they are time dependent. When a communication area has been scheduled and linked on a disc channel list by disc optimization, control is returned to priority scheduler.

Post Request Processor

The post request processor is initiated by the priority scheduler when the decision has been made to process a completed communication area from one of the disc channel lists. The post request processor processes completed communication areas by:
(1) monitoring the completion of the total disc request,
(2) special processing for the streaming of seismic tapes,
(3) calculating the current end-of-file (EOF) after writing data to the disc,
(4) releasing central memory resources used for communications areas' construction, and
(5) detecting and recording error conditions.

Post request processor is primarily responsible for completion of the total disc I/O request. In the majority of disc I/O requests, there will be associated several communications areas. Since the scheduled communications areas for a given disc request will complete at different points in time, there must be provided a method to record communications areas completions. FIG. 14 illustrates how post request processor controls the completion of a disc request.

The arrows (PTR) illustrate the linkages provided for post request processor to access the different control blocks associated with a disc request.
(a) a list entry is provided for each disc I/O request,
(b) the request control block counter is associated with each disc request and denotes the number of request control blocks to be processed.

When all communications areas have been completed for a given request control block, then the request control block counter is decremented by one. If the request control block counter equals zero, then the disc request has completed.
(c) a master communications area is built for each request control block and is used to control communications areas completions for the request control block. The master communications area also provides a point of collection for status information.
(d) the communications areas counter is contained within the master communications area and shows the number of outstanding communications areas for a request control block. When a communications area completes, the communications area counter is decremented by one. If the communications areas counter equals zero, then all communications areas have been completed for request control block.

Upon completion of a disc I/O request, post request processor passes the completed request to task controller and returns control to priority scheduler.

Having described the control system for the computer of which the invention forms a part, the stoed program processors of the invention are now described.

OPEN

.1 Purpose: The Open component prepares a disc file for processing. Before a file is actually allocated the open command is issued from the source language which initializes the necessary tables for disc file processing. As information is to be written on discs the tables contain the addresses of the file on the disc.

.2 Characteristics: Command.

.3 Input: The caller of the Open Command must supply a two word argument table with:
  A. A FCB Pointer
  B. A function code
    .1 FCB Parameters (See Table PP4)
      A. Function
      B. Either an Access Name or a Disc Address
      C. Intended Use
      D. If disc space is to be initially allocated for the file; the Allocation Initial, Allocation Increment, Allocation Maximum, and LIO characteristics.
    .2 Function Code (in argument table): The function code is used to determine whether the Command ID or Job ID is to be used as a referencing command ID. Function Code may be:
      A. Zero-Command ID will be used
      B. Not Zero-Job ID will be used
    .3 Access Name List Pointer: If an Access Name is used, Command Controller will supply as input to Open a pointer to the Access Name List.

.4 Output: Open constructs any control blocks necessary for the user to access the file; a System Open File Table Displacement and/or completion code is returned via the File Control Block. Open also returns the LIO characteristics via the FCB when Opening a file which has been previously allocated.

.5 Interfaces:
  Components Called:
    Disc Assignment Component (DAC)
    DIO
    Memory Management
  Tables and Data Blocks Used/Modified:
    System Open File Table (SOFT)
    Referencing Command List (RCL)
    File Information Block (FFIG)
    PIO File Information Block (PIOFIB)
    Access Name List (ANL)
    File Control Block (FCB)
    Logical File Control Block (LFCB)
    Waiting Command List (WCL)

.6 Description:
The basic function of Open is to provide a PIOFIB, properly connected to the system data structure, so that the caller of open may perform I/O operations on a file.

If the file being opened is already open to other users and if the conditions for file sharing are met, the new user will share the existing PIOFIB.

If the file being opened is already open and conditions for file sharing are not met, the identity of the opening command is placed in the waiting command list so that Command Controller may determine when to re-initiate the open request for that command.

If the file being opened is not already open, a new PIOFIB is constructed for the file, and it is connected to the system data structure by addition of an entry to the System Open File Table.

Whenever a file is opened, the identity of the opening command is placed in the Referencing Command list associated with the file; and the location of the System Open File Table entry pertaining to the file is placed in a location such that Close may access this SOFT Entry.

Other functions are performed depending on the options of the open.

If the file to be opened exists on disc prior to the open, the file may be identified to open directly by its disc address or indirectly by an access name.

If the disc address is supplied directly, Open searches the System Open File Table to locate the PIOFIB which exists if the file is already open.

If the file is not already open, the disc address is used to acquire the file's FIB from the disc so that a PIOFIB can be constructed.

If an access name is used, the disc address is obtained from an entry in the access name list of the JPT. The access name entry must have been made prior to the open by use of either the ASG process or FI process. The entry may also have been made by the JF process, provided that some previously executed command of the job had caused the allocation of the disc space for the job.

If the file to be opened does not exist on disc prior to the open, and it is not a step local file, open may be used to create the file on disc. Two forms of open may be used for file creation: (1) If the allocation option is specified in the open request, the file is created; and the disc address of the file is returned to the opener. No access name is used. (2) If an access name is supplied in the open request and the corresponding access name list entry (in the JPT) indicates that the file does not exist on disc, the file is created; and the disc address of the file is placed in the access name entry. Such an access name entry must have been made prior to the open by use of the JF process.

The open process for a step local file is equivalent to the open process when allocation is requested. However, instead of returning the disc address of the file to the opener, an access name list entry is created and the address placed in it. The access name to be used for the file must be supplied by the opener.

The access name list used for step local files is separate from that used for other files.

Further, each step has its own step local access name list. Therefore, the access names used for step local files need be unique only for the step. Two steps of a job may use the same step local access name (for different step local files.)

The step local process is different than the JF process (with allocation) in that the access name list entry created by open is removed from the list when the file is closed.

The opening of a sysout file is the same as the opening of a step local file. However, when the sysout file is subsequently closed, the file is not released; but it is recorded in the job log for later printing or punching. The access name must be supplied in the FCB.

The Open process for a Step Created Job Local File

R—Required
O—Optional
N—Not Used
I—Required when file is Initially allocated

TABLE PP1

| FUNCTION | FCB PARAMETERS | | | | | | | |
|---|---|---|---|---|---|---|---|---|
| | Access Name 1st 4 Chars | Access Name Last 4 Chars | Intended Use | Allocation Initial | Allocation Increment | Allocation Maximum | Record Size Block Size | LIO Flags Key Size |
| Access Name | R | R | R | O | O | O | I | I |
| Disc Address | R | N | R | N | N | N | N | N |
| Disc Allocation | N | N | R | R | R | R | R | R |
| Step Local | R | R | R | O | O | O | I | I |
| Sysout | R | R | R | O | O | O | I | I |
| Step Local Job File | R | R | R | O | O | O | I | I | is similar to a Step Local open except the Access Name must be unique for the job. The Access Name List Entry becomes a part of the JPT Access Name List. The opener supplies the Access Name. The Entry is treated exactly the same as a JF Type Open after disc space is allocated for the file. Unless Closed with the release option, the Entry will remain a part of the JPT Access Name List until termination of the job.

A request to open a file which requires initial allocation of disc space will cause the LIO characteristics from the caller's File Control Block (FCB), to be transferred to File's File Information Block (FFIB) and PIOFIB.

EXCEPTION: Access Name Open of a Job File with an LIO card processed for that Access Name prior to the Open request will cause the LIO characteristics in the Access Name List Entry to be transferred to the FFIB, PIOFIB, and caller's FCB.

A request to open a file which has already been allocated disc space will cause open to put the LIO characteristics into the caller FCB from either the Access Name List Entry (if an LIO card had been processed), or the PIOFIB (if no LIO card has been processed).

The Open process is controlled by the function field of the FCB.

Access Name—indicates use of an access name to locate an existing file, with creation of a JF file is required.

Disc Address—indicates use of the disc address to locate the file.

Step Local File—indicates that the file is to be created as a step local file.

Disc Allocation—indicates that the file is to be created and the disc address of the file returned to the opener.

Sysout File—indicates that a sysout file is being created.

Step Created Job Local File—indicates that the file is to be created by the same process as a step local, but the file can exist for the duration of the job. The FCB function code msut be specified according to the type of open to be performed.

Table PP1 indicates which parameters must be supplied for each function.

The Status of the Open command is indicated in the FCB. Open will return a completion code of zero if the open was successful, otherwise the completion code will indicate an error completion encountered during the process of opening. If the completion code requires further description, a modifier is also returned.

Table PP2 indicates the parameters which may be modified by the open process (excluding the status, completion code, and modifier). Complete words not modified are not shown.

S—Same (Not modified)
R—Returned with successful open
L—Modified if an LIO card has been processed, or file has been allocated
N—Not Returned

TABLE PP2

| | FBC PARAMETERS | | | | |
|---|---|---|---|---|---|
| | 1st Four Chars Access Name | Record Size Block Size | LIO Flags Key Size | SOFT Displacement | ANLE Pointer |
| Function Access Name | S | L | L | R | R |
| Disc Address | S | L | L | R | N |
| Disc Allocation | R | S | S | R | N |
| Step Local | S | S | S | R | R |
| Sysout | S | S | S | R | R |
| Step Created Job Local File | S | L | L | R | R |

Each request to open a file is validated to determine that the intended activity is compatible with the state of the file. The state of a file is catagorized as:

(0) Closed (or not open)
(1) Open with one read user
(2) Open with one write user
(3) Open with one read/write user
(4) Open with N shared read/writer user
(5) Open with N shared Read users Table PP3 indicates the file states with which each intended file activity is compatible.

TABLE PP3

| ACTIVITY | STATE | | | | | |
|---|---|---|---|---|---|---|
| | 0 | 1 | 2 | 3 | 4 | 5 |
| Read Exclusive | yes | no | no | no | no | no |
| Write Exclusive | yes | no | no | no | no | no |
| Read/Write Exclusive | yes | no | no | no | no | no |
| Shared Read/Write | yes | no | no | no | yes | no |
| Shared Read | yes | no | no | no | no | yes |

If the intended file activity is incompatible with the state of the file, the open will not be completed; the command ID will be placed in the Waiting Command List. When the file is closed by all users, Close will pass a pointer to the Waiting Command List (WCL) to Command Controller. Command Controller will then reinitiate the Open request for those commands which are waiting.

If the file is being created by open, it will be treated as a not open file for the purpose of validation.

If the open is successful, the file's PIOFIB is updated to indicate changes of state caused by the open.

Each request to open a file by Access Name is validated to determine that the caller has permission to carry on his intended activity. Permission may be to read, write, or to execute the file.

If the open cannot be completed because the intended activity is not compatible with access permission, the open will not be completed and an error comcompletion code will be returned.

For any open, logical file characteristics are collected and merged.

Sources of characterisitics are:
LIO card (characteristics in access name entry)
LFCB
file's FIB The set of characteristics which result are placed in the FCB.

If open is required to perform a disc allocaion, the size specifications may be obtained from two sources:
(1) The FCB used for the request;
(2) The access name list entry (for a JF allocation only).

If the disc allocation option or step local file option is specified, any sizes specified in the FCB are used.

If the access name option is specified and the file is a non-allocated JF file, the sizes may be obtained from both the access name list entry and the FCB. The size values are placed in the access name list entry by the JF process. If any of the three sizes is specified in both the FCB and the access name list entry, the largest value is used. If zero sizes are specified, zero values will be used.

If any error is detected by open, the control blocks involved are returned to their original state. The error is reported to the caller via the completion code and completion code modifier fields in the FCB.

.1 File Control Block: The File Control Block may be in any CM location. See Table PP4.

TABLE PP4

|  | Byte 0 | Byte 1 | Byte 2 | Byte 3 |
|---|---|---|---|---|
| Word 0 | Not Used | Function | Not Used | |
| 1 | Access Name (4 Chars) or Disc Address | | | |
| 2 | Access Name (last 4 Chars) | | | |
| 3 | USE | Status | C. Code | C. Mod |
| 4 | Displacement to SOFT Entry | | | |
| 5 | Allocation Initial | | | |
| 6 | Allocation Increment | | | |
| 7 | Allocation Maximum | | | |
| 8 | Pointer to Access Name List Entry | | | |
| 9 | Record Size | | Block Size | |
| 10 | LIO Flags | | Key Size | |

In the File Control Block:

| | | |
|---|---|---|
| Word 0 | Byte 0: | Not Used |
| | Byte 1: | 0 indicates Access Name Open |
| | | 1 indicates Disc Address Open |
| | | 2 indicates Disc Allocation Open |
| | | 3 indicates Step Local File Open |
| | | 4 indicates Sysout File Open |
| | | 5 indicates Step Created Job File Open |
| Word 0 | Bytes 2 & 3: | Not Used |
| Word 1: | | If Access Name required, first 4 char. of Access Name; if Disc Address Open, Disc Address of File's FIB. |
| Word 2: | | If Access Name required, last 4 characters of Access Name. Otherwise, not used. |
| Word 3 | Byte 0: | Intended Use |
| | | 0 None |
| | | 1 Read Only (One User) |
| | | 2 Write Only (One User) |
| | | 3 Read and Write (One User) |
| | | 4 Shared Read and Write (N Users) |
| | | 5 Shared Read (N Users) |
| | | 8 Execute |
| | | 9 Indicates F10 Request |
| | Byte 1: | Status of Open Process |
| | | 0 Not Started |
| | | 1 In Process |
| | | 2 Complete |
| | Byte 2: | Completion Code |
| | | 0 Successful Completion, return to caller |
| | | 1 Parameter Conflict, return to caller |
| | | 2 Unable to locate Access Name Entry, return to caller |
| | | 3 Disc Address not address of a FIB, return to caller |
| | | 4 Attempt to open file already opened by caller Command (Not yet closed), return to caller |
| | | 5 Conflict of intended use and access permission. (Byte 3 contains permission), return to caller |
| | | 6 Parity Error encountered attempting to read the FFIB, return to caller |
| | | 7 Unable to obtain disc space for allocation, return to caller, open may write MSG to Joblog |
| | | 8 Attempt to duplicate access name of a step local file, return to caller |
| | | 9 Access Name Entry's type inappropriate, return to caller, open may write MSG to Joblog |

TABLE PP4-continued

| | | |
|---|---|---|
| Byte 3: | Completion Code Modifier if C. Code 5, permission allowed | |
| | 0 None | 4 Execute |
| | 1 Read | 5 Execute and Read |
| | 2 Write | 6 Execute and Write |
| | 3 Read and Write | 7 Execute, Read and Write |
| | If C. Code 9, Access Name List Entry's Type | |
| Word 4: | The displacemewnt to the SOFT Entry for PIOFIB Pointer and Disc Address of the File. | |
| Word 5: | Allocation Initial if disc allocation is to be performed; specifies initial allocation to be acquired. | |
| Word 6: | Allocation Increment - Amount of disc space in sectors to be added when current end of file is reached. | |
| Word 7: | Allocation Maximum - Maximum size in sectors the file will be allowed to attain. An attempt to write beyond end of file after maximum size is attained will fail. | |
| Word 8: | Contains a pointer to the Access Name List Entry. Open puts this pointer in the FCB after Open confirms that an entry has been made for the Access Name. | |
| Word 9 Left: | Record Size (Logical Record Size in Words) | |
| Right: | Block Size (Logical Block Size in Words) | |
| Word 10 Left: | L10 Flags | |
| Bits 0 & 1: | Record Type | |
| | 0 FIXD | 2 VARV |
| | 1 VARF | 3 WDCT |
| Bit 2: | Block Type | |
| | 0 FIX | 1 VAR |
| Bit 3: | Access Method | |
| | 0 Sequential | 1 Keyed |
| Bit 4: | Subfile | |
| | 0 No | 1 Yes |
| Bit 5: | Stream | |
| | 0 No | 1 Yes |
| Bit 6: | ASC Tape | |
| | 0 No | 1 Yes |
| Bit 7: | Abort/Accept | |
| | 0 Abort | 1 Accept |
| Bits 8-15: | Not currently used | |
| Word 5 Right: | Key size (in words) | |

.2 Files File Information Block (FFIB):

The FFIB is the first two sectors of the file (on disc). It contains the LIO characteristics by which the file was created to be accessed. The FFIB also contains the Disc Map and information needed by File Management. Table PP5 (on the following page) shows the fields of the FFIB and a description of the fields follow:

TABLE PP5

File Information Block - FFIB

| Word | Byte 0 | Byte 1 | Byte 2 | Byte 3 |
|---|---|---|---|---|
| 0 | * | F | I | B |
| 1 | File Management | | User Count | Type |
| 2 | Record Size | | Block Size | |
| 3 | LIO Size | | Key Size | |
| 4 | Inactive File Chain Pointer | | | |
| 5 | SOFT Disp. for Catalog File | | | |
| 6 | VDA of Catalog Node (NHL) | | | |
| 7 | Sign Indic | Version No. | RW Flag | Erase |
| 8 | Current End of File (VDA) | | | |
| 9 | Current Allocation | | | |
| 10 | Allocation Increment | | | |
| 11 | Allocation Maximum | | | |
| 12 | # Map Entries | Not Used | Lst CH Mod Used | Bad Band |
| 13 | Channel - First Map Entry | | | |
| 14 | Second Map Entry | | | |
| 15 | Map Entry } up to 112 map entries | | | |
| . | Map Entry | | | |
| 127 | | | | |

| | | |
|---|---|---|
| Word 0: | *FIB - to identify a File FIB (used as validation) | |
| Word 1 Byte 0 & 1: | Used by File Management | |
| Byte 2: | User Count - the number of users who have referenced the file. | |
| Byte 3: | Type of File | |
| | 0 Step local | 3 Catalogued File |
| | 1 Address Opened/Allocated | 4 FI Created File |
| | 2 JF File | 5 Sysout File |
| Word 2 Left: | Record Size (Logical record size in words) | |
| Word 2 Right: | Block Size (Logical record size in words) | |
| Word 3: | Same as description of Word 10 in the FCB | |
| Word 4: | Inactive File Chain Pointer - DA of next file on inactive chain | |
| Word 5: | Location in the SOFT of the entry for the catalog which references | |

TABLE PP5-continued

File Information Block - FFIB

| | |
|---|---|
| | this file |
| Word 6: | Catalog Node VDA |
| | Virtual Disc Address of the Node Header |
| | List for the catalog node |
| Word 7 Byte 0: | Sign Indic - Indicates the form and sign of the version number |
| | 0  Not specified         2  Positive signed number |
| | 1  Unsigned number       3  Negative signed number |
| Byte 1: | Version Number in the form specified by Sign Indic - (Binary #) |
| Byte 2: | RW Flag (Read/Write Flag) |
| | 0  Read Copy of Catalogued File |
| | 1  Write Copy of Catalogued File |
| Byte 3: | Erase Flag - Set by release when the file is made inactive |
| | 0  indicates the file need not be erased when released |
| | 1  indicates the file is to be erased |
| Word 8: | Current EOF (VDA) - The virtual address of the word after the |
| | last word which was written into the file is also the number of |
| | words which have been written into the file. |
| Word 9: | Current Allocation - The number of words allocated for the file. |
| Word 10: | Allocation Increment - The number of words to be added to the |
| | file allocation when an attempt is made to write at current EOF |
| | (or beyond). |
| Word 11: | Allocation maxiomum - The maximum number of words which can be |
| | allocated for the file. |
| Word 12 Byte 0: | Number of Map Entries |
| Byte 1: | Not Used |
| Byte 2: | Last Channel/Mod. Used |
| Byte 3: | Not Used |
| Word 13: | Map Channel Entry/First Map Entry (Absolute Disc Address of FFIB) |
| Word 14-127: | Map Entries - One Map Entry for each contiguous extent of the file. |
| .3 PIOFIB | |
| | The PIOFIB is constructed of Queue Blocks, with the SOFT (System Open File Table) containing an entry for each opened PIOFIB. The number of Queue Blocks for the PIOFIB is variable depending on the length of the Disc Map. |

TABLE PP6

PIOFIB

| Word | | | | |
|---|---|---|---|---|
| 0 | Forward Pointer | | | |
| 1 | Back Pointer | | | |
| 2 | P | F | I | B |
| 3 | Modify | State | Not Used | Type |
| 4 | Record Size | | Block Size | |
| 5 | LIO Flags | | Key Size | |
| 6 | Current End of File (VDA) | | | |
| 7 | Current Allocation | | | |
| 8 | Allocation Increment | | | |
| 9 | Allocation Maximum | | | |
| 10 | # Map Entries | Not Used | Last Chnl/ Mod Used | Not Used |
| 11 | Channel - First Map Entry | | | |
| 12 | Second Map Entry | | | |
| 13 | Third Map Entry | | | |
| 14 | Fourth Map Entry | | | |
| 15 | Fifth Map Entry | | | |

Queue Block 1

| | |
|---|---|
| Word 0: | Pointer to next queue block if map entries exceed the limits of first queue block. |
| Word 1: | Pointer to Chain Header |
| Word 2: | PFIB - to identify PIOFIB. Used for validation by DIO. |
| Word 3 Byte 0: | Modify (to determine if FFIB has been modified) |
| | 0  indicates the FFIB has not been modified by DIO and will not be updated when closed |
| | 1  indicates the FFIB has been modified by DIO and will be updated when closed. |
| Byte 1: | State - current use of file |
| | 0  None                3  Read and Write |
| | 1  Read Only           4  Shared Read and Write |
| | 2  Write Only          5  Shared Read |
| Byte 2: | Not Used |
| Byte 3: | Type |
| | 0  Stop Local                       3  Access Name Opened: Catalogued File |
| | 1  Address Opened/Allocation |
| | 2  Access Name Opened: JF File      4  Access Name Opened: FI File |
| |                                5  Sysout File |
| Words 4 & 5: | Description same as FCB words 9 and 10. (See Table PP4) |
| Word 6: | Virtual Disc Address of the Current End of File |

TABLE PP6-continued

PIOFIB

| | | |
|---|---|---|
| Word 7: | | Current Allocation in Sectors |
| Word 8: | | Allocation Increment in Sectors |
| Word 9: | | Allocation Maximum in Sectors |
| Word 10 | Byte 0: | Number of Map Entries |
| | Byte 1: | Not Used |
| | Byte 2: | Last Channel/Mod. Used |
| | Byte 3: | Not Used |
| Word 11: | | Map Channel Entry and First Map Entry |
| Words 12-15: | | Second thru Fifth Map Entries |
| Queue Block 2: | | Queue Block 2 and any others required to enter Map Entries are constructed as follows: |
| Word 0: | | Pointer to next Queue block for Map Entries |
| Word 1: | | Back Pointer to preceding Queue block of this PIOFIB |
| Words 2-15: | | Map Entries |
| | | As many as are needed to contain the map will be used. |
| .4 | | System Open File Table (SOFT) The SOFT will contain one entry for each disc file which is open. When a file not previously opened is opened, Open will make a six-word entry in the SOFT. If the file has already been opened, Open will increment the open count. Entries will be removed by Close when a file is closed to all users. The table will occupy one contiguous block of Central Memory. The address of the table will be contained in a system vector table. An entry may be addressed by displacement from the table origin. The entry of the table will contain: |
| Word 0: | | Disc Address of File - to identify the file, may be used as key to search table. |
| Word 1: | | CM address of PIOFIB |
| Word 2: | | Pointer to the end of PIOFIB chain |
| Word 3: | | Waiting Command List Pointer |
| Word 4: | | Referencing Command List Pointer |
| Word 5 | Byte 0: | Open Count (Number Commands which have opened the file) |
| | Byte 1: | Swap Count (Number Commands which have opened the file and are currently swapped out) |
| | Byte 2: | For File Management of Catalogs |
| | Byte 3: | Wait Count (Number Commands waiting to open the file) |

The first two words of the table are reserved for determining if the table should be expanded or reduced in size, and whether there is room to make a new entry. Table PP7 shows some of the various ways a SOFT Entry may look.

All addressing of PIOFIBs will be made indirectly through the table; no other element of any data structure will contain the memory address of a PIOFIB.

A list of the commands which have opened the file. Each command will be identified by a one-word name. The name is supplied by Command/Task Controller in a fixed location of every CPT.

When a file is opened for the first user, the Command ID is put in the SOFT entry. If the open count is ≧2, the RCL pointer is in the SOFT entry and the users Command IDs are contained in the Referencing Com-

TABLE PP7

System Open File Table

| Word | | | | |
|---|---|---|---|---|
| 0 | Length of Table (allocated words) | | | |
| 1 | Current Number Entries in SOFT | | | |
| 2 | Disc Address of File | | | Entry format with one referencing command and no commands waiting to open the File. |
| 3 | PIOFIB Pointer | | | |
| 4 | PIOFIB End Pointer | | | |
| 5 | Zeros | | | |
| 6 | Referencing Command ID | | | |
| 7 | O.C.=1 | SC=0 | FM | WC=0 |
| 8 | Disc Address of File | | | Entry format with more than one referencing command and 1 command waiting to open the file. |
| 9 | PIOFIB Pointer | | | |
| 10 | PIOFIB End Pointer | | | |
| 11 | Waiting Command ID | | | |
| 12 | RCL Pointer | | | |
| 13 | O.C.>1 | SC=0 | FM | WC=1 |
| 14 | Disc Address of File | | | Entry format with more than one referenceing command and more than one command waiting to open the File. |
| 15 | PIOFIB Pointer | | | |
| 16 | PIOFIB End Pointer | | | |
| 17 | WCL Pointer | | | |
| 18 | RCL Pointer | | | |
| 19 | O.C.>1 | SC=0 | FM | WC>1 |
| 20 | Next SOFT | | | |
| 21 | Entry | | | |

.6.5 Referencing Command List (RCL):

mand List. The Command IDs remain in the RCL for as long as the Open Count is $\geq 2$. When the Open Count=1, the remaining Command ID will be placed in the SOFT entry (RCL pointer word), and the list will be released to Memory Management.

Command IDs will be added to the RCL by Open and removed by Close. The number of entries in the RCL is given by the Open count of the SOFT.

The RCL will be allocated in contiguous blocks of $2^n-2$ but not less than $2^3-2$. The first word of the RCL will indicate the size of the list. The SOFT entry's Open Count will represent the number of referencing command IDs in the list.

.6 Waiting Command List (WCL):

A list of commands which have attempted to open the file but cannot because the state of the file is not compatible with the intended use of the file.

The WCL will be allocated in contiguous blocks of $2^n-2$, but not less than $2^3-2$.

When all users who have opened the file close the file, Close will pass a pointer to Command Controller in an augment table. Command Controller will then re-initiate the open request for the commands in that list.

The first word of the WCL will indicate the size of the list until the file is closed to all users. Before Close passes the list to Command Controller, the size of the list will be removed. The first word of list will then be used to indicate the number of command IDs which are in the list. Command Controller will be responsible for releasing the CM used for the list to Memory Management.

.7 Access Name List Entry:

Access name list entries are part of the Job Queue. One entry is made for each access name defined in the job. The entries are made by Catalog Look Up (preprocessing for names defined by ASG, FI and JF cards, and by Open for Step Local and Sysout Files. Step Local and Sysout Files access name list entries are linked off the step's CPT. No other card may cause modification of the LIO characteristics for an existing entry. (See Table PP8)

TABLE PP8

Access Name List Entry

| Word | | | | |
|---|---|---|---|---|
| 0 | Forward Pointer | | | |
| 1 | Back Pointer | | | |
| 2 | Access Name (1st 4 Chars) | | | |
| 3 | Access Name (Last 4 Chars) | | | |
| 4 | Record Size | | Block Size | |
| 5 | LIO Flag | | Key Size | |
| 6 | Type | LIO Card | Open Count | Access Attributes |
| 7 | } Contents Depends on Type | | | |
| 8 | | | | |
| 9 | | | | |
| 10 | Allocation Initial | | | |
| 11 | Allocation Increment | | | |
| 12 | Allocation Maximum | | | |
| 13 | SOFT Displacement for PIOFIB | | | |

Words 0 & 1: For Memory Management
Word 2: First Four Characters of Access Name
Word 3: Last Four Characters of Access Name
Words 4 & 5: Description Same as Words 9 & 10 of FCT (Table PP4)
Word 6 Byte 0: Entry Type
  1 Entry Made by JF Card; file not allocated
  2 Entry Made by JF Card; file allocated
  3 Entry made by ASG Card; file not on disc
  5 Entry made by ASG ; copy of file on disc
  6 FI File, on disc, ready to open
  7 Entry made by Open; Step Local File
  8 Entry made by Open; Sysout File
  9 File is prepared for PCU by FI (Open will allocate for PCU)
Byte 1: LIO Card
  0 LIO Card not processed
  1 LIO Card has been processed
Byte 2: Open Count (the number of steps in the job which have used this access name to open the file)
Byte 3: Access Attributes (0 - no permission, 1 permission)
  Bit 28 = Read Attribute
  Bit 29 = Write Attribute
  Bit 30 = Execute Attribute
  Bit 31 = File has been locked
Words 7, 8 & 9: Contents Depends on Type (Word 6 Byte 0)
  Type 1 = JF not allocated
  Word 7, 8 & 9 not used
  Type 2 = JF allocated
  Word 7 - FFIB Pointer (DA of File)
  Words 8 & 9 - Not used
  Type 3 = ASG - no file on disc
  Word 7 Not used
  Word 8 - SOFT displacement for Catalog File
  Type 5 = ASG
  Word 7 - FFIB Pointer (DA of File)
  Word 8 - SOFT displacement for Catalog File
  Word 9 - VDA of Catalog Node (NHL)
  Type 6 = FI File, ready to open
  Word 7 - FFIB Pointer (DA of File) (This is entered by FI not by CLU.)
  Words 8 & 9 - Not used

TABLE PP8-continued

| | Access Name List Entry |
|---|---|
| | Type 7 & 8 = Step Local or Sysout File |
| | Word 7 - FFIB Pointer (DA of File) |
| | Words 8 & 9 - Not used |
| | Type 9 = FI File, not on disc |
| | Words 7, 8 & 9 - Not used |
| Words 10, 11, 12: | Will contain disc parameter information for some types. If no disc parameters are found in FCB or ANLE, system default parameters are used. |
| Word 13: | After the file is opened, a displacement to the SOFT entry is placed in ANLE Word 13. |

.7 Tasks of the Open Command
  A. OPP-Open Preprocessor
  B. ODS-Open Disc Space
  C. OFC-Open File Component
  D. VSC-Validation Search Component
  E. WCP-Waiting Command Processor
  F. SEP-SOFT Expansion Processor
.1 Task Name: OPP
  .1 Entry Point: OPN (Entry to the Open Command.)
  .2 Input: Argument Table containing:
    A. Command/Job ID
    B. ANL Pointer
    C. FCB Pointer
  .3 Output: Variable-dependent on exit
    A. ANLE Pointer
    B. Error Completion Codes
  .4 Description: OPP determines the function to be performed. If the open is for an allocated file by Access Name or disc address, a call is made to OFC. If the open is for an unallocated file, OPP determines that (or creates if the function so dictates) a valid Access Name List Entry exists for Access Name unallocated opens. OPP calls task ODS for Disc Allocation Function (FCB) and Access Name opens on unallocated files.
    A. ANLE—this subroutine searches the Access Name List to determine if any entry exists with the Access Name supplied. If no entry exists, ANLE gets a Nucel and causes it to be linked to the Access Name List. If an entry exists, a pointer to that entry is returned.
    B. ANLS—this subroutine searches the ANL for a given Access Name. If found, a pointer to the entry for that access is returned. If not found, a function code is returned which indicates an entry was not found.

Flowcharts for OPP are shown in FIGS. P1–P3.
.7.2 Task Name
  .1 Entry Point ON1
  .2 Input
    A. FCB Pointer
    B. ANLE Pointer
  .3 Output: A CM complete FFIB.
  .4 Description:

ODS gets 126 words of CM to build a FFIB. The allocation parameters are determined and put in the FFIB. The largest parameter values will be used. A call is made to DAC with return to call+1.

Upon return from DAC, the absolute disc address is formed and put in the FCB or ANLE, whichever is applicable. The LIO characteristics are transferred to the FFIB and also to the FCB if an LIO card has been processed and the ANLE indicates a Job File is being opened.

The appropriate type is set in the FFIB and the user count is set to one.

ODS uses one subroutine:
  OPNSHIFT-this subroutine insures that an allocation request which is to the word level is increased by one quarter band if any of the twelve low order bits are set. The reason for this subroutine: DAC shifts out the twelve low order bits to determine the number of quarter bands requested.

Flowcharts for ODS are shown in FIGS. P4–P9.
.7.3 Task Name OFC
  .1 Entry Point ON2
  .2 Input:
    A. CM FFIB Pointer
    B. ANLE Pointer
    C. Function Code (determines calling task)
  .3 Output
    A. FCB Completion Code
    B. PIOFIB (Soft Displacement)
    C. Necessary Control Linkage for file access.
      1. Disc Address
      2. Soft Entry
      3. Referencing Command List
  .4 Description: OFC detemines what task of the Open command made the call. If the call is from ODS, the newly created FFIB is written to disc. Next, a PIOFIB Is created. (Calls from VSC enter here to have a PIOFIB created for a disc resident file not currently open). OFC next determines if a SOFT entry is available. If not, a call is made to WCP. WCP returns to the entry point of OFC and branches back to build a SOFT entry. After the SOFT entry is built, the ANLE reflects the Disc Address, Open Count and SOFT displacement. The FCB has a completion code and SOFT displacement.

Flowcharts for OFC are shown in FIGS. P10–P12.
.7.4 Task Name VSC
  .1 Entry Point ON3
  .2 Input Disc Address of file or ANLE pointer where disc address may be found.
  .3 Output
    A. If PIOFIB exists and shared use is allowed:
      1. FCB Completion Code
      2. SOFT Displacement
    B. If PIOFIB exists and shared use is not allowed; the registers are saved as parameters to call Open's task WCP (Waiting Command Processor).
    C. If PIOFIB does not exist:
      1. A CM created FFIB.
      2. Function code to call OFC.
  4. Description:

VSC validates for Access Name Opens that the FCB intended use is allowed by access attributes in the ANLE. If the intended use conflicts with the current state of the file, VSC calls WCP to cause the caller to be put in a wait state to be reinitiated when the file is closed by the current users.

VSC searches the SOFT for the disc address supplied and increments the Open Count in the SOFT entry if shared use is allowed; the SOFT displacement is returned and the ANLE Open count is also incremented if applicable.

If the disc address is not found, DIO is called to read up the FFIB at the Disc Address supplied. The FFIB read is validated by an identifier (*FIB) and a call to OFC is made if a valid FFIB has been read. If not, an error condition is returned to the caller.

For Access Name Opens that use VSC, the RCL is utilized by placing the callers referencing command ID in the RCL.

Flowcharts for VSC are shown in FIGS. P13-P18.

.7.5 Task Name WCP

.1 Entry Point: ON4

.2 Input: Registers are saved in CPT as input to WCP.

.3 Output: An entry in the WCL and SOFT displacement to entry returned to Command Controller.

.4 Description:

WCP puts the Referencing ID of the calling command in the waiting command list. The return is to Command Controller. The calling command will be put in wait state until all current users of the file being waited upon have closed the file. At that time, Command Controler may reinitiate the callers task.

Flowcharts for WCP are shown in FIGS. P19-P20.

CLOSE

.1 Purpose: The Close component terminates the processing of a file, and updates the control information of the file so that it may subsequently be used. The close command is issued from the source language in order to flag the information tables created by the open command such that no additional disc memory can be allocated for the particular file being processed.

.2 Characteristics: Command

.3 Input: The caller of the Close command must supply a two word argument table with:
  A. A FCB Pointer: (the FCB contains the parameters needed by Close to perform the callers request).
  B. A Function Code: The function code is used to determine whether the Command ID or Job ID was used as a referencing command ID to open file. The function code may be:
    1. Zero: Command ID was used.
    2. Not Zero: Job ID was used.

Note: A command Controller Subprogram runs in front of Close an expands the Callers argument table to include a Access Name List pointer. The argument table contains:
  1. The calling Command ID (step ID)
  2. A pointer to the header of the calling command's ANL chain.
  3. A pointer to the FCB (callers).

.4 Output
  A. The Status and Completion code fields of the FCB. (See Table CC1 Word 3 Bytes #1 and #2).
  B. The Access Name List Entry may be modified.
  C. Access to the PIOFIB will be removed. (The PIOFIB will be released if no other user has the file open.)
  D. The FFIB may be updated. (If no other user currently has the file open and the PIOFIB indicates that the file has been modified, the FFIB will be updated.)
  E. A list of waiting Commands will be released to Command Controller if no other users have the file open and commands are waiting to open the file.
  F. The SOFT entry will be removed if the open count=0.
  G. If the close is performed for a step Local or Sysout file; the Step Access Name List Entry and the disk space used for the file are released.

.5 Interfaces
Components Called:
Disc Assignment Component (DAC)
DIO
Memory Management
Tables and Data blocks Used/Modified:
System Open File Table (SOFT)
Referencing Command List (RCL)
Waiting Command List (WCL)
File's File Information Block (FFIB)
PIO File Information Block (PIOFIB)
PIO File Information Block (PIOFIB)
Access Name List (ANL)
Logical File Control Block (LFCB)
File Control Block (FCB)

.6 Description:

The primary function of Close is to update the File FIB to reflect changes in the file since it was opened, and to destroy the connection of the user to the file by removing the user's access to the PIOFIB. The FIB is updated on disc if no other users currently have the file open and the PIOFIB shows that the file has been modified.

The same FCB used to open the file may be used to close the file. Table CC1 shows the parameters used and/or modified by the Close command.

TABLE CC1

| Word | File Control Block (Used by Close) | | | |
|---|---|---|---|---|
| 0 | Not Used | Function | Release | Not Used |
| 1 | Access Name (1st 4 Chars) or Disc Address | | | |
| 2 | Access Name (last 4 Chars) | | | |
| 3 | Not Used | Status | C. Code | Not Used |
| 4 | Displacement to Soft Entry | | | |
| 5 | | | | |
| 6 | | | | |
| 7 | | | | |
| 8 | Pointer to Access Name List Entry | | | |
| 9 | | | | |
| 10 | | | | |

Words 5–7: not used or changed
Words 9–10: not used or changed

Word 0  Byte 0: Not used or modified by Close.
        Byte 1: 0 indicates Access Name Close
                1 indicates Disc Address Close
        Byte 2: 0 indicates file is not to be released
                1 indicates file is to be released

TABLE CC1-continued

| | | |
|---|---|---|
| | Byte 3: | Not used or modified by Close. |
| Word 1 | | First four characters of Access Name if function indicates Access Name Close. Disc Address of file if function indicates Disc Address Close. |
| Word 2 | | Last four characters of Access Name if function is Access Name Close. |
| Word 3 | | |
| | Byte 0: | Not used or modified by Close |
| | Byte 1: | Status of Close process |
| | | 0 Not Started |
| | | 3 In Process |
| | | 4 Complete |
| | Byte 2: | Completion Code |
| | | 0 Successful completion |
| | | 1 Parameter conflict (invalid function code) |
| | | 2 Access Name List Entry not found. |
| | | 3 Disc Address supplied not found in SOFT. |
| | | 4 Attempt to Close a file already closed, or not opened by Access Name supplied |
| | | 5 Release Option specified: File Not Released |
| | Byte 3: | Not Used or modified by Close |
| Word 4 | | Displacement to SOFT entry. (Used if supplied. If not supplied the necessary searches are performed by Close.) |
| Words 5, 6 & 7 | | Not modified or used by Close |
| Word 8 | | A pointer to the Access Name List Entry. (Used if supplied with an Access Name Close. If not supplied, the necessary searches are performed by Close.) |
| Words 9 & 10 | | Not used or modified by Close |

The Access Name List Entry may be modified or released by Close.

A. If the release option is not specified, the ANLE will not be removed. The file will be updated if no other users currently have the file open.

B. If the release option is specified, the ANLE will be removed if no other user has the file open by the name. If the ANLE is removed, the file is updated and released. (Disc release will decrement the user count in the FFIB and release the file if the user count=0.) If the file has been opened by the same Access Name more than once, Open will decrement the open count in the ANLE. When the file is closed, the ANLE Pointer and SOFT displacement will be removed from the caller's FCB.

If the FCB function for close is Disc Address and a SOFT displacement is given in the FCB, Close will use the displacement and determine that the disc address located at the Entry (in the SOFT) is the same as in the FCB. If it is not, or the SOFT displacement is not given, Close will search the SOFT to find the Disc Address supplied in the FCB. If the Disc Address in the FCB is not found in the SOFT, Close exits with an error completion code (in the FCB) to the caller. If the Disc Address is found, the open count in the SOFT entry is decremented. If no other users currently have the file open, the FFIB is updated, and the SOFT Entry removed. If the release option is specified, the file is released and the SOFT displacement is removed from the FCB.

Command Lists: Pointers to a list of command IDs may exist in the SOFT entry. The list may be a Referencing Command List or Waiting Command List.

A. Referencing Command List:

Any command which opens a file by access name with an Access Name List Entry in the JPT's ANL chain will have either: (1) Its command ID placed in the SOFT Entry Word reserved for a RCL pointer (if the open count=1), or 2. Its command ID put in the Referencing Command List (if the file is being shared). Close will always remove the Command ID when the command closes the file. When the Command List becomes such that only one user has the file open, Close will put that Command ID in the RCL pointer word and release the CM used for the list.

B. Waiting Command List:

When the SOFT Entry open count becomes zero, Close checks the wait count to see if commands are waiting to open the file. If commands are waiting to open the file, Close returns a list of the waiting command's IDs to command controller.

.7 Tasks of the Close Command:
  A. CLS Close Preprocessing
  B. CFC Close File Component
  C. CUR Close Update Release
  .1 Task Name—CLS—Close Preprocessing
    .2 Entry Point—CLS
    .2 Input—Argument table containing,
      1. Command/Job ID
      2. ANL pointer
      3. FCB pointer
    .3 Output:
Either an error completion code in the caller's FCB or the registers will be saved in Close's CPT as input parameters to call CFC.
    .4 Description:
CLS determines that a valid disc address or Access Name is being used for the Close.
      Four errors may possibly be encountered in CLS which would cause an error return to the caller. They are:
        1. Invalid Function Code (Parameter conflict)
        2. Access Name List Entry not found.
        3. Disc Address not found in SOFT
        4. Attempt to close a file not opened with command ID received.
      If an error is not encountered a call will be made to CFC. The Flowchart for CLS is shown in FIGS. C1-C2.
  .2 Task Name—CFC—Close File Component
    .1 Entry Point—CL1
    .2 Input—Registers saved in Close's CPT are input parameters.

.3 Output—FCB completion code may be returned.

.4 Description—CFC removes the referencing command ID from the SOFT for Access Name Closes.

If the SOFT entry Open Count indicates no other users have the file open and the release option has not been specified, a call will be made to CUR to update the FFIB on disc. If the file is not shared and the release option is specified a call will be made to DAC to release the file.

Exits from CFC may be to Disc Allocation Component (DAC) to release the file; Successful Close exit to caller; Error exit to caller; or to CUR.

The Flowchart for CFC is shown in FIGS. C3–C4.

.3 Task Name—CUR—Close Update Release

.1 Entry Point—CL2

.2 Input—SOFT displacement to entry.

.3 Output—Updated FFIB on disc. FCB completion code.

.4 Description—If the file has been modified since it was opened the FFIB will be updated on Disc.

The PIOFIB is delinked and the NUCELS used for the PIOFIB are made available to the system.

The Waiting Command list will be returned to Command Controller (if a WCL exist).

The SOFT entry will be made available for use.

A call is made to DAC (Disc file release process) if the release option is specified. If the release option is specified for an Access Name Opened file, the Access Name List Entry is delinked and released.

Exits are to; DAC to release the file; Error return to caller if a parity error is encountered or a successful exit to caller.

The SOFT displacement and ANLE pointer are removed from the caller's FCB. If the file is not released the SOFT displacement is also removed from the ANLE.

The Flowchart for CUR is shown in FIGS. C5–C7.

DISC ASSIGNMENT COMPONENT

.1 Purpose—The Disc Assignment Component is responsible for managing the assignment and release of the ASC disc resources to the various files within a job.

.2 Characteristics—DAC consists of several tasks all of which are disc resident.

.3 Input—Specific input varies between each DAC task and the function involved. Detailed input will be described at the individual task description level.

.4 Output—Upon successful completion of a series of tasks within the Disc Assignment component, the various tables associated will be updated. An error completion code is generated if completion is unsuccessful.

.5 Subsections—The Disc Assignment Component consists of three distinct sections. They are:

.1 Pre-processor—Its function is to validate an allocation request, select the channels/modules required to carry out the allocation, set up the Task Parameter Table (TPTB) to be used by future tasks in DAC, and interface with the allocation and release processes.

.2 Allocation—Its function is to select and map enough available disc space to hone a specific request.

.3 Release—Its function is to make space previously assigned available for reassignment.

.6 Tables—The following tables are used by the tasks of DAC:

.1 Module Select Queue (MOSQ)—The header for the MOSQ is one word in length and contains the amount of space in quarter bands which is yet to be allocated at any one time. There is a one word entry in the MOSQ for each module of disc which contains the Channel/Module number and the amount of disc which is to be allocated from that module. Entries are placed in the order of module preference for file release which parallels DMS (Disc Module Selection) assignment preference. MOSQ is shown in Table 1.

TABLE 1

| AMOUNT OF DISC TO BE ALLOCATED | |
|---|---|
| Channel/Module | Disc Allocated on Module |

The Module Select Queue is used by Disc Assignment Component for the passing of information between the various associated tasks. This table is internal to the component, is formed as a part of the TPTB, and cannot be obtained or used by any other command.

.2 Disc Resource Table (DRTB)—The purpose of the Disc Resource Table is to serve as an inventory of the overall disc resources available and as a depository for control and statistical data used by the Disc Assignment algorithms. Table 2 shows the header and the information used for one channel. The length of the table varies according to the number of channels.

TABLE 2

| | NUMBER OF ENTRIES | TOTAL DISC AVAILABLE | |
|---|---|---|---|
| | CHANNEL STATUS | CHANNEL I D | FILE COUNT |
| | CHANNEL SELECT COUNT | SPACE AVAILABLE ON CHANNEL | |
| MOD 0 | MODULE SELECT STATUS | BAND STATUS TABLE ADDRESS | |
| | MODULE STATUS | SPACE AVAILABLE ON MODULE | |
| MOD 1 | MODULE SELECT STATUS | BAND STATUS TABLE ADDRESS | |
| | MODULE STATUS | SPACE AVAILABLE ON MODULE | |

The number of entries in the table corresponds to the number of channels. Total disc available represents the disc space available in band or larger size fragments. Space available in sub-band fragments is not included in this quantity. The channel status, channel select count, and module status bytes are used as internal flags by Disc Assignment to represent the availability of disc. The channel ID indicate the number of the channel referred to by the channel directory entry. The file count represents the number of files that receive their initial allocation of disc from this channel. Space available on the channel represents the amount of space which can be obtained on the channel if the inactive files are released. Space Available on the module represents the amount of space which can be obtained on the module without releasing the inactive files.

.3 Band Status Table (BDST)—Disc is broken down artificially into sections known as domains which are further broken down into fragments. All of the fragments within a domain are the same size, but the size of fragments differs between domains. These domains are physically arranged on disc so that the domain with the larger fragment size has a lower absolute disc address (ABDA) than a domain with smaller fragments. When a request is made for disc space, Disc Assignment will try to assign a fragment of of the size requested. Information concerning this allocation is kept in the BDST.

The header for a BDST consists of three words as shown in Table 3. The first of these gives the number of domains, the total number of borrow blocks, and an index pointing to the first borrow block for this Band Status Table. The block address is determined by combining the index and the address of the BDST. The second and third words contain the absolute disc addresses of the head and tail of the Inactive File Chain respectively. These two words will have #FF in their first byte if there are no entries on the IFC.

TABLE 3

| # of Domains | Total # Blocks | Block Address |
|---|---|---|
| ABDA of first link in IFC | | |
| ABDA of last link in IFC | | |

A domain directory is given for each domain of each BDST as shown in Table 4. It contains counters and pointers relevant to each size domain. The first word gives an index to the borrow block associated with this domain, the size of a fragment within the domain, and the number of fragments which have not been previously selected for assignment. The fragment size is given in quarter bands. The second word given an index to the bits to be tested in the band status fields to determine disc availability and the number of fragments in the domain before any are allocated. The indices in the domain directory are used by adding them to the address of the associated data item. The third word contains the absolute disc address of the first fragment within this domain.

TABLE 4

| Borrow Index | Fragment Size | # Fragments not Selected |
|---|---|---|
| Index to bits to be tested | | # Fragments in domain |
| Absolute Disc Address Represented | | |

If there are no fragments available of the appropriate size for filling the disc request, an attempt will be made at "borrowing" a larger fragment. In borrowing, a larger fragment of the size closest to that of the borrowing fragment will be used. If there is no more room in the borrow block for a borrow entry it will be necessary to combine smaller fragments. There is no borrow area for fragments of the largest size or for sub-band fragments. The first word of the borrow block serves as a header. It gives the size of the borrowing fragment and the possible number of borrows for a fragment of this size. This header is not changed during execution. A borrow entry shows the number of borrowed fragments in use, the number of borrowed fragments available for use, an index to the representative bits in the band status field, and the size of the borrowed fragment as shown in Table 5.

TABLE 5

| | Borrowing Fragment Size | Possible # Borrows | |
|---|---|---|---|
| # Fragments Borrowed | # Fragment Yielded | Fragment Index | Borrowed Fragment Size |

The band status section consists of a number of bits which are used to indicate the availability/unavailability of an area of disc as shown in Table 6. One bit is used to represent a band for a band or larger fragment area. One bit is used to indicate a sub-band for a sub-band fragment area. A "zeroed" bit indicates an available disc area.

TABLE 6

| | | | Band Status Field |
|---|---|---|---|

.4 Disc Mapping—Disc space assigned to a file is software mapped by the Disc Assignment Component. This map is kept in the File Information Blocks (FIB) associated with the file and is used by DIO to determine the boundaries of a file and to convert virtual addresses into absolute disc addresses. The mapping entries are also used to return the disc allocated to a job when a file is released. (Refer to Table 7).

There are three types of disc mapping entries: a Channel ID entry, a band resolution entry, and a sub-band resolution entry. Each is one word long and is identified by the first two bits of the entry.

A channel ID entry is denoted when bit 0 of the entry is zero. This entry identifies the channel from which the subsequent entries were allocated. Anytime an assignment crosses channels, a new channel ID entry is inserted in the map.

An entry for a band resolution fragment is identified by a bit configuration of 10 in the first two bits of the entry. This entry contains the module number (0 or 1), the absolute band address at which the contiguous area of disc begins, and the length of the contiguous area given in multiples of bands.

An entry for a sub-band resolution fragment is identified by all bit configuration in the first two bits of the entry. This entry contains the module number (0 or 1), the absolute sector address at which the contiguous area of disc begins, and the length of the contiguous area given in multiples of quarter bands.

A band or sub-band map entry also uses bit 2 for internal bookkeeping to indicate whether a fragment of the desired size was found or if it was necessary to borrow from a larger fragment.

TABLE 7

| 1 | Channel ID | | | |
|---|---|---|---|---|

| 1 | 0 | | MOD | Absolute Band Address | # Bands |
|---|---|---|---|---|---|

| 1 | 1 | | MOD | Absolute Sector Address | # Quarter Bands |
|---|---|---|---|---|---|

.5 Inactive File Chain—An inactive file chain is a threaded list of inactive FIB's residing on Disc. There is one inactive file chain for each disc module attached to the system, and is headed by the associated module's BDST. The head consists of the absolute disc address of the oldest and newest entries on the chain. Additions to the chain are made to the "newest" end of the chain. Each entry in the chain points to the next oldest entry in the chain.

.1 Inactive File Chain is shown in Table 8.

TABLE 8

| CM | ABDA of oldest FFIB on Chain |
|---|---|
| | ABDA of newest FFIB on Chain |

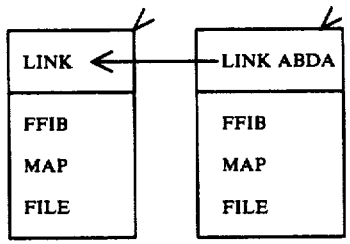

DISC

.6 Significant Words in FIBs—Along with the map entries which reside in the FIBs, the four words immediately preceding the first map entry are used by Disc Assignment as shown in Table 9. The first of these gives the amount of disc which is to be assigned to the file initially and is there after used to show the current amount of disc assigned. The second of these gives the amount of disc which is to be assigned to the file each time a request is made for additional space. The third word specifies a limit for the maximum total space which is to be allocated to the file. The fourth word shows the number of entries in the map and also has a flag which is used internally by Disc Assignment to specify the last channel and module used.

TABLE 9

| Initial and Current Disc Allocated | |
|---|---|
| Allocation Increment | |
| Allocation Maximum | |
| # Entries in map | Last Ch/Mo used |

.7 Comments

.1 The Job Scheduler component determines the amount of disc space resources reserved for a job. The allocation processor of DAC performs the actual assignment of the disc space reserved to a job among its various files.

.2 Treatment of the assignment of disc space is based upon the following considerations: (a) Short mapping tables are important. This means that the number of disc fragments necessary for an assignment should be minimized. (b) Fragmentation is inevitable; however, the algorithms chosen should retard the fragmentation. (c) Allocation must be responsive to 10 considerations. This means balancing the allocation load across channels (by file), and assigning units of allocation which would not result in timing conflicts.

.3 Disk is divided into both physical and logical units. Physically there are up to 16 channels, 2 modules per channel, 1536 bands per module, 256 sectors per band, and 64 words per sector. Disc is logically divided by the BDST into sections called domains. A domain represents a physical area on disc from which all allocations will be limited to a single standard size. Each domain is subdivided into unisized fragments which represents a contiguous string of disc bands which are assigned and released as a unit. The domain boundaries, determined by the number or size of the fragments in the domains, are predetermined by the installation at Sysgen through the information stored in the Band Status Table.

.4 It is expected that the number of the various sized fragments assigned to each domain will vary between installations. In this manner, Disc Assignment can be "turned" to fit the needs of any environment. Ideally there will be a fragment of the desired size available for assignment whenever desired and it will not be necessary to borrow or combine.

.5 Disc Assignment determines which domain to search for available fragments of disc by analyzing the size of the allocation request. Very small amounts (less than 16,000 words) will be selected from the sub-band domain where each fragment represents a ¼ band. All other domains contain fragments of either 1,2,4,8,16, or 32 band size.

.6 The search for available fragments of disc space begins on domain boundaries and proceeds from left to right.

Flowcharts for the Disc Assignment Component (DAC) are shown in FIG. DA1.

DISC PRE-PROCESSOR

1. Purpose—Disc Assignment Pre-Processor (DPP) is responsible for the validation of request for disc space. If the validation is successful it also initializes certain quantities in the Task Parameter Table (TPTB) for use by the following Disc Assignment tasks.

2. Input—Input to DPP is a parameter word in the Task to Task Parameter Table (TTPT) consisting of a function code and a parameter block pointer as shown in Table 10 t,1120
   1. Initial file allocation—A call from the OPEN component will result in an initial file allocation. The function code will be a $00_H$ and the parameter block pointed to will be a partially constructed File Information Block (FFIB) in Central Memory (CM).
   2. Append file allocation—A call from the DIO component will result in an append file allocation. The function code will a $01_H$ and the parameter block pointed to will be a DIO Reguest Queue Entry in CM.
   3. Release—A call to release a specific file on disc will result in an SCALL to Disc File Release to update information. The remainder of the DPP task will not be processed if a release is called for. The function code will be $02_2$.

3. Output—Whether validation is successful or not, DDP will set the Disc Assignment complete bit in the DIO Request Queue Entry if the request is an append. Other output will depend upon type of completion.
   1. Successful—Upon successful completion, the first two words of the Module Select Queue (MOSQ) in the TPTB will be initialized, a word in the TPTB will indicate the number of words in the Band Status Table per module (TPTBNWPD), the flagging bits in the Disc Resource Table will be zeroed, and the current allocation in the Job Parameter Table (JPTB) will be updated. If the request is an append, the current allocation in the DIO File Information Block (DFIB) will also be updated. In the case of successful validation control will be passed to Disc Module Selection.
   2. Unsuccessful—If completion is not successful termination will occur with an error condition being passed to Command Controller. The three error conditions tested for are as follows:
      A. The amount of disc requested to be appended to a users present allocation exceeds the maximum specified.
      B. The amount of disc requested for assignment together with the amount currently assigned to the users job exceeds the reservation.
      C. The amount of disc requested is greater than the amount currently available within the system.
      In the case of unsuccessful validation control will be passed to Command Controller.

.4 Comments
   .1 On an initial request for disc space, if the user does not specify the amount of disc he wants assigned, the default value will be two bands.
   .2 On an append request, if the user does not specifiy the amount of additional disc space requested, he will receive the amount specified by the reservation amount less the amount currently allocated.
   .3 On an append request, if neither the increment amount or the maximum amount are specified, two bands of disc space will be assigned to the file.
   .4 On an append request, if the increment amount is specified but there is no maximum specified, the append will be assigned.
   .5 On an append request, if the increment amount specified is less than two bands and four times the increment amount is less than the maximum amount, two bands of disc will be assigned.

Flow charts for the Disc Assignment Pre-Processor are shown in FIGS. DA2-DA4.

DISC MODULE SELECTION

.1 Purpose—Disc Module Selection (DMS) is responsible for determining the order to be used in assigning disc space on the various modules.

.2 Input—Input to DMS is the Task Parameter Table (TPTB) used by the Disc Pre-Processor routine. Any input information required by this task will have been placed in the TPTB by DPP.

.3 Output—There are no error returns within this task. However, there are two possible exit points which will initiate either of two tasks.
   .1 Disc Assignment Processor—If there is enough free space (not assigned to either active or inactive files) DAP will be the task to execute after DMS. DMS furnishes this task with the order for processing modules in disc assignment and the amount of disc which is to be assigned to the various modules. These items are stored in the TPTB which is to be passed on to DAP.
   .2 Disc File Release—If there is not enough free space available, DFR will be the task to execute after DMS. This task furnishes DFR with an order to used in selecting modules to release files off their inactive File Chains and the amount of free space already selected for assignment to the various modules. These items are stored in the TPTB which is to be passed on to DFR.

.4 Comments—In selecting a channel/module for assignment the following rules are observed:
   .1 If the request is an append function, the first channel/module selected will be the same channel/module which was last chosen in processing the file.
   .2 The first channel assigned if the request is not an append function will be the one with the least number of files.
   .3 Channels will be selected on the basis of most channel space available after the first channel selection.
   .4 In all instances except the first selection for an append function the module with the largest number of the largest fragments will be selected. Checks are made to insure that a module is active and has not been previously selected.

Flowcharts for the Disc Module Selection routine are shown in FIGS. DA5-DA9.

DISC ALLIGNMENT PROCESSOR

.1 Purpose—Disc Assignment Processor (DAP) performs the actual assignment of the disc space reserved to a job among its various files. It assigns the actual disc space necessary to satisfy the user request and builds a map of the allocated disc space.

.2 Input—DAP will be entered from either of two tasks; DMS if it was determined that there was enough space available for assignment without releasing inactive files or DRP if it was necessary to release inactive files in order to provide the space necessary for assignment. Any input information required by this task will have been placed in the task parameter table by DRP or DMS.

.3 Output—Output from Disc Assignment Processor will depend upon the type of completion.

.1 Successful—Upon successful completion a disc map in the File Information Block (FIB) will be built or updated. The disc map is required by DIO to convert virtual disc addresses into actual disc addresses, and disc release to return assigned disc space to the available pool. The various tables associated with the Disc Assignment Component are updated.

.2 Unsuccessful—If completion is not successful, termination will occur with an error condition being passed to Command Controller. The two error conditions tested for are as follows:

A. The length of the disc map is exceeded. The length of the FFIB is restricted to two sectors (128 words) and when the number of map entries causes this length to be exceeded an error will result.

B. If there are no quarter bands available when required, an error condition will result. There are only a finite number of quarter bands available and when these have been assigned termination will occur.

.4 Comments

.1 If a fragment of the desired size is not available for assignment the Disc Assignment Processor will be able to either borrow a fragment from a domain of larger fragments and use a portion of it or assign several smaller fragments until the desired amount of disc space have been assigned.

Preference will be given to borrowing; i.e. smaller fragments will be combined only in the event that there are no fragments of the required size and no larger fragments.

.2 It is not possible for the thirty-two band or quarter band domains to borrow. If there are no thirty-two band fragments available when required it will be necessary to combine smaller fragments. If there are no quarter band fragments available when required termination will occur with an error condition specified.

.3 If a fragment is borrowed by a smaller fragment the borrowed fragment will be available for assignment to fragments of the borrowing size only; i.e. if an eight band fragment borrows a sixteen band fragment it will be broken up into two eight band fragments and cannot yield an eight band fragment and two four band fragments.

.4 When the areas of disc assigned are contiguous, DAP will update the last map entry to include the new area rather than building another map entry. If a borrow took place in assigning an area of disc a new entry must be made in the disc map. These entries will not be comined when contiguous.

Flowcharts for the Disc Assignment Processor routine are shown in FIGS. DA10–DA19.

DISC FILE RELEASE

.1 Purpose—Disc File Release (DFR) acts as a controlling task for Disc Release Processor. It is responsible for removing the information pertinent to a file prior to the release of the file. It also decides which files are to be released immediately and which are to be placed on the Inactive File Chain.

.2 Input—DFR will be started when the Disc Assignment Processor determines that there is not enough free space available to fill a request, making it necessary to release files on the Inactive File Chain or when Disc Pre-Processor determines that the Disc Assignment Component has been called to release a file. The two word input parameter block located in the TPTB will be as shown in Table 11.

TABLE 11

| Function Code | |
|---|---|
| ABSOLUTE DISC ADDRESS/MODULE SELECT QUEUE | |

.1 If the call to DFR is initiated by DPP, the first byte of the first word will contain a function code of $02_H$. The second word of the parameter table will contain the absolute disc address of the file to be released.

.2 If the call to DFR is intitiated by DAP, the first byte of the first word will contain a function code of $00_H$ or $01_H$. The second word of the parameter block will be the first word of the thirty-four word MOSQ.

.3 Output—Output from Disc File Release will depend upon the type of completion.

.1 Successful Upon successful completion the various tables and information blocks associated with the Disc Assignment Component will be updated.

.2 Unsuccessful If completion is not successful termination will occur with an error condition being passed to Command Controller. The three error conditions tested for are as follows:

A. If an unrecoverable parity error occurs in reading the FFIB and the parity error occurs in a relevant area of disc an error condition will result.

B. When an error is determined in "CLOSEing" a catalog, an error code is passed to Disc File Release which in turn treats the condition as an error in its processing.

C. The amount of disc to be freed by Disc File Release must be obtained or an error will be indicated.

.4 Comments

.1 Disc File Release divides files into three major groups: catalog files, catalogs, and other files. In order to keep catalog files on disc for as long a time as possible they will be placed on an inactive file chain until the space which they use is required by another file. They will not be released until Disc Assignment Processor determines that the disc they occupy is required.

.2 If a catalog is being released Disc File Release will update the File Management tables associated with the catalog.

.3 If files are being released because additional disc space is required files will continue to be released from the Inactive File Chain until the required amount of space has been acquired. If Disc Assignment Component is called to release a file processing will take place one at a time.

.4 It is possible for the user to specify a release option when releasing a file. If specified the Disc File Release task will call the Erase task to write zeroes into the area which the file occupied. This will only happen after all users have completed use of the file.

Flowcharts for the Disc File Release Routine are shown in FIGS. DA20-DA25.

PROCESSOR

.1 Purpose—Disc Release Processor (DRP) processes the disc map built for a file by the Disc Assignment Processor and updates the DAC tables making space defined by the map available for reassignment. DRP also searaches the Bad Band Table (BAND) to determine if any of the bands on which the released file resided contained read errors. Any bands so noted are marked unavailable for reassignment.

.2 Input—DRP will be entered from the Disc File Release (DFR) task. Any input information required by this task will have been placed in the task parameter table by DFR.

.3 Output—There are no error returns within this task. Upon completion this task will return to DFR with the Disc Assignment Component tables updated. It will also return to DFR the amount of space released in band or larger fragments within the updated Task Parameter Table.

.4 Comments—If a bad band is detected while releasing a file the entrie fragment that the bad band is in will not be available for reassignment. The quantity of disc which the fragment represents will be removed from the available space.

Flowcharts for the Disc Release Processor are shown in FIGS. DA26-DA32.

Having described the invention in connection with certain specific embodiments thereof, it is to be understood that further modifications may now suggest themselves to those skilled in the art and it is intended to cover such modifications as fall within the scope of the appended claims.

What is claimed:

1. A digital computer system having a control means for allocating memory space for storing a data file in at least one cyclic memory wherein said cyclic memory includes at least one data storage device comprising contiguous storage elements, said cyclic memory being partitioned into a plurality of data storage regions and wherein each of said data storage regions is also partitioned into a plurality of data storage subregions with all subregions within a given region being assigned equal storage capacity of contiguous storage elements and with subregions of different regions being assigned different storage capacities of said contiguous storage elements comprising:

(a) means for generating a list for all data storage subregions of said storage device including a beginning absolute address of each subregion;

(b) means for ordering the list of subregions in order of decreasing memory capacity, said subregions being grouped in their respective regions;

(c) means for indicating the storage capacity and availability of each said subregion group;

(d) first storage means for storing said ordered list as a table, wherein said table includes with each subregion entry, the indicia of the storage capacity and availability of the respective subregions;

(e) means for sequentially searching said table including comparison means for comparing the storage capacity of each available subregion with the memory space required for the data field to be stored in said cyclic memory system;

(f) means for assigning and storing the data file to be stored in the first available subregion having the smallest available storage capacity which will completely contain the data file to be stored, and when no such subregion is available, including means for assigning and storing at least part of the data file to be stored in the first available subregion whose storage capacity is less than or equal to the memory space required for the part of the data file in accordance with the result of the comparison by said comparison means; and (g) means for reinitiating operation of said searching means until the comparison means indicates an absence of any portion of a data file that has not been stored.

2. The digital computer system of claim 1, further comprising:

(h) second storage means; and (j) means cooperating with the means for assigning and storing for generating and storing in the second storage means a separate entry for the whole or the parts of each data file which are stored in available subregions to form a data file information table containing a mapping table of the data file.

3. The digital computer system of claim 2 wherein the format of the data file information table comprises a cyclic memory channel number, a plurality of address entries wherein each address entry contains a cyclic memory number, an absolute band address specifying a location at which each subregion begins and the length of each subregion, and wherein the digital computer system has at least two cyclic memories and is connected by channels to the at least two cyclic memories, the data storage regions being divided into bands, the bands comprising a specified number of subregions identical in storage capacity within one region but differing in storage capacity from region to region, and wherein the second storage means includes means for storing the format of the data file information table.

4. The digital computer system of claim 1 wherein the at least one cyclic memory of the digital computer comprises a magnetic storage disk.

5. A control system in a digital computer system for a cyclic memory system for storing a data file in a random access memory wherein the cyclic memory system comprises at least one cyclic memory having a plurality of contiguous storage elements and includes at least one data storage device partitioned into a plurality of memory regions wherein each of said regions is also partitioned into a plurality of cyclic memory subregions with all subregions within a given region being assigned equal memory capacity of contiguous storage elements and with subregions of different regions being assigned different memory capacities of contiguous storage elements, the control system comprising:

(a) means for generating an ordered list of all said subregions in an order of decreasing memory capacity, grouped in their respective regions including a beginning absolute address of each subregion;

(b) means for indicating the availability of each of the subregions;

(c) first means for storing the ordered list in the random access memory along with the indicia of availability of each of the subregions;

(d) means for searching the list including comparison means for comparing the memory capacity of each available subregion with the memory space required for the data file to be stored in the cyclic memory system;

(e) means for assigning and storing the data file to be stored in the first available subregion having the smallest available storage capacity which will completely contain the data file to be stored and when no such subregion is available, for assigning and storing at least part of the data file to be stored in the first available subregion whose storage capacity is less than or equal to the memory space required for the part of the data file in accordance with the results of the comparison means; and (f) means for reiniating operation of the searching means until the comparison means indicates an absence of any portion of a data file that has not been stored.

6. The control system of claim 5 further comprising:

(g) second storage means in the random access memory; and (h) means, cooperating with the means for assigning and storing, for generating and storing in the second storage means, a separate entry for the whole or parts of each data file which are stored in available subregions to form a data file information array containing a mapping table of the data file.

7. The control system of claim 2 wherein the format of the data file information array comprises a cyclic memory channel number, a plurality of address entries wherein each address entry contains a cyclic memory, an absolute band address specifying a location at which each subregion begins and the length of each subregion and wherein the control system has at least two cyclic memories and is connected by channels to the at least two cyclic memories, the bands comprising a specified number of subregions identical in storage capacity within one region but differing from region to region in storage capacity, and wherein the second storage means in the random access memory includes means for storing the format data information array.

8. The control system of claim 5 wherein the at least one cyclic memory comprises a magnetic storage disk.

* * * * *